(12) United States Patent
Yuen et al.

(10) Patent No.: US 7,499,628 B2
(45) Date of Patent: Mar. 3, 2009

(54) ENHANCING OPERATIONS OF VIDEO TAPE CASSETTE PLAYERS

(75) Inventors: Henry C. Yuen, Redondo Beach, CA (US); Daniel S. Kwoh, Flintridge, CA (US); Roy J. Mankovitz, Encino, CA (US); Carl Hindman, Redondo Beach, CA (US); Hing Y. Ngai, Rancho Palos Verdes, CA (US); Yee Kong Ng, Tai Po (HK); Elsie Y. Leung, South Pasadena, CA (US)

(73) Assignee: Index Systems inc., Los Angeles, CA (US)

( * ) Notice: Subject to any disclaimer, the term of this patent is extended or adjusted under 35 U.S.C. 154(b) by 1238 days.

(21) Appl. No.: 10/173,816

(22) Filed: Jun. 17, 2002

(65) Prior Publication Data

US 2003/0190138 A1  Oct. 9, 2003

Related U.S. Application Data

(63) Continuation of application No. 09/532,640, filed on Mar. 21, 2000, now abandoned, which is a continuation of application No. 08/773,612, filed on Dec. 30, 1996, now Pat. No. 6,091,884, which is a continuation of application No. 08/176,852, filed on Dec. 30, 1993, now abandoned, which is a continuation-in-part of application No. 08/167,678, filed on Dec. 15, 1993, now abandoned, which is a continuation-in-part of application No. 08/066,666, filed on May 27, 1993, now abandoned, which is a continuation-in-part of application No. 08/014,541, filed on Feb. 8, 1993, now abandoned, which is a continuation-in-part of application No. 08/001,125, filed on Jan. 5, 1993, now abandoned, which is a continuation-in-part of application No. 07/883,607, filed on May 7, 1992, now abandoned, which is a continuation-in-part of application No. 07/817,723, filed on Jan. 7, 1992, now abandoned, which is a continuation-in-part of application No. 07/805,844, filed on Dec. 5, 1991, now abandoned, which is a continuation-in-part of application No. 07/747,127, filed on Aug. 19, 1991, now abandoned.

(51) Int. Cl.
 *H04N 5/76* (2006.01)
 *H04N 7/00* (2006.01)
(52) U.S. Cl. .............................. 386/83; 386/95; 386/46
(58) Field of Classification Search .................... 386/1, 386/6–8, 45, 69–70, 81, 83, 95, 125–126; 360/15, 69, 72, 79
See application file for complete search history.

(56) References Cited

U.S. PATENT DOCUMENTS 2,548,011 A * 4/1951 Frost .......................... 434/313

(Continued)

*Primary Examiner*—Thai Tran
*Assistant Examiner*—Gelek Topgyal
(74) *Attorney, Agent, or Firm*—Ropes & Gray LLP

(57) ABSTRACT

Operation of a video cassette player is facilitated by providing a VBI decoder which decodes information, such as title, channel, date, time and length of broadcast programs and utilizing the information in providing directory of the programs as well as control of the VCR. The video cassette player is also provided with a VBI encoder for inserting control as well as directory information into the tape, either in the VBI portions of the video track or in the control track.

23 Claims, 167 Drawing Sheets

U.S. PATENT DOCUMENTS

| | | | |
|---|---|---|---|
| 3,601,544 A * | 8/1971 | Murphy | 370/204 |
| 4,125,844 A * | 11/1978 | Bretschneider et al. | 346/74.3 |
| 4,173,026 A * | 10/1979 | Deming | 360/44 |
| 4,180,827 A * | 12/1979 | Gates | 257/556 |
| 4,210,785 A * | 7/1980 | Huber et al. | 360/72.2 |
| 4,224,644 A * | 9/1980 | Lewis et al. | 360/72.2 |
| 4,225,780 A * | 9/1980 | Jacoub et al. | 235/449 |
| 4,338,644 A * | 7/1982 | Staar | 360/132 |
| 4,357,638 A * | 11/1982 | Yoshimaru et al. | 360/72.2 |
| 4,363,039 A * | 12/1982 | Nishimura et al. | 386/69 |
| 4,390,901 A * | 6/1983 | Keiser | 348/465 |
| 4,426,684 A * | 1/1984 | Sechet et al. | 711/213 |
| 4,516,164 A * | 5/1985 | Moxon | 360/53 |
| 4,517,598 A * | 5/1985 | Van Valkenburg et al. | 348/478 |
| 4,554,599 A * | 11/1985 | Shiozaki | 360/69 |
| 4,562,468 A * | 12/1985 | Koga | 375/240.14 |
| 4,573,084 A * | 2/1986 | Iida | 358/300 |
| 4,577,239 A * | 3/1986 | Sougen | 360/15 |
| 4,587,577 A * | 5/1986 | Tsunoda | 386/69 |
| 4,591,931 A * | 5/1986 | Baumeister | 360/72.1 |
| 4,635,121 A * | 1/1987 | Hoffman et al. | 348/731 |
| 4,641,205 A * | 2/1987 | Beyers, Jr. | 386/83 |
| 4,641,208 A * | 2/1987 | Inazawa et al. | 360/72.2 |
| 4,703,465 A * | 10/1987 | Parker | 369/84 |
| 4,706,121 A * | 11/1987 | Young | 348/27 |
| 4,723,181 A * | 2/1988 | Hickok | 360/72.2 |
| 4,734,767 A * | 3/1988 | Kaneko et al. | 348/400.1 |
| 4,755,888 A * | 7/1988 | Hori et al. | 360/16 |
| 4,792,864 A * | 12/1988 | Watanabe et al. | |
| 4,803,551 A * | 2/1989 | Park | 348/468 |
| 4,814,924 A * | 3/1989 | Ozeki | 360/133 |
| 4,841,386 A * | 6/1989 | Schiering | 360/69 |
| 4,857,999 A * | 8/1989 | Welsh | 725/22 |
| 4,864,432 A * | 9/1989 | Freer | 360/27 |
| 4,866,434 A * | 9/1989 | Keenan | 340/825.72 |
| 4,866,542 A * | 9/1989 | Shimada et al. | 386/69 |
| 4,873,584 A * | 10/1989 | Hashimoto | 386/83 |
| 4,880,963 A * | 11/1989 | Yamashita | 235/449 |
| 4,890,171 A * | 12/1989 | Nagao | 360/73.05 |
| 4,894,713 A * | 1/1990 | Delogne et al. | 375/240.2 |
| 4,894,789 A * | 1/1990 | Yee | 348/552 |
| 4,908,707 A * | 3/1990 | Kinghorn | 348/460 |
| 4,908,713 A * | 3/1990 | Levine | 386/83 |
| 4,908,859 A * | 3/1990 | Bennett et al. | 380/212 |
| 4,922,341 A * | 5/1990 | Strobach | 375/240.24 |
| 4,937,844 A * | 6/1990 | Kao | 375/240 |
| 4,951,276 A * | 8/1990 | Sakaegi et al. | 369/53.24 |
| 4,954,892 A * | 9/1990 | Asai et al. | 375/240.23 |
| 4,965,827 A * | 10/1990 | McDonald | 705/65 |
| 4,972,260 A * | 11/1990 | Fujikawa et al. | 375/240.03 |
| 4,977,455 A * | 12/1990 | Young | 348/460 |
| 4,982,074 A * | 1/1991 | Ogasawara | 235/454 |
| 4,989,104 A * | 1/1991 | Schulein et al. | 360/72.1 |
| 4,993,003 A * | 2/1991 | Fechner et al. | 368/47 |
| 5,001,561 A * | 3/1991 | Haskell et al. | 375/240.02 |
| 5,010,499 A * | 4/1991 | Yee | 348/552 |
| 5,038,231 A * | 8/1991 | Harigaya et al. | 360/69 |
| 5,047,867 A * | 9/1991 | Strubbe et al. | 386/83 |
| 5,063,610 A * | 11/1991 | Alwadish | 455/45 |
| 5,119,507 A * | 6/1992 | Mankovitz | 455/154.1 |
| 5,121,476 A * | 6/1992 | Yee | 348/559 |
| 5,122,886 A * | 6/1992 | Tanaka | 386/104 |
| 5,144,423 A * | 9/1992 | Knauer et al. | 375/240.17 |
| 5,148,403 A * | 9/1992 | Gardner | 366/15 |
| 5,157,614 A * | 10/1992 | Kashiwazaki et al. | 701/200 |
| 5,161,019 A * | 11/1992 | Emanuel | 725/56 |
| 5,164,831 A * | 11/1992 | Kuchta et al. | 348/231.7 |
| 5,164,963 A * | 11/1992 | Lawrence et al. | 375/265 |
| 5,165,069 A * | 11/1992 | Vitt et al. | 386/46 |
| 5,172,363 A * | 12/1992 | Greenspun | 369/85 |
| 5,179,479 A * | 1/1993 | Ahn | 360/72.1 |
| 5,200,823 A * | 4/1993 | Yoneda et al. | 348/473 |
| 5,206,937 A * | 4/1993 | Goto | 709/209 |
| 5,228,014 A * | 7/1993 | d'Alayer de Costemore d'Arc | 369/30.27 |
| 5,253,066 A * | 10/1993 | Vogel | 725/28 |
| 5,285,276 A * | 2/1994 | Citta | 375/240.12 |
| 5,293,357 A * | 3/1994 | Hallenbeck | 725/39 |
| 5,307,173 A * | 4/1994 | Yuen et al. | 386/83 |
| 5,319,453 A * | 6/1994 | Copriviza et al. | 346/6 |
| 5,353,121 A * | 10/1994 | Young et al. | 725/52 |
| 6,091,884 A * | 7/2000 | Yuen et al. | 386/83 |
| 6,167,188 A * | 12/2000 | Young et al. | 386/83 |

* cited by examiner

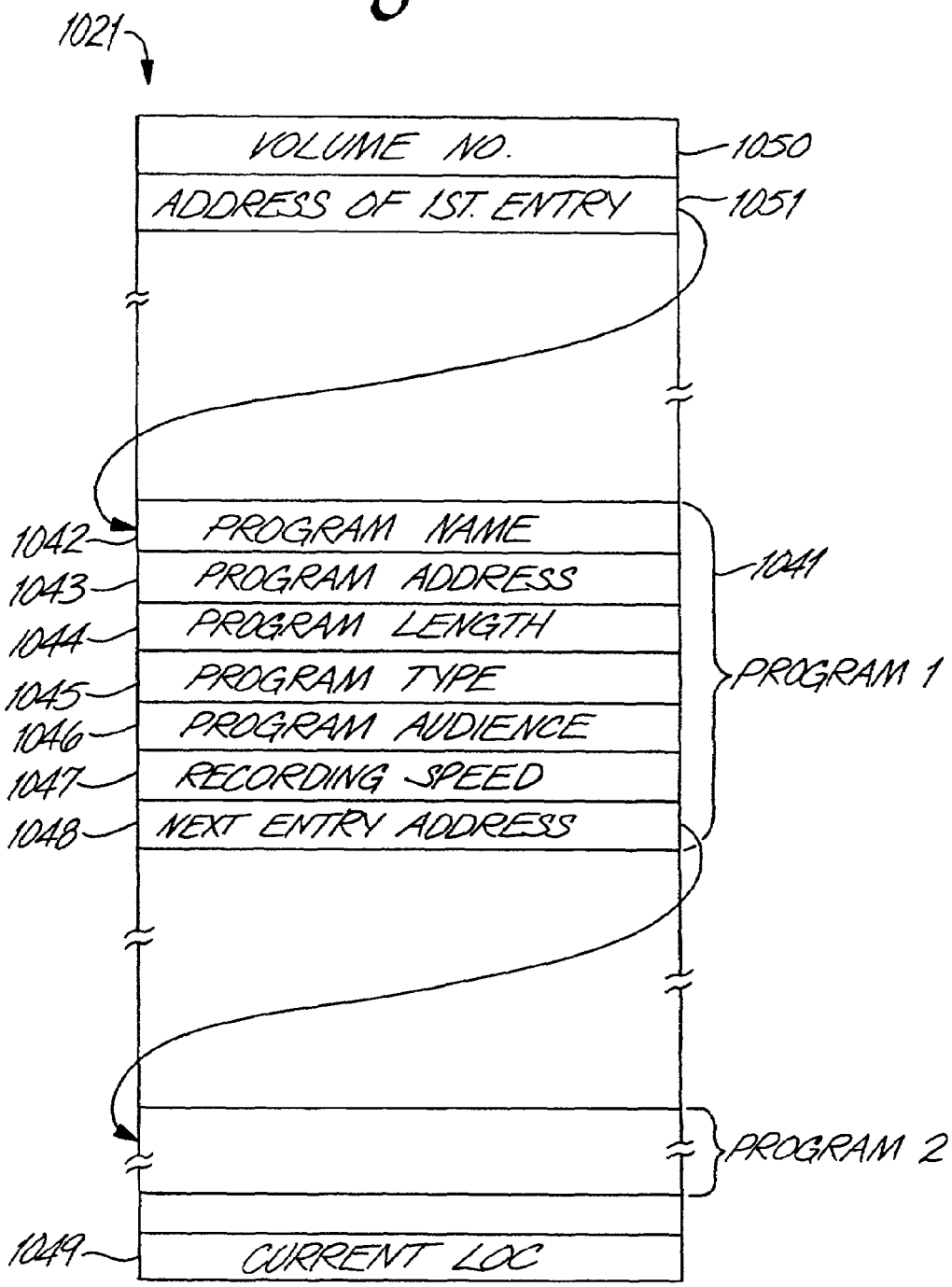

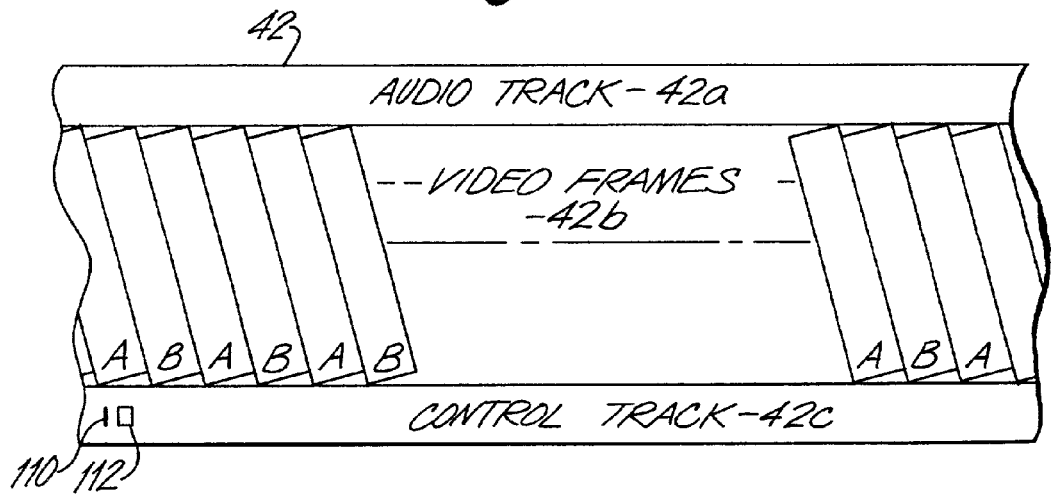
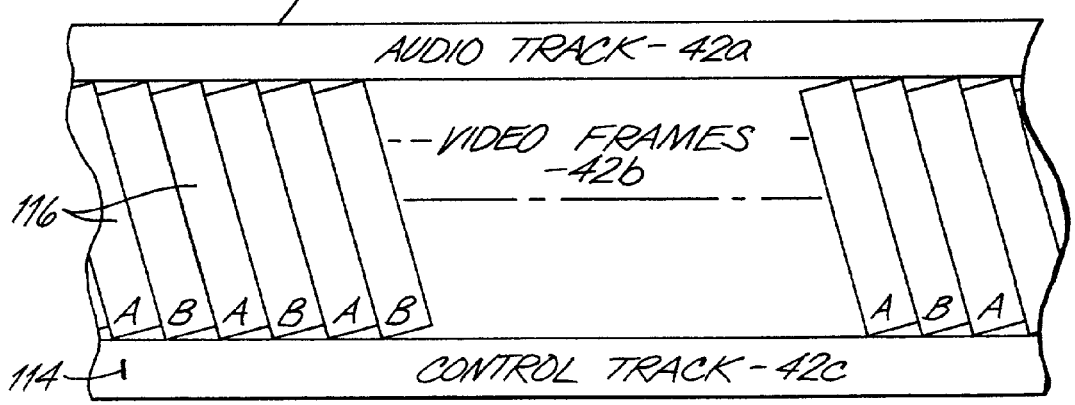

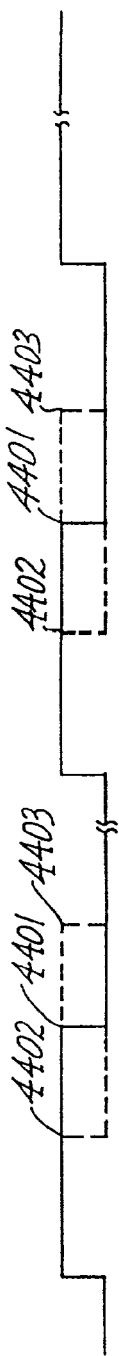
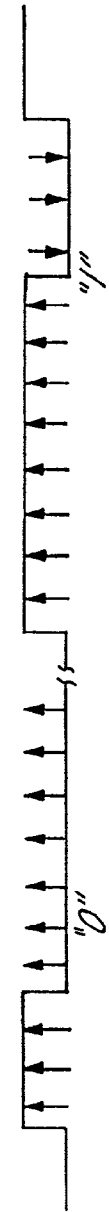
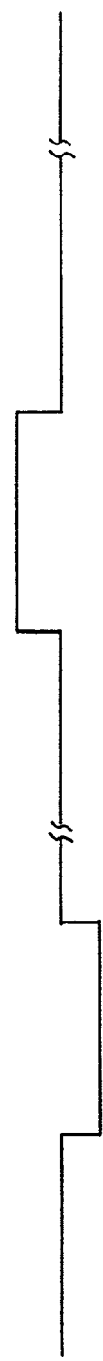

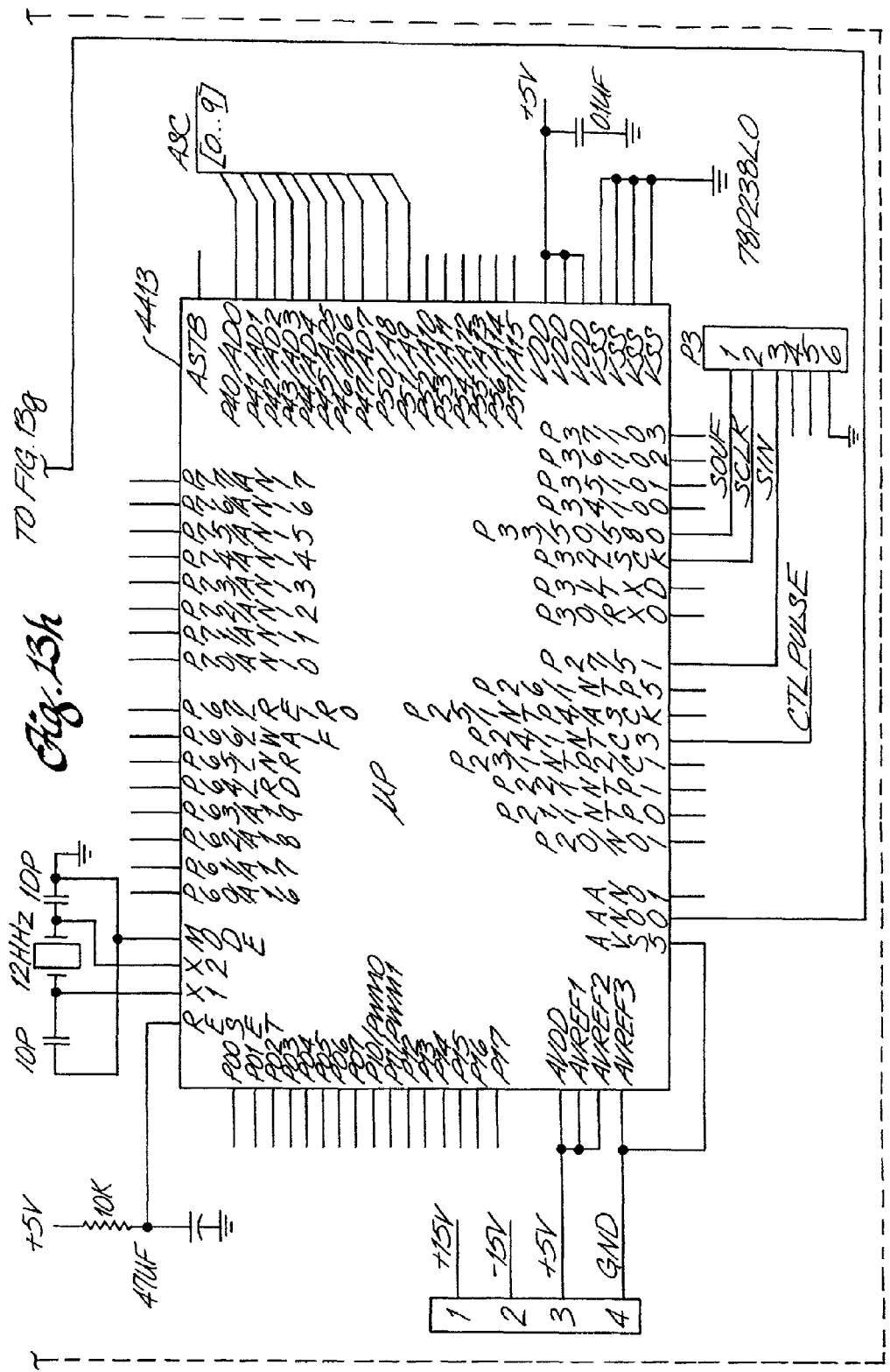

Fig. 15

*HR TAPES:*

CT ADD TID ADD TID ADD TID ADD TID ADD TID ADD TID ADD TID
       START OF PROG.1   START OF PROG.2  START OF PROG.3  END

VBI

SRAM   DIRECTORY

*PR TAPES:*

CT ADD TID ADD TID ADD TID ADD TID ADD TID ADD TID ADD TID
       START OF PROG.1   START OF PROG.2  START OF PROG.3  END

VBI   DIR DIR DIR DIR DIR DIR DIR DIR DIR DIR DIR DIR DIR DIR DIR

SRAM

*RI TAPES:*

CT   ADD TID       ADD TID ADD TID ADD TID     ADD TID
     START OF PROG.1   START OF PROG.2  START OF PROG.3  END

VBI

SRAM   DIRECTORY

Fig. 16

HR TAPES:

VBI: ADD TID ADD TID ADD TID ADD TID ADD TID ADD TID ADD TID

CT:
- MARK / START OF PROG. 1
- MARK / START OF PROG. 2
- MARK / START OF PROG. 3
- MARK / START OF PROG. 4

SRAM: DIRECTORY

PR TAPES:

VBI: ADD DIR TID ADD DIR TID ADD DIR TID ADD DIR TID ADD TID

CT:
- MARK / START OF PROG. 1
- MARK / START OF PROG. 2
- MARK / START OF PROG. 3
- MARK / END

SRAM:

RI TAPES:

VBI: ADD TID ADD TID ADD TID

CT:
- START OF PROG. 1
- START OF PROG. 2
- START OF PROG. 3
- END

SRAM: DIRECTORY

*Fig. 17*

HR TAPES:

VBI    ADD TID ADD TID ADD TID ADD TID ADD TID ADD TID ADD TID

CT

SRAM    DIRECTORY

PR TAPES:

VBI    ADD DIR TID ADD DIR TID ADD DIR TID ADD DIR TID ADD TID

CT

SRAM

RI TAPES:

VBI

CT    ADD TID    ADD TID    ADD TID    ADD TID

START OF PROG.1  START OF PROG.2  START OF PROG.3  END

SRAM    DIRECTORY

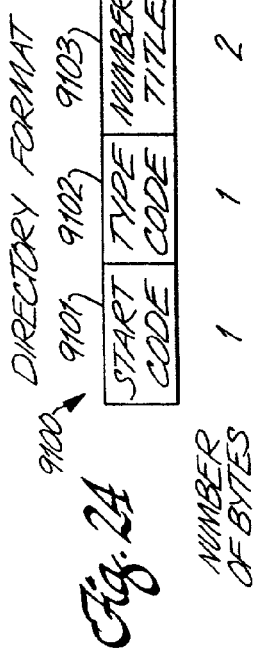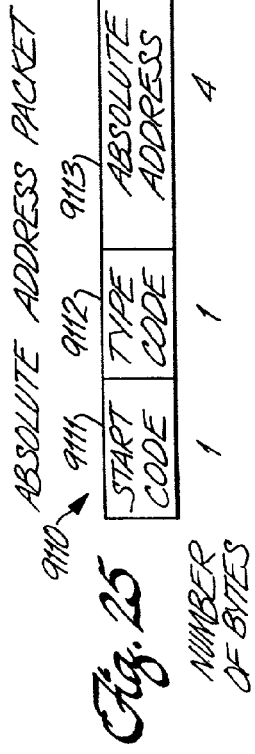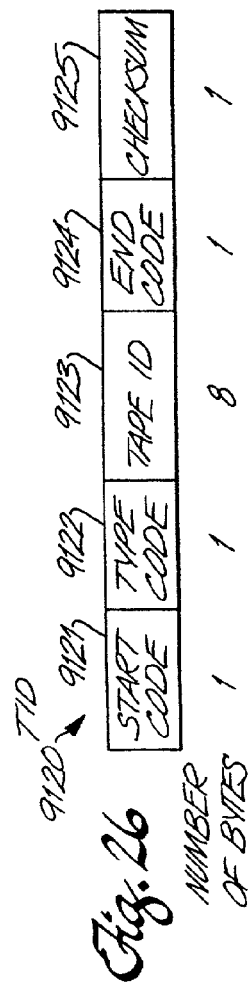

Fig. 27

D(N) PACKET ON THE VBI — 2601

| START CODE | TYPE | N | START ADDRESS | STOP ADDRESS | RECORD SPEED | PC | PC EXTENSION | VERSION | LANGUAGE | TITLE TEXT | EXPAND | STOP CODE | CHECKSUM |
|---|---|---|---|---|---|---|---|---|---|---|---|---|---|
| 1 | 1 | 2 | 3 | 3 | 1 | 1 | 1 | 1 | 1 | m | n | 1 | 2 |

NUMBER OF BYTES

Fig. 28

D(0) PACKET FOR TAPE TITLE — 2602

| START CODE | TYPE | N | LENGTH | RESERVE | REEL DIAMETER | RESERVED | VERSION | LANGUAGE | TITLE TEXT | EXPAND | STOP CODE | CHECKSUM |
|---|---|---|---|---|---|---|---|---|---|---|---|---|
| 1 | 1 | 2 | 3 | 3 | 2 | 1 | 1 | 1 | m | n | 1 | 2 |

NUMBER OF BYTES

Fig. 29

TP PACKET ON VBI 2603

| START CODE | TYPE | TID | RESERVED | N | STOP CODE | CHECKSUM |
|---|---|---|---|---|---|---|
| 1 | 1 | 10 | 1 | 2 | 1 | 1 |

NUMBER OF BYTES

| HR TAPE | 0 | 0 | 0 | MACHINE ID | TAPE NUMBER |
|---|---|---|---|---|---|
| 39 | 38 | 37 | 31 | 30 | 15 0 |

BIT

| PR TAPE | UPC |
|---|---|
| 1 | |
| 39 38 | 0 |

Fig. 34

2603' — START CODE | TYPE | TID | PN | ABSOLUTE ADDRESS | YEAR | MONTH | NULL BYTE | CHECKSUM | STOP CODE | XOR BYTE

Fig. 37

| START CODE | TYPE | CONTENT | CHECKSUM | STOP CODE | XOR BYTE |

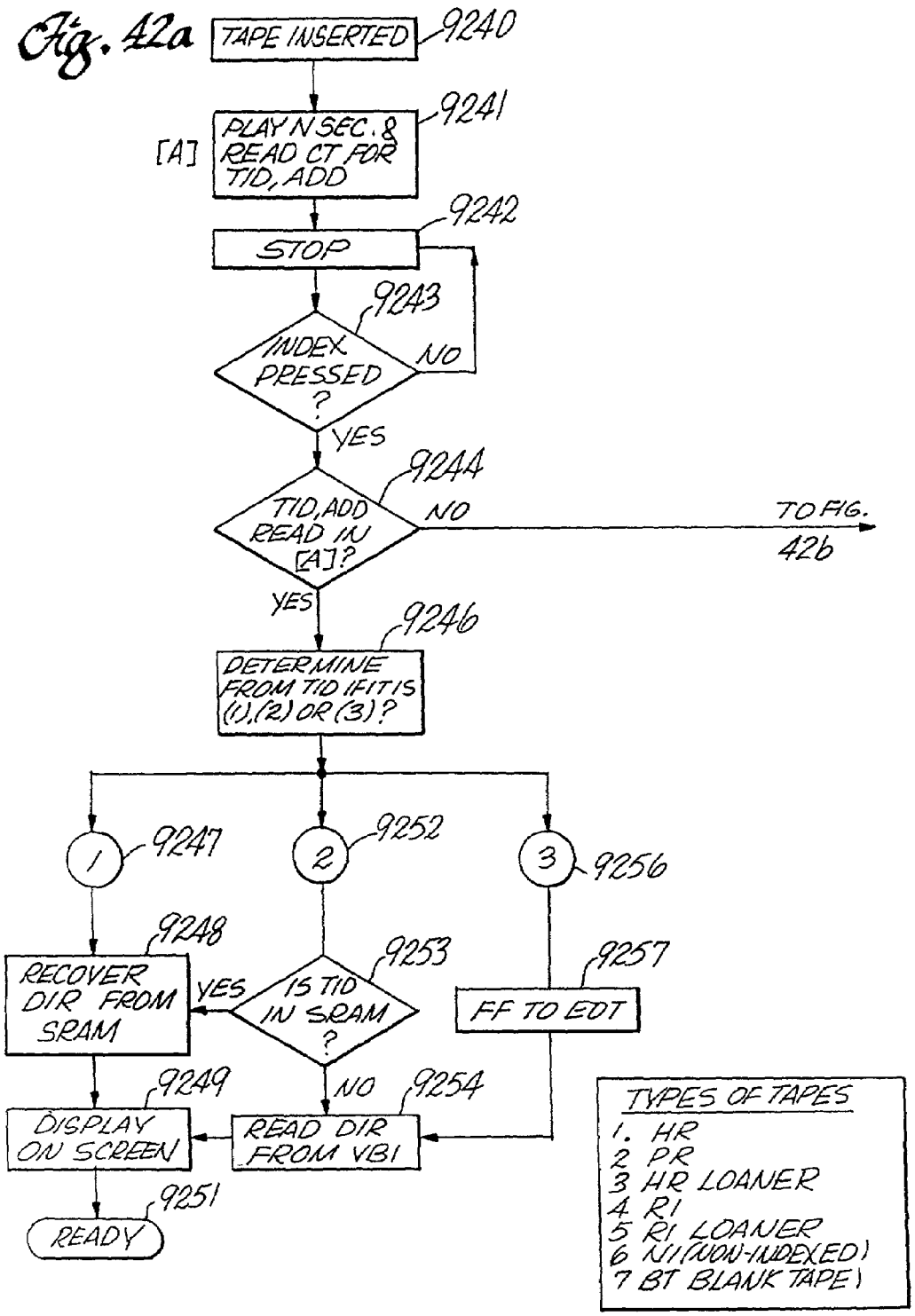

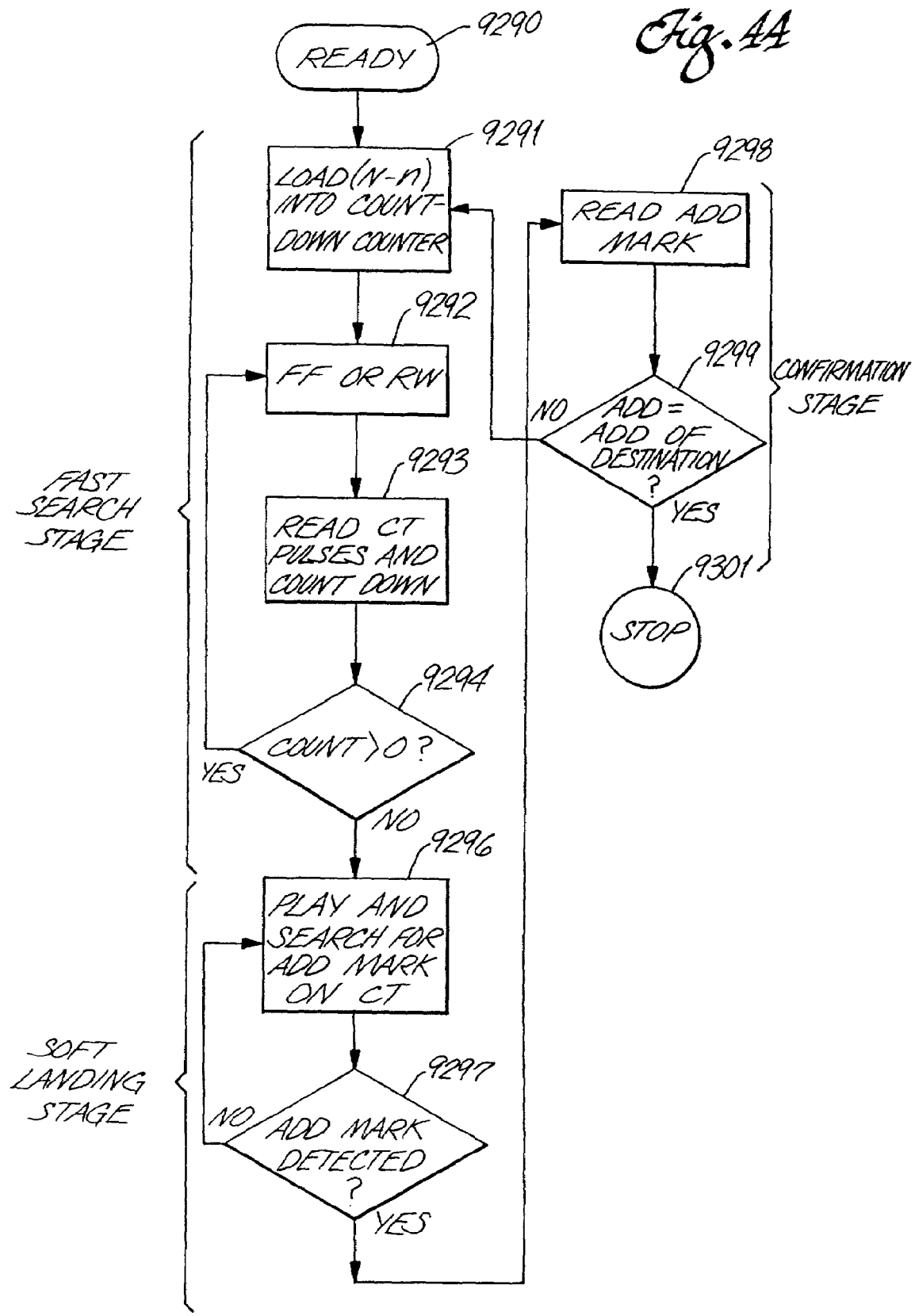

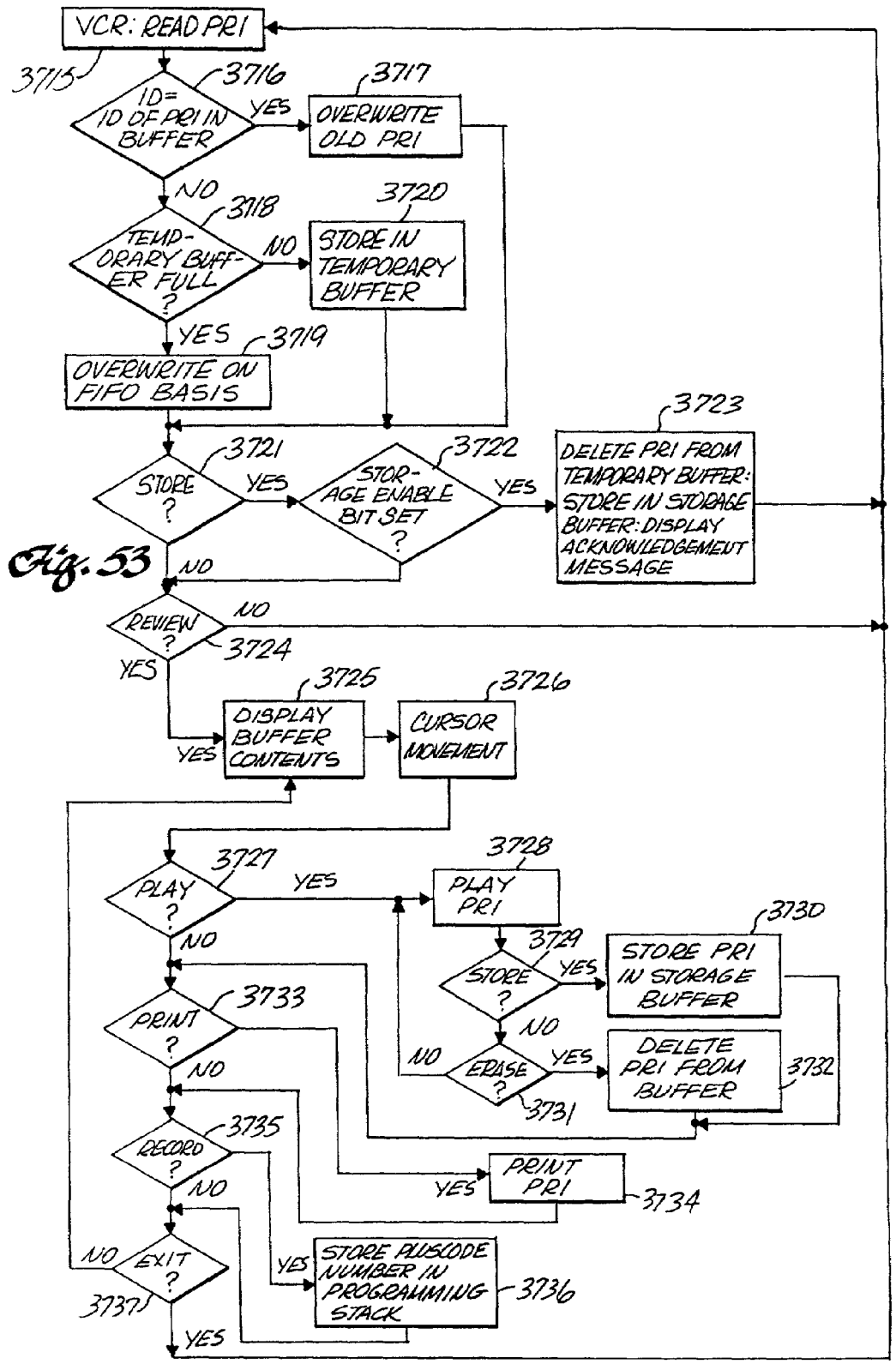

Fig. 54

|  | STORED |
|---|---|
| PRI B: | VCR PLUS™ PROGRAMMER COUPON |
| PRI D: | LOSE WEIGHT FAST BY THIN JIM |

TEMPORARY

| PRI E: | FRUGAL GOURMET RECIPE |
| → PRI F: | WINNING LOTTERY NUMBERS |
| PRI G: | GM REBATES FOR CADILLAC |
| PRI H: | ABC MOVIE OF THE WEEK |

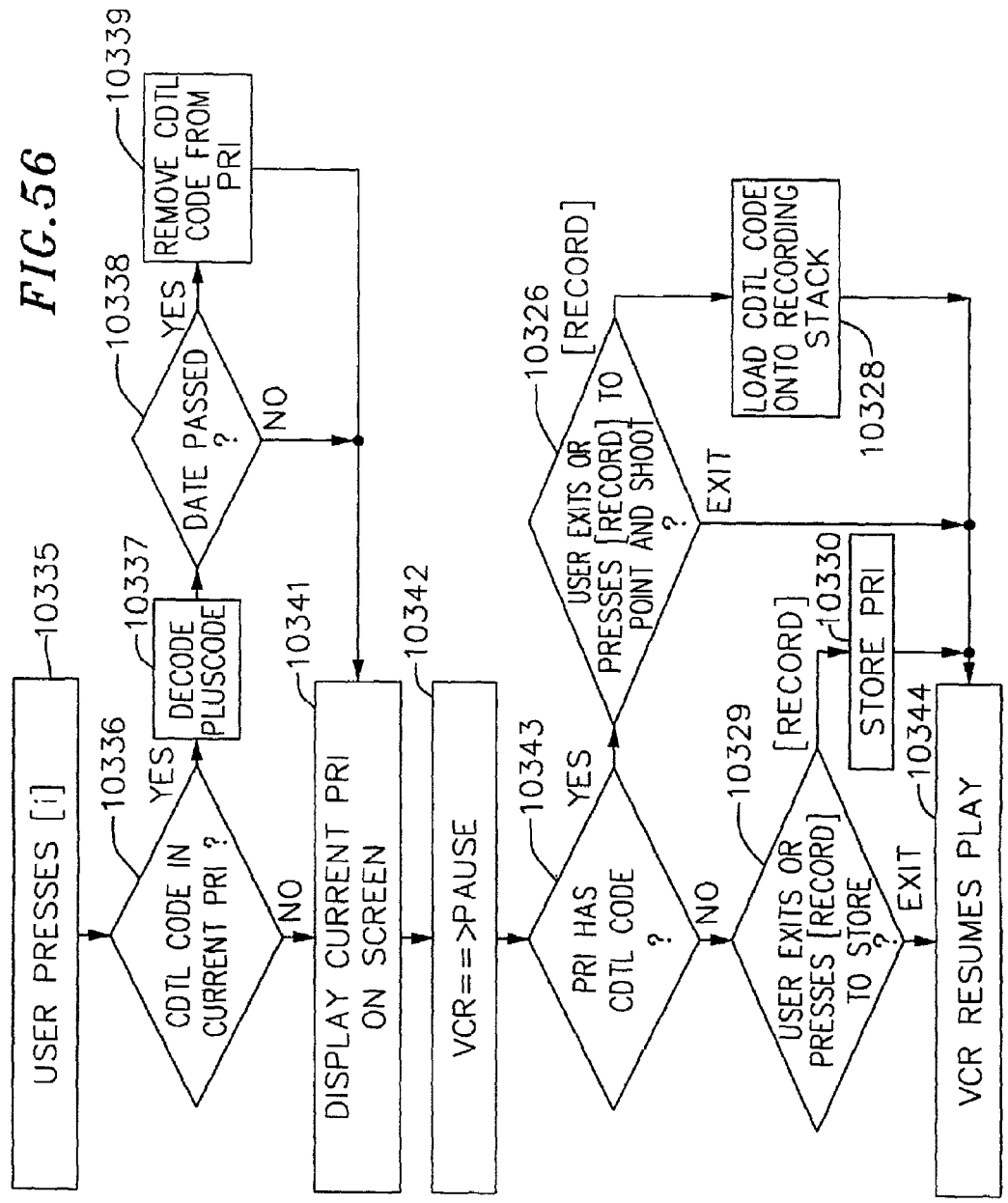

Fig. 66

| CHANNEL 1 | PROGRAM #1 | COMM'L #1 | PROGRAM #2 | COMM'L #3 | COMM'L #9 | PROGRAM #3 |
| --- | --- | --- | --- | --- | --- | --- |
| 2 | COMM'L #5 | PROGRAM #4 | COMM'L #6 | COMM'L #7 | PROGRAM #5 | COMM'L #8 PROGRAM #6 |
| 3 | PROGRAM #7 | COMM'L #9 | COMM'L #10 | PROGRAM #8 | PROGRAM #9 | |
| 4 | COMM'L #11 | COMM'L #12 | COMM'L #13 | PROGRAM #10 | COMM'L #14 | |
| 5 | ADD INFO #1 | ADD INFO #1 | ADD INFO #2 | ADD INFO #13 | ADD INFO #13 | ADD INFO #14 | ADD INFO #14 | ADD INFO #1 |

Fig. 69

| PROG. NUMBER | LENGTH |
|---|---|
| PROGRAM 1 | 10 |
| PROGRAM 2 | 12 |
| HBO MOVIE PROGRAM GUIDE 5/15/93 | 35 |
| PROGRAM 4 | 20 |

Fig. 70

| PROG. NUMBER | LENGTH |
|---|---|
| PROGRAM 1 | 10 |
| PROGRAM 2 | 12 |
| HBO MOVIE GUIDE 5/15/93 (VM) | 35 |
|     7:30 FANTASIA (120 MIN) | |
|     9:30 TERMINATOR II (135 MIN) | |
|     11:45 BATMAN (115) | |
| PROGRAM 4 | 20 |

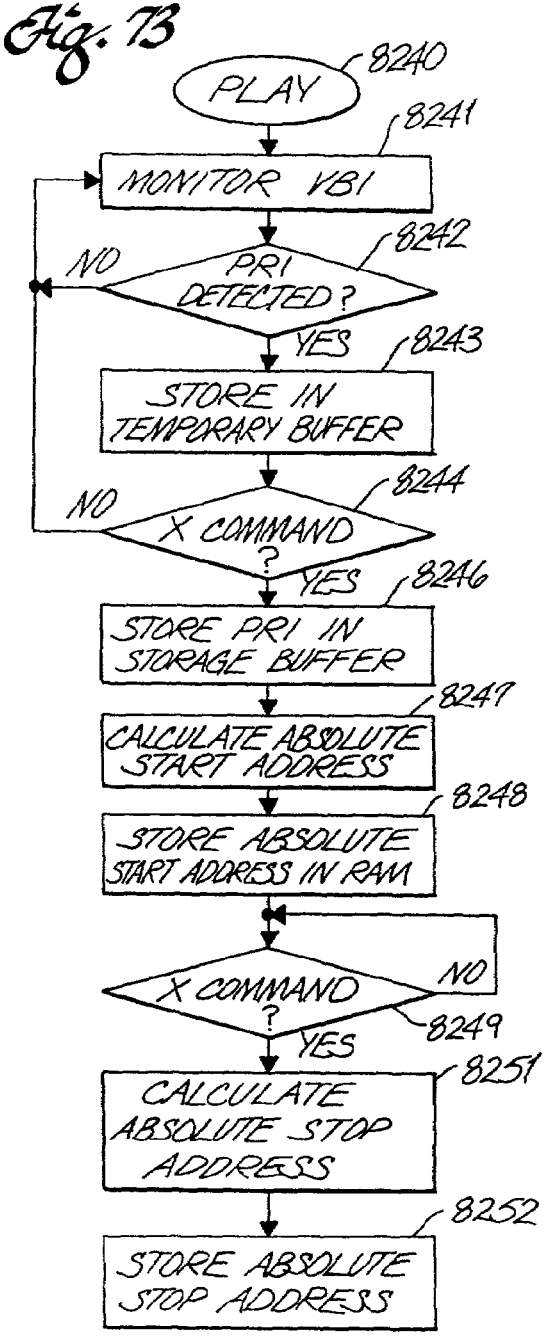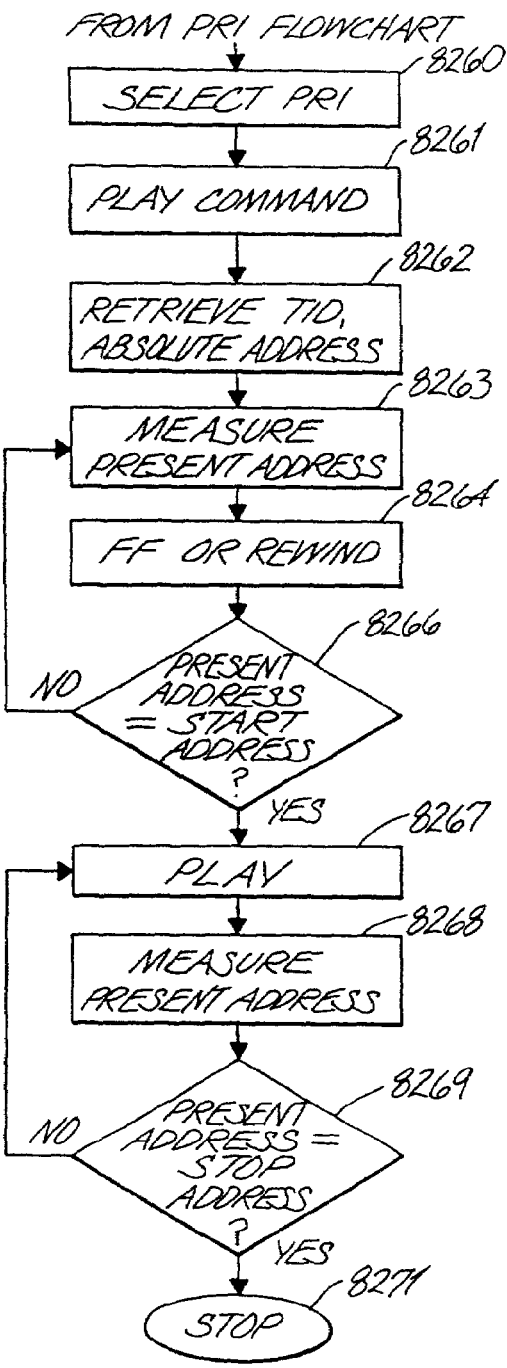

Fig. 77

INFORMATION

1. MacDonald's special
2. Lexus Test Drive
3. Stock Data Service
→ 4. Airline Discount Seats

Choose item and press [PLAY]

Fig. 78

NAME 1  GUIDE
Price: $ Price / subs. time

1. Call *900* - xxx - xxxx
2. Enter onto telephone keypad the following ID number:
   __*I D #*__

3. Enter onto remote keypad the authorization number given to you over the telephone:

__ __ __ __ __

Press [ENTER] to enter, or
Press [CANCEL] to start over

Wrong Entry

Please start over again

Thank you for purchasing the

NAME guide.

Your service will start on

_____and lasts till _____

New data will be sent on

POINTER DATA

| START CODE | TYPE | ADDITIONAL ID | POINTER DESCRIPTION (1) | POINTER (1) | ... | POINTER DESCRIPTION (M) 2605 | POINTER (M) | STOP CODE | CHECKSUM |
|---|---|---|---|---|---|---|---|---|---|
| 1 | 1 | 2 | 1 | 1 | | 1 | 1 | 1 | 2 |

NUMBER OF BYTES

Fig. 84 — 2606

CJPG/PRI DATA PACKET

| START CODE | TYPE | USAGE | INFORMATION | STOP CODE | CHECKSUM |
|---|---|---|---|---|---|
| 1 | 1 | 2 | 2-128 | 1 | 2 |

NUMBER OF BYTES

Fig. 85 — 2607

| START CODE | TYPE | PID | STOP CODE | CHECKSUM |
|---|---|---|---|---|
| 1 | 1 | 1 | 1 | 2 |

NUMBER OF BYTES

Fig. 86

| START CODE | TYPE | BLOCK NUMBER | BLOCK TOTAL | SIGNATURE | RESERVED | CONTENT | CHECKSUM | STOP CODE | XOR BYTE |
|---|---|---|---|---|---|---|---|---|---|

2606

| START CODE | TYPE | SECTION NUMBER | TOTAL SECTION | CONTROL FLAG | EXTEND TIME | RESERVED | PROGRAM NAME | CHECKSUM | STOP CODE | XOR BYTE |

Fig. 87

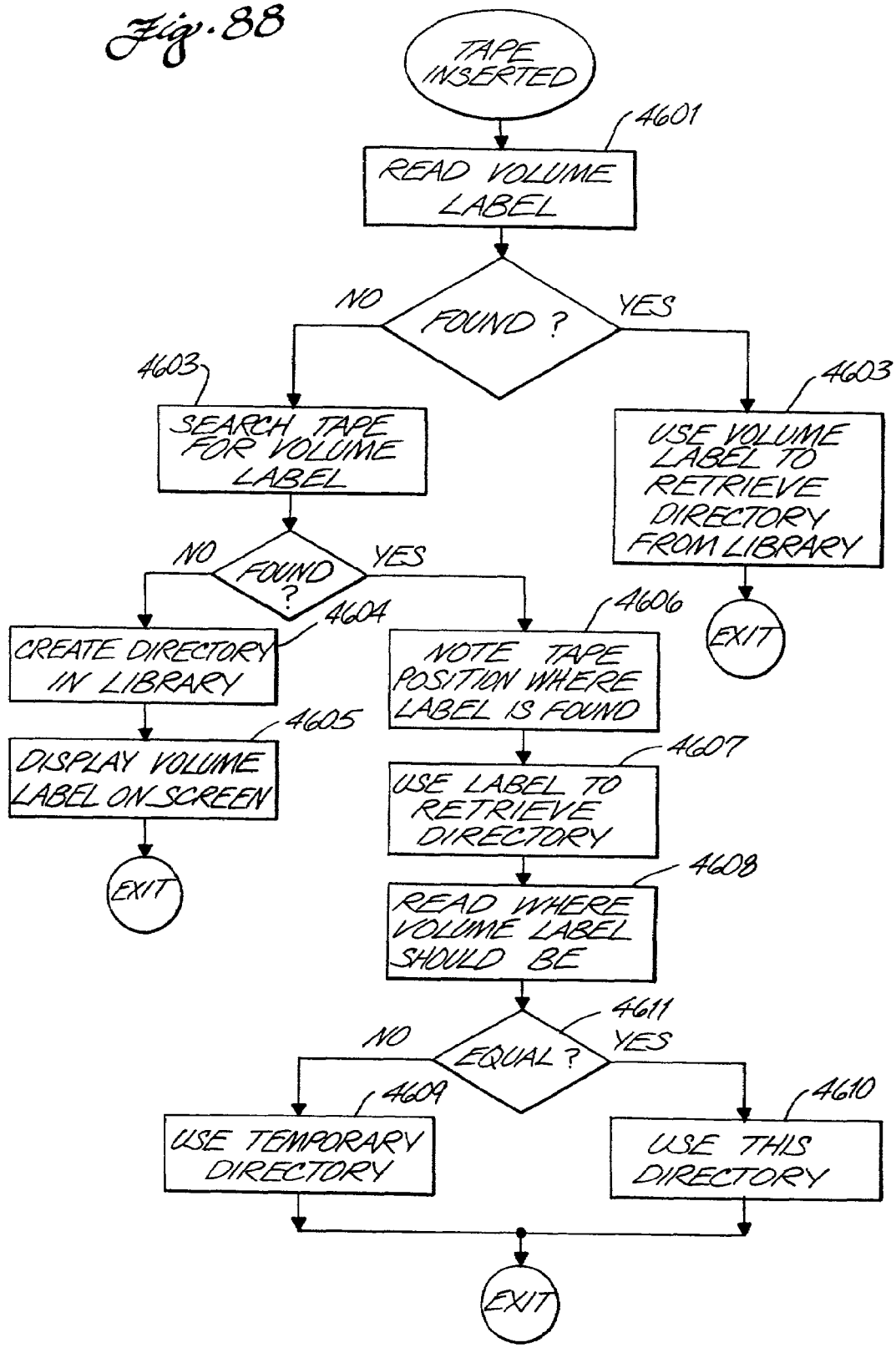

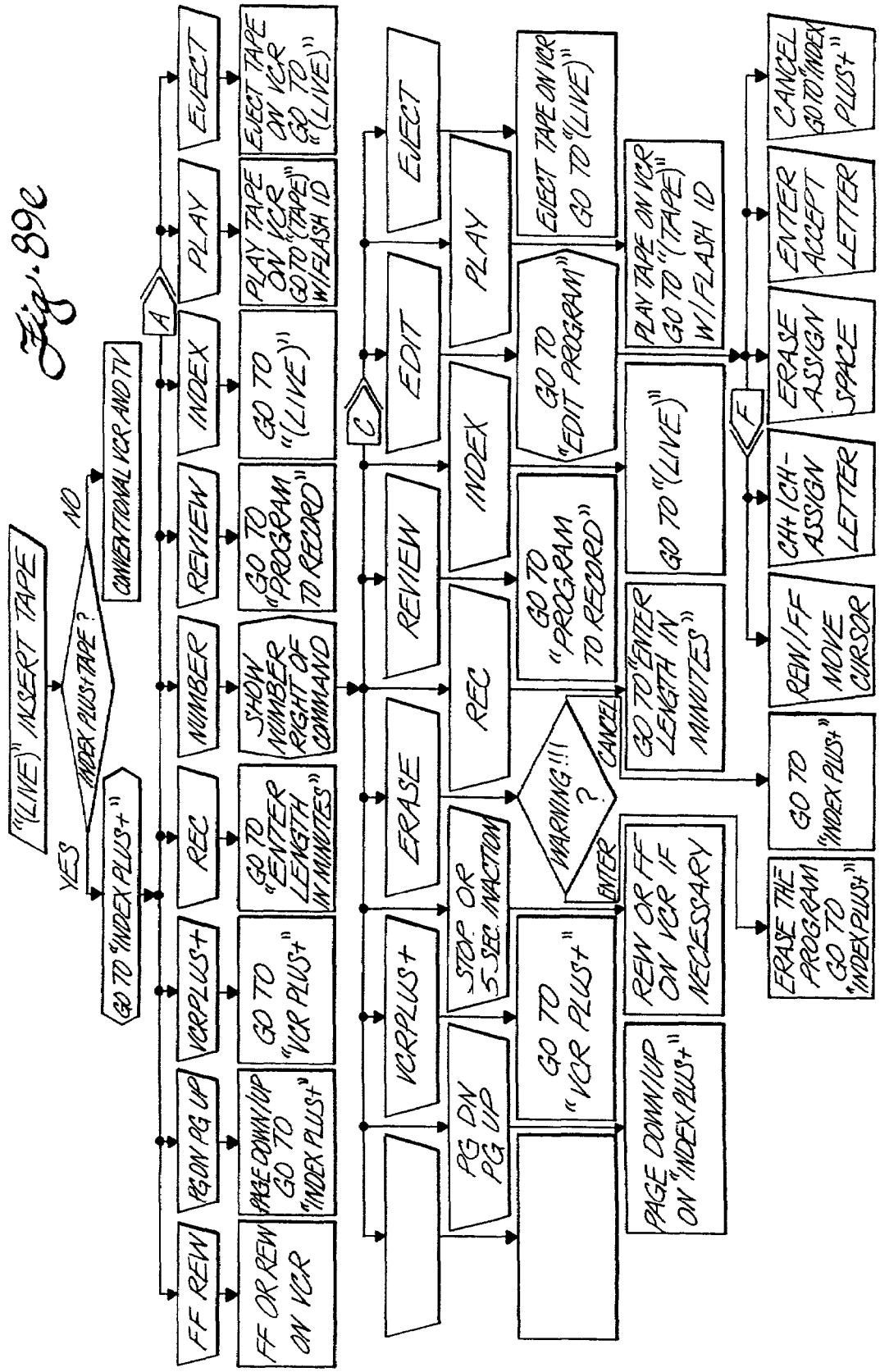

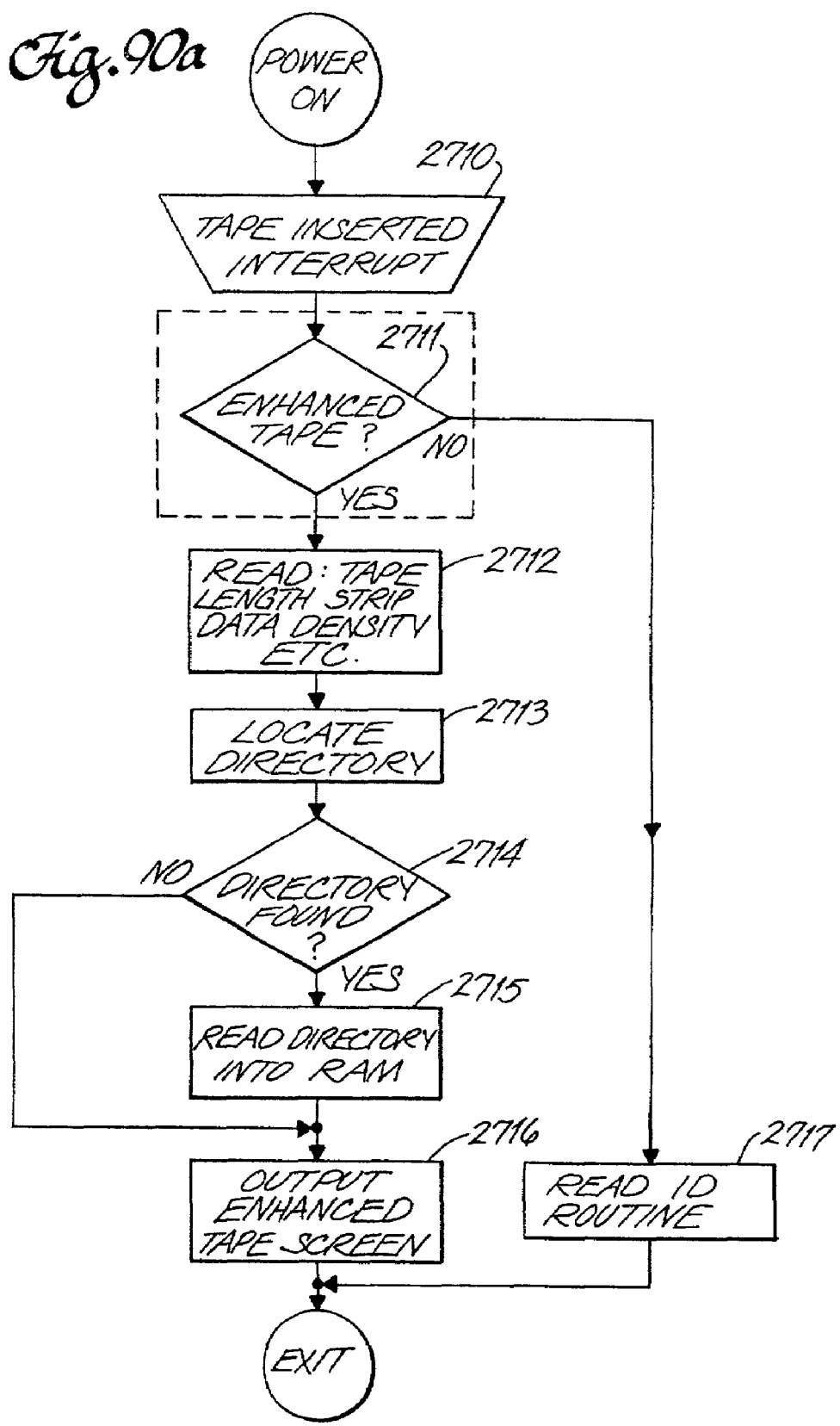

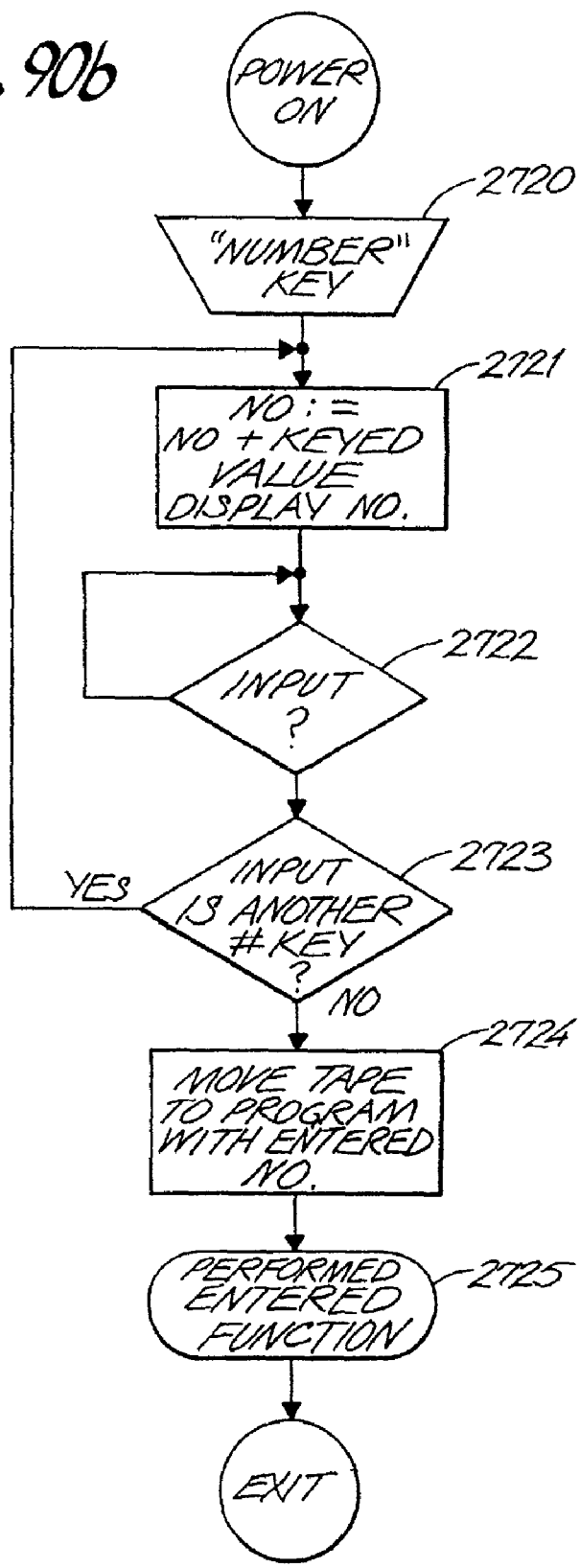

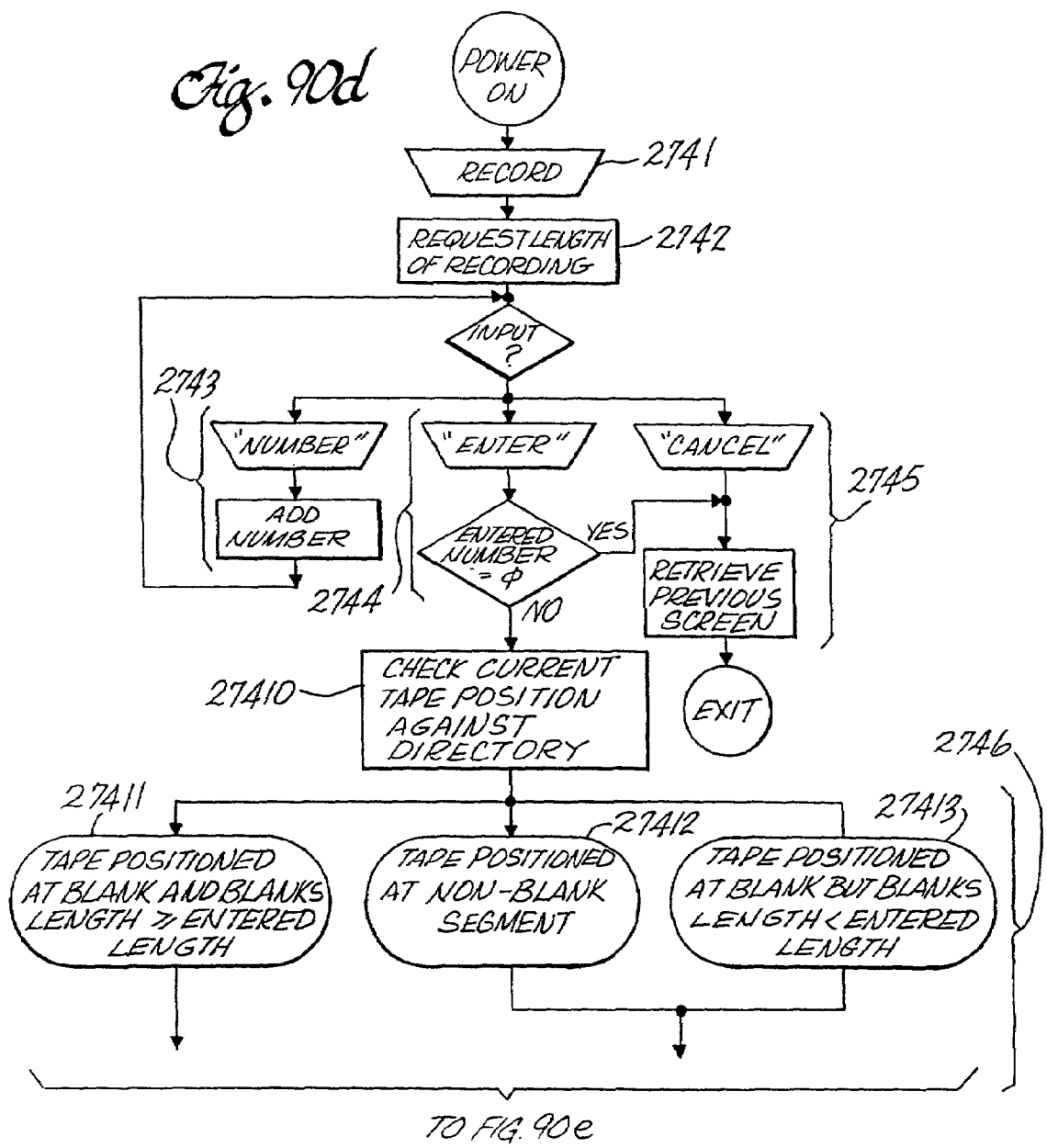

FROM FIG. 90d

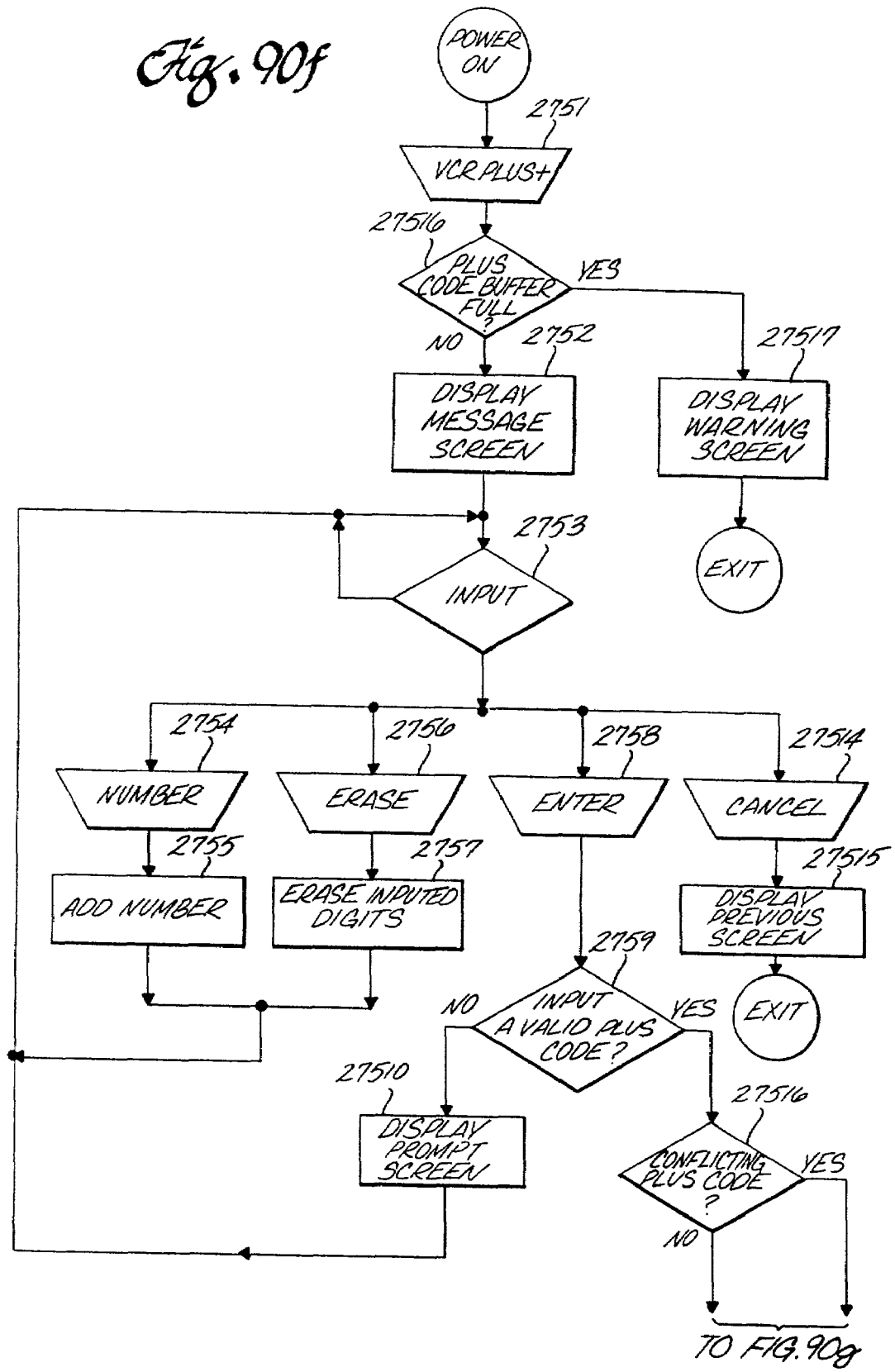

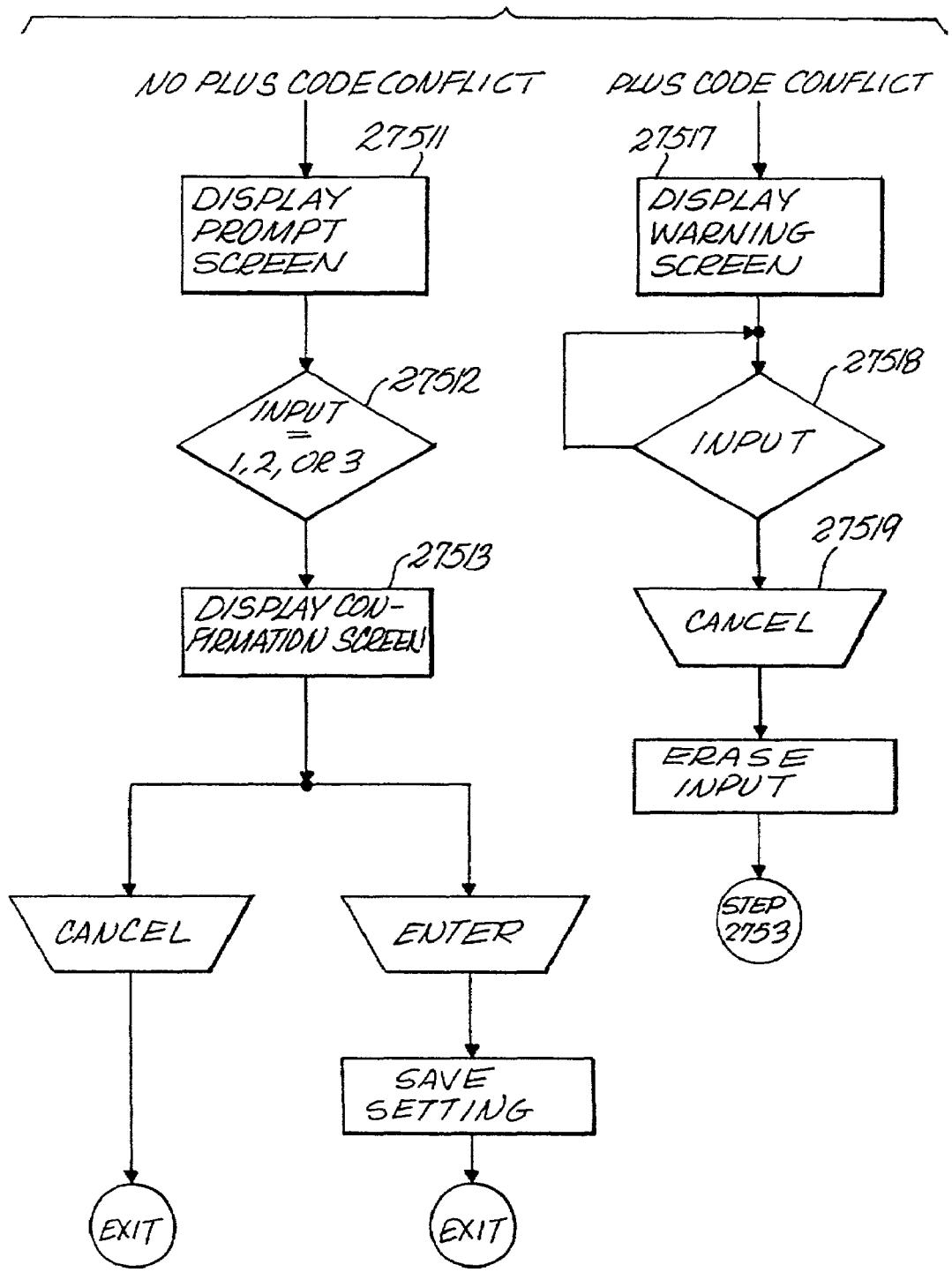

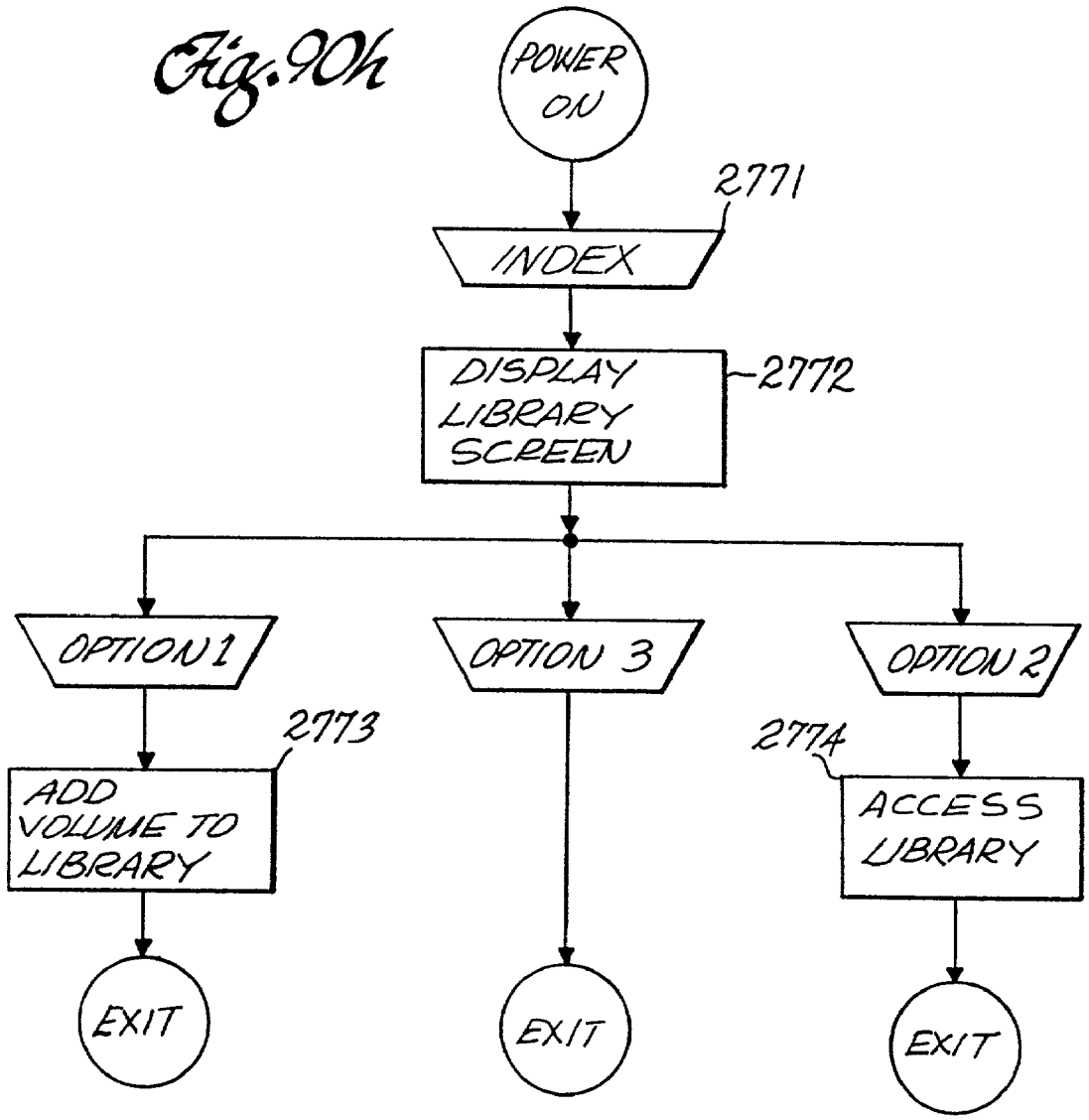

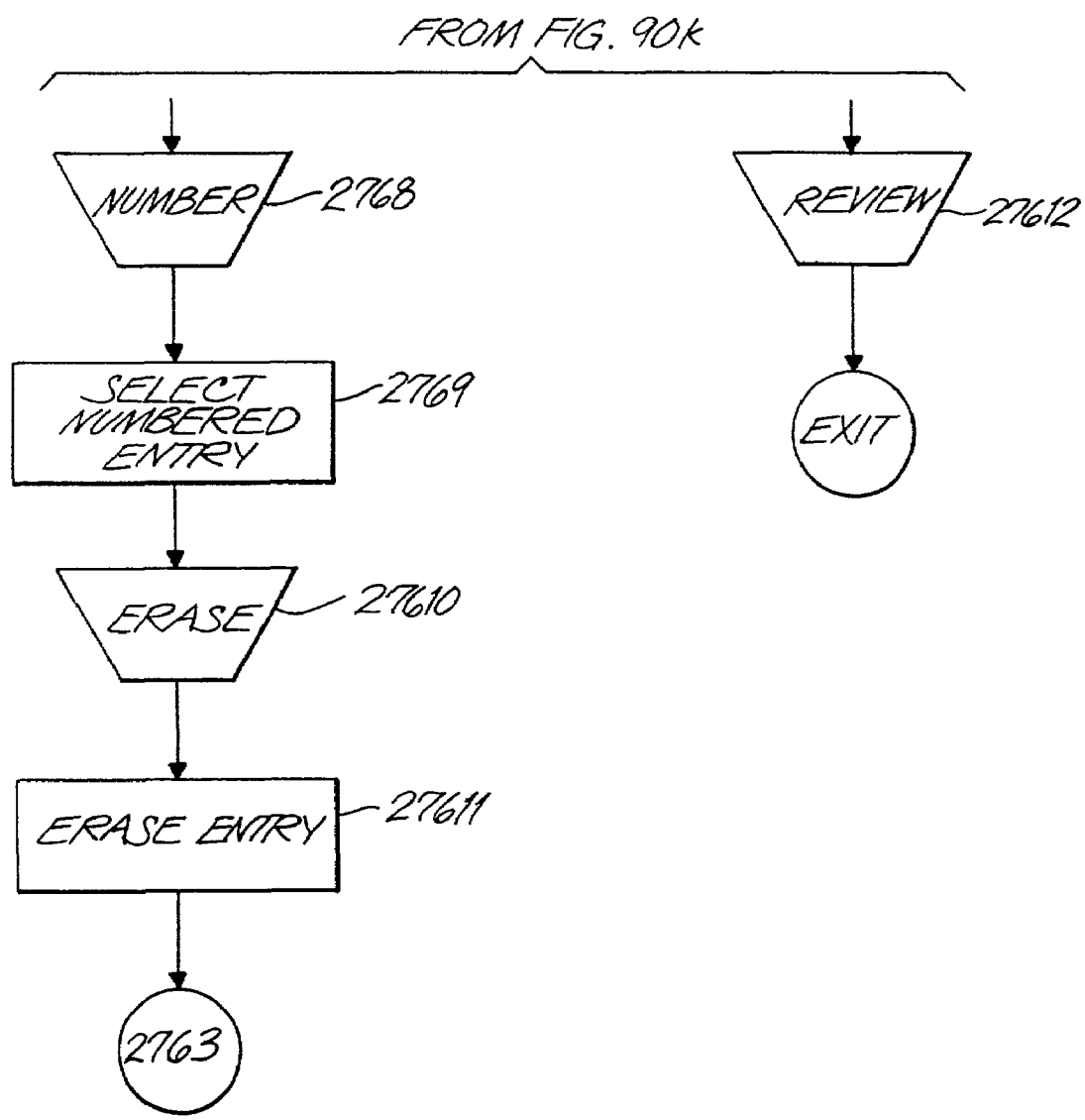

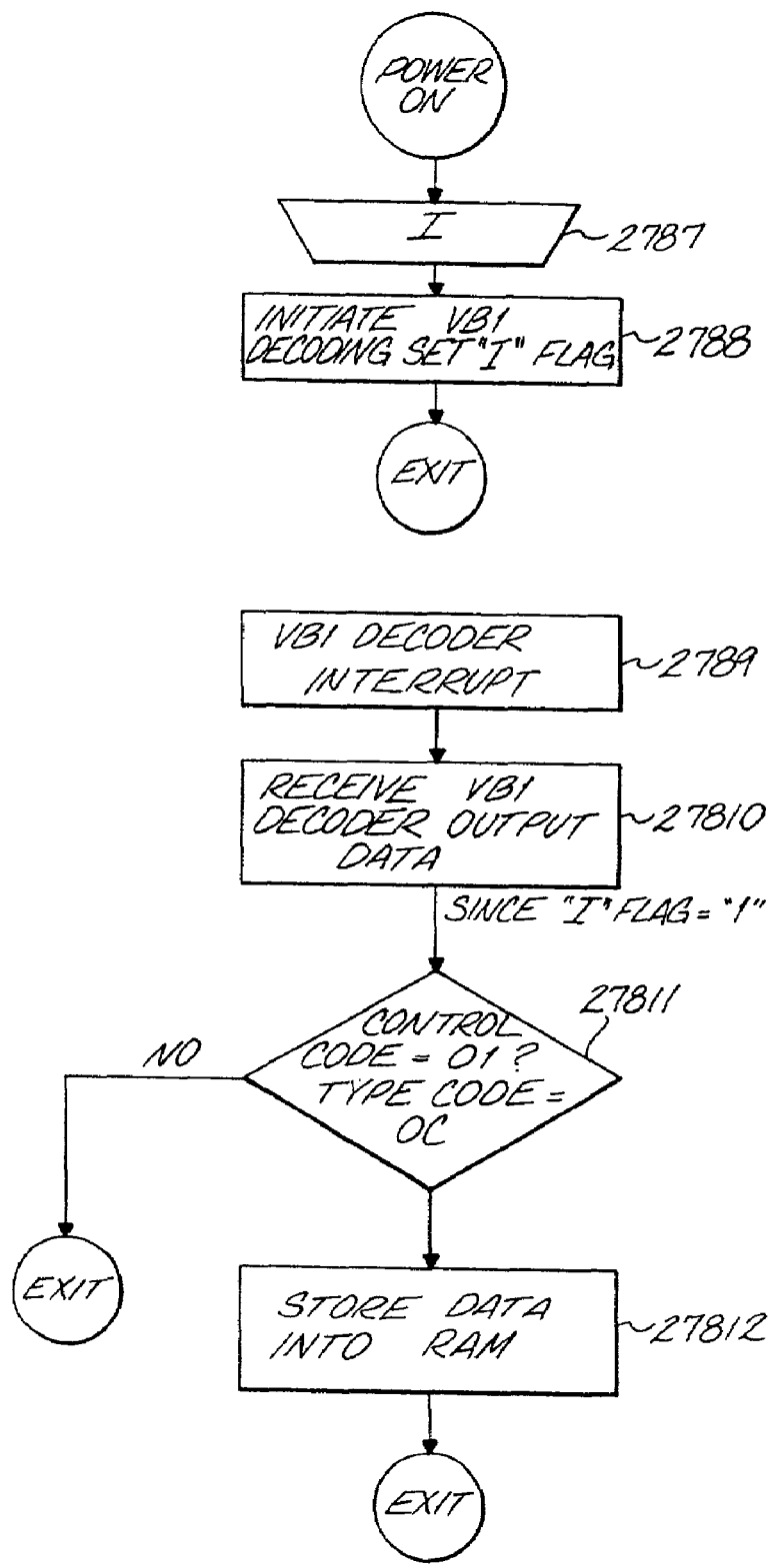

|   |   | MIN | MODE |
|---|---|---|---|
| 1 | STAR TREK PART 2 | 30 | SP |
| 2 | (BLANK) | 19 |  |
| 3 | JOHN'S GRADUATION | 36 | SP |
| 4 | 8:30 PM, DEC. 12, 1992 | 18 | LP |
| 5 | (END) | 24 |  |

SPEED: SP
COMMAND:

Fig. 91b

|   |   | MIN |
|---|---|---|
| 1 | STAR TREK | 30 |
| 2 | RODEO | 17 |
| 3 | BEYOND 2000 | 26 |
| 4 | CHIP AND DALE | 18 |
| 5 | (END) | 24 |

MOVING TO 4
COMMAND: 4 RECORD

Fig. 91c

|   |   | MIN |
|---|---|---|
| →1 | STAR TREK | 30 |
| 2 | RODEO | 17 |
| 3 | BEYOND 2000 | 26 |
| 4 | CHIP AND DALE | 18 |
| 5 | (END) | 24 |

→→→ PROGRAM 03
COMMAND: 3 PLAY

Fig. 91d

ENTER LENGTH IN MINUTES

PRESS [ENTER] TO RECORD
OR [CANCEL] TO QUIT

Fig. 91e

WARNING !!!
RECORDING WILL OVERWRITE THE
FOLLOWING PROGRAMS:
    CHIP AND DALE

PRESS [5] TO RECORD AS PROGRAM #5
OR [CANCEL] TO EXIT
OR [RECORD] TO OVERWRITE

Fig. 91f

|   |   | MIN |
|---|---|---|
| 1 | STAR TREK PART 2 | 30 |
| 2 | (BLANK) | 19 |
| 3 | BEYOND 2000 | 26 |
| 4 | (BLANK) | 120 |
| 5 | CHIP AND DALE | 18 |
| 6 | (END) | 24 |

Fig. 91g

PLEASE ENTER PLUS CODE™ NUMBER
OF DESIRED PROGRAM
_ _ _ _ _ _ _ _ _ _ _ _

PRESS [CANCEL] TO EXIT
      [ENTER] TO SAVE
      [ERASE] TO ERASE INPUT

*Fig. 91h*

INPUT IS AN INVALID PLUS CODE™ NUMBER
PLEASE CHECK LISTING AND RE-ENTER
- - - - - - - - - - - - - - - - - - - - - - -

PRESS [CANCEL] TO EXIT
    [ENTER] TO SAVE
    [ERASE] TO ERASE INPUT

*Fig. 91i*

PLUS CODE™ NUMBER SAVED

PRESS [1] FOR RECORDING ONCE ONLY
    [2] FOR RECORDING WEEKLY
    [3] FOR RECORDING EVERY WEEKDAY

Fig. 91j

PLUS CODE™ NUMBER BUFFER FULL
CANNOT PERFORM VCR PLUS+™
PROGRAMMING

PRESS [CANCEL] TO EXIT
    [REVIEW] TO REVIEW PLUS CODE
            BUFFER

Fig. 91k

PROGRAM TO RECORD

| # | CH | DATE  | TIME  | LEN | ST |
|---|----|-------|-------|-----|----|
| 1 | 3  | 12-01 | 3:00  | 5   | OK |
| 2 | 2  | 12-03D| 2:00  | 10  | OK |
| 3 | 5  | 12-04 | 19:00 | 15  | OK |
| 4 | 3  | 12-05 | 18:00 | 20  | OK |

TO ERASE A PROGRAM:
PRESS PROG # AND [ERASE]

Fig. 91ll

```
                      INDEX

WARNING: THE PROGRAM YOU JUST SET
         CONFLICTS WITH PREVIOUSLY SET
         PROGRAM

CH     DATE      START      STOP
PREVIOUS    4      12-01     12:00      14:00
NEW         5      12-01     13:00      15:30

PRESS [CANCEL] TO CANCEL
      [REVIEW] TO REVIEW PLUS CODES
```

Fig. 91m

```
                INDEX
                                    MIN
  → 1    STAR TREK                  30
    2    RODEO                      17
    3    BEYOND 2000                26
    4    CHIP AND DALE              18
    5    (END)                      24
  COMMAND: 2 ERASE
```

Fig. 91n

```
            WARNING !!!

DO YOU REALLY WANT TO
     ERASE PROGRAM #02 ?

PRESS [ENTER] TO ERASE
     OR [CANCEL] TO EXIT
```

Fig. 91o

```
                    INDEX
              LIBRARY OPTIONS
      1. ADD TAPE VOLUME TO LIBRARY
      2. ACCESS LIBRARY
      3. CANCEL
         PRESS SELECTION AND [ENTER]
```

Fig. 91p

```
                    INDEX
              ACCESS LIBRARY OPTIONS

1. SEARCH PROGRAMS BY PROGRAM TITLES
      2. SEARCH PROGRAMS BY PROGRAM TYPES
      3. DISPLAY A TAPE DIRECTORY

PRESS NUMBER OF OPTIONS AND
         [ENTER] TO CONTINUE A PREVIOUS SEARCH
         PRESS "C" BEFORE SELECTING AN
         OPTION
```

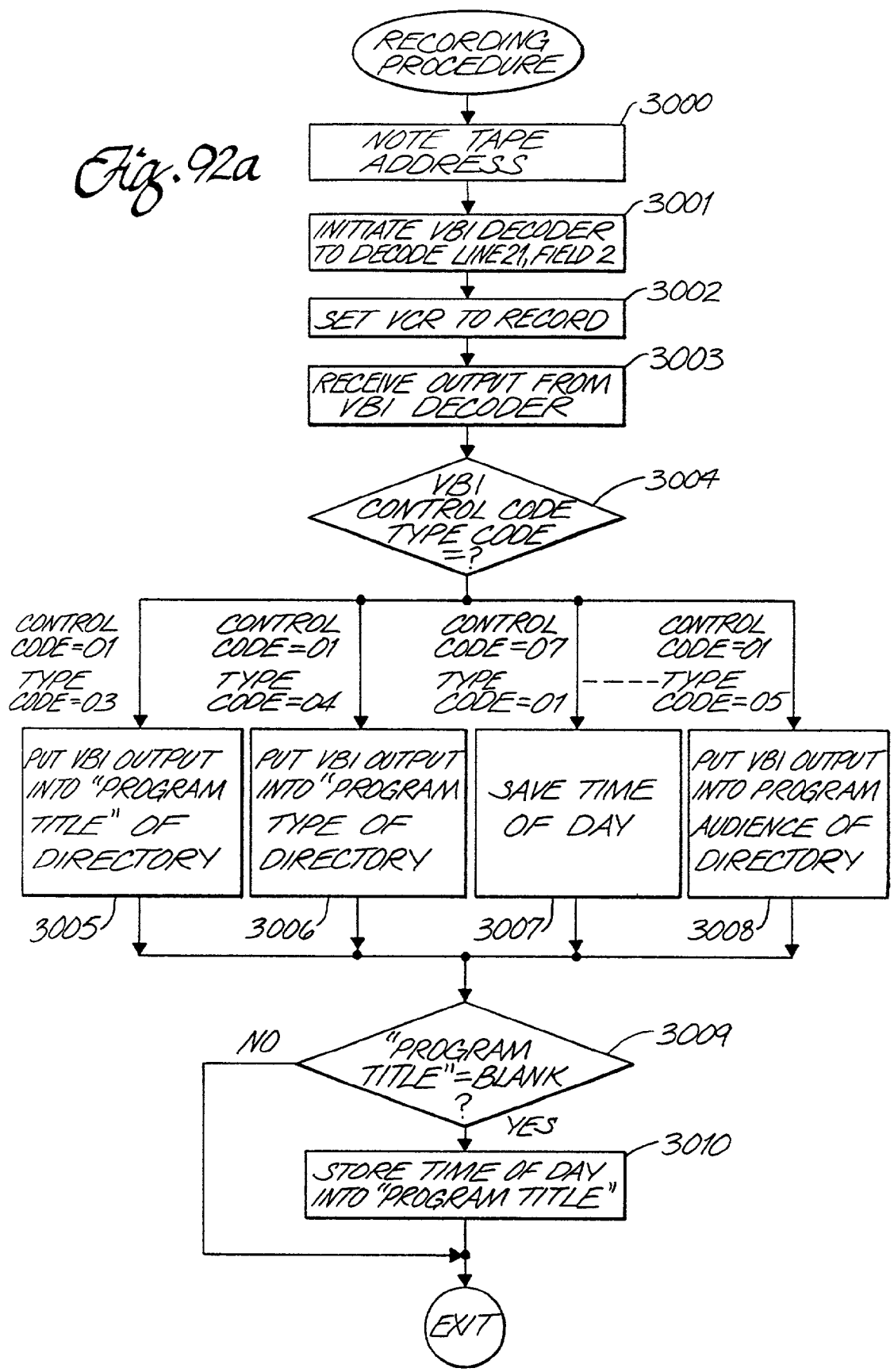

Fig. 92b
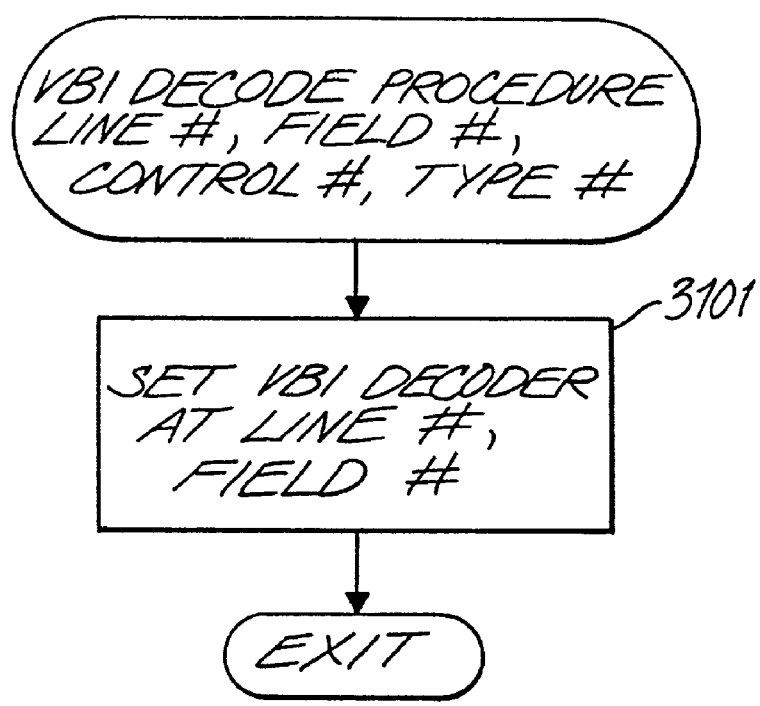
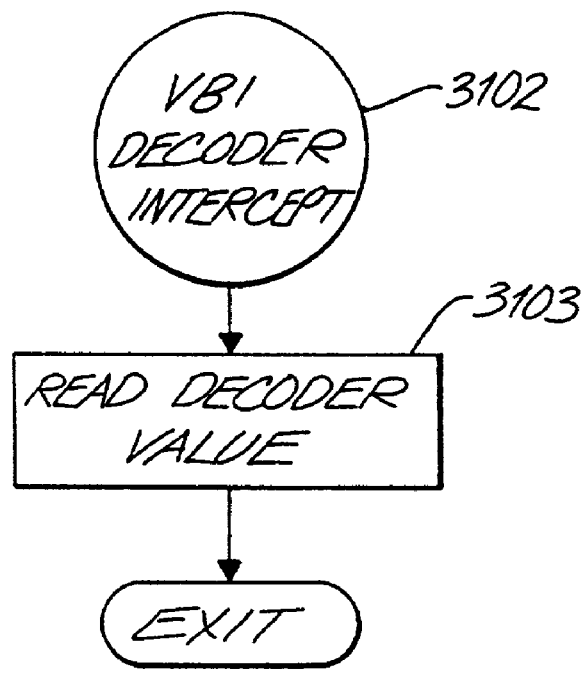

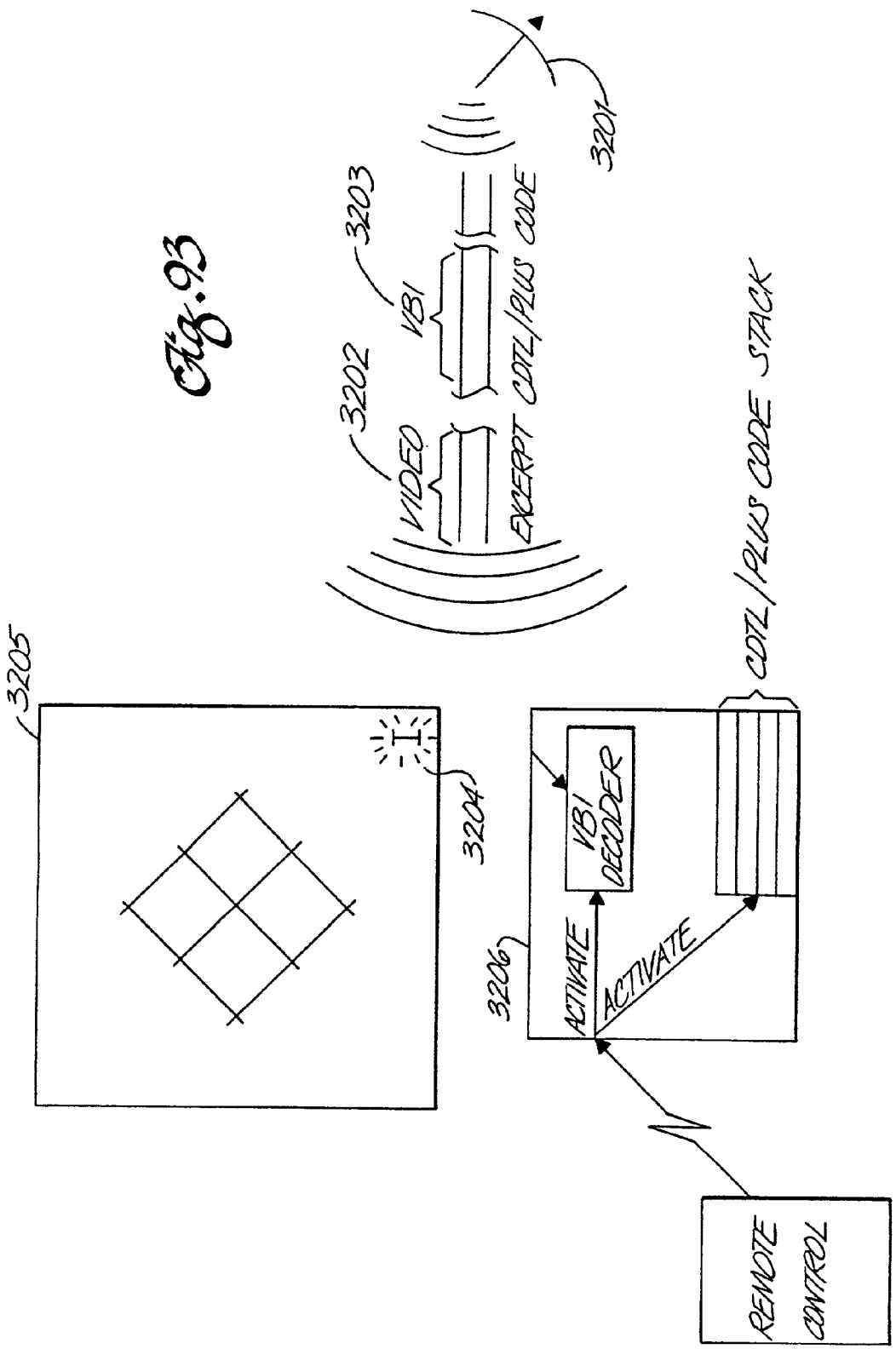

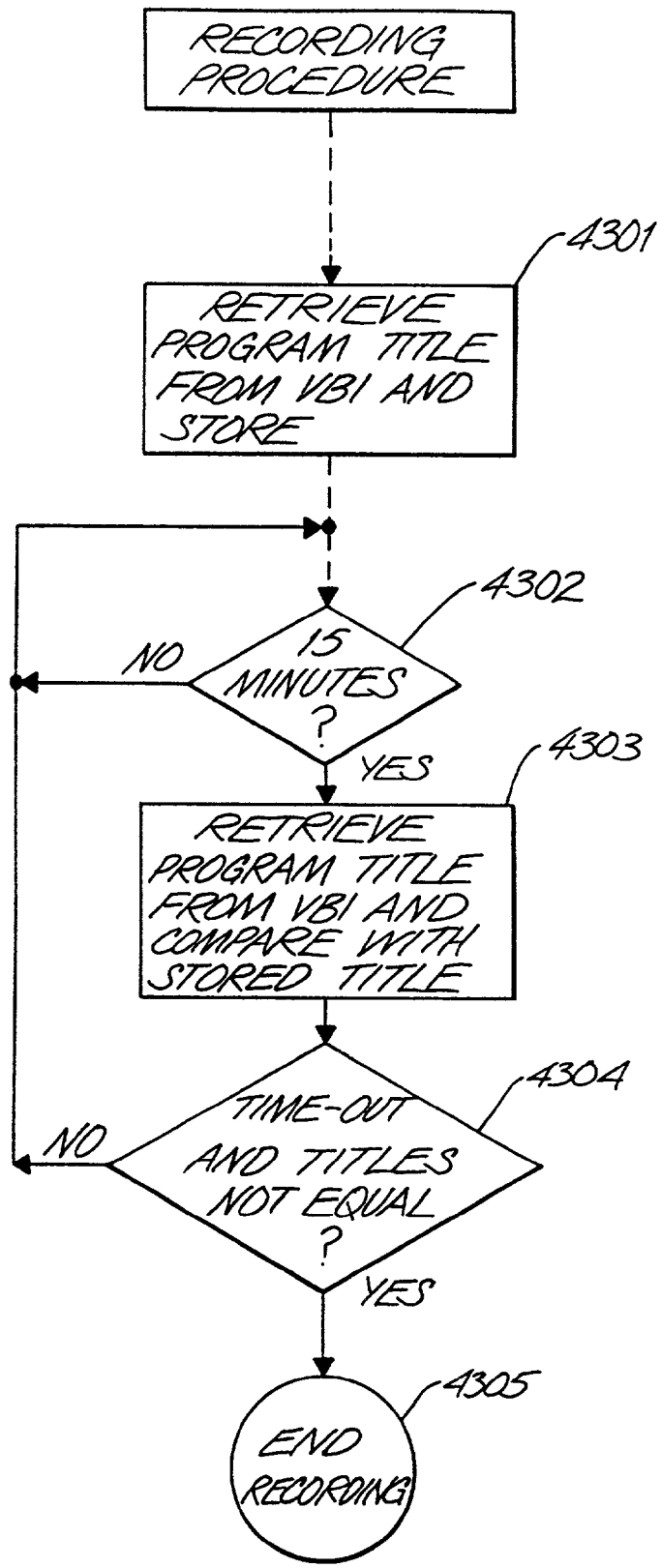

THIS IS A NEW BLANK TAPE
ENTER LENGTH OF TAPE

_ _ _ MINS

[ENTER] TO CONFIRM
[CANCEL] TO START OVER

Fig. 97b

THE CURRENT TAPE INDEX
INFORMATION HAS BEEN
ADDED TO THE LIBRARY

PLEASE EJECT THE TAPE
NOW AND LABEL THIS TAPE
AS NUMBER 8

Fig. 97c

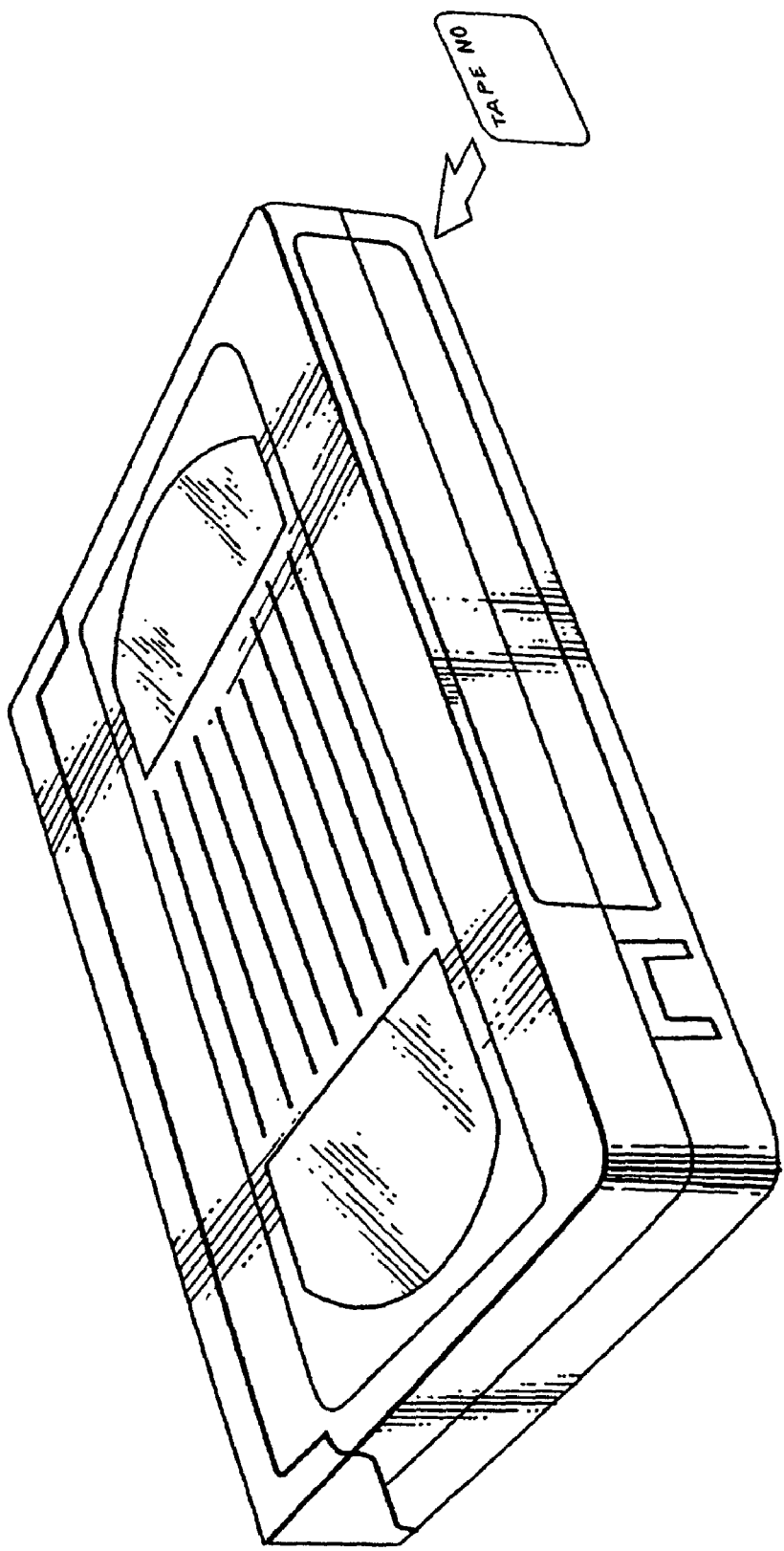

PROGRAM TO RECORD

| CH | DATE | TIME | MIN | ST |
|----|------|-------|-----|----|
| 4  | 2/13 | 9:00  | 60  | OK |
| 2  | 2/17 | 18:00 | 30  | OK |
| 5  | 2/20 | 20:00 | 60  | NO |
| 11 | 2/20 | 19:30 | 30  |    |

TO ERASE:
HIGHLIGHT SELECTION
PRESS [ERASE]

Fig. 97e

ENTER LENGTH OF PROGRAM
TO RECORD

_ _ _ MINS

[ENTER] TO CONFIRM
[CANCEL] TO START OVER

Fig. 97f

INDEX          TAPE NO. 8

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

HIGHLIGHT SELECTION

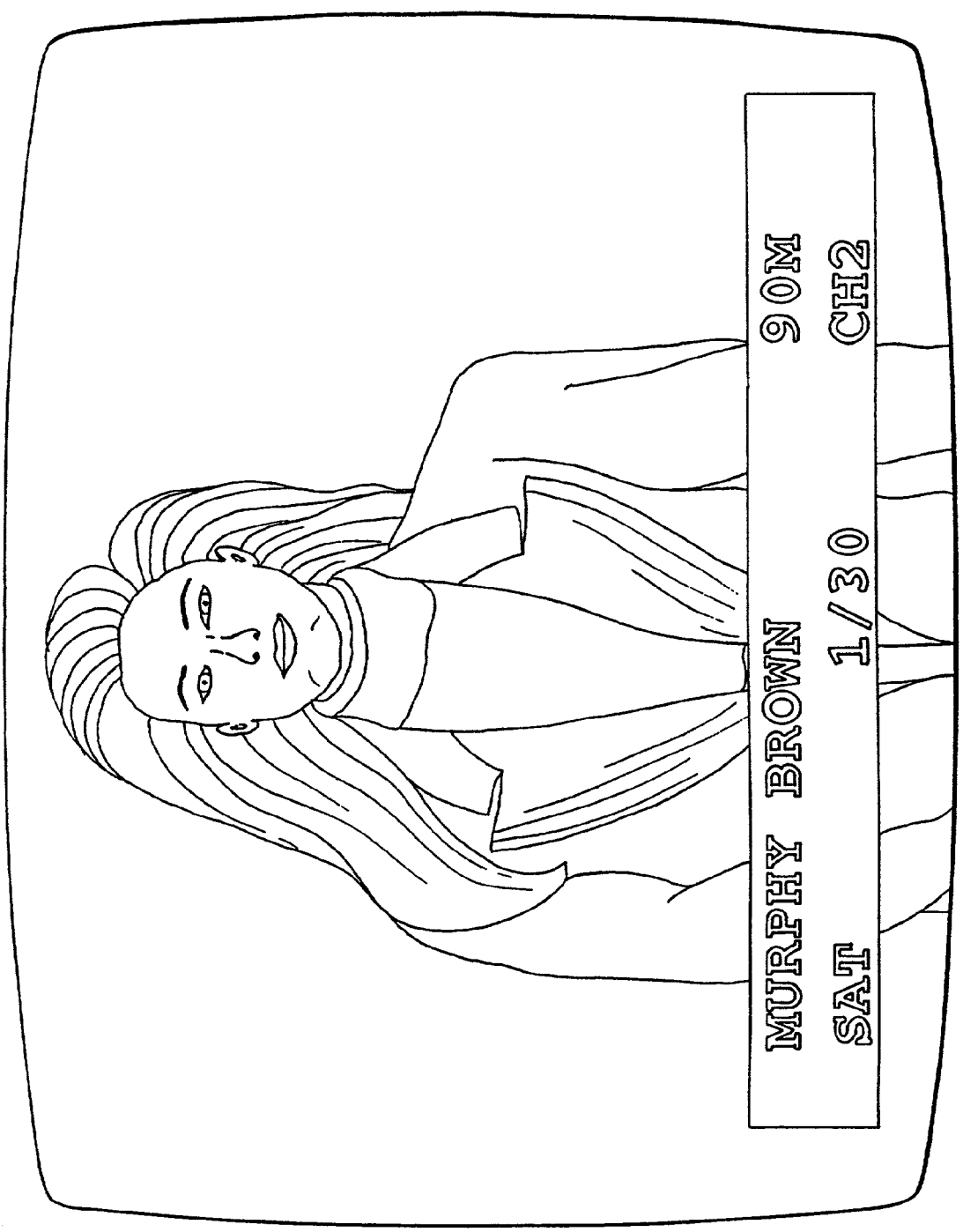

INDEX          TAPE NO. 8

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

HIGHLIGHT SELECTION

WARNING !

DO YOU REALLY WANT TO ERASE

MURPHY BROWN?

[ENTER] TO ERASE
[CANCEL] TO EXIT

Fig. 9Tj

INDEX     TAPE NO. 8

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

HIGHLIGHT SELECTION

EDIT PROGRAM TITLE

TERMINATOR

T2 _ _ _ _ _ _ _ _ _ _

[ENTER] TO CONFIRM
[CANCEL] TO CANCEL
CHANGES

Fig. 97U

SEARCH BY

TAPE LIST
PROGRAM LIST
CATEGORY

HIGHLIGHT SELECTION
PRESS [ENTER]

Fig. 9m

ENTER THE FIRST LETTER
OF PROGRAM TITLE

|

[ENTER] TO CONFIRM

| TITLE | TAPE NO. |
|---|---|
| TARZAN | 12 |
| TERMINATOR | 8 |
| THELMA & LOUISE | 46 |
| TWO OF A KIND | 77 |
| UNIVERSAL SOLDIER | 98 |
| WHAT ABOUT BOB | 46 |
| WILD ORCHID | 23 |
| YOUNG EINSTEIN | 49 |

USE PG▲ PG▼ TO REVIEW
MORE TITLES

SEARCH BY

TAPE LIST
PROGRAM LIST
CATEGORY

HIGHLIGHT SELECTION
PRESS [ENTER]

Fig. 97g

ENTER TAPE NO.

- - -

[ENTER] TO CONFIRM
[CANCEL] TO START OVER

Fig. 9Tr

INDEX          TAPE NO. 8

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

Fig. 9/3

SEARCH BY

TAPE LIST
PROGRAM LIST
CATEGORY

HIGHLIGHT SELECTION
PRESS [ENTER]

Fig. 97t

SEARCH BY CATEGORY

RELIGION
SOAP OPERA
SPORTS
GENERAL

EDUCATION
GAMES
MOVIE
MUSIC
NEWS/DOCUMENTARY

HIGHLIGHT SELECTION
PRESS [ENTER]

Fig. 97a

SPORTS

BASEBALL HORSE RACING
BASKETBALL ICE HOCKEY
CAR RACING TENNIS
FOOTBALL WATER SPORTS
GOLF GENERAL

HIGHLIGHT SELECTION
PRESS [ENTER]

FOOTBALL

| PROGRAM TITLE | TAPE # |
|---|---|
| BEARS VS. 49ERS 12/29 | 17 |
| BEARS VS. RAIDERS 1/3 | 76 |
| EAGLES VS. CHARGERS 11/11 | 9 |
| RAIDERS VS. COWBOYS 10/3 | 67 |
| RAIDERS VS. JETS 10/10 | 23 |

USE PG▲ PG▼ TO REVIEW
MORE TITLES

Fig. 9Ix

LIBRARY

INDEX
SEARCH
REGISTRATION
DOWNLOAD
BACKUP
INITIALIZE TAPE

HIGHLIGHT SELECTION
PRESS [ENTER]

LIBRARY REGISTRATION

ADD
DELETE
CHANGE

HIGHLIGHT SELECTION
PRESS [ENTER]

Fig. 97y

ENTER TAPE NO. TO BE
DELETED FROM LIBRARY

Fig. 9Z

WARNING!

TAPE 8 WILL BE DELETED.
ARE YOU SURE?

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

[ENTER] TO ERASE
[CANCEL] TO EXIT

Fig. 97a'

DOWNLOADING COMPLETED

PLEASE EJECT THE TAPE
NOW

Fig. 97d

INDEX LIBRARY

SEARCH
REGISTRATION
DOWNLOAD
BACKUP
INITIALIZE TAPE

HIGHLIGHT SELECTION
PRESS [ENTER]

Fig. 98'

LIBRARY REGISTRATION

ADD
DELETE
CHANGE

HIGHLIGHT SELECTION
PRESS [ENTER]

Fig. 97h'

CHANGE TAPE #

_ _ : _ _

FROM
TO

[ENTER] TO CONFIRM
[CANCEL] TO START OVER

Fig. 97t'

NO. 18 IS ALREADY TAKEN. PLEASE CHOOSE ANOTHER NUMBER

FROM __ __ 8
TO __ __ __

[ENTER] TO CONFIRM
[CANCEL] TO START OVER

Fig. 97J

SELECT THE TAPE CATEGORY

NON-INDEXED TAPE
INDEX     TAPE
BLANK TAPE

HIGHLIGHT SELECTION
PRESS [ENTER]

Fig. 97k'

DO YOU WANT TO
RETRO-INDEX THIS TAPE?

YES   NO

HIGHLIGHT SELECTION
PRESS [ENTER]

Fig. 97U'

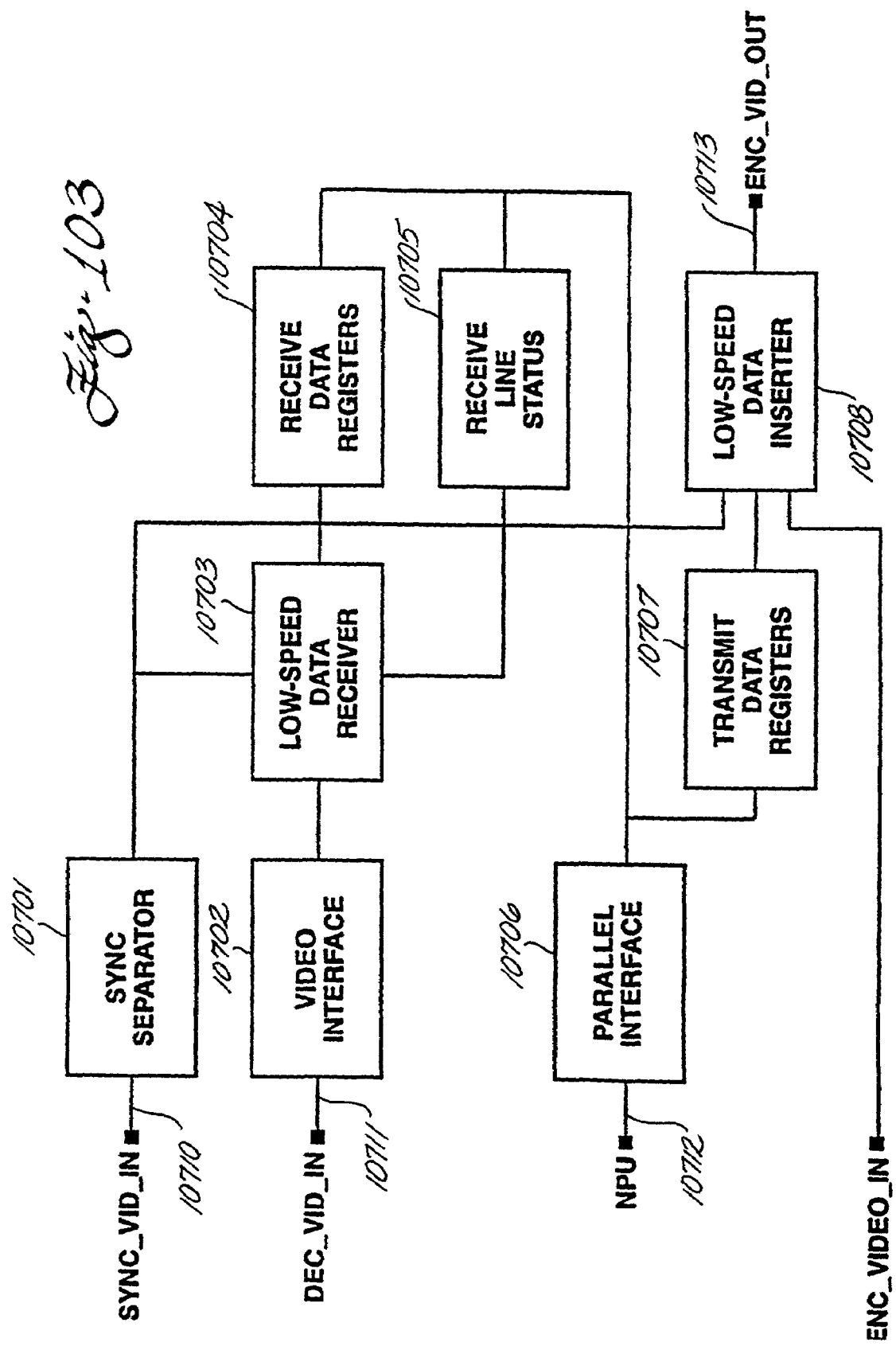

ENHANCING OPERATIONS OF VIDEO TAPE CASSETTE PLAYERS

CROSS REFERENCE TO RELATED APPLICATION

This is a continuation of application Ser. No. 09/532,640, filed Mar. 21, 2000, now abandoned, which is a continuation of application Ser. No. 08/773,612, filed Dec. 30, 1996, now U.S. Pat. No. 6,091,884, which is a continuation of application Ser. No. 08/176,852, filed Dec. 30, 1993, now abandoned, which a continuation-in-part of application Ser. No. 08/167,678, now abandoned, filed Dec. 15, 1993, which is a continuation-in-part of application Ser. No. 08/066,666, now abandoned, filed May 27, 1993, which is a continuation-in-part of application Ser. No. 08/014,541, filed Feb. 8, 1993 now abandoned, which is a continuation-in-part of application Ser. No. 08/001,125, now abandoned, filed Jan. 5, 1993, which is a continuation-in-part of application Ser. No. 07/883,607, now abandoned, filed May 7, 1992, which is a continuation-in-part of application Ser. No. 07/817,723, now abandoned, filed Jan. 7, 1992, which is a continuation-in-part of application Ser. No. 07/805,844, now abandoned, filed Dec. 5, 1991, which is a continuation-in-part of application Ser. No. 07/747,127, now abandoned, filed Aug. 19, 1991, the subject matter of each of these applications is incorporated herein by this reference.

FIELD OF THE INVENTION

In one aspect, this invention is related to means and method for facilitating management, storage, and retrieval of programs on a cassette of magnetic tape. In another aspect, this invention is related to maintaining current information about a tape in a magnetic tape cassette and more particularly to maintaining current information about such a tape using a magnetic tape reader/recorder, and magnetic tape cassettes therefor.

BACKGROUND OF THE INVENTION

Two general methods for long term mass storage of data are known; random access and sequential access. The random access method uses long playing (LP) record players, compact disc (CD) drives and video disc drives for consumer use, and hard disc drives, floppy disc drives and optical disc drives for use with computers. In all; information is accessed at random by moving a playing head directly over the desired playing area of the stored media.

a. Problems With Serial Storage Devices

In the sequential method, stored information can only be accessed sequentially. The sequential method uses audio tape drives, video tape drives and digital audio tape drives for general consumer use and digital tape drives and tape backup cassette drives for use with computers and analog tape drives for instrumentation purposes. All of these devices use magnetic tape as the stored media. The big advantage of tape drives is low cost compared with random access devices. The disadvantages and problems of using magnetic tape are threefold.

i. To go to a particular location on tape, the tape must be either advanced or rewound in a serial or sequential manner. Unless forward or reverse operations can be performed at very high speed, this can be a time consuming process.

ii. The exact contents and location of records on the tape are not known. Random access devices can record (usually at the outermost tracks) an index of the content at the beginning of the disc and anytime the index information needs to be accessed, the read or write head simply skips over to read the index. For magnetic tape, even if the index is recorded in a reserved area at the beginning of the tape, as is presently done in some video tape or computer tape backup systems, its usefulness is limited, due to the time required to rewind the tape all the way to the beginning, assuming the tape is not at the beginning when the need arises to search for the index. Owners of large numbers of tapes desire to place titles on the tapes to enable rapid identification of the program thereon. Usually titling is done by hand writing a title on a label on the tape or its box. However, the tape can become separated from the box, or the label may fall off. Some tape owners repeatedly record over the same tape and prefer not to use permanent labels. Computer tapes may contain hundreds of records or files and handwriting or updating the index onto the box is not practical.

iii. The absolute current location of the tape is not known. Most tape drives have tape counters which only indicate relative location. For example, if a tape cassette is played and then removed from a tape drive without rewinding, the next time the cassette is inserted and played by a tape drive, the absolute location of the tape in the cassette will no longer be known. Attempts have been made to overcome this problem by writing absolute address marks onto the tape. For example, some recent video tapes use the VHS Address Search System (VASS) whereby absolute address marks are written at 1 minute intervals onto the control track of a VHS tape. In computer backup of hard discs by tape, the streaming mode is usually used where a constant stream of data blocks (usually 512 bytes) are written onto the tape, each block being usually preceded by one or two address bytes. Thus, absolute addressing is available but not yet universally used on tape.

Knowing the absolute address is important. For example, assume that there are 5 programs (or records) on a tape and each of their starting addresses is known and a user desires to go to the starting location of program 4. Without knowing the absolute address of where the tape is currently positioned, the user or the drive has no way of knowing whether to rewind or fast forward the tape to reach the desired record.

In order for tape drives to compete against random access devices, it is important that these three problems be either overcome or ameliorated.

b. Providing Program Titles

Placing a descriptive title on the tape presents another problem. Video titling is usually known and recorded on a leader portion of the tape. Ordinarily, the title is computer-generated and recorded in a sequence of regular video frames, rather than on the control track. If multiple copies of the tape are made, the quality of the title drops off drastically. Also, the title cannot be conveniently edited without re-recording the sequence of frames. Prior art systems for applying such titles are either expensive or cumbersome. Professional video titling systems include the well-known Chyron system and many others. Typically these systems include a complete computer, a complex, high-resolution character generator, a special effects generator for making shadows, italics and other effects, and a video interface to generate a video signal. Such systems are too expensive and complicated for the home video market.

Some videocassette recorders (VCRs) and camcorders are equipped with simple character generators for displaying simple block letters and numbers, either superimposed over a recorded video signal or recorded and mixed with the picture signal. A typical camcorder application is adding characters representing the recording date and time to a video signal as it is being recorded, thereby adding a "date stamp." In VCRs, the character generator can be used to show programming information such as channel, date, and time on screen as the VCR is being programmed to record programs at a future date. However, currently there is no simple way to use the VCR character generator as a titling device.

In "Recommended Practice For Line 21 Data Services, Part Seven, Extended Data Service Packets", Draft EIA-608, Oct. 12, 1992, there is suggestion of using VBI line 21, field 2 to send information such as program title and type along with the broadcast program. Yet, the possible use of such information for facilitating operation of a videocassette recorder, such as providing a title for a recorded program, is never suggested.

c. Title Editing

Another problem with prior art titling systems is data input and editing. With Chyron systems, a full-size typewriter-style keyboard is used which is inappropriate for home use and slow for poor typists. Editing of a title is impractical with most home-generated titles, because the title is recorded as a video image on the tape. Thus, the prior art fails to provide a convenient means for generating, storing, and editing video titles for use with sequentially-stored magnetic tape. Users of home video equipment would likewise appreciate a system using internal character-generator hardware and VCR remote controls, thereby precluding the need for complex or expensive hardware to generate titles.

It is an object of the invention that the addressing system provide a fast and accurate way of searching for the starting points of the programs. It is a further object that the addressing system determine the current position on the tape and provide a means of homing in to the destination address, during a search. It is yet another object of the address system to provide a means for accounting for the lengths of programs as they are recorded or modified.

It is an object of the invention to have a memory that is randomly accessible for storing the directory. It is another object of the invention that the directory be changeable without degrading the quality of the recorded information on the tape.

It is an object of the invention to provide a program guide that is broadcasted to the user and which provides current scheduling and descriptive information that includes special events which are scheduled on short notice. It is a further object that the program guide be usable for timer programming a Indexing VCR with minimal interaction by the user so that the user finds time shifting for viewing programs easier. It is yet another object that the broadcaster can provide increase the viewing of programs broadcasted during traditional off-hours.

It is an object of the invention to have an indexing VCR with greater reliability and utility and at a lower cost than the Moving Head System.

It is an object of the invention to provide a program guide that is broadcasted to the user and which provides current scheduling and descriptive information that includes special events which are scheduled on short notice. It is a further object that the program guide be usable for timer programming an Indexing VCR with minimal interaction by the user so that the user finds time shifting for viewing programs easier. It is yet another object that the broadcaster can provide increase the viewing of programs broadcasted during traditional off-hours.

SUMMARY OF THE INVENTION

The invention provides, in a magnetic tape cassette reader/recorder, a method and apparatus for maintaining current information, such as a directory of recorded programs, about a tape in a magnetic tape cassette. The availability or the program directory can greatly facilitate operation of the tape cassette reader/recorder. For example, with a program directory, a user can perform an erase operation of a taped program by simply indicating on the directory that the program can be over-written and/or no longer accessible; or a recording operation by selecting from the directory a proper tape segment to perform the record operation without having to go through the tape to find the right spot. In brief, the availability of a program directory will eliminate much of the frustration that has been felt for so long by so many users of tape devices such as VCRs.

Different embodiments of the present invention are disclosed in the specification for storing current information about a tape. According to one embodiment of the present invention, directory information of a tape is recorded on the tape itself. The advantage of the embodiment is that the invention can be practiced without modification to the tape or its housing.

In one implementation of this embodiment, directory information is written on the video track of the tape in the vertical blanking intervals (VBI) of recorded video signals.

In another implementation, directory information is written on the control track of the tape. Preferably, a marker is formed on the tape to uniquely identify the position of a current directory. Also preferably, a first marker is recorded on tape in close proximity to a current directory when the directory is recorded on the tape. The tape is searched for a directory with the first marker. A second marker is recorded on the tape in close proximity to the first marker when the current directory is read. Alternatively, a marker may be recorded on the tape in close proximity to a current directory when the directory is recorded on the tape. The tape is searched for a current directory with the marker in close proximity thereto. The marker is erased when the directory is read. Also, the current tape position may be read from the housing of the cassette during insertion of the cassette into the reader/recorder. A current position of the tape may be written on the housing of the cassette during removal of the cassette from the reader/recorder.

In one embodiment, the directory is erased from the tape immediately after the step of reading the directory. In another embodiment, the reader/recorder re-positions the tape in the cassette, after reading the directory and prior to removal of the cassette, to a position such that the directory will be read out by the reader/recorder upon reinsertion of the cassette in the reader/recorder and prior to reading by the reader/recorder of one of the records from the tape. In still another embodiment, the tape is not rewound after the directory is read and prior to removal of the cassette; however, the tape is read for the directory in a reverse direction when it is reloaded.

Preferably there is recorded on the tape in association with the directory, a current position of the tape at which the reader/recorder will commence reading the tape upon reinsertion of the cassette in the reader/recorder. Also preferably, when reading the directory from the tape, the current position is also read from the tape and a representation of the current position is stored in the memory. Preferably, the current position in the memory is updated as the tape is being moved for reading or writing and the updated position may be recorded on the tape.

In still another embodiment of the present invention, directory information of a tape is stored in a random access memory located in the VCR. An identification (e.g. a volume label) is written on the tape whereby the corresponding directory information can be retrieved from the random access memory when the tape is loaded into the VCR.

Index information are provided on the tape to facilitate searching of programs recorded thereon and positioning the tape to selected programs.

According to one implementation, the index information is written at predetermined space intervals on the tape. The index information is represented by the value of the tape reel counter at the time the information is written. In one specific implementation, the index information is written onto the control track. In another specific implementation, the index information is written onto the VBI portions of the video track.

In another implementation, a cue signal is written at the beginning of each program. The address of a program is represented by its sequential position relative to other programs on the tape. A program under this implementation is located by counting the cue signals encountered during either a fast forward or a rewind operation, until the appropriate number of cue signals are encountered.

Different implementations are provided to further enhance the creation, maintenance and usefulness of the program directory. For example, in one embodiment, a program title, forming one part of the directory, is entered using controls on a jog shuttle remote control of the recorder/reader as an input device. A representation of an alphanumeric keyboard is displayed on a monitor screen by a character generator in the recorder/reader under control of the controller. Arrow buttons or a jog shuttle knob on the remote control can be used to select individual characters forming words in the program title. After the complete title is composed by a user it is saved in the directory. In another embodiment, a scrollable character is displayed instead of a keyboard representation. The arrow buttons or jog shuttle knob cause the character to change by stepping sequentially through the alphabets/numerals until a desired character is located.

In another embodiment, the controller is coupled to a decoder for decoding data (e.g. a program title) communicated in the VBI portions of a broadcast television signal. The decoded data is fed to the directory in the memory and also is displayed on a monitor screen. The displayed data can then be edited using controls on a jog shuttle knob of a VCR remote control. In one specifically contemplated embodiment, the decoder decodes data from line 21, field 2 of the VBI.

In another embodiment, the data communicated in the VBIs include data, such as a program title, which can be used to detect extension of a program beyond its scheduled time, thereby causing the VCR to continue recording the program.

In yet another embodiment, auxiliary information of a first program, such as the channel-date-time-length of a related second program is broadcasted in the VBI of the first program. In response to a user input, the auxiliary information is retrieved from the VBI and used for automatically setting the VCR to record the related second program.

In yet another embodiment, the auxiliary information are text data relating to the first program. Under the embodiment, the VCR has means-responsive to user input for storing the text data in a memory so that they can be displayed at selected time.

In another embodiment, a library containing the directories of a plurality of selected tapes is stored in the VCR. The availability of the library facilitate searching of programs among the plurality of tapes.

In still another embodiment, broadcast programs are classified into different categories. The identification of the category of a broadcast program is broadcasted in its VBI. According to the embodiment, the category identification is retrieved from the VBI and stored as part of the directory information, which can later be used to facilitate searching of a specific category of programs from an archive of tapes.

In a preferred embodiment, a hybrid VCR system is capable of detecting the address and the tape identification number (TID) from either the control track or the VBI of a video tape and identifying the type of tape therefrom. A first type of tape is a home recorded tape (HR tape) in which the directory thereof is stored in a RAM and the TID and the address are stored in the control track in a first embodiment and in the VBI in a second embodiment. A second type of tape is a prerecorded tape (PR tape) from a publisher in which the directory is stored in the VBI and the addresses are stored in a similar manner to the HR tapes. A third type of tape is a retroactively indexed tape (RI tape) which was previously recorded without an index and to which an index is being added. A directory is created in the RAM and the TID and addresses are recorded in the control track.

The address is determined from the location of the recording on the tape as a distance from the beginning of the tape. In a first embodiment, the address is determined by counting the spindle rotation either by counting the number of pulses reflected from light reflective lines on the spindle or calculating the length from the number of sync pulses recorded on the tape. In a second embodiment, the distance is determined by measuring the rotation of a capstan that rotates in unison with the tape movement.

In a first embodiment, the address system is a file mark plus a synchronous sprinkling address system (FMAS). This system writes the absolute address on the control track in the form of address packets. These packets are written in two types of locations. The first type (type 1) is written at the beginning of each program and at the end of the last program on the tape. The main function of these packets is to serve as "file marks" for search of starting points of programs. The second type of packet (type 2) is asynchronously recorded as often as possible in between the type 1 packets. These packets serve as "road marks" for determining current tape location.

In a second embodiment, two separate address systems are used. A high resolution address system (HRAS) writes an absolute address at high repetition rate (e.g., once every few seconds) on a line of the VBI. The second type of address system is a low resolution address system (LRAS) where the absolute address is written on the control track at the beginning of each program as well as the end of the last program as an address mark. An alternate LRAS is to write only marks, such as VISS or VASS marks in the control track at the beginning of each program on the tape and at the end of the tape.

The TID is generated by seeding a random number generator with the time of the first usage of the VCR so that the probability of two VCRs having the same identification number is reduced. The TID also includes a tape number.

Multiple indexing VCRs may be interconnected on a bus for transferring directory data therebetween. In a specific implementation, a household may have several VCR systems that will play some video tapes in both systems. The interconnection allows the directory to be transferred between multiple VCRs so that each VCR has the same directory library.

In yet another embodiment, an input/output port is provided so that the user may connect the VCR system to a printer or another external device such as a telephone line or a floppy disk drive. The directory or auxiliary information broadcast with a program may be printed in hard copy.

The invention provides in a magnetic tape cassette player/recorder a method and apparatus for providing a listing of television programs for an upcoming predetermined time period, along with video images and audio related to the programs in the listing. The program directory greatly facilitates operation of the electronic program guide tape. For example, by moving a cursor to a desired program displayed on the television screen, the user can select a program for viewing the associated video clips or selecting a recording operation by selecting from the displayed guide menu the program to be recorded without having to go through the steps of entering channel time, date and program length information directly into the video tape recorder. In one embodiment of the invention, the program information is stored in the vertical blocking interval associated with each displayed guide. As the guide is being displayed, the directory information is read from the VBI and stored into a random access memory.

Index information is provided on the tape to facilitate searching for video clips recorded thereon, and positioning the tape to the selected video clips.

The index information includes the channel, date, time and length information, either as discrete information or coded information, and the start and stop addresses of the video clips associated with each program entry on the guide in one specific implementation, index marks are written onto the control track at the beginning of each video clip and each guide menu. The address of a program may be represented by its sequential position relative to other programs on the tape, or by an absolute address representative of the distance from a fixed location, such as the beginning of the tape. In a system using a relative address, a video clip or menu is located by counting the index marks encountered during either a fast forward or a rewind operation until the appropriate number of index marks are counted.

The guide tapes may be provided to the user either by broadcasting the information in which the indexing VCR creates a guide from the broadcasted information. Alternatively, an information provider may sell the guides through retail outlets or by mail subscription. In one implementation of the invention, the user of the guide can receive updated information by taking a video tape to a retail store and using an update machine to record a new electronic program guide on the video tape.

BRIEF DESCRIPTION OF THE DRAWINGS

The foregoing features of the invention will be better understood upon consideration of the following detailed description of certain preferred embodiments taken in conjunction with the accompanying drawings in which:

FIG. 7 is a schematic illustrating a conceptual structure of an in-use directory in the data structure of FIG. 6 according to a specific implementation of the present invention.

FIG. 8 is a graphical representation of the format of the information recorded on the magnetic tape in the cassette of FIG. 5 with markers and directories in the control track.

FIG. 13a is a timing diagram showing modification of the synchronization pulse recorded on the control track of a video tape for encoding a directory thereon.

FIG. 13b is a timing diagram showing the synchronization pulses recorded on the control track when a binary bit "0" is to be written at one time instant (one frame) and a binary bit "1" is written at another time instant (another frame).

FIG. 13c is a timing diagram showing the timing of the current of opposite polarity through the coil of the control head.

FIG. 13d is a timing diagram showing the head signals generated by the control pulse edge detector shown in FIG. 13f.

FIG. 13e is a timing diagram showing the head signals generated by the control pulse edge detector shown in FIG. 13f in response to the current flow shown in FIG. 13c.

FIGS. 13g-13h is a detailed schematic of the circuit of FIG. 13f.

FIG. 15 is a schematic view of an embodiment for storing tape identification numbers and addresses using a file mark plus asynchronous sprinkling address system.

FIG. 16 is a schematic view of an alternate embodiment for storing tape identification numbers and addresses using a high and low resolution addressing system.

FIG. 17 is a schematic view of another alternate embodiment for storing tape identification numbers and addresses using a high and low resolution addressing system.

FIG. 24 is a schematic view showing the data format for the directory recorded on pre-recorded tapes.

FIG. 25 is a schematic view showing the data packet format for the absolute address packet.

FIG. 26 is a schematic view showing the data packet format for the tape identification number (TID).

FIG. 27 is a schematic view showing the format for another embodiment of the directory packet D(N) recorded in the VBI for prerecorded tapes.

FIG. 28 is a schematic view showing the format for another embodiment of the directory packet D(0) for the tape title recorded in the VBI for prerecorded tapes.

FIG. 29 is a schematic view showing the format for another embodiment of a TP packet recorded on the VBI for HR tapes and PR tapes.

FIG. 30 is a schematic diagram showing the format for another embodiment of a TID for an HR tape.

FIG. 31 is a schematic diagram showing the format for another embodiment of a TID for a PR tape.

FIG. 34 is a schematic view showing the format for a TPA packet recorded on the VBI for HR tapes and PR tapes.

FIG. 37 is a schematic view showing the format for the automatic backup (ABU) data packet used in the automatic backup function.

FIGS. 42*a*-42*b* are flow charts showing the steps employed in the operation of the indexing VCR using a FMAS addressing system when a tape is inserted therein.

FIG. 44 is a flow chart showing the steps employed in the search for a program on an indexed tape using a FMAS addressing system.

FIG. 53 is a flow chart showing the steps employed in the processing of program related information.

FIG. 54 is a schematic diagram of the display of the program related information stored in the buffers.

FIG. 56 is a flow chart showing the steps employed in an alternate embodiment for processing of program related information during playback of a tape.

FIG. 57 is a flow chart showing the steps employed for processing requests for program identification and channel specific program guides during tape playback.

FIG. 66 is a schematic view showing the video signals transmitted over a plurality of channels containing programs and commercials and a secondary channel containing the addresses and addressable auxiliary information.

FIG. 69 is a schematic diagram of the display of the directory selected in FIG. 68.

FIG. 70 is a schematic diagram of the display of the directory including the electronic guide selected in FIG. 68.

FIG. 73 is a flow chart showing the steps employed in the operation of temporarily indexing portions of a video tape between VISS marks.

FIG. 74 is a flow chart showing the steps employed in the operation of playing temporarily indexed portions of a video tape between VISS marks.

FIG. 77 illustrates the screen displayed by the VCR to show the viewer the available subscription services.

FIG. 78 illustrates the screen displayed by the indexing VCR to provide instructions to the viewer for obtaining authorization to the subscriber services.

FIG. 83 is a schematic view showing the format for the pointer packet data broadcasted in the VBI for auxiliary information.

FIG. 84 is a schematic view showing the format for the CSPG/PRI packet data recorded in the VBI as pointed to by the pointer in line 21 of the VBI.

FIG. 85 is a schematic view showing the video magazine (VM) packet used for video magazines.

FIG. 86 is a schematic view showing the format for the CSPG/PRI packet data recorded in the VBI as pointed to by the pointer in line 21 of the VBI.

FIG. 87 is a schematic view showing the VM packet used for video magazines.

FIG. 88 is a flow chart showing the steps employed in storing a directory in a library.

FIGS. 89a-89f are flow charts showing the steps employed in one specific embodiment of the invention.

FIG. 90a is a flow chart showing the steps performed by the controller when an enhanced tape is inserted into the VCR embodying the present invention;

FIGS. 90b-90n are flow charts showing the steps performed by the controller when different keys are pressed;

FIGS. 92a-92c illustrate the steps of different procedures performed by the VCR embodying the present, invention;

FIG. 93 illustrates how instant information is decoded from the VBI and used in the VCR embodying the present invention;

FIG. 94 is a flowchart showing the steps for extending the recording of a broadcasted;

FIG. 103 is a block diagram of the VBI signal processor.

DETAILED DESCRIPTION

Video Signal Format

Figure 1:
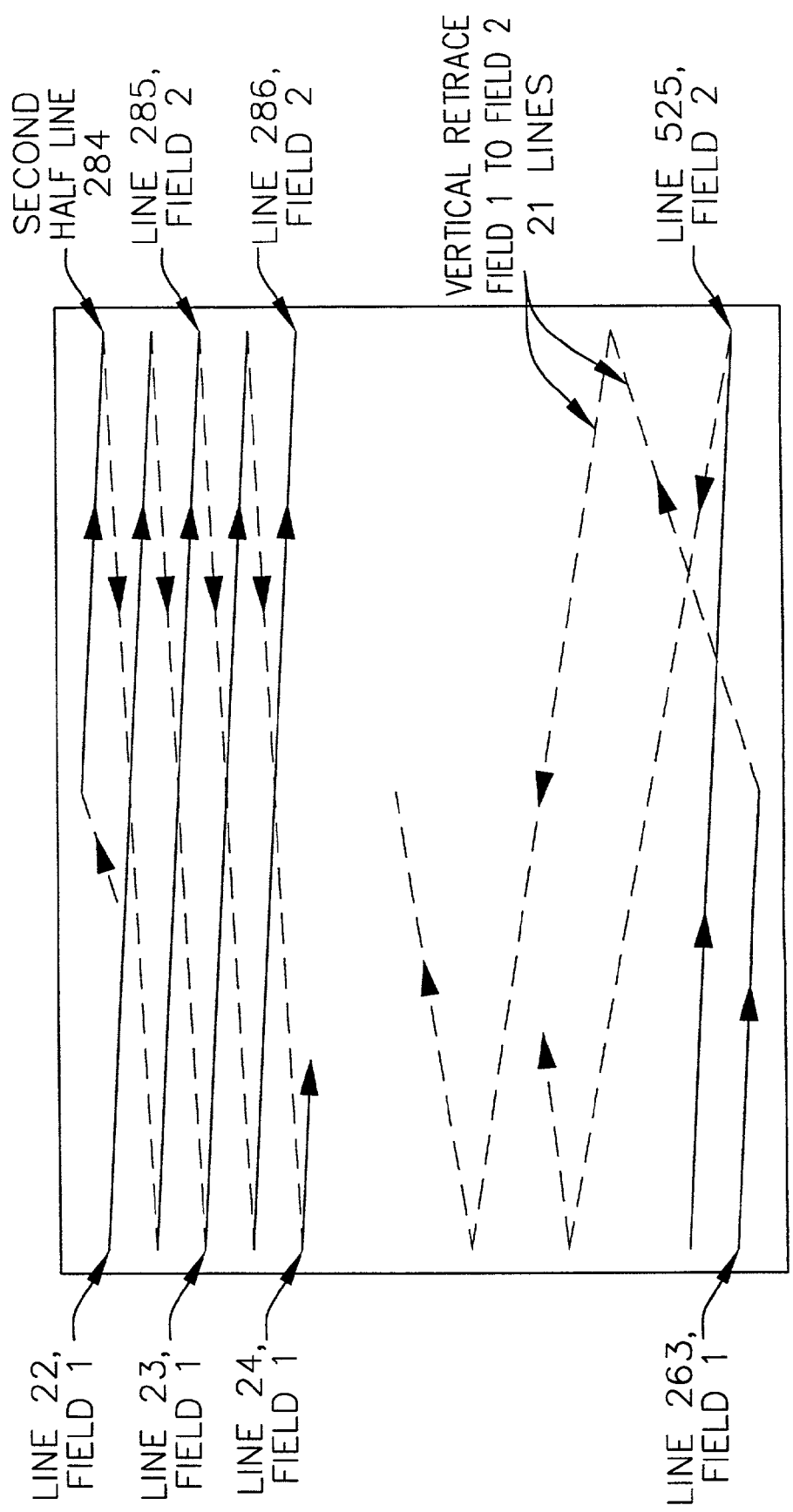
FIG. 1 is a schematic diagram illustrating the interlaced scanning pattern on a screen of a conventional television receiver.

FIG. 1 is a schematic diagram illustrating the interlaced scanning pattern on a screen of a conventional television receiver.

By way of background, video images in a cathode ray tube (CRT) type-video device, e.g. television, are generated by scanning a beam along a predefined pattern of lines across a screen. Each time all the lines are scanned, a frame is said to have been produced. In one implementation, such as used in the United States, a frame is scanned 30 times per second. Each television frame comprises 525 lines which are divided into two separate fields, referred to as field 1 ("odd field") and field 2 ("even field"), of 262.5 lines each. Accordingly, these even and odd fields are transmitted alternately at 60 Hz. The lines of the even and odd fields are interleaved to produce the full 525 line frame once every 1/30 of a second in a process known as interlacing. Another standard in the world uses 625 lines of information and interlace 312 and 313 lines at 50 fields per second. In the 525 line standard used in the United States, approximately 480 lines are displayed on the television screen.

Referring now to FIG. 1, a video display scans the beam from the top left hand corner and scans across the screen (line 22, field 1 in FIG. 1). After it finishes scanning the first line, the beam returns to the left hand side during a period known as a horizontal blanking interval and repeats scanning along another line which is parallel to but lower than the previous line (line 23, field 1 in FIG. 1). The scanning continues along the lines until the beam reaches the center of the bottom part on the screen (line 263, field 1) to complete field 1.

From the bottom center of the screen, the beam returns to the top where it starts scanning from substantially the center of the screen along the lines for field 2 which interlace the lines of field 1. This is not an instantaneous bottom to top jump but actually requires the length of time to scan 21 horizontal lines, such as lines 22, 23, . . . , for example. These lines are numbered 264 through 284 and are part of field 2, with the second half of line 284 being displayed. Then lines 285 to 525 of field 2 are scanned to complete field 2. When the beam reaches the bottom, right hand corner of the screen, the picture frame is formed. In the NTSC protocol widely used in North America, each field contains 262.5 horizontal lines and a pair of fields constitute a single 525 line video frame and creates one video picture at one instant in time on the video display.

During the time in which the beam returns from the bottom to the top of the screen between the fields, it carries no video or picture signals because it does not produce any picture element on the screen. This time interval is generally known as the vertical blanking interval (VBI). Its duration is typically 21 times the time duration that it takes the beam to scan across the screen. In other words, the duration of the VBI is equal to the time for the beam to scan 21 lines and is divided into 21 lines. In interlaced scanning, the VBI is identified by the field with which it is associated. Apparatus and methods using the NTSC standard with 21 lines in each VBI are well known in the art and therefore are not discussed in detail herein.

Because no image is produced on the display during the vertical blanking interval, no picture information therefore needs to be carried by the broadcast signals. Thus, the VBI is used for conveying auxiliary information from a television network or station to an audience. For example, close captioned data associated with the television program are transmitted as encoded composite data signals during VBI line 21, field 1 of the standard NTSC video signal at a rate of 480 bits per second.

Lines 1 through 9 of the VBI of each field are used for vertical synchronization and post equalizing pulses. Thus, lines 10 through 21 are available for auxiliary information.

Transmission System

Figure 2:
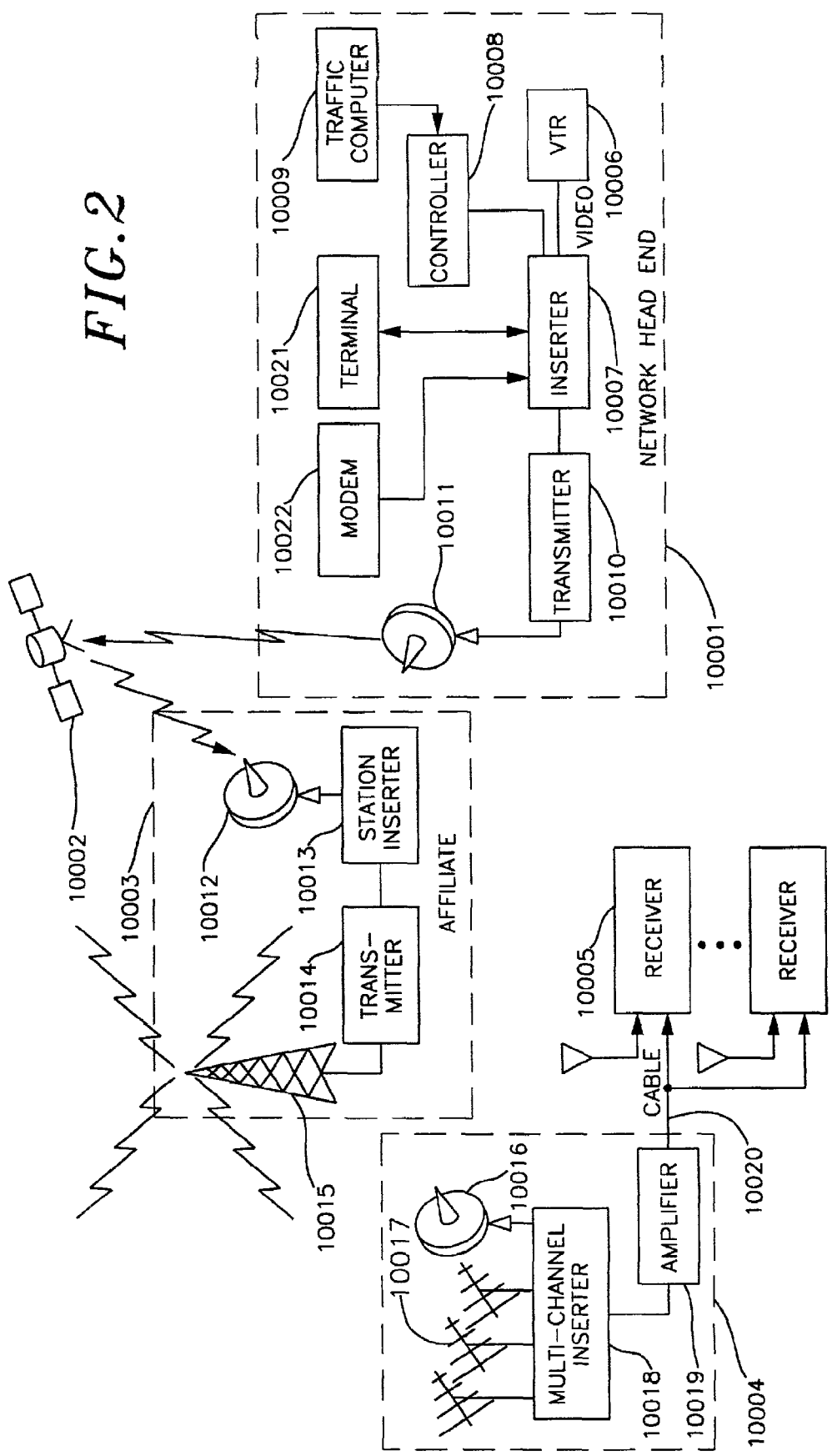
FIG. 2 is a functional block diagram of a data transmission system.

FIG. 2 is a functional block diagram of a data transmission system.

As used herein, the terms "broadcast" and "transmit" are used interchangeably for the transmission of signals over cable or fiberoptics, to or from satellites, over the air, and the like.

As an overview, a network head end 10001 transmits a composite television signal containing inserted information in a portion thereof, typically the vertical blanking interval (described above in conjunction with FIG. 1), to a satellite 10002 which rebroadcasts the same to a local affiliate 10003 or an O&O. The affiliate 10003 may further insert data into the vertical blanking interval of the received television signal and transmit the same to a local cable head end 10004. The cable head end 10004 receives television signals from a plurality of sources (including satellites) and may further insert data into the vertical blanking interval of any of the television signals. The signals from the plurality of sources are combined into a composite television signal, amplified, and provided over a cable to a plurality of individual subscribers 10005. In addition, the individual subscribers 10005 may receive signals directly from the local affiliate 10003 by air, which may include the use of a satellite 10002, or by cable.

More specifically, the network head end has a video tape recorder (VTR) 10006 for providing a program signal to an inserter 10007. A controller 10008 also at the head end controls the scheduling of loading tapes from a cart (a machine with a plurality of video tape cassettes which are moved by a robotic arm from a storage location and inserted into a video tape recorder and vice versa) Furthermore, the controller 10008 controls the lighting of stages during live broadcasts, such as news broadcasts. The controller 10008 is typically an Intel 486 microprocessor based system. A traffic computer 10009 controls the exact timing of playing individual segments of video tapes and inserting commercials therebetween as well as switching between different programs. Some network head ends have both a traffic computer 10009 and a controller 10008. The traffic computer 10009 provides bare bone time and title data for generating channel specific program guides (CSPG) as will be described below. The controller 10008 provides data and commands to the inserter 10007. The traffic computer 10009 provides data and commands to the controller if present. Otherwise, the traffic computer 10009 provides these signals directly to the inserter 10007. The inserter 10007 inserts data into the vertical blanking interval of the composite television signal as will be described below and provides the television signal to a transmitter 10010 which in turn provides the television signal on a microwave carrier to a satellite dish 10011 for transmission to the satellite 10002.

The satellite 10002 retransmits the received signal, which is received by a satellite dish 10012 at the affiliate 10003. The dish provides the signal to a station inserter 10013 at the local affiliate 10003. The affiliate may also insert data into the composite television signal as will be described below. The television signal is then provided to a transmitter 10014 and then to a transmitting antenna 10015.

A local cable operator 10004 has a plurality of satellite 10016 dishes and antennas 10017 for receiving signals from a plurality of networks 10001 and affiliates 10003. The received signal from each of the dishes 10016 and antennas 10017 is provided to a respective input of a multi-channel inserter 10018, which can input data into the vertical blanking interval of a received signal. The multi-channel output from the inserter 10018 is amplified in an amplifier 10019 and provided over a cable 10020 to individual subscribers 10005.

As will be described below, the VBI decoder in the indexing VCR scans VBI lines 10-25 of both fields 1 and 2. Lines 1 through 9 are typically used for vertical synchronization and equalization and, thus, are not used to transmit data. Closed captioning and text mode data are generally transmitted on VBI line 21, field 1 of the standard NTSC video signal, at a rate of 480 bits per second. Extended data services (EDS) data is transmitted on VBI line 21, field 2.

By way of background, the data in the vertical blanking interval can be described in terms of the waveform, its coding and the data packet. The closed caption data waveform has a running clock followed by a frame code, followed by the data. The coding of the data is non-return-to-zero (NRZ) 7 bit odd parity.

Under mandatory FCC requirements effective July 1993, televisions having a size 13" and greater must provide closed captioning in two closed captioning fields which are used for two languages in real time and two text mode fields. The text mode fields fill the entire screen with text. The default mode is an open ended mode in which the page is first filled up and then scrolled up. The individual recipient of such data has no control over the data.

Caption data decoding is further described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS", Title 47, C.F.R., Part 73.682 (a) (22), Caption Transmission format; Title 47, C.F.R. Part 73.699, FIG. 6; "TELEVISION SYNCHRONIZING WAVEFORM"; Title 47, C.F.R., Part 73.699, FIG. 17A; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Under the extended data services (EDS) proposed in the *Recommended Practice for Line 21 Data Service*, Electronics Industries Association, EIA-608 (drafts Oct. 12, 1992 and Jun. 17, 1993) (hereinafter referred to as "EIA-608" standard", the subject matter of which is incorporated by reference, additional data is provided in line 21, field 2 of the vertical blanking interval. This requirement includes two closed captioning fields, two text mode fields and the extended data services. Table I shows the classification of data, the class control code, and the type code. The extended data includes, among other information, program name, program length, length into show, channel number, network affiliation, station call letters, UCT (universal coordinated time) time, time zone, and daylight savings time. Upstream at the network, the network inserts the program name, the length of the show, the length into the show, the network affiliation, and the UCT time. Downstream at the affiliate, the affiliate inserts the channel number, the time zone, the daylight standard time and program names. The network inserts the data that does not differ for different affiliates.

The data is transmitted in packets. Six classes of packets are proposed in the EIA-608 standard, including: (1) a "Current" class for describing a program currently being transmitted; (2) a "Future" class for describing a program to be transmitted later; (3) a "Channel Information" class for describing non-program specific information about the transmitting channel; (4) a "Miscellaneous" class for describing other information, (5) a "Public Service" class for transmitting data or messages of a public service nature such as National Weather Service Warnings and messages; and (6) a "Reserved" class reserved for future definition.

According to the proposed EIA-608 standard, a packet is preceded by a Start/Type character pair, followed by information/informational characters pairs until all the informational characters in the packet have been sent.

Table I lists a subset of the control and type codes of various kinds of information to be broadcasted in the VBI according to the EIA-608 standard. For example, to transmit the program identification number (scheduled start time) of a program, a control code of 01 hex, a type code of 01 hex and a packet of four characters (one character specifying the minute, one character specifying the hour, one character specifying the date and one character specifying the month) are sent. Similarly, to transmit the program name, a control code of 01 hex, a type code of 03 hex, and a packet of between 2 to 32 characters are sent. As another example, the VBI may also be used to transmit a time-of-day value, by sending a control code of 07 hex, a type code of 01 hex, and a packet of two characters. The data format is also encrypted as described in other patent applications. The inserter 10007 stores data from the video stream and handles the insertion of such data into the video stream.

TABLE I

| Class | Class Control Code | Type |
|---|---|---|
| Current Class | | |
| Program Identification (scheduled start time) | 01 hex, 02 hex | 01 hex |
| Length/Time-in-show | 01 hex, 02 hex | 02 hex |
| Program Name | 01 hex, 02 hex | 03 hex |
| Program Type | 01 hex, 02 hex | 04 hex |
| Program Rating | 01 hex, 02 hex | 05 hex |
| Audio Services | 01 hex, 02 hex | 06 hex |
| Caption Services | 01 hex, 02 hex | 07 hex |
| Aspect Ratio Information | 01 hex 02 hex | 09 hex |

TABLE I-continued

| Class | Class Control Code | Type |
|---|---|---|
| Composite Packet - 1 | 01 hex, 02 hex | 0C hex |
| Composite Packet - 2 | 01 hex, 02 hex | 0D hex |
| Program Description row 1 to 8 | 01 hex, 02 hex | 10 hex-17 hex |
| Channel Information Class | | |
| Network Name (affiliation) | 05 hex, 06 hex | 01 hex |
| Call Letters (Station ID) and Native Channel | 05 hex, 06 hex | 02 hex |
| Tape Delay | 05 hex, 06 hex | 03 hex |
| Miscellaneous | | |
| Time of Day | 07 hex, 08 hex | 01 hex |
| Impulse Capture ID | 07 hex, 08 hex | 02 hex |
| Supplemental Data Location | 07 hex, 08 hex | 03 hex |
| Local Time Zone & DST Use | 07 hex, 08 hex | 04 hex |
| Public Service Class | | |
| National Weather Service Code | 09 hex, 0A hex | 01 hex |
| National Weather Service Message | 09 hex, 0A hex | 02 hex |

The data inserted into the television signal that is provided by the inserter is the closed captioning data which includes the text mode, EDS and, the station inserted data. The station inserted data includes the channel specific program guide (CSPG), program related information, supplemental text, and a VM packet which is a data packet used for triggering and control and which is described below in conjunction with FIG. 87.

As noted above, the traffic computer 10009 provides bare bone time and title information automatically to the inserter for creating a channel specific program guide. The video input into the inserter may also have data in the VBI. The data may either be final data at low speed, such as the 1× and 2× defined below, modes or localized data at a high speed according to the Northern American Broadcast Teletext Specification (NABTS). In addition, data, such as program identification, program related information, or the full channel specific program guide (i.e., the program descriptions of the programs yet to be broadcast) may be manually entered from a local terminal 10021. The local terminal 10021 may be used to pre-build, recall, or edit messages. Further, the terminal 10021 may recall messages for emergency reports. The terminal 10021 typically includes a computer. In addition, a modem 10022 may be used to provide data to the inserter 10007. Such data (the program identification, program related information or channel specific program guide) may be provided manually or automatically from remote sites, such as a television program guide publisher or the network head end. The output of the inserter 10007 is a composite television signal with the data inserted. This system processes both teletext data (which is not related to the program) and auxiliary information (which is related to the program).

Data Transmission Format

Figure 3:
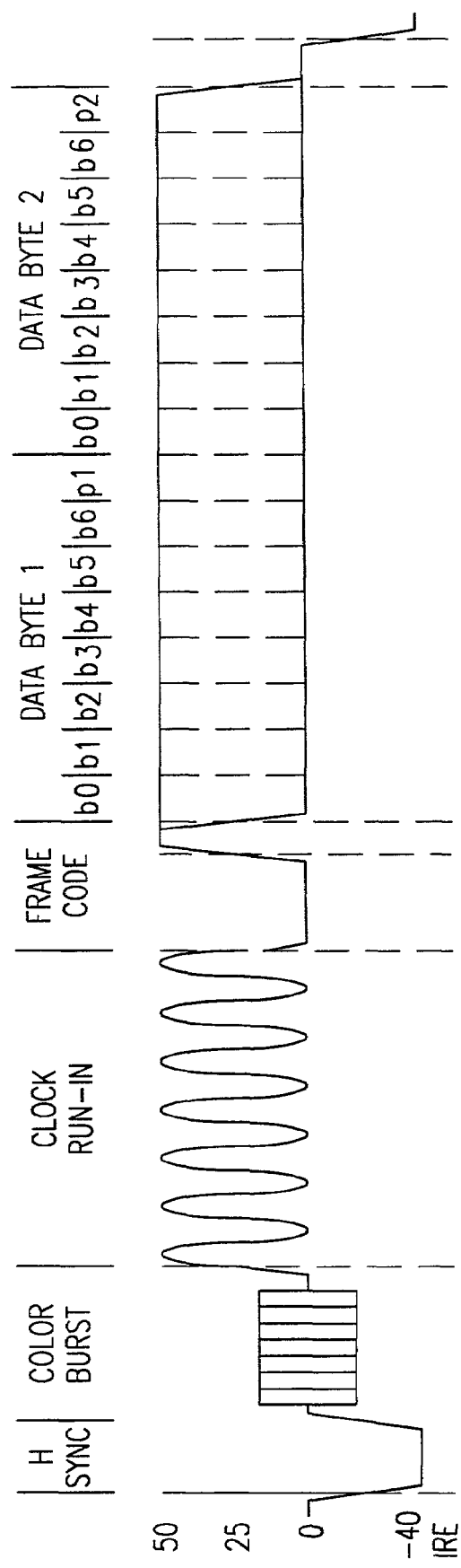
FIG. 3 is a timing diagram of the standard data format (1×) for transmitting data in the VBI.

The timing of video signals in NTSC format is well known in the art. As described above, the vertical blanking interval is the time between the flyback from the bottom of the screen to the top of the screen. Although no video signal is displayed, the horizontal synchronization pulses are still provided during the VBI. The standard data transmission rate is defined in the EIA-608 standard. As shown in FIG. 3, the horizontal synchronization pulse is followed by color burst signals. A clock run-in cycle follows the color burst which in turn is followed by a frame code. The clock run-in is "10101010101." The format code is "01000011." Two data bytes (16 bits) are transmitted at a rate of 32 times the horizontal sync frequency in each VBI line. Each byte is 8 bits including a parity bit. This format is referred to as the standard data rate format (or 1× format). Each byte in the VBI line is arranged with the least significant byte first. The last bit is used as parity for error checking and correction. Each byte of the transmitted data is parity checked upon receipt. An error correction scheme based on the parity bit and the last XOR byte which occurs at the end of each packet is performed on each packet to correct for one possible bit error in-each packet. As described below, the packets DN, CSPG, PRI, and VM may be transmitted in either the 1× format or the 2× format to be described below. Each of these packets may also be encrypted as described below.

Figure 4:
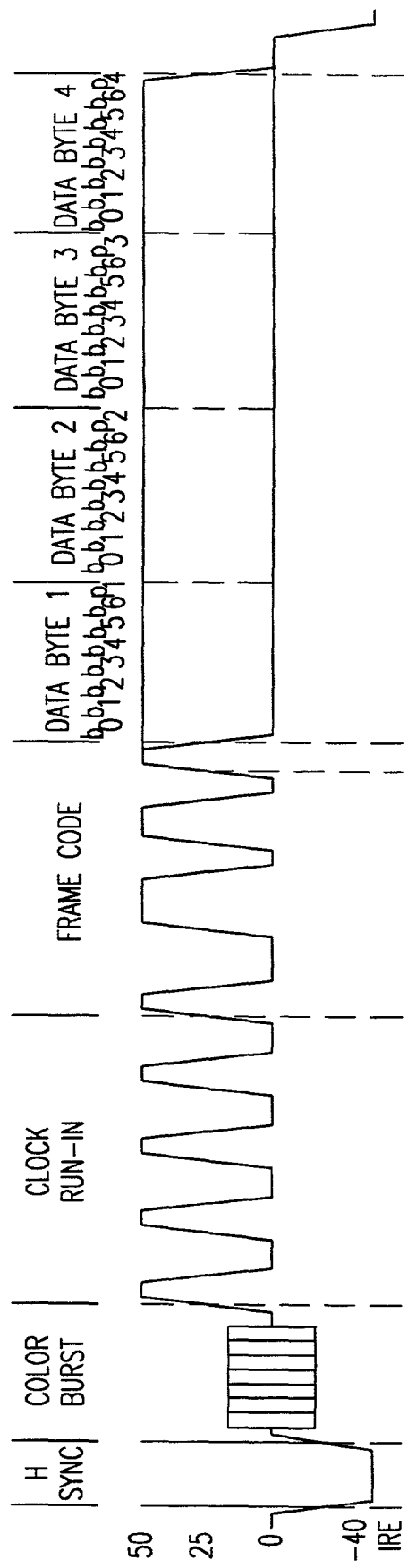
FIG. 4 is a timing diagram of the accelerated data format (2×) for transmitting data in the VBI.

An accelerated data format (2× format) as shown in FIG. 4 uses a bit rate twice that of the 1× format to thereby provide 4 bytes per VBI line. The clock run-in is the bit sequence "10101010." The frame code is "10011101101." Four data bytes (32 bits) are transmitted at a rate of 64 times the horizontal sync frequency.

Overview of the Tape Indexing System

It is a feature of this invention that an indexing VCR uses a directory as described below to perform searches, by title, category, key words, or the like, of the user's video tape library to find the particular tape that a selected program is on. In addition, a directory of the particular tape may be similarly searched to locate a program on the tape. The tape may then be automatically advanced to the selected program. Indexing is used herein to describe the searches, the generation of these directories, and the like.

The directory contains information related to the identification number of a tape, the programs recorded thereon and related information to these programs, such as length of time, type of program, and address (also referred to as location) on the tape. The directory may be recorded in different locations on the tape for different embodiments as described in the parent patent application. In one embodiment described herein, the tape directory is recorded in a random access memory (RAM) for home recorded tapes and recorded on the tape itself in the vertical blanking interval for prerecorded tapes.

As will be described in detail below, each tape has a tape identification number (TID) written at some repetition rate along the whole tape on a VBI line for both home recorded and prerecorded tapes. The tape identification numbers reference the tape to a corresponding directory stored in the RAM. After the tape is inserted into the indexing VCR, the VCR identifies the type of tape and locates and retrieves the corresponding directory from the RAM or from the tape itself.

The Indexing VCR

Figure 5:
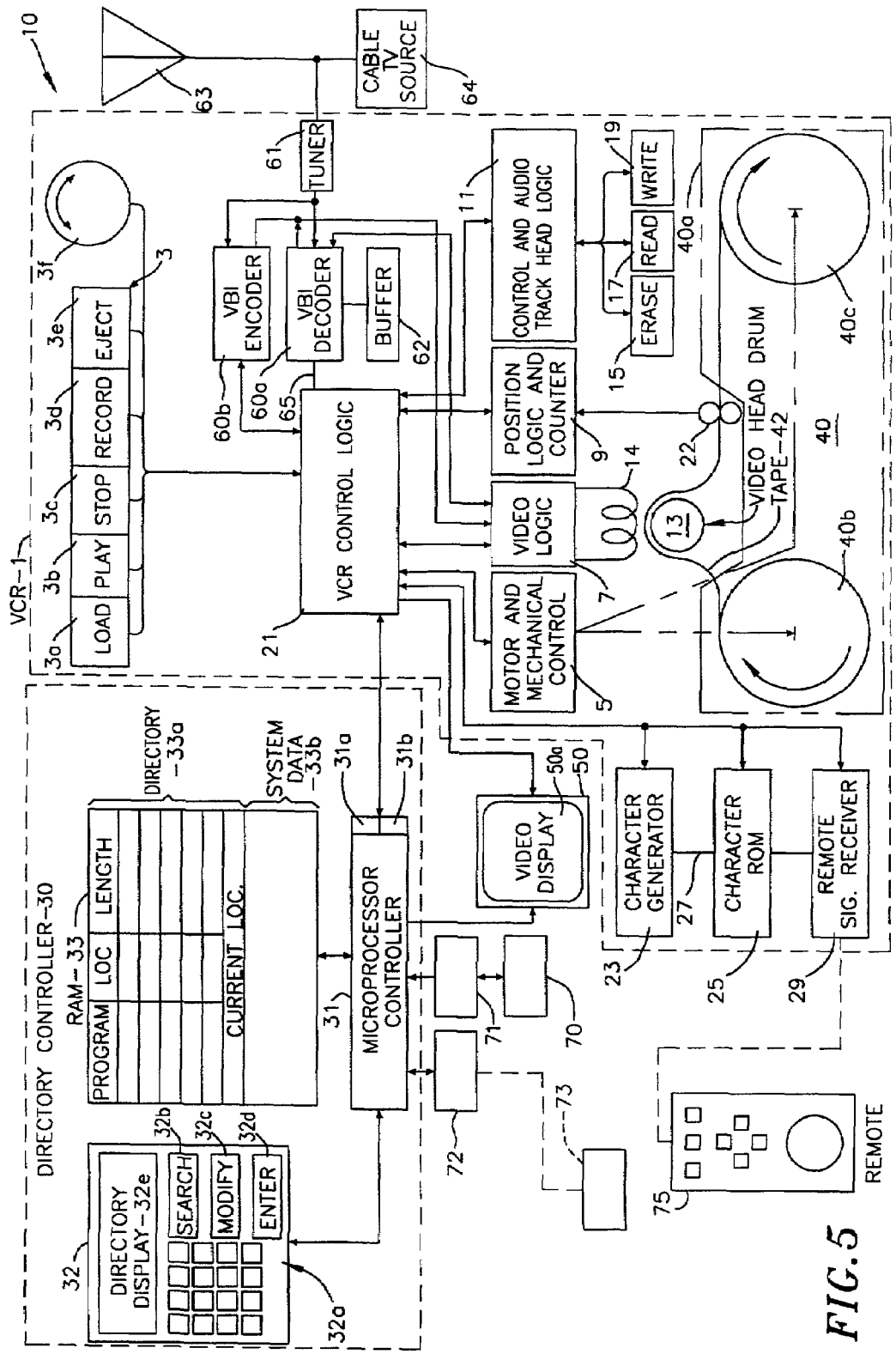
FIG. 5 is a block diagram illustrating a indexing video cassette recorder, using a hybrid indexing system that provides indexing of recorded programs for home recorded tapes, prerecorded tapes, and retroactively indexed tapes, and a standard video cassette format, and that has a directory controller, a bus interface, and an output interface and embodies the invention.

FIG. 5 is a block diagram of an indexing VCR system 10 including a video cassette reader/recorder (VCR) 1 with a conventional video tape cassette 40, a video display 50, and a directory controller 30. The VCR 1 is a video reader/recorder device and uses any one of many different recording technologies such as BETA, VHS, super VHS, 8 mm, VHS-C or any other popular technologies. In particular, VHS-C indexed tapes can be played directly on a VHS indexing VCR with full index functioning. The cassette 40 is a conventional video cassette having a magnetic tape 42 packaged in a cartridge 40a or cassette housing (hereafter called cassette) and transported between a feeding spindle 40b and a takeup spindle 40c. Even though the size and design of the housing is different for different types of recording technology, the basic information that goes on the tape itself is similar. The technology and operation of a VCR are well understood in the art.

The VCR 1 has a button control panel 3 with control buttons, including LOAD 3a, PLAY 3b, STOP 3c, RECORD 3d, and EJECT 3e, for controlling the operation of the VCR 1. The LOAD button 3a is optional and is not used on machines which load automatically. The VCR control logic circuit 21 receives control signals from the button control panel 3 and controls the overall operation of the VCR 1 by sending control signals to a motor and mechanical control logic circuit 5, a video logic circuit 7, a position logic and counter circuit 9, and a control and audio track head logic circuit 11 of the VCR 1, as well as to the video display 50 and the microprocessor controller 31 of the directory controller 30.

The motor and mechanical control logic circuit 5 controls loading and ejecting of the cassette 40 and also controls movement of the video tape 42 within the video cassette 40 during recording, reading (playback), fast forward, and rewind. The video logic circuit 7 controls the operation of a video read/write head drum 13 in reading from or recording video signals to the tape 42. The electrical signals are magnetically coupled between the video logic circuit 7 and the video head drum 13 using a winding 14. The position logic and counter circuit 9 monitors tape movement through a cassette tape movement sensor 22 and generates signals that represent tape position. The control and audio track head logic circuit 11 controls writing, reading, and erasing of signals on the control or audio track of the tape 42 through the write head 19, the read head 17, and the erase head 15.

The directory controller 30 includes a microprocessor controller 31, a random access memory (RAM) 33 and a directory input/output display and control panel 32. Preferably the microprocessor controller 31 comprises an integrated circuit microprocessor, a program store 31a, such as a read-only-memory (ROM), for storing a control program to implement methods of the invention, and a clock 31b for generating a clock signal for timing functions and providing the time. The time may be set using the directory input/output display and control panel 32 in a manner known in the art. (Alternatively, the VCR 1 may maintain the time.) The microprocessor controller 31 controls the sequence and operation of the directory controller 30 and interfaces with the VCR control logic circuit 21 to implement the necessary functional capabilities for reading, updating and recording the directory. The microcontroller processor 31 in the indexing VCR 10 performs all indexing functions and human interface, interprets (e.g. tab, indent, screen format, attributes) and processes the auxiliary information display. An exemplary implementation of the microprocessor controller 31 is illustrated below in conjunction with FIGS. 99-103.

The RAM 33 is a conventional random access semiconductor memory which interfaces directly with the microprocessor controller 31. The RAM 33 is preferably non-volatile. Alternatively, the RAM 33 is battery backed up. The battery back up should maintain the contents of the memory for a predetermined time, e.g., 7 days, after the loss of power. The retention time may be shorter, if the indexing VCR uses an automatic backup of the memory onto video tape, such as described below. A portion of the RAM 33 shown as system data 33b, is also used for storing the system software of the microprocessor controller 31. The RAM 33 is also used for storing the program directory 33a. Another portion of the RAM 33 is used as buffer memory for the channel specific program guide (CSPG) and the program related information which are described below. Still another portion of the RAM 33 is used as a temporary memory for storing part of the directory read from a prerecorded tape. Yet still another portion of the memory is used as a program play sequence buffer for storing program numbers in a user defined sequence for soft editing (described below). The size of the RAM 33 is at the discretion of the manufacturer. However, the RAM 33 preferably can store the directory of at least 400 tapes. Accordingly, the RAM 33 has preferably at least 256 kilobits of memory for library storage. Further, the RAM 33 has preferably 720 bytes for the CSPG buffer and 3600 bytes for the program related information buffer (900 bytes for stored information; 1800 for temporary real time information; 900 bytes for temporary program related information). Effective memory size of the RAM 33 may be increased by using well known data compression techniques. Data recorded in the RAM 33 may be encoded or scrambled. Methods for encoding and scrambling are described below. The encoding and decoding programs are stored in the ROM.

At start up (or power up) of the indexing VCR, the PROM writes a signature into a portion of the RAM 33, preferably comprising at least four bytes, to indicate that the RAM has been initialized. Each byte in the signature has a different non-trivial value, i.e. not all zeros or all ones. In addition, all buffers in the RAM 33 are cleared to ensure that no invalid information is processed or displayed. If the signature is invalid, the microprocessor controller 31 initializes the RAM 33. As will be described below in conjunction with FIG. 31, at the first power on, the indexing VCR generates a random number as a machine identification number (MID) that becomes part of an identification number for each tape created by that VCR. As will be described below in conjunction with FIGS. 52*a*-52*b*, the indexing VCR 10 allows the user at start up to restore or install the library into the RAM 33 from a tape.

The directory input/output display and control panel 32 has an alphanumeric keyboard 32*a* and special function keys, such as a SEARCH key 32*b* for commanding searches for data in the directory 33*a* and on the tape 42, a MODIFY key 32*c* for modifying or deleting directory information in the RAM 33, and an ENTER key 32*d* for entering program directory information. Instead of providing special function keys, functions can also be initiated by entering predefined sequences of conventional keys on the alphanumeric keyboard 32*a*.

A display 32*e* is a conventional liquid crystal or other type display for displaying data being entered on the keyboard 32*a*, and to display the directory or other information stored in the RAM 33. Alternately, as discussed below, an on-screen display 50*a* can be used. The directory information stored in the RAM 33 is processed by the microprocessor controller 31.

The VCR 1 additionally comprises a character generator circuit 23 coupled to the VCR control logic circuit 21 and to a character generator read-only memory (ROM) 25. Character generators are well-known in the art. Typically, the character generator ROM 25 stores a data table representing pixel or bit patterns of a plurality of alphanumeric characters, such as the Roman alphabet and the Arabic numerals. Upon command by the VCR control logic circuit 21 and the character generator circuit 23, the data in the character generator ROM 25 is read and placed in an output signal to the video display at a position on the display determined by coordinates generated by the microprocessor controller 31. The end result is visual display of a alphanumeric character on the display screen. Character generators are well-known for channel display in television receivers, and for use in professional titling equipment.

The screen 50*a* is preferably 36 characters×15 rows. As will be described below, a broadcaster preferably broadcasts auxiliary information in this format. For displays with a different format, the indexing VCR 10 reformats the information. For example, a VCR with a higher screen display density, such as 36 characters×15 rows, may center the information in the 24 characters×10 rows format. Alternatively, for a higher screen display density, the data may be broadcasted at the higher density. When there are more rows than can be displayed on one page, the indexing VCR 10 displays a message, such as "(MORE)," to inform the user that there is another page of information.

As shown in FIG. 5, an input of a VBI signal decoder 60*a* is coupled to the output of a tuner 61, which is generally included in the majority of consumer VCR's for off-the-air recording. The tuner 61 receives a broadcast TV signal from an antenna 63, a cable TV signal source 64, or a satellite receiver system. The tuner 61 down converts the received broadcast video signal from one of several different video channels onto a common unused television channel, typically channel 3 or 4. The tuner 61 provides the down converted video signals to a VBI decoder 60*a* which decodes data recorded on the VBI of the received video signal, a VBI encoder 60*b* which encodes data onto the VBI of the video signal that is to be recorded onto the video tape 42, and the video logic circuit 14. The VBI decoder 60*a* can decode at least lines 10-25 of both fields of the VBI. The decoder 60*a* may also decode VBI signals using copy protection pulses inserted therebetween, such as the Macrovision copy protection system.

Data encoded in the VBI is retrieved by the VBI decoder 60*a* and provided to the directory controller for automatic generation of the program title for the directory of the program being recorded. Television broadcasts include titles and subtitles transmitted during the Vertical blanking interval (VBI) portion (described below) of the broadcast video signal, which is decoded and displayed as text subtitles along with the video image by means of the VBI decoder. The extracted, decoded program title can be edited by a user or saved in the directory. Thus, the extracted program title can serve as an alternate data input source for the program directory, reducing the needed amount of user input. Other auxiliary information described below may also be broadcasted during the VBI and decoded by the VBI decoder 60*a*.

Examples of commercially available VBI caption decoders include the TeleCaption 4000 Adaptor, commercially available from National Caption Institute, Falls Church, Va., and Teletext Decoder, available from Norpak Corporation, Ottawa, Canada. In a specific embodiment of the present invention, the VBI decoder 60*a* is a circuit from ITT with part number of CCD3000. The CCD3000 decoder may be set to decode a selected field and line of the VBI by setting a control and status register. Field selection is accomplished by selectively setting bit 4 of the IM BUS control register with a RAM address of 02H. Line selection is accomplished by selectively setting the IM Bus control register a with RAM address of 04H. (See "CCD 3000 Closed-Caption Decoder preliminary", table 4.2, page 31, Edition Apr. 22, 1991, ITT Semiconductors.) Both the decoder, the tuner, and the interaction of both, are conventional in the art.

A decoder signal line 65 is coupled from the decoder to the VCR control logic circuit 21 to carry decoded VBI data to the control logic circuit. The VCR control logic circuit 21 is commanded by the microprocessor controller 31 to pass the decoded data to the directory 33*a* under control of a stored program in the RAM 33. The program then causes the VBI information to be stored as a program title in the directory and displayed on the display 50. The VBI data is sent to the RAM 33 during or immediately before the display of an on-screen directory at step 1408 described below for FIG. 44*a*, so that when the directory is displayed, the VBI data immediately appears in the directory display. A user then can edit the caption to adjust it as desired.

VBI data is placed in a broadcast TV signal by a broadcast TV station in a continuous stream; a user of the VCR 1 cannot stop or slow down the stream without additional hardware. Thus, it is possible that the first VBI data received by the antenna 63 is not the program title. This problem can be overcome by coupling a data buffer memory 62 to the decoder. Under control of the decoder, all VBI data received by the VBI decoder 60*a* is stored in the VBI buffer and serially output to the VCR control logic circuit 21. Each VBI data word is displayed in the directory, and the user presses the ENTER button to accept the word and store it as a program title. For a period of time dependent on the size of the buffer and the rate of data received by the VBI decoder 60*a*, received data remains in the buffer from which it can be recalled by a user and saved as a program title. When the buffer 62 fills, any additional data words received will cause overflow, resulting in loss of the earliest received word. If a large enough buffer 62 is used, this overflow effect will not be a problem. The functions of reviewing buffered data and storing saved titles can be controlled by a stored computer program or subroutine in the RAM 33.

Not only can the information (e.g. title, subtitle, program identification) transmitted during the VBI portion be displayed in real time or used to generate program title for the directory, it can be utilized to further facilitate operation of the VCR. For example, by monitoring the transmitted title, the VCR can automatically detect the end of a program and stop recording thereto. Also by monitoring the VBI portion used for transmitting the title, the VCR can filter out (in recording a program) segments that are unrelated to the program (e.g. commercials), by temporarily stopping the VCR if changes in the title portion are detected.

It is disclosed in the preceding paragraphs that the VBI data may be broadcast at a relatively high repetition rate prior to broadcast, enabling a suitable decoder to detect the data. In the system of FIG. 5, the decoder 60*a* can be designed to receive and store in buffer 62 the program identification information from line 21 of field 2 of each frame. Using suitable logic, the program title and other information can be stored automatically in the directory 33*a*, without user intervention.

The system architecture of the video system 10 in FIG. 5 shows the microprocessor controller 36 having multiple inputs and outputs to several functional units such as the video signal decoder 28, the VBI encoder 26, the VBI decoder 24, the RAM 48, the ROM 44, and the like. An alternate embodiment (not shown) using a common bus structure may be used. In this alternate embodiment, the aforementioned functional units and the microprocessor controller each connect to a common bus.

Memory Structure

The indexing VCR stores in the RAM 33 the start address, the stop address, the record speed, the program category, the extension program category, the version, the language, and the program title for each program for retrieval during playback. The features of this data will explained below.

Figure 6:
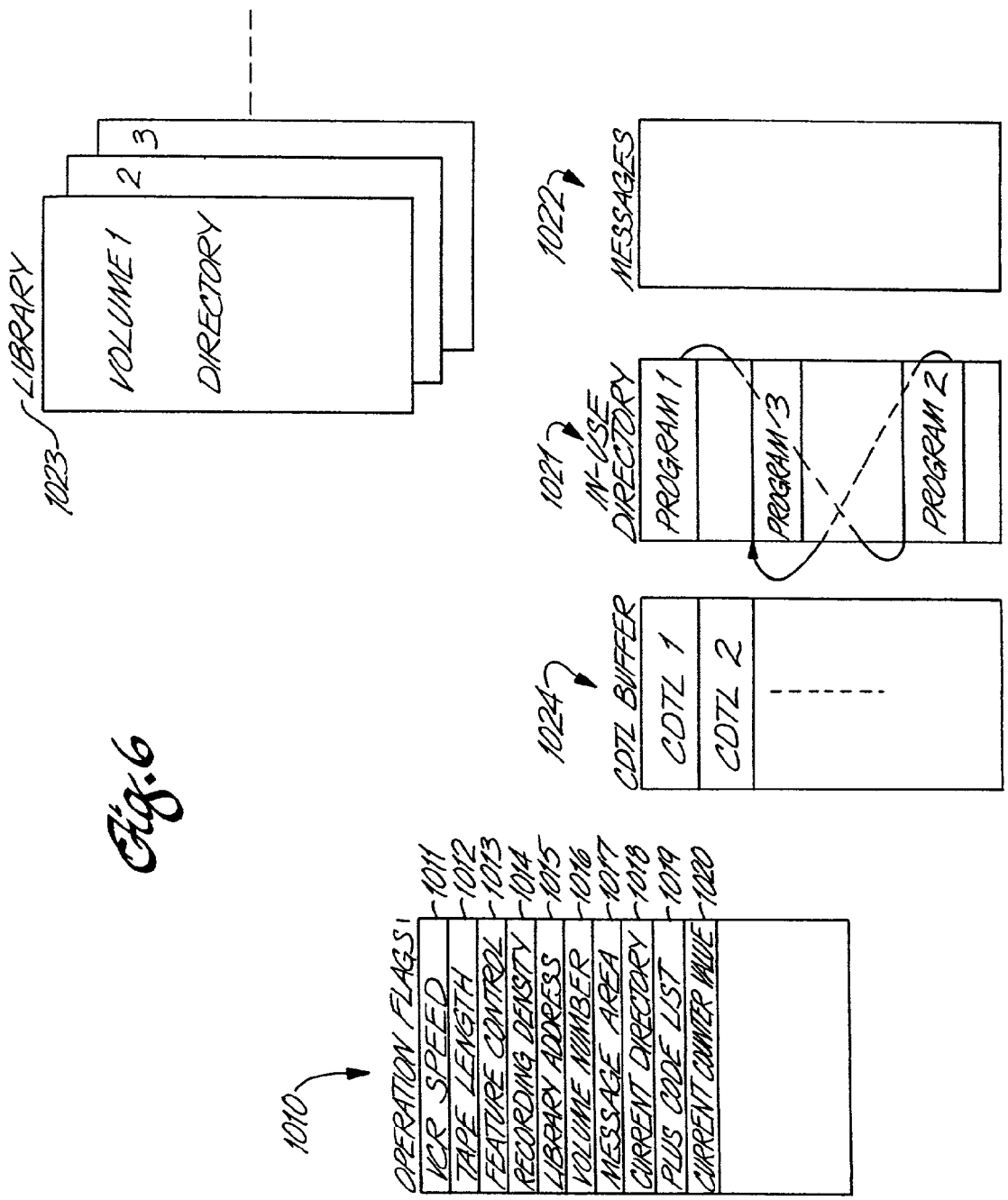
FIG. 6 is a schematic conceptually illustrating a structure of data stored in the RAM of the directory controller of FIG. 5 according to a specific implementation of the present invention.

Now the memory structure of the RAM 33 is described by referring to FIG. 6 which is a schematic conceptually illustrating a typical structure of the data stored in the RAM 33 according to one embodiment of the present invention. The RAM 33 can be viewed conceptually as having an area 1010 for storing operation flags. These flags include a mode flag (MODEFLAG) 1011 for indicating the operation speed (e.g. SP, LP, or SLP) of the VCR 1 and which will be changed whenever the operation speed of the VCR 1 is changed. A tape length flag (TAPELNG) 1012 indicates the length (e.g. E-60, E-90, E-120) of an inserted tape 42. A second memory flag 1014 (SECMEM) stores access information of a secondary memory which may be provided on the cassette 40 for storing directory information. For example, if the secondary memory is a magnetic strip, SECMEM 1014 may store the recording density of a magnetic strip, or if the secondary memory is a semiconductor memory, SECMEM 1014 may store the access time and capacity thereof.

The flags also include a feature control field (FTCNTL) 1013 for specifying the VCR functions that are available to a user. In the simplest case, if a secondary memory is needed on the cassette for storing directory information, FTCNTL 1013 will be set in one way if an inserted cassette has the secondary memory and in another way if the inserted cassette has no secondary memory. FTCNTL 1013 may also specify other functions, and can be set by reading a code carried at a predetermined area of the cassette (e.g. on a magnetic strip on the cassette housing).

Area 1010 also stores a message pointer 1017 pointing to a message area 1022 which stores input and output messages; and a CDTL pointer 1019 pointing to a CDTL buffer 1024 which stores channel-date-time-length (CDTL) data of future recordings.

In a preferred embodiment, a library 1023 is also provided in the RAM 33. The library 1023 stores directories of tapes which users of the VCR 1 have archived. Each directory stored in the library contains substantially the same information as the in-use directory. If a library is present, a library pointer 1015 is provided for pointing to the library 1023.

A directory pointer 1018 is also provided for pointing to an in-use directory 1021 which stores the directory of the currently inserted tape. This directory pointer 1018 may actually point to a location in the library wherein the directory of the tape is located.

In addition, the area 1010 also stores a tape or volume number field (VOLNO) 1016 which stores a counter value representing the number of tape directories already stored in the library 1023. Other flags may be added as needed.

Referring to FIG. 7, which is a schematic illustrating a conceptual structure of the in-use directory 1021 in the data structure of FIG. 6, the in-use directory 1021 stores the directory of the cassette tape currently inserted into the VCR 1. For each program recorded on the cassette tape, a corresponding entry 1041 is set up in the in-use directory 1021. For purposes of illustration, FIG. 7 shows the entry 1041 only for program 1. However, each program similarly has an entry 1041. Each entry 1041 stores a title or program name (PROGRAM) 1042; a program address (LOC) 1043 which stores the absolute tape counter value of the beginning of the program; a program length value (LENGTH) 1044 which stores the length of the recorded program, represented as a function of the difference between its address from the address of the next program or record or a measure of time from a fixed reference point, such as the beginning of the tape; an optional program type field (TYPE) 1045 which stores the category of the recorded program; an optional program audience field (AUDIENCE) 1046 which stores the recommended audience of the program; and an optional recording speed (SPEED) 1047 which stores the speed at which the program is recorded.

A current tape location (CURRENT LOC) 1049 is also stored in the directory for indicating the absolute position from the beginning of the tape 42 in the cassette 40 where the valid directory is located, or the value of the tape counter when the tape is ejected. This field is used for setting the tape counter when the tape is reloaded into the VCR 1. The recording on the tape of the absolute tape position is described below.

A field 1051 is a pointer to the address of the first entry of the directory 1021 represented in FIG. 7 by an arrow pointing to the program name (PROGRAM) 1042. Each entry also has a field 1048 storing the address of the next entry in the directory also represented in FIG. 7 by an arrow pointing to program 12. These fields provide a link from one entry to the next entry and are used for facilitating search, deletion, and addition of entries. In the preferred embodiment, the directory information is not stored on tape 42, but is retrieved from the library 1023. In this embodiment, a volume label (VOLNO) 1050 is provided in the in-use directory 1021. This field is used for retrieving the directory information of the tape from a library 1023 stored in the RAM 33.

Each item in the directory can be modified through the use of the buttons on the keyboard 32a and the special button keys 32b, 32c, 32d of the directory controller 32, as will be described below.

Tape Format

Figure 9H:
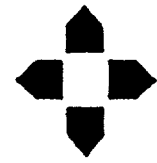
FIG. 9 is a graphical representation of the format of the information recorded on the magnetic tape in the cassette of FIG. 5 with markers in the control track and the directories in the fields of the video frames.
Figure 9M:
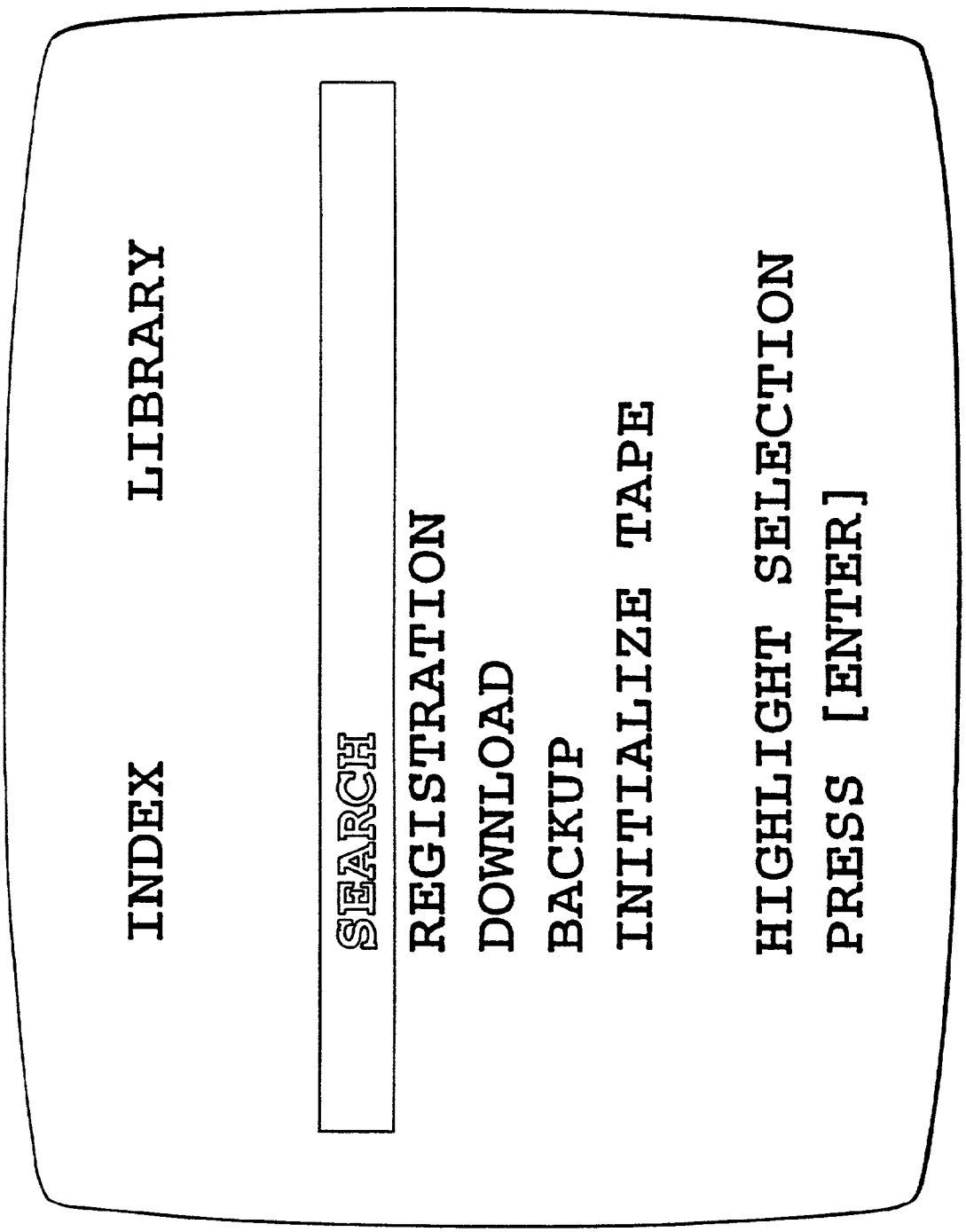
Figure 9C:
Figure 9Z:
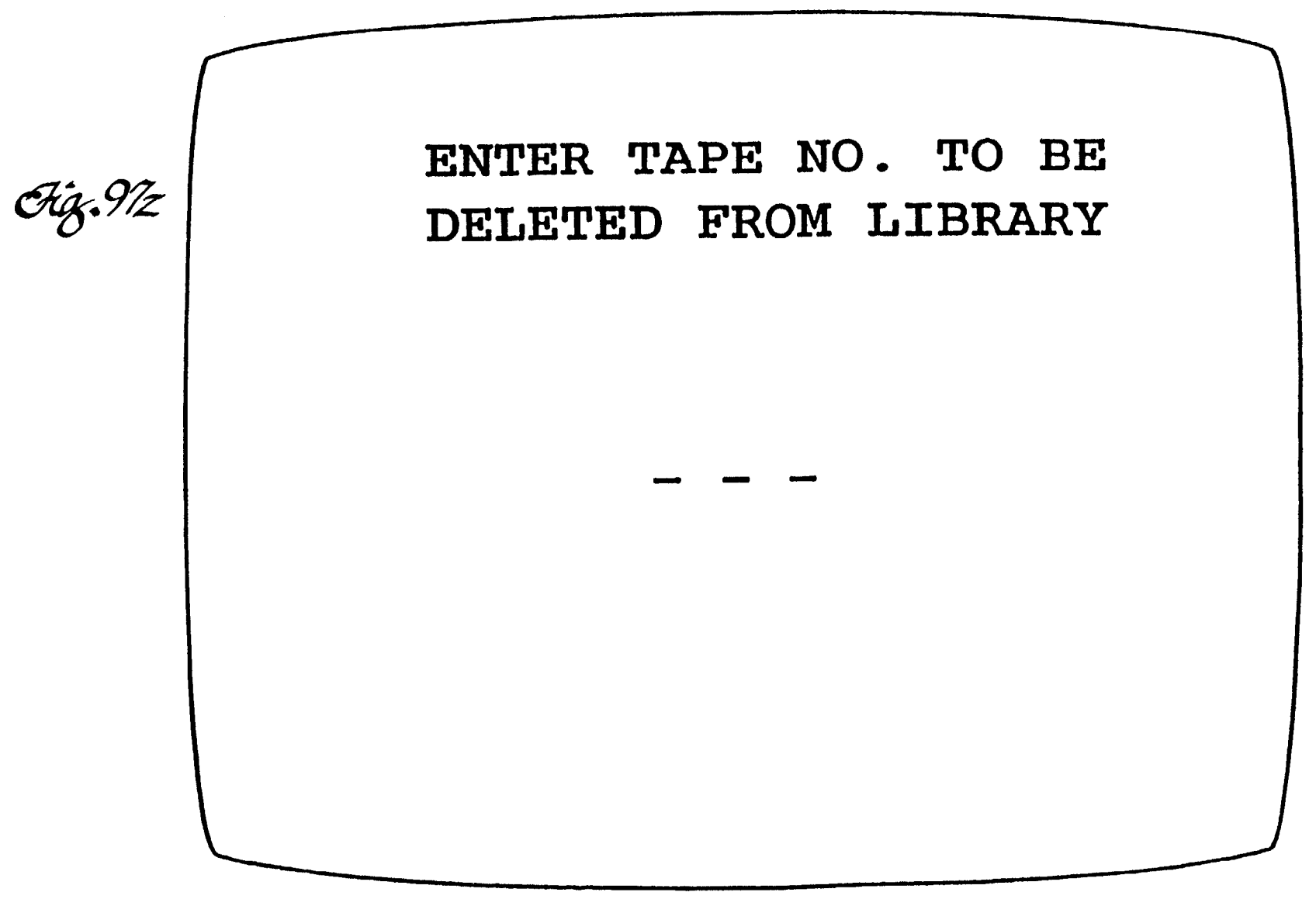

By way of background, the format of the tape 42 is now described. FIGS. 8 and 9 illustrate the information content of one example of video tape for both BETA and VHS format which both use the same general tape layout. The tape 42 is divided into three areas. A narrow strip running along the upper edge of the tape 42 is an audio track 42a which contains audio signals. A second narrow strip running along the bottom edge of the tape is a control track 42c which contains synchronization ("sync") control signals. The middle area 42b is for video signals which are recorded in pairs of parallel fields going up and down the width of the tape at a slight angle. Markers 110, 112, and 114 may be used.

The video head drum 13 is fitted with two read/record heads 180 degrees apart, so that even numbered lines make up one field and odd numbered lines make up the other field. To reduce flicker on the video screen, these fields are projected onto the face of the cathode ray tube (CRT) screen 50a of the video display 50 at alternating intervals.

Decoding VBI Information

Figure 10:
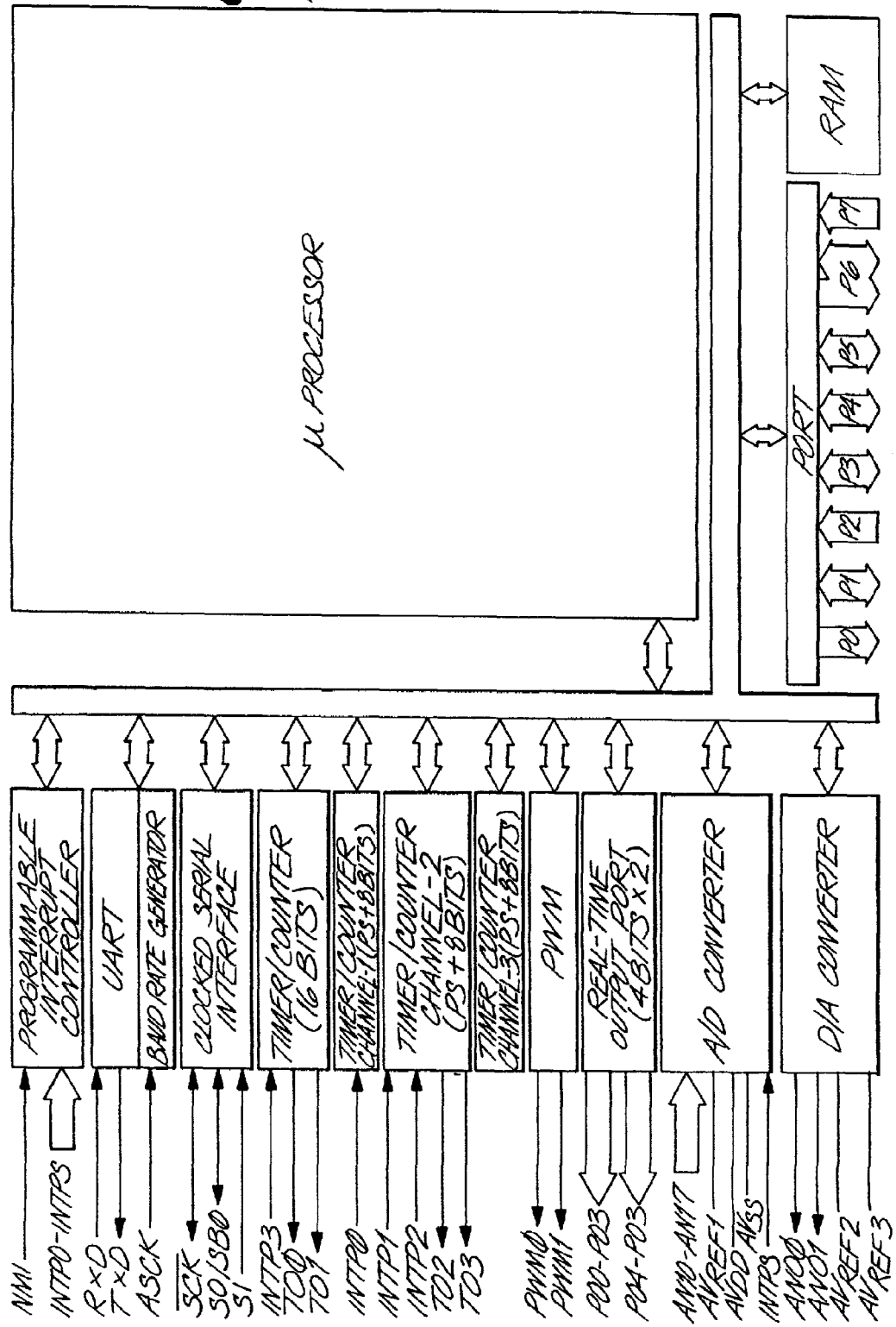
FIG. 10 is a block diagram illustrating the microprocessor controller of FIG. 5 and its interfaces for implementing a specific embodiment of the present invention.

Referring back to FIG. 5, the microprocessor controller 31 controls the sequence and operation of the directory controller 30 and interfaces with the VCR control logic circuit 21 to implement the necessary functional capabilities for reading, updating and recording the directory. The microprocessor controller 31, according to a specific embodiment, is a microcomputer chip with part number of UPD78234 from NEC Corporation, a logical block diagram of which is illustrated in FIG. 10. This microcomputer chip preferably is a microprogrammed processor capable of accessing a data memory of up to one megabyte. A plurality of input/output ports, P0-P7, are provided for coupling to various components of the VCR 1, such as the motor and mechanical control logic circuit 5, the video logic circuit 7, the position logic and counter circuit 9, and the control and audio track head logic circuit 11. Asynchronous communication between the microcomputer chip and these components is achieved by the provision of a plurality of interrupt inputs INPT0-INPT5.

Figure 11:
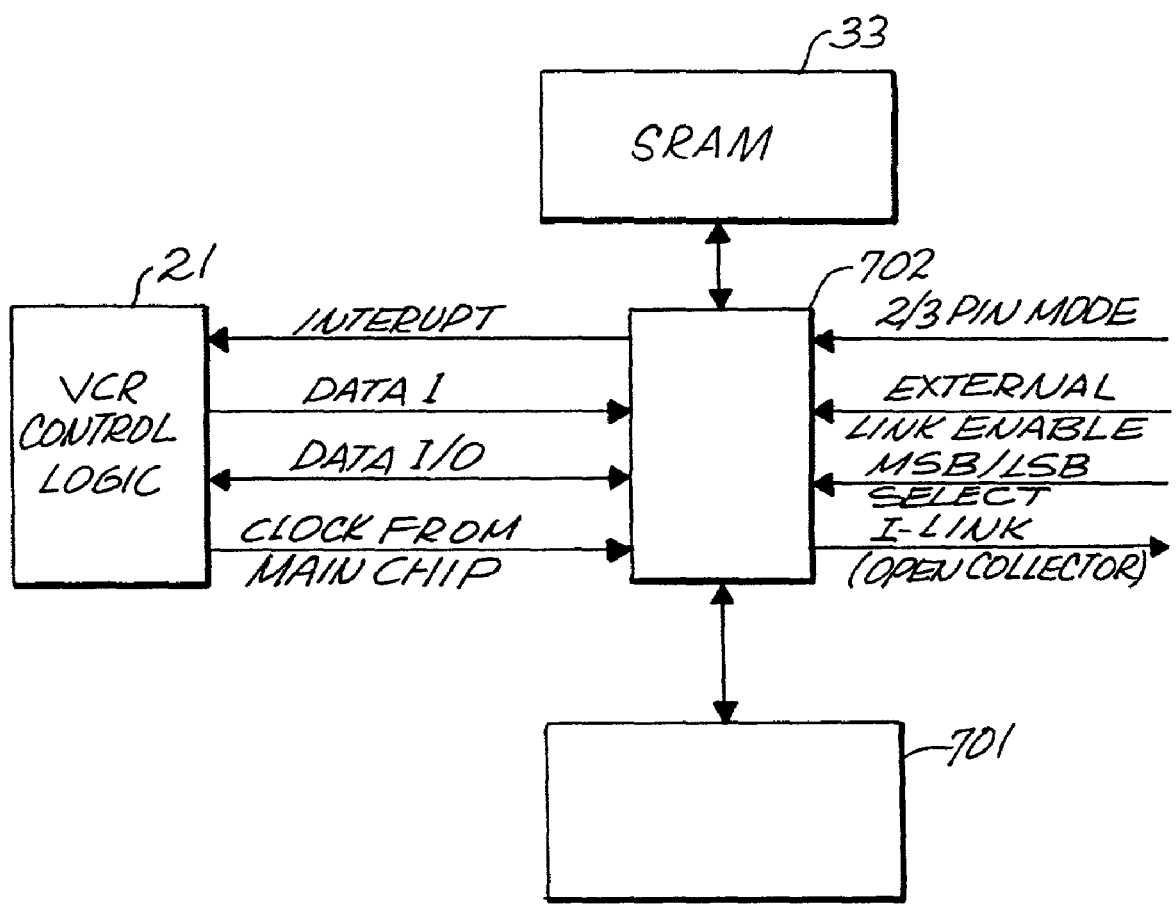
FIG. 11 is a block diagram illustrating the microprocessor controller of FIG. 5 and its interfaces for implementing another specific implementation of the microprocessor controller.

FIG. 11 shows a block diagram of another specific implementation of the microprocessor controller 31. A VBI signal processor 701 performs the vertical and horizontal synchronization separation of the VBI lines. The VBI signal processor 701 also slices and encodes the VBI lines. This controller performs the functions of the VBI encoder 60b, and the buffer 62 (see FIG. 5). A controller 702 controls the RAM 33 and performs error correction and decryption for some type of data coming from the VBI signal processor 701. The controller 702 also provides an interface with the serial link (I-LINK) and an interface with the VCR control logic circuit 21. The controller 702 also controls the RAM 33. The microcontroller processor 31 in the indexing VCR 10 performs all indexing functions and human interface, interprets (e.g. tab, indent, screen format, attributes) and processes the auxiliary information display. The microcontroller also performs all normal indexing VCR 10 functions.

In this embodiment, the interface between the controller 702 and the VCR control logic circuit 21 is a clock serial bus via two or three I/O lines which is hardware selectable by the two/three pin mode input signal to the controller 702. The interrupt signal line allows the VCR control logic circuit 21 to monitor the status of the controller 702 by interrupt. In a two pin configuration, the data I/O signal line functions as a two way signal path between the VCR control logic circuit 21 and the controller 702. In the three pin configuration, the controller 702 provides data on a data output signal line. Also, in the three pin configuration, the VCR control logic circuit 21 sends data on the data "I" line to the controller 702. The external length enable signal enables the controller 702 to communicate with the external RAM 73. The MSB/LSB select signal sets the serial bus to MSB first.

Indexing Overview

The VCR uses the directory described above in FIGS. 6-7 to perform searches of the user's tape library to find the tape that a selected program is on. The directory of a particular tape may be searched using keywords, or title information to locate a program on the tape. The tape may then be advanced to the selected program. Indexing is used herein to describe these searches, the generation of these directories, and all related functions.

The indexing VCR 10 provides a hybrid method for indexing recorded programs, which are recorded on one of three types of tape: home recorded tapes, prerecorded tapes, and retroactively indexed tapes. A home recorded tape (HR tape) is a tape on which the user has made recordings from broadcast or cable by either real time recording, timer programming his VCR, or using a VCR PLUS+™ programming system. As will be described below, the index is created at the time of recording by the VCR. The second type of tape is a prerecorded tape (PR tape) that is a commercially purchased tape, such as a Raquel Welch work-out tape, a karaoke tape, songs, lectures or speeches, that contains many titles on it or may contain only one program. These tapes are not expected to be overwritten. The index is stored on the tape by the video publisher at the time of the recording. The third type of tape is a retroactively indexed tape (RI tape) which is a previously unindexed recorded tape on which the user retroactively adds an index. For this type of tape, the index is added by the VCR at the time of the retroactively indexing. For the HR tapes and the RI tapes which are both produced by the home VCR, the directories all reside in the RAM 33 of the indexing VCR 10.

As will be described in detail below, each tape has tape identification numbers (TID) written at some repetition rate along the whole tape on either a VBI line for HR tapes or on a control track 42c for RI tapes.

If the directory or directories are stored in the video fields, corruption of video signals with directory signals on selected video fields, such as a few odd fields spaced apart by a certain number of fields, has little noticeable visual degradation of the video picture. This is because the human brain retains a visual image for a brief period after the image is removed ("persistence of vision").

The TID's reference the tape to a corresponding directory stored in the RAM 33. When either a HR tape or a RI tape is inserted into the VCR, the VCR locates and reads the tape identification and then retrieves the corresponding directory from the RAM 33. This operation is preferably independent of the point of tape insertion to thereby effectively create a random access capability for selections on the tape. On the other hand, for PR tapes which are produced by the video publisher, the directory is stored on the tape preferably by writing it repeatedly on a VBI line. When the PR tape is inserted into an indexing VCR, the indexing VCR 10 independently of the point of tape insertion can quickly locate and read a copy of the directory from the VBI line. Thus, the PR tape can be read by random access also.

In one embodiment, RI tapes are created by only writing VISS marks on the control track and manually entering the program title information into the memory. Because this embodiment does not add TID information to the tape itself, the user must identify the tape to the indexing VCR. Once the tape is identified, the VCR operates as if the RI tape is an HR tape. Consequently, the tape becomes random access at this time and not when the tape is first inserted.

The VCR 1 includes a VBI encoder 60*b* coupled to the video logic circuit 7 whereby information, which receives digital data, such as tape label (e.g. a volume number), directory, and/or addresses, from the microprocessor controller 31 and encodes such data for recording into the VBI portion of the video signals which are to be recorded on the cassette tape 40. When line 21 field 2 is encountered, the digital data stored in the registers are output so that they can be written on the video track as described above.

VBI encoder 60*b* can be implemented in a similar manner as one of those already existing in the art, e.g. encoders for encoding closed-caption data into the VBI portions of video signals. An exemplary implementation of the VBI encoder 60*b* is also illustrated in the schematic block diagram of FIGS. 12*a* and 12*b*.

Exemplary VBI Encoder

Figure 12A:
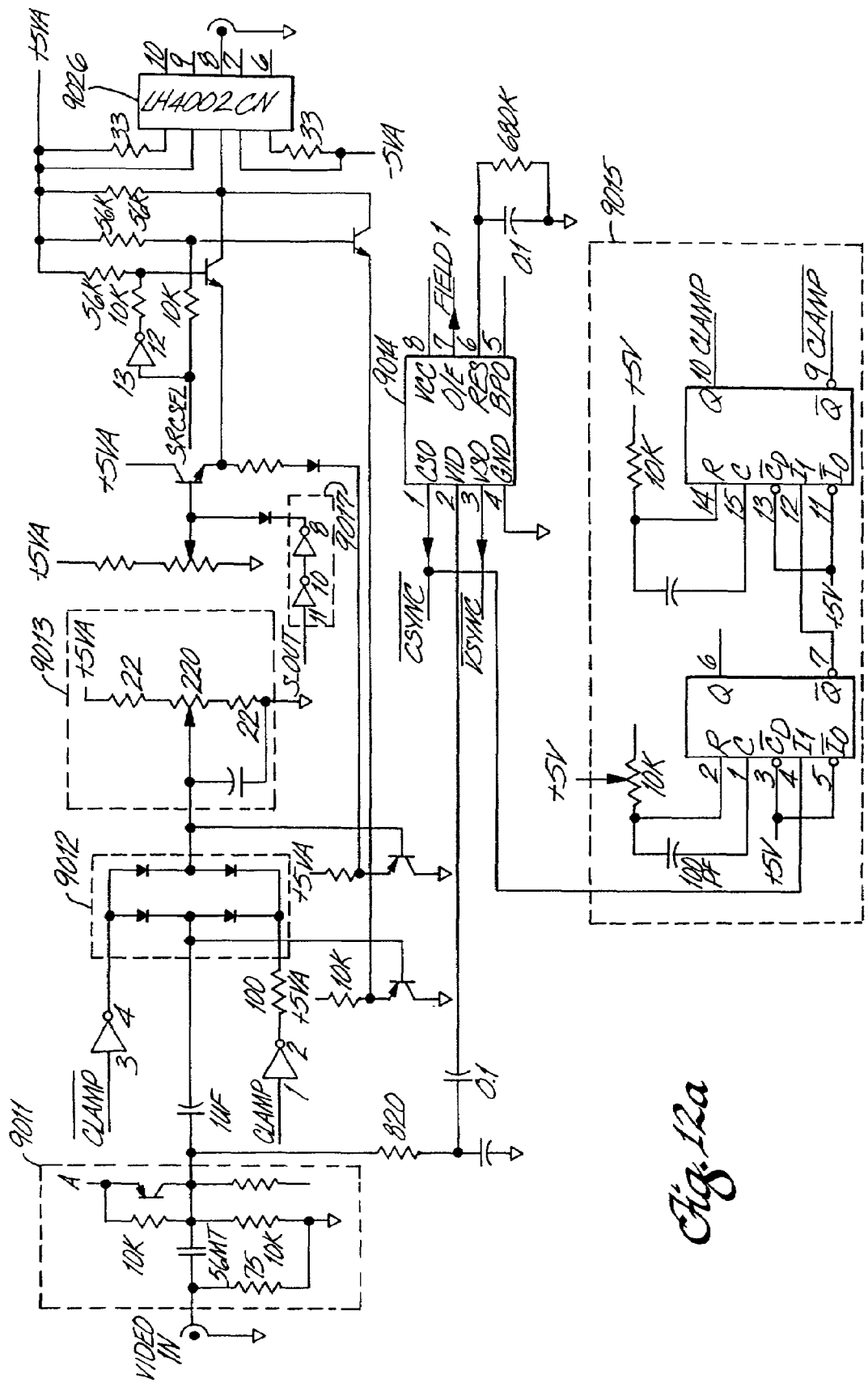
FIGS. 12a-12b are parts of a schematic circuit diagram of a VBI encoder shown in FIG. 5.
Figure 12B:
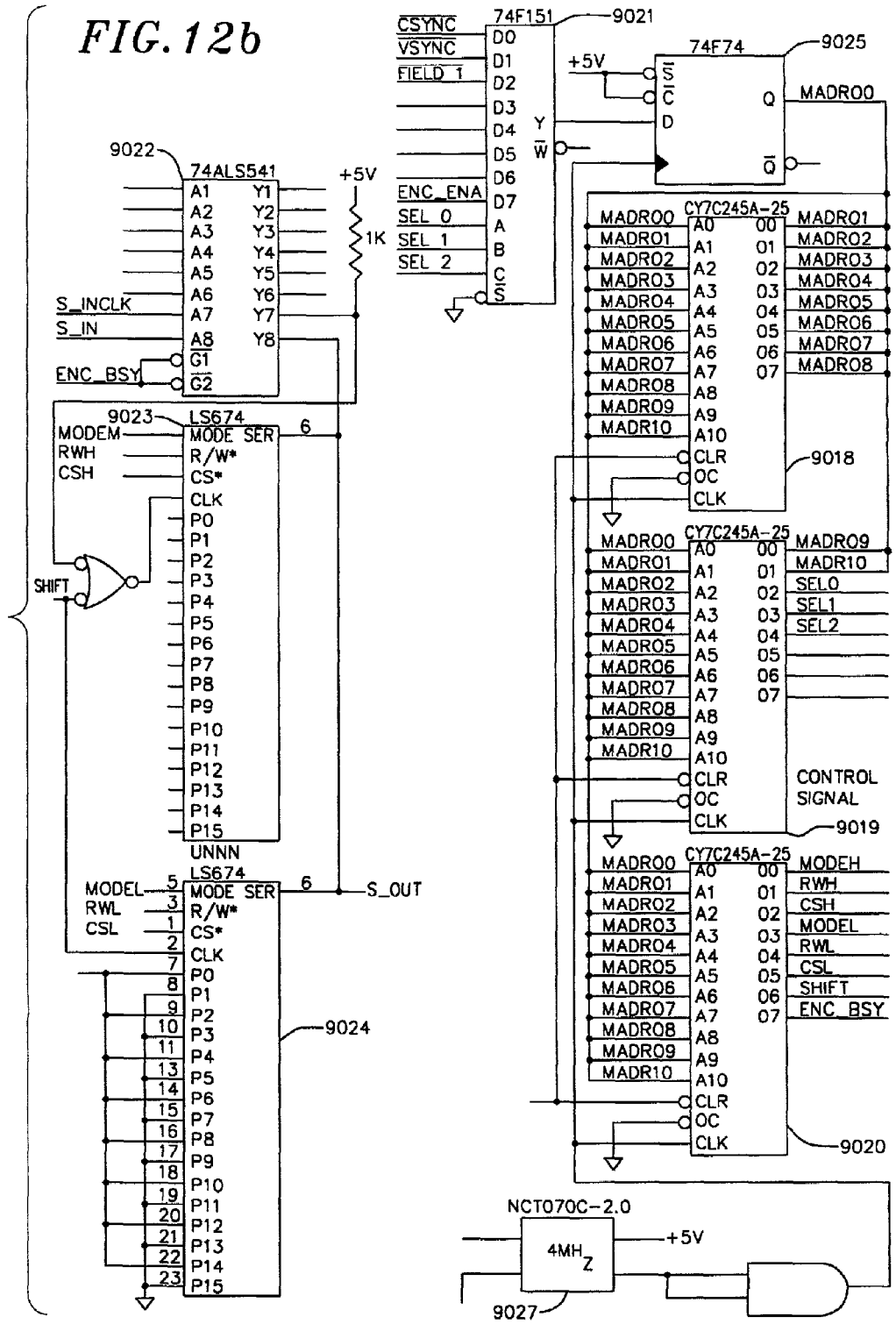

Refer now to FIGS. 12*a* and 12*b*, the VBI encoder 60*b* receives the video signal VIDEO IN from the tuner 61 for recording onto a cassette tape. A buffer 9011 is provided to receive the video signal VIDEO IN so that the tuner 61 is not loaded down by the VBI encoder 60*b*. The output from the buffer 9011 is provided to a clamping circuit 9012 so that the D.C. level can be restored to facilitate inserting of information signals into the video signals. The D.C. level is fixed by a circuit 9013, by setting the variable resistor therein.

The output from the buffer 9011 is also provided to a decoder 9014 which is an integrated circuit, such as part no. LM1881N from National Semiconductor. The integrated circuit decodes the video signal to produce a composite sync $\overline{\text{CSYNC}}$ signal, a vertical sync $\overline{\text{VSYNC}}$ signal, and a field signal FIELD 1.

The composite sync $\overline{\text{CSYNC}}$ signal is provided to a circuit 9015 whereby a monostable one-shot signal with a fixed pulse width is produced. Two output signals are generated from the circuit 9015 and they are used as the input signals, $-\overline{\text{CLAMP}}$ and CLAMP, into the clamping circuit 9012.

Input data (i.e. directory information or address) signal S_IN for encoding into the VBI and a clock by a signal S_INCLK are provided to a register 9023 (see FIG. 12*b*) through a buffer 9022. These signals may be sent by the microprocessor controller 31 from one of its output ports.

A circuit 9024 is another register circuit. Its inputs are alternately connected to high and low voltage levels. This circuit is used for producing the clock run-in signals, as shown in FIG. 3, before data are stored into the VBI.

Data from the register circuits 9023 and 9024 are provided as signals S_OUT into a circuit 9017 (see FIG. 12*a*). The data signals from the circuit 9017 are combined with the D.C. signal outputted from the circuit 9013 (so that they have the same D.C. level as the video signals). When the data signals are to be written onto the tape, the data from the register 9023 (see FIG. 12*b*) will be written first. A signal, SRCSEL, which is generated from the microprocessor controller 31, is used to select whether the signals for recording into the video track through a chip 9026 (see FIG. 12*a*) should come from the data signals (which may contain directory or address information) or the broadcast video signal VIDEO IN.

Referring back to FIG. 12*b*, operation of the encoder is controlled by a sequencer formed by chips 9018, 9019, 9020 and 9021 operating in conjunction with the chip 9025, a 74f74 D flip-flop and a clock signal from the clock circuit 9027.

Figure 12C:
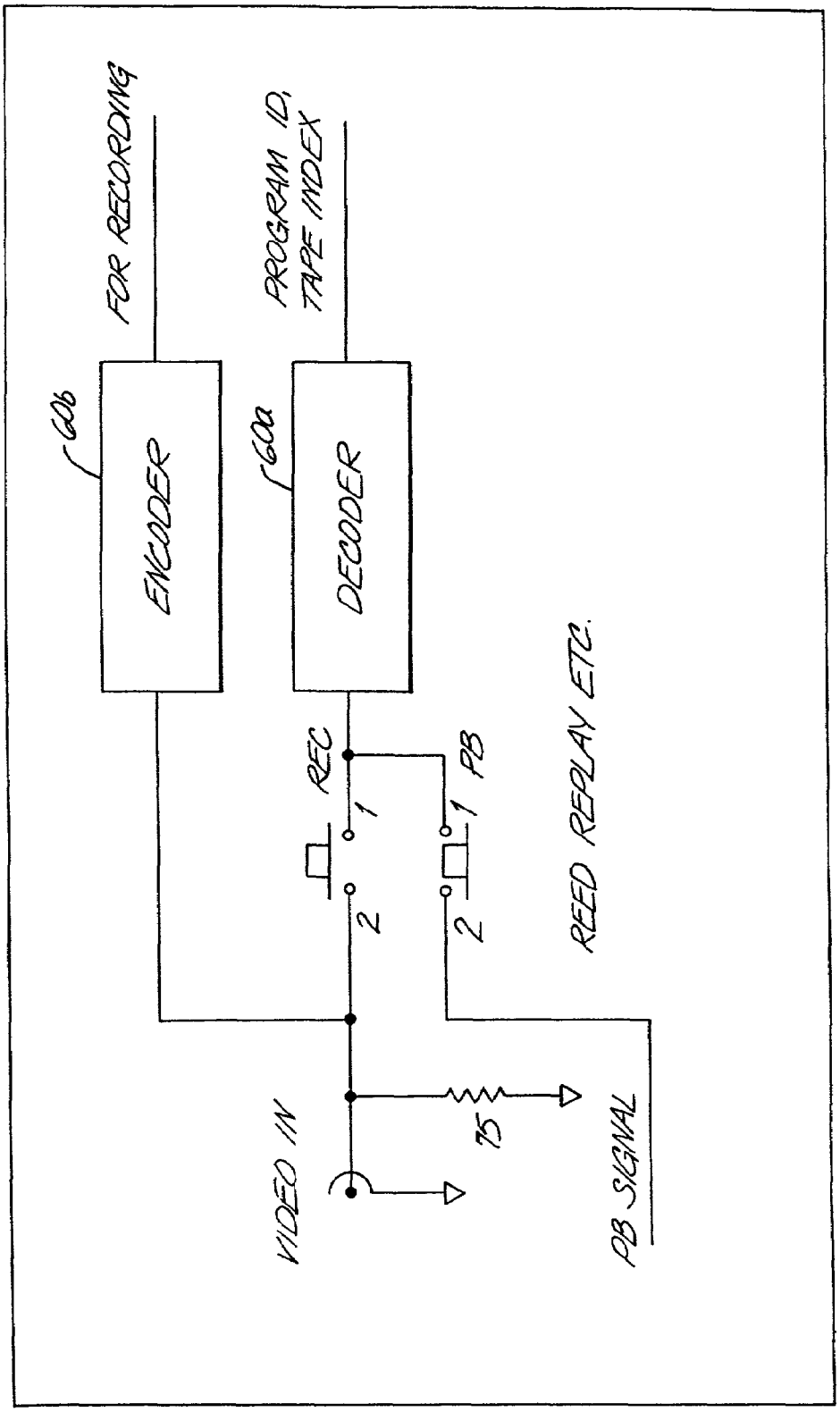
FIG. 12c illustrates a VBI decoder for decoding both broadcast signals and recorded signals.

As illustrated in FIG. 12*c*, the VBI decoder 60*a* can be used at different time durations to decode either the broadcast signals (Video In) from the tuner 61 or the recorded signals (PB Signal) read by the video logic circuit 7 from the tape 42. When the VCR 1 is recording a program, the VBI decoder 60*a* operates to decode information in the VBI of the broadcast signals. When the VCR 1 is playing back a program from the cassette tape 40, the VBI decoder 60*a* can operate to decode information stored in the VBI of the recorded signals (e.g. previously recorded directory information).

It needs to be noted that although the decoder 60*a* in the embodiment is used both for decoding broadcast signals and recorded signals, it will be understood that a separate decoder can be provided for each operation. Moreover, although the decoder 60*a* and the encoder 60*b* are shown and described as two units, they can be incorporated into a single semiconductor chip or implemented by discrete logic components. In the implementation of FIG. 11, the VBI signal processor 701 performs the VBI signal processing.

Prerecorded Tape

As described above, prerecorded tapes (PR tape) are manufactured by a tape publisher and contain a plurality of different titled programs thereon. A program directory or directories containing information about the names and locations of each program or record on the tape is stored on the tape. In one of the specific embodiments, the label (e.g. a volume number or a name) for the tape is also recorded.

Either the video frames 42*b* or the control track 42*c* (see FIGS. 8-9) may be used for storing the program directory(s). In one embodiment, the program directory is stored, by the VCR control logic circuit 21 under control of the microprocessor controller 31, in the control track 42*c* and in another embodiment in odd and/or even numbered fields of spaced apart pairs of video fields, either as full video frame or in the VBI.

Using the Control Track

It is well understood that modern video recorders typically have a capstan for pulling the cassette tape past a rotating video head drum. The control track 42*c* on the tape is normally provided for recording a synchronization pulse for synchronizing the rotation of the capstan with the rotation of the video head drum. The synchronization pulse is conventionally a 30 Hz pulse, with only the leading edge being used for the synchronization. According to the present invention, directory information can be stored on the control track by modifying the control track pulse duty cycle so that the location of the flux reversal on a prerecorded video tape is modified so that these relative locations represent digital data.

Figure 13F:
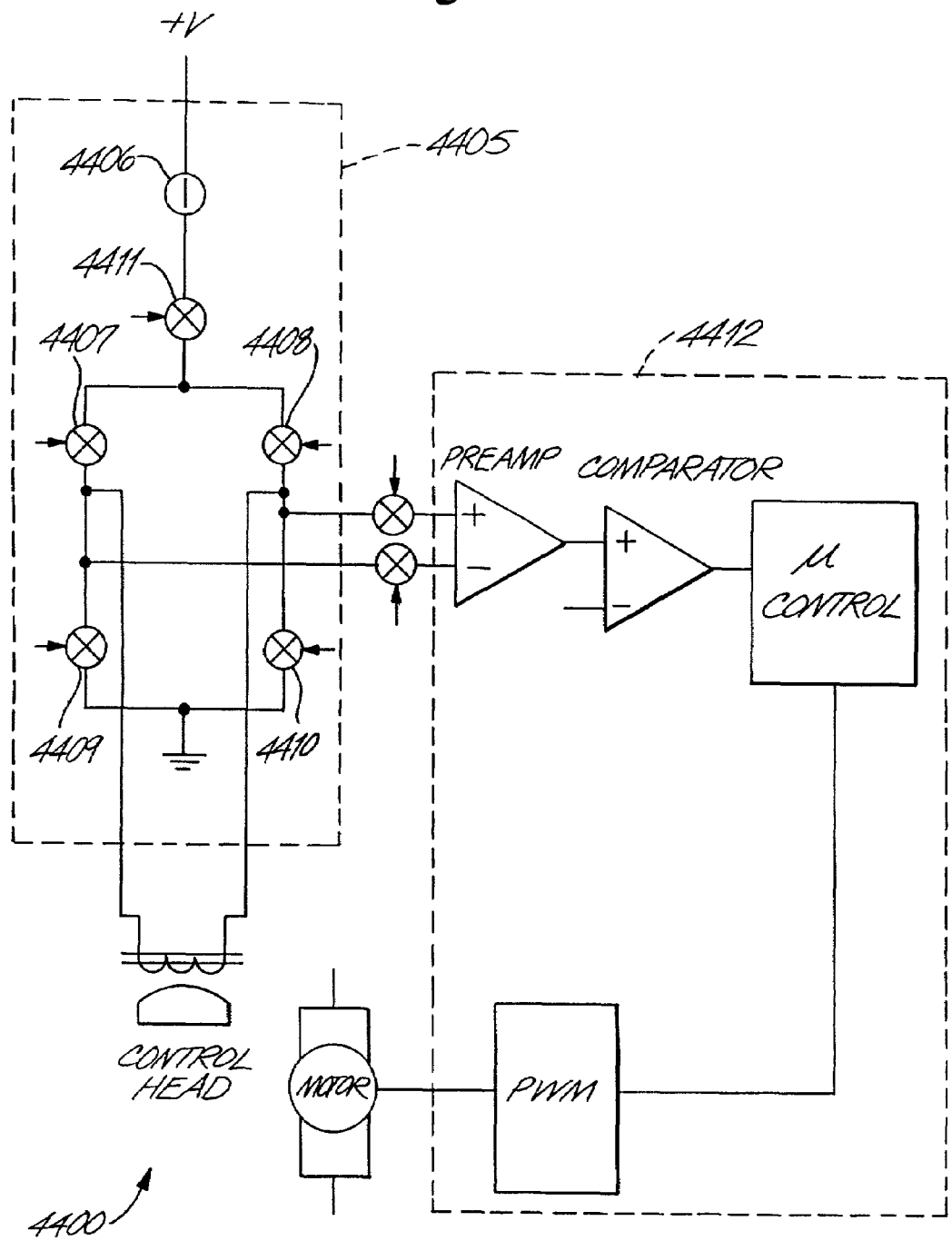
FIG. 13f is a block diagram of a circuit 4400 for controlling the reading and writing of encoded data signals on the control track.
Figure 13G:
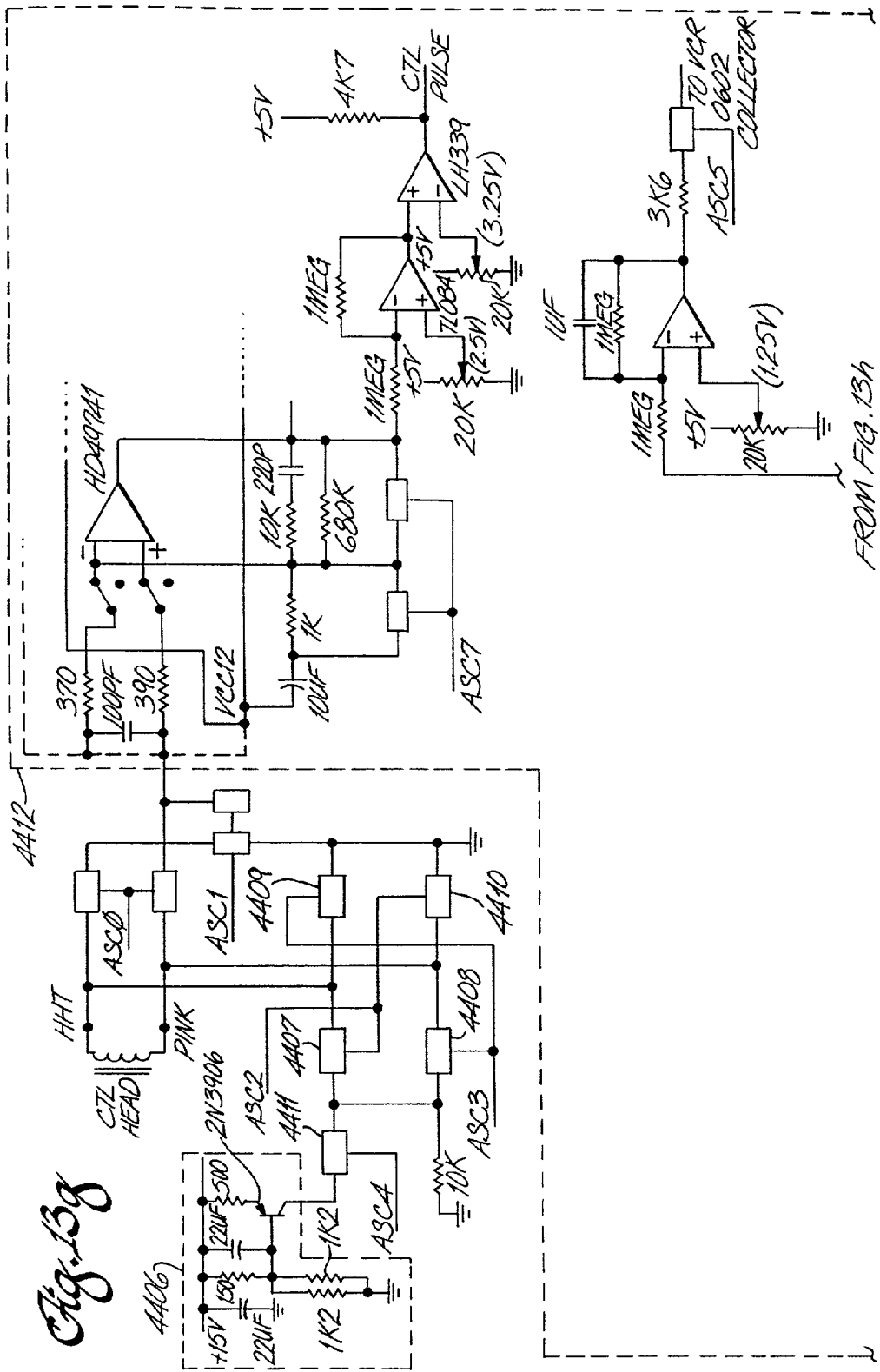

FIG. 13*a* is a timing diagram showing the synchronization pulse recorded on the control track. FIG. 13*d* is a timing diagram showing the head signals generated by the control pulse edge detector shown in FIG. 13*f*. FIG. 13*0e* is a timing diagram showing the head signals generated by the control pulse edge detector shown in FIG. 13f in response to the current flow shown in FIG. 13c. The negative going head signal shown in FIG. 13d corresponds to the leading edge of the control pulse shown in FIG. 13a which will not be modified during the encoding of data. In a standard video recorder, when no data is recorded, the falling edge of each pulse occurs at substantially the mid-point 4401 of a pulse interval. According to one implementation of the present invention, to encode one of the binary values (e.g. "0"), the falling edge is shifted forward (the corresponding positive going head signal shown in FIG. 13d is also shifted), e.g. to a time 44 or at about 37% of the pulse width 4402 from the rising edge. To encode another one of the binary values (e.g. "1"), the falling edge is shifted backward, e.g. to a time 4403 at about 63% of the pulse width from the rising edge. Alternatively, the time of the pulse width may be other values, e.g., a "0" may be 30% and a "1" may be 70%. The position of the positive going head signal is shown in its modified location by the circuit 4400 to be described in connection with FIGS. 13f and 13g depending on the data that the signal represents.

Because the leading edge of the pulse in FIG. 13a or the corresponding negative going pulse in FIG. 13d is not rewritten, the timing between negative going pulses is uniformly spaced at the control track 30 Hz frequency. However, in areas where two separate recordings adjoin, this uniform timing may not be met and the written data may be in error. Thus, it may be necessary to use preambles and post-ambles to identify encoded data and either error detection codes such as cyclic redundancy codes or checksums to ensure data integrity. FIG. 13b is a timing diagram showing the synchronization pulses recorded on the control track when a binary bit "0" is to be written at one time instant (one frame) and a binary bit "1" is written at another time instant (another frame).

Normally, the synchronization pulses on a control track are recorded by saturated magnetization. To alter the timing of a falling edge, appropriate current must be applied to shift the magnetization at the altered portion of the track. To advance the falling edge, as when a "0" is to be written, a first current (e.g. negative) must be applied so as to cause the magnetization between time 4402 and time 4403 to be in one direction. To delay the falling edge, as when a "1" is to be written, a second current opposite in polarity to the first current (e.g. positive), must be applied so as to cause the magnetization between time 4402 and time 4403 to be in another direction.

FIG. 13f is a block diagram of a circuit 4400 for controlling the reading and writing of encoded data signals on the control track. FIG. 13g is a detailed schematic of the circuit 4400. The circuit 4400 comprises a current steering network 4405 which comprises a plurality of analog current switches controlled by a microprocessor 4413 (for clarity, control signals are not shown in FIG. 13f). The microprocessor 4413 is preferably a NEC 18238 microprocessor. By activating the appropriate switches, current may be driven through a control head in a desired direction and at a predetermined timing relation to the leading edge of the control pulse.

The current steering network 4405 has a current source 4406 which provides a constant current through a control switch 4411 into two current paths, a first path formed by current switches 4408 and 4410, and a second path formed by current switches 4407 and 4409. The control inputs of current switches 4408 and 4409 are coupled to a common control signal (ASC3). The control inputs of current switches 4407 and 4410 are coupled to another common control signal (ASC4). To write a "0" to the control track, current switches 4408 and 4409 are closed and current switches 4407 and 4410 are opened during the time duration between 4402 and 4403. As a result, a current passes from the current source 4406 through the current switch 4408 into the lower terminal of the control head, exits from the upper terminal of the control head and passes through the current switch 4409 to ground. To write a "1" to the control track, current switches 4407 and 4410 are closed and current switches 4408 and 4409 are opened during the time duration between 4402 and 4403. As a result, a current passes from the current source 4406 through the current switch 4407 to the upper terminal of the control head, exits from the lower terminal of the control head and passes through the current switch 4410 to ground.

By selectively controlling the closing and opening of the two pairs of current switches, current of opposite polarity can be caused to flow through the coil of the control head, as illustrated in FIG. 13c. The current changes the direction of magnetization of the control track, advancing the flux change in one instance and delaying the flux change in another instance, thereby recording encoded data onto the track. As described, information is encoded on the control track at one bit per frame as illustrated in FIG. 13e. In other embodiments, different duty cycles may be used to encode different values; for example, if 32 different duty cycle values are used, then 5 bits of information can be encoded into one frame.

Data written on the control track 42c are read by the control pulse edge detector circuit which comprises generally a preamplifier for amplifying the control pulse read from the tape and a comparator for generating a pulse corresponding to the logic level recorded on the tape 42. The edge of this logic pulse corresponds to the flux transitions on the tape.

The pulses on the control track 42c are used for controlling the motor speed controller. By monitoring the period of the control pulse using the microprocessor 4413 the tape speed is known. The microprocessor 4413 can then control the motor speed control circuit to keep the tape speed within a reasonable range during the time when control pulses are rewritten. To prevent sudden flux changes from adversely affecting the play/record servo amplifier, a pair of isolation switches are provided to isolate it from the rest of the circuit.

Figure 13I:
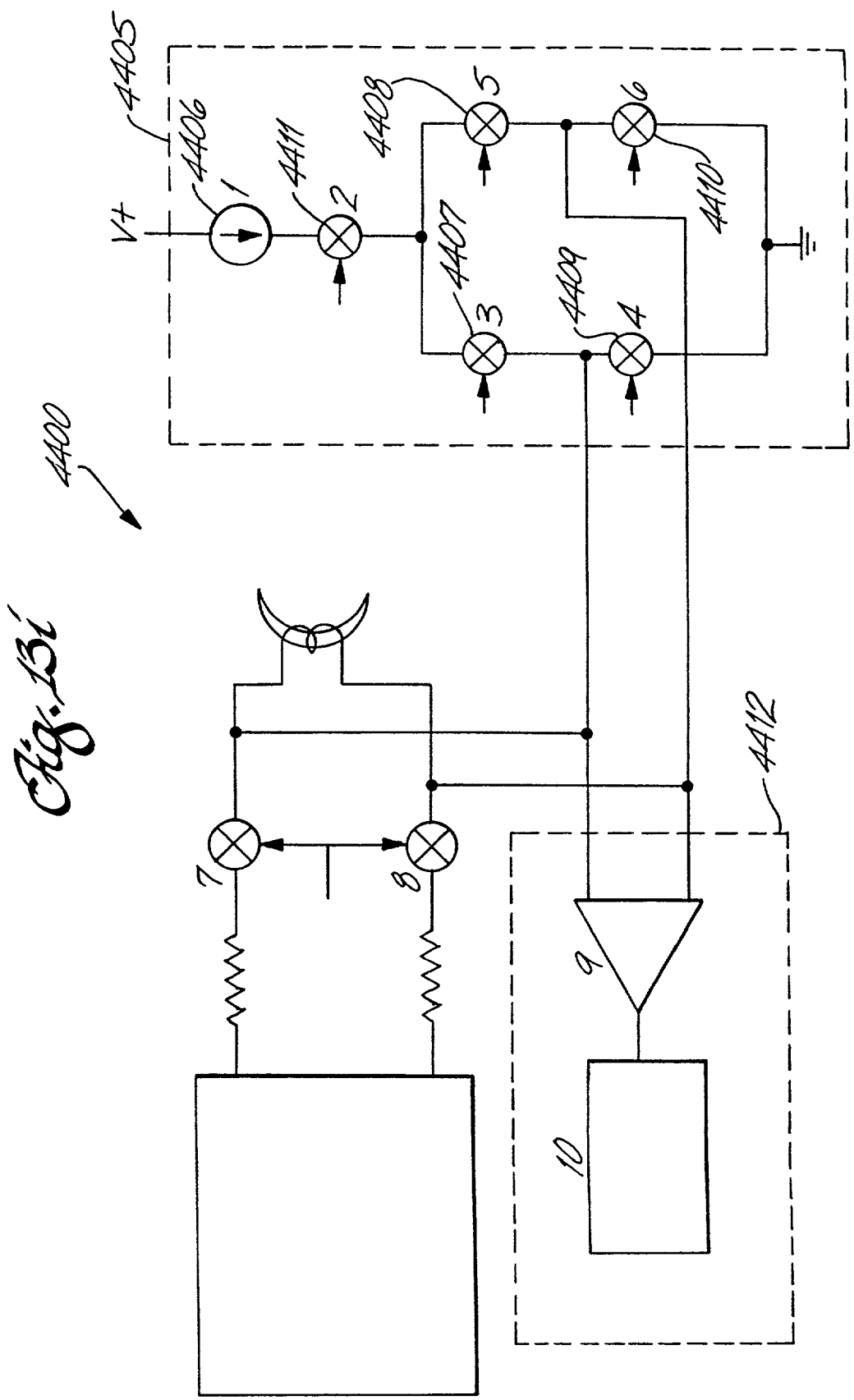
FIG. 13i is a block diagram for an alternate embodiment of the circuit for encoding and decoding data on the control track shown in FIG. 13f.

FIG. 13i is a block diagram for an alternate embodiment of the circuit for encoding and decoding data on the control track shown in FIG. 13f. This circuit operates in a manner similar to that of FIG. 13f.

Writing on Control Track

In order to avoid the disastrous result of leaving the current switches on while the tape is free running, a software write protect check is implemented. Writing is permitted only when a shorting bar is inserted between pins 32 and 33 of the microprocessor 4413.

The control pulse is fed to a pin 24 of the microprocessor 4413, and an interrupt INTP3 is conditioned to respond to the positive going edge of the signal. This triggers a capture register TMO internal to the microprocessor 4413. The first pass through of the routine is to note down the reading of the capture register. The second interrupt cycle, and all the subsequent ones, read the capture register and establish the length of the previous cycle by subtracting the last register content from the current register content. This value is used as the current cycle length, assuming that the speed can not vary so rapidly. By shifting this value 2 places to the right, the value is divided by 4. Since a 25 percent value is to be the threshold value in a timer TM1 internal to the microprocessor 4413, and the timer TM1 is fed by a ¹⁄₆₄ clock (CLK) instead of a ⅛ CLK as the capture register TMO, a further shift of 3 more places is done. This shifted value is then stored in a register _T25 in the microprocessor 4413. A further right shift of 1 place provides the 12.5 percent value (⅛ clock), which is then stored in a register _T12 in the microprocessor 4413. The values in the registers _T12 and _T25 are added together to generate a 37.5 percent value, which is stored in a register _T37 in the microprocessor 4413.

In between the interrupt-responses and the above calculation are the turning off of the gain clamp switches and the turning off of the VCR amplifier switches. The microprocessor 4413 then looks the polarity of the data that is to be written. If it is a zero, the microprocessor 4413 then subtracts the value in the register T1 from the value in the register _T37, and loads the result into the compare register of timer TM1. The value in the register T1 is a constant representing the dead time used in performing the above calculations and the overhead of the interrupt. The microprocessor 4413 then waits for the timer TM1 to expire, and commands, using a signal ASC3, the current switches 4408 and 4409 to open and using current from the current source 4406, creates a flux reversal on the tape at this point. At the same time, the microprocessor 4413 reloads the timer TM1 with the value in the register _T37 after subtracting another empirical time constant T2 from it. When the timer TM1 expires, it then turns off the current, allowing the head inductance current to recover through a 10K resistor to ground. After a time of about 600 microseconds, the microprocessor 4413 turns off the steering switch 4405, turns on the VCR preamp switch, releases the gain clamp, clears the interrupt status of INTP3 caused by the switching currents, restores the registers, and exits the interrupt routine.

If the data to be written is a one, the process is similar except that instead of using the register _T37 to start the current, a register _T25 is used. Instead of providing the signal ASC3, a signal ASC2 is provided. The microprocessor 4413 uses the same register _T37 for the duration of the current. But because it starts the current earlier, it also finishes earlier. Therefore, a value _T12 is added to the end of the cycle after the current steering switches are off before turning the VCR preamp back on.

In one specific embodiment where directory information is stored on the control track, the tape contains only one single valid directory and a plurality of obsolete directories corresponding to the number of times the tape has been played and ejected from the VCR 1. The valid directory is distinguished from the obsolete directories by a marker system to be described later.

In another embodiment, each time the directory is read into the local RAM memory, the directory is erased from the tape. During the process of tape ejection from the VCR 1, the updated directory is rewritten onto the tape at the place of ejection such that only one directory is maintained on the tape. The disadvantage of this embodiment is the added hardware and time required to selectively erase the directory without disrupting the control or video signals.

Remote Controller

The microprocessor controller 31 receives user selected commands from a remote controller unit 75 (also referred to as "remote control"), which is coupled by wireless means known in the art, such as infrared, ultrasonic, or radio frequency, to a wide angle remote signal detector 29 which can detect the infrared signals from the remote control which may be anywhere in the room in which the video system 10 is located. The remote signal detector 29 converts the user selected commands into electrical control signals by means well known to those skilled in the art and provides such signals to the microprocessor controller 31.

The remote control 75 preferably includes the control functions for controlling the operation of the tuner 61, the VCR 1, and the program guide functions of the microprocessor 31 as will be described below. Alternatively, the remote control 75 may be a universal remote controller for controlling a plurality of other electronic devices (not shown), such as radio receivers, compact disk players, and the like.

Figure 14:
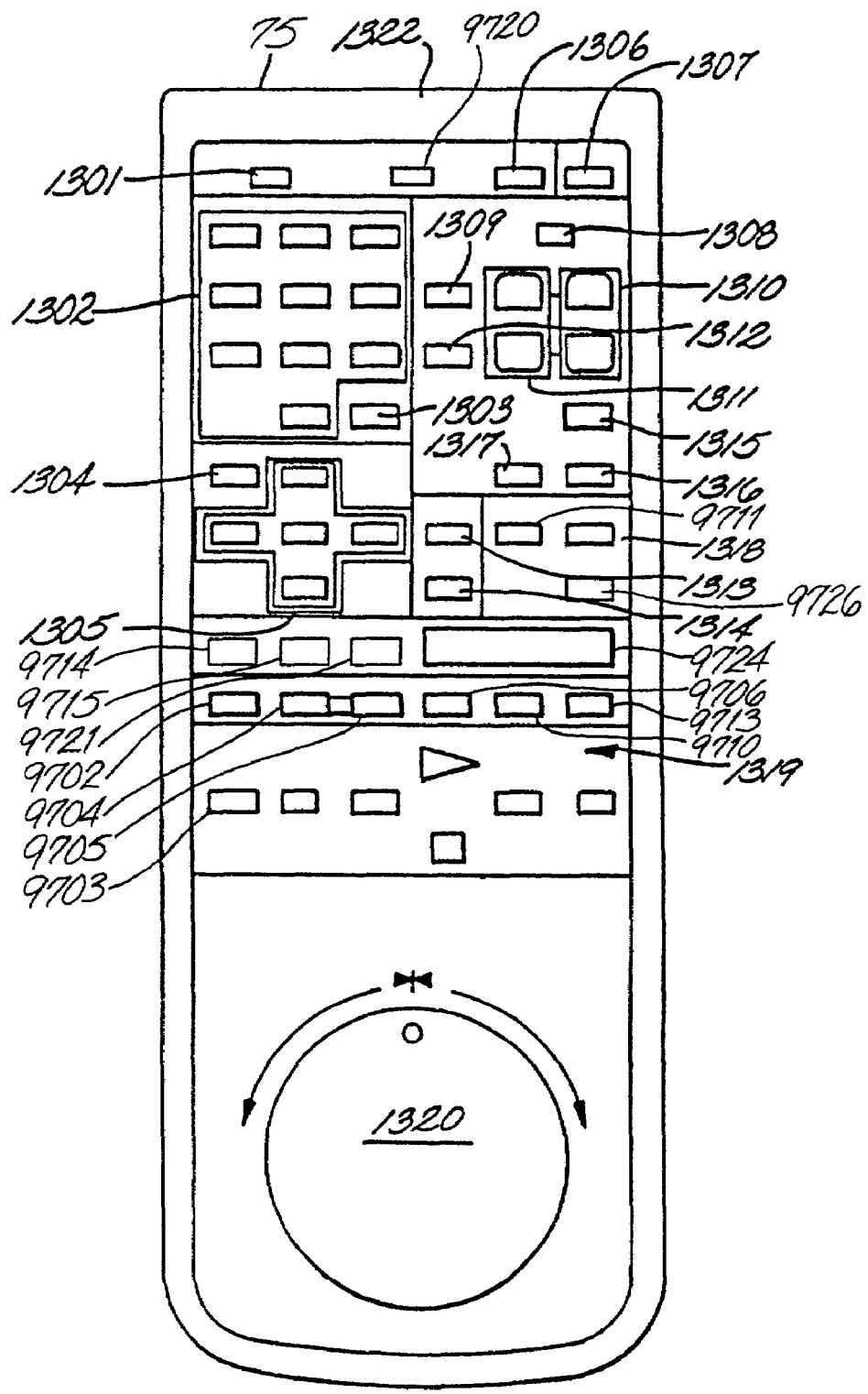
FIG. 14 illustrates an embodiment of a remote control unit for operating the indexing VCR of FIG. 5.

FIG. 14 illustrates an embodiment of a remote control unit 75. The unit 75 comprises a hand-held housing 1322 provided with a plurality of push buttons 1301-1319. A remote jog shuttle knob 1320 is provided for hand-held operation of the jog shuttle feature of the VCR. A command mode selector switch 1301 enables activating the control unit. A plurality of number keypad buttons 1302 enable remote entry of numbers for commands and selections, such as channel numbers. An ENTER button 1303 is used to enter channel numbers and menu options in the methods discussed below. A menu button 1304 is used to display a menu of user options, as discussed below. A plurality of cursor movement buttons 1305, each marked with an arrow, is used to move an on-screen cursor in various menu operations. An antenna TV/VTR button 1306 is used to command the video display 50 to display a signal coming either from an antenna or the output of the VCR 1. A power switch 1307 enables turning power to the VCR 1 on and off. A TV/VTR switch 1308 enables selectively using the remote control unit to control the VCR 1 or the video display 50. An input select button 1309 enables selection of the source to be recorded. Channel change buttons 1310 enable toggling the channel selection up and down. Similarly, volume buttons 1311 enable toggling the volume louder or softer. A record mode button 1312 enables selection of recording tape speed. A timer clear button 1313 is used to clear timer settings of the VCR. A timer record button 1314 is used to enter a timer recording mode. An index button 1315 is used to enter an index mode. Other buttons 1316-1319 can be used to control various functions on the VCR, including the direction, speed, and mode of the tape transport. These buttons include rewind, play, stop, fast forward, record, single frame advance, and slow motion whose functions and implementation are well known in the art.

A print button 9702 allows the user to print on hard copy or to disk the directory or other information in the RAM 33. An eject button 9703 is used to eject the cassette 40 from the VCR. A page up button 9704 and a page down-button 9705 are used to move up or down pages on the screen. A cancel button 9706 is used to cancel selections made. A library button 9710 is used to retrieve directories. A VCR Plus+™ button 9711 is used to enter "PLUSCODE™" numbers for timer programming.

An edit button 9713 is used to edit selections on the screen. A review button 9714 is used to review stored selections. An erase button 9715 is used to erase selections. An info ("i") button 9721 is used to request or store auxiliary information as described below such as to store "PLUSCODE™" numbers or channel-date-time-length data associated with a separate broadcast that provides additional information related to the program or commercial being viewed. A program identification (PGM ID) button 9724 is used to display the program title and other information of the program being viewed either direct from cable or airwaves or from tape. A title button 9726 is used to retrieve program information (such as program title, network affiliation, and related information) and the channel specific program guide.

Alternatively, the VCR 1 or the display controller 30 may include these buttons.

Various methods of combining steps of key strokes may be used. Pressing the index button 1315 once causes the microprocessor controller 31 to recall the tape directory and display it onto the screen. Pressing the index button 1315 again causes the microprocessor controller 31 to remove the directory and display the video signal.

Pressing the title button 9726 once causes the microprocessor controller 31 to display for a predetermined time before removing program related information (such as program name, network affiliation and the like). Pressing the title button 9726 either shortly after an earlier pressing or while the program related information is displayed causes the microprocessor controller 31 to remove the guide and display the video signal.

During broadcast, pressing the "i" button 9731 once causes the microprocessor controller 31 to display a PRI server which will be described below.

As another example, pressing the "i" button twice in rapid succession may be used to review information stored. Pressing the "i" button three times in rapid succession may be used to cancel a selection.

Although the embodiment of the indexing VCR 10 is described in terms of the components thereof as being included in the indexing VCR, the invention is not so limited. Various components of the indexing VCR may be integral to the VCR, a television, a cable box, separate therefrom or any combination.

While the invention has been described and preferred embodiments disclosed, it is anticipated that other modifications and adaptations will occur to those skilled in the art. It is intended therefore, that the invention be limited only by the claims appended hereto.

A "V" button 9720 allows the user to store or retrieve auxiliary information associated with a program being viewed and that is transmitted concurrently with the program. A "R" button 9722 is used to review stored selections using the "i" button 9721. Alternatively, the "v", "i", and "r" buttons may be used to dial a telephone number transmitted as part of the auxiliary information as described above.

Directory

For HR and RI tapes, the directories are stored in the RAM 33 and referenced either by the TIDs which are written repeatedly on line 19 of the VBI for HR tapes or by a tape number inputted by the user, which the indexing VCR 10 uses to cross reference to a TID for RI tapes. PR tapes also have a TID written on the VBI throughout the tape. In some embodiments, a TP packet (defined below in conjunction with FIG. 29) is written on HR and PR tapes. The TP packet includes a TID and a program number. The program number is a unique number assigned to each program on the tape. The program number may be used for confirmation of the search. In another embodiment, a TPA is written. This packet includes a TID, a program number, and an absolute address. For PR tapes, the directory is written repeatedly, preferably as often as space allows, on line 20 of both fields of the VBI. Alternatively, the directory is written repeatedly on a line pointed to by a pointer in line 21, field 2. As a default, if the indexing VCR 10 cannot find a pointer in line 21, it looks for the directory in line 20. The recording format is per the EIA-608 standard on Extended Data Services. The directory is stored as D(N) data packets, defined below in conjunction with FIG. 27, which contains all the information that relates to a program entry in the directory. Alternatively, the D(N) packet may be written in two or more lines to speed up the read process. Also, the D(N) packet may be written at a faster rate, such as two to four times faster, than the EIA-608 standard. The D(N) data packet contains a program entry where N ranges from 1 to the maximum program numbers in the directory. For PR tapes, the TID and the program number (and absolute address in some embodiments) are repeatedly written on both fields of line 19 of the VBI. Alternatively, the DN packet, which is defined below in conjunction with FIG. 32, may be used.

For RI tapes, the RAM 33 is capable of storing the program number and up to 32 characters per title.

When a PR tape is inserted into an indexing VCR 10, the indexing VCR 10 reads the VBI line 19 to quickly determine the TID and program number (and, in some embodiments, an absolute address) and then stops. When the user presses the Index button, the indexing VCR 10 determines from the TID that the tape is not a HR tape. The indexing VCR 10 then goes into PLAY mode and reads the directory from VBI line 20 and displays it on-screen.

Addressing System

FIG. 15 is a schematic view of an embodiment for storing tape identification numbers and addresses using a file mark plus asynchronous sprinkling address system. In the preferred embodiment, the address system is a file mark plus asynchronous sprinkling (FMAS) address system. This system writes an absolute address on the control track 42c (see FIGS. 8-9) in the form of address packets. Since control track data is not readily copied from one VCR to another, some copy protection is provided. These packets are written in two types of locations. The first type (type 1) is written at the beginning of each program and at the end of the last program on the tape. The main function of these packets is to serve as "file marks" for search of starting points of programs. The second type of packet (type 2) is asynchronously recorded as often as possible in between the type 1 packets. The main function of these packets is to serve as "road marks" so that on insertion of the cassette 40 into the VCR 1, the current tape location can be quickly determined.

As an overview, when an indexed tape is inserted into the VCR 1, the VCR quickly determines from surrounding type 2 address packets the exact current tape location. To search for the starting point of some other program, the VCR 1 either fast forwards or rewinds and monitors the control track of the correct destination address packet. Once this packet is located, the VCR 1 stops and goes back at play speed to land exactly at the destination address packet. With the FMAS system, the determination of the current location is faster because of the asynchronous sprinkling of addresses. The search for the starting point of a program is accomplished since the VCR 1 monitors the control track 42c while fast forwarding or rewinding and is also accurate since the destination address packet is written exactly at the start of the program like a file mark.

In the FMAS address system, the absolute address is written on the control track 42c of the tape 42 in the form of address packets using the data encoding and decoding described above in connection with FIGS. 13a-13i. The absolute address is a measure of the distance from the beginning of the tape. This distance is preferably determined by counting control track pulses. For example, an address at a point of the tape may be the number of seconds in the SLP mode from the beginning of the tape to that point. Thus, an E-120 tape has an address range from 0 to 21600 (120 minutes×60 seconds). An address of 1140, for example, defines a point whose distance from the beginning of the tape can be covered in 1,140 seconds in SLP mode. If the VCR mode is recording or replaying in SP mode from the beginning, then after 380 seconds (1140 seconds÷3), the address is also 1140. If there is a blank space in between two programs, the address system takes that into account. For example, if program 1 is recorded in SLP mode and has an address of 1,000 at the end of the program, the tape then travels some distance before it starts program 2. Since there is no video signal between the end of program 1 and the beginning of program 2, there are no control track pulses to keep track of the distance travelled. In this case, the takeup spools spindle revolution counts can be used to interpolate.

For example, the takeup spool spindle may be counting 1 count for 30 control track pulses, i.e. 1 address count at the end of program 1. At the beginning of program 2, the takeup spool may be counted in two counts for 30 control track pulses, i.e. 1 address count at the beginning of program 2. Thus, on the average, the takeup spool counts 1.5 counts per 30 control track pulses, i.e. 1 address count for the blank space between program 1 and program 2. If the takeup spindle counts 150 counts of blank space, it is assumed the control track would have counted 3,000 control track pulses (150÷1.5×30), i.e. 100 address counts. The starting address of program 2 is 1,000 (end of address of program 1)+100 (length of blank area)=1,100. The absolute address is written once at the beginning of each program and at the end of the last program. For HR tapes and PR tapes, the address is repeated as often as possible (in the order of once every few seconds) between the beginning and the end of every program. For RI tapes, the address is repeated as often as possible for some programs as will be described in detail below.

In alternate embodiments, two separate address systems are used. In a high resolution address system (HRAS), the VCR writes an absolute address at high repetition rate (e.g., once every few seconds) on a line of the VBI. The absolute addressing system is maintained both for finding the current location as well as for calculating the length of programs and blank spaces. The absolute address is a measure of the distance from the beginning of the tape. For example, an address with a value of 1120 may represent a distance from the beginning of the tape after the take-up spool spindle has made 140 revolutions (with 8 counts per revolution). This information may be written once every few seconds. Alternatively, the absolute address may represent the time from the beginning of the tape. Because the play time depends on the recording speed of the tape, the time from the beginning of the tape should also account for the different tape speeds. The second type of address system is a low resolution address system (LRAS) where the absolute address is written on the control track at the beginning of each program as well as the end of the last program as an address mark. An alternate LRAS is to write only marks, such as VISS or VASS marks, in the control track at the beginning of each program on the tape and at the end of the tape.

FIG. 16 is a schematic view of an alternate embodiment for storing tape identification numbers and addresses using a high and low resolution addressing system. Th HR tapes and the PR tapes employ both the high resolution address system and the low resolution address system. The HRAS is possible because address data can be written onto the VBI while recording is taking place. For an HR tape, the address and TID are stored in the VBI and the directory is stored in the RAM 33. For PR tapes, the address, directory, and TID are stored in the control track 42c. The LRAS uses a marker at the beginning of each program and at the end of the last program. When a HR tape or PR tape is inserted into the VCR 1, the VCR quickly reads the TID and address from the VBI and finds out the exact current tape location.

On the other hand, the RI tapes employ the low resolution address system. For RI tapes, an address mark is written on the control track at the beginning of each program and at the end of the last program. The RI tapes cannot in practice employ the high resolution address system because writing a high resolution address requires writing over the whole tape which is too time consuming for the user. Further more, the VBI cannot be retroactively overridden without destroying the picture. On the other hand, a limited amount of data can be overwritten onto the control track, e.g., in a video index search system (VISS). Hence, for retroactively indexing old tapes, the address data is written on the control track 42c. When an RI tape is inserted into the VCR, the VCR first determines whether the tape has a high resolution address system. It searches the VBI for the TID and an absolute address. Failing to find that, the VCR then looks for the LRAS on the control track. It rewinds the tape to find the closest address mark and reads the address and TID to obtain a current location.

To search for the starting point of some other program, the process for HR tapes and PR tapes are as follows. The VCR knows the current absolute address as well as the destination absolute address. While monitoring the take-up spool spindle revolution count, the machine quickly fast-forwards or rewinds to the vicinity, typically within 5 seconds of the destination, and then slows down to play speed to read the VBI and stop at the correct address. For RI tapes, the first part of the search process is identical to that of HR and PR tapes. Knowing the current absolute address and the destination absolute address and while monitoring the take-up spool spindle revolution count, the machine can quickly fast-forward or rewind to the vicinity of the destination. It then slows down to play speed to read the control track and stop at the correct address mark.

To perform a search, for HR and PR tapes, when the tape is inserted into the indexing VCR, the current location of the tape is known from the absolute address on the VBI line. From this address and from the directory recovered from the RAM 33 for HR tapes or from the VBI for PR tapes corresponding to the TID, the current program number is known. For example, if the current program is program 3 and the command is to go to program 6, the VCR must fast forward to land on the third indexing mark, such as a VISS or VASS mark, from the present location. Since the VCR can read the control track during fast forward or rewind, it can read marks stored in the control track. When the third mark is seen during the fast forward, the VCR switches to stop and then rewind since the third mark has been passed. The VCR then switches to play to read the absolute address and can then "soft-land" on the selected address. For RI tapes, once the program number is found, the process is the same.

FIG. 17 is a schematic view of another alternate embodiment for storing tape identification numbers and addresses using a high and low resolution addressing system. The HR and PR tapes employ only a HRAS addressing system. As with the embodiment of FIG. 16, the address and TID are stored in the VBI and the directory is stored in the RAM 33. The RI tapes use the LRAS described above in FIG. 16. In this embodiment, when searching is done on HR and LR tapes as described below in FIG. 44, the system measures location on the tape using the spindle revolution counts or position counters described below in FIGS. 48-51. Searching on RI tapes is the same as described above for the embodiment of FIG. 5.

Figure 18:
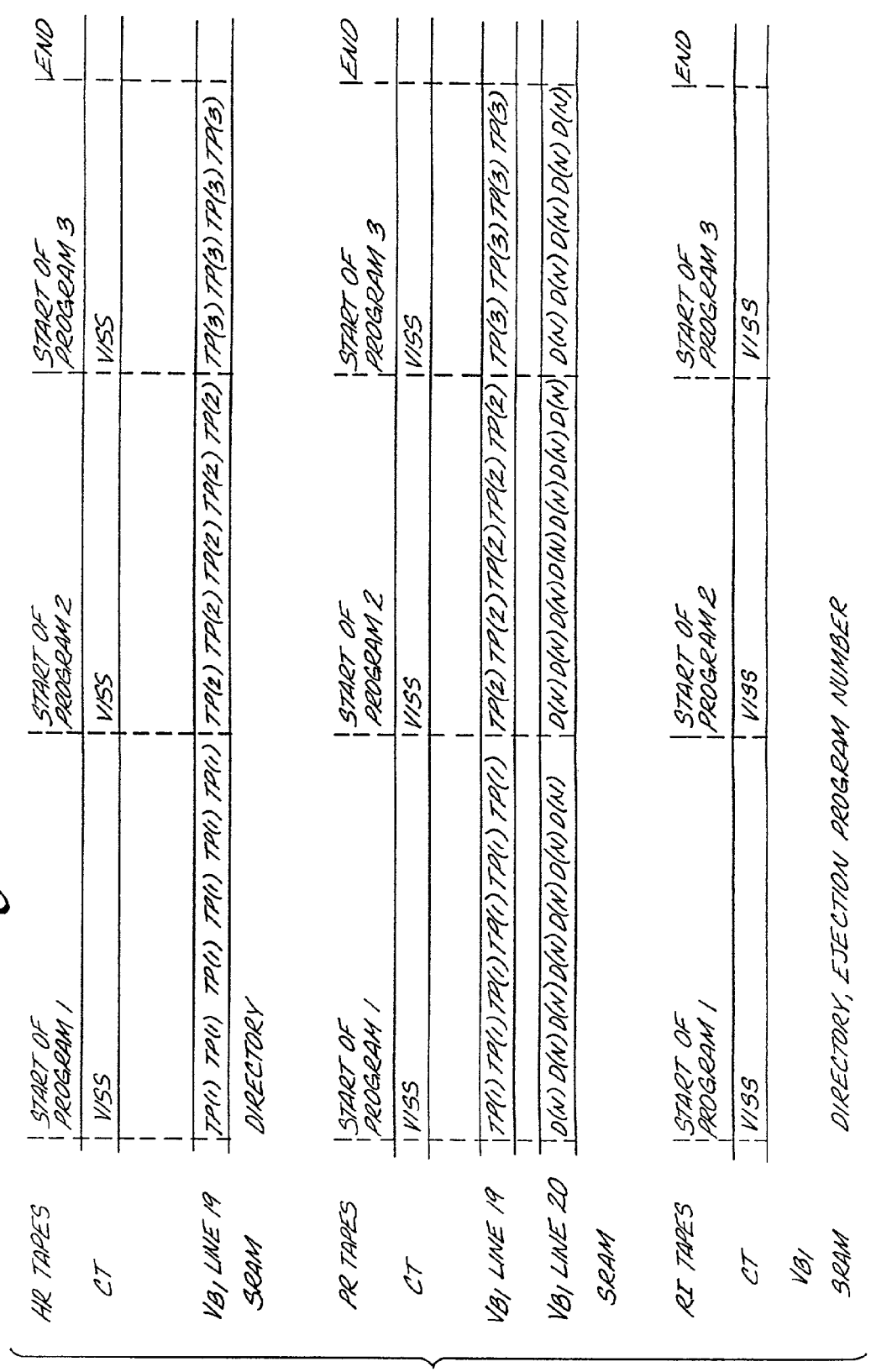
FIG. 18 is a schematic view of yet another embodiment for storing tape identification numbers and program numbers using a VISS PLUS TP data packet address system.

FIG. 18 is a schematic view of another embodiment for storing tape identification numbers and program numbers using a VISS PLUS TP data packet address system. In this embodiment, the system writes a TP data packet, which comprises a TID and a program number in line 19 of the VBI. As will be described below, the TP data packet may be written on other lines of the VBI where a pointer on VBI line 21 points to these other lines. However, the default mode uses line 19. The program number represents the order in which the program was recorded. For example, program 3 is the third program written on the tape. if program 3 is the last program written on the tape, the next program that is written has a program number of 4, even if the program is physically written on the tape before program 3. The format of the TP packet is described below in conjunction with FIGS. 29-31. The recording format for the TP data packet conforms with the EIA-608 standard on Extended Data Services. As will be described below in conjunction with FIGS. 30-31, the TID is constant for a tape. The program number is constant within a program, but changes from program to program.

As a subset of the VISS PLUS TP system, the indexing VCR 10 uses a VISS system to write a VISS mark on the control track 42c at the beginning of each program on the tape to mark the starting point of the program. RI tapes use only the VISS system.

For HR and PR tapes, the VISS PLUS TP system is used. In this system, the TID and program number are written in TP data packets at a high repetition rate, e.g., about once every $\frac{1}{12}$ seconds, on line 19 of both fields of the VBI. The VISS marks on the control track serve as file marks for searching for the starting points of the programs. The TP data packets serve as road marks so that upon insertion of the cassette into the indexing VCR 10, the current tape location can be quickly determined. In addition, the address system provides a method for determining the length of programs as they are recorded or modified, as will be described below.

As an overview, when an HR or PR tape is inserted into the indexing VCR 10, the indexing VCR 10 scans the VBI for a predetermined time, e.g., two seconds, and quickly determines from surrounding TP data packets the TID of the tape and the current program number. When the user presses the Index button, the indexing VCR 10 retrieves the directory from the RAM 33 and displays it. When the user requests the indexing VCR 10 to move to the starting point of another program, the indexing VCR 10 executes a search by either fast forwarding or rewinding the tape while counting the number of VISS marks in the control track to the destination location.

For an RI tape, because the TP data packet is not written on the VBI or elsewhere on the tape, a different method is employed. Instead, when a RI tape is ejected from the indexing VCR 10, the current program number at the time of ejection (also referred to as an ejection program number) is stored in the RAM 33. The next time that the RI tape is inserted into the indexing VCR 10, the indexing VCR 10 attempts to find a TP packet in the VBI. Because no TP packet is found, the indexing VCR 10 prompts the user to enter the assigned tape number, when the user presses the Index button. Using this number, the indexing VCR 10 determines the corresponding TID, recovers from the RAM 33 the ejection program number and uses it as the current program number, and displays the directory. At this time, the indexing VCR 10 may search using the search process described above for HR and PR tapes.

In summary, Table II shows the directory and address systems for the 3 types of tapes.

TABLE II

| Tape Type | Directory | Address System |
| --- | --- | --- |
| HR | RAM 33 in indexing VCR 10 | VISS + TP |
| PR | VBI on tape | VISS + TP |
| RI | RAM 33 in indexing VCR 10 | VISS |

In an alternate embodiment to the VISS+TP system, the indexing VCR 10 also uses an absolute address system (also called VISS+TP+AA). Several absolute address systems are described in detail below in conjunction with FIGS. 48-51. An absolute address is the length either in distance or in minutes at a predetermined recording speed (e.g., standard long play—SLP) from a predetermined location on the tape (e.g., the beginning of the tape). The absolute address preferably has an accuracy of ±3 minutes in SLP mode and ±1 minute in SP mode. The absolute address is preferably written in $\frac{1}{4}$ minute units in SLP mode. As described below, the absolute address is part of the TPA packet that is written on the VBI, typically line 19.

Figure 19:
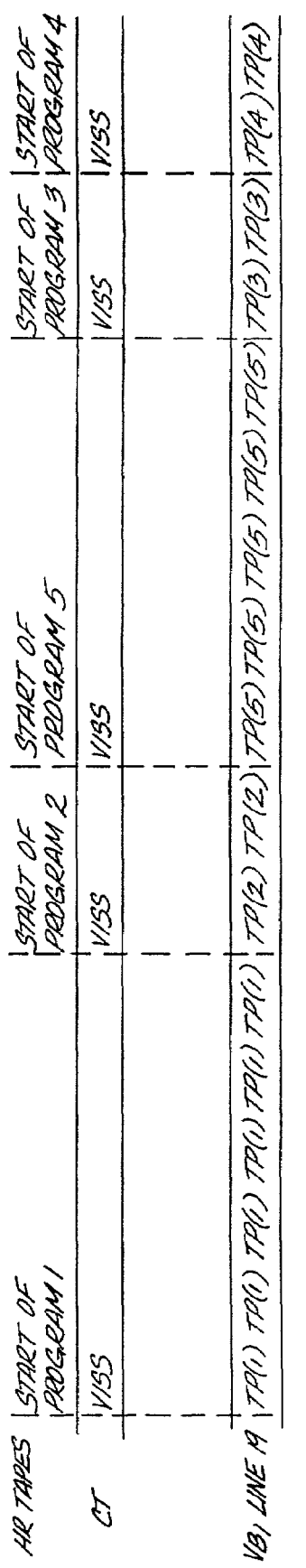
FIG. 19 is a schematic view of the embodiment of FIG. 18 where a program has been overwritten on the tape.

The absolute address system provides faster searches. In some indexing VCRs, the VISS marks cannot be monitored during high speed fast forward or rewind, but only at moderate search speed (semi-load condition). In contrast, the reel ratio can be measured at very high speed fast forward or rewind (unloaded condition). Using the absolute address calculated from the reel ratio, the indexing VCR 10 can search the tape. The absolute address system also provides a more accurate determination of the location of the tape. For example, referring now to FIG. 19, a program five is recorded on a previously recorded HR tape starting in the middle of a previously recorded program two and ending after the beginning of a previously recorded program three. As seen in FIG. 19, when program five is recorded, the indexing VCR 10 writes a VISS mark at the beginning of program five and writes a TP packet corresponding to program five in line 19 of the VBI. Upon reaching the start of program three, the indexing VCR 10 erases the VISS mark corresponding to the start of program three and writes a new mark at the end of program five which becomes the start of the remaining portion of program three. With an absolute address system, the indexing VCR 10 can automatically calculate the length of programs two and three and correspondingly update the directory. Without an absolute address system, the indexing VCR 10 can flag the length of programs two and three as being unknown and when the tape is played, measure the length of the programs for a later updating of the directory. Alternatively, in an indexing VCR 10 without an absolute address system, the indexing VCR 10 may force new programs to be written at the starting point of an old program to avoid programs of unknown length.

At power off, the microprocessor controller 31 stores the TID in battery backed up RAM to facilitate retrieval of the directory.

VBI Line Conflict Resolution

Because various VBI lines are used for different purposes by different users, the indexing VCR employs a conflict resolution system. As examples of other uses of the VBI, line 21 is used for both closed captioning and Extended Data Services. Line 19 is used in ghost cancellation. Macrovision uses lines 13-20 of field 1, and lines 12-19 of field 2 for copy protection in prerecorded tapes. Neilson uses lines 10-12 for encoding of audience survey information in prerecorded tapes. Although line 21 is used for broadcasting purposes, it may be used in prerecorded tapes when there is no closed captioning. The VBI lines presently used by Macrovision for copy protection may be moved to other lines at the discretion of the PR tape manufacturer. In addition, less than eight lines may be used with some copy protection efficiency loss. After reception of the broadcast signal, the use of line 19 has served its purpose and becomes free for writing the TP packet. Thus, for PR tapes, there is no broadcasted line 19 conflict. However, with PR tapes, if some tapes cannot use line 19 or line 20 or both, the write of TP and D(N) packets may be done on other lines by using pointers, which are written on line 21, field 2, to these other lines as described above according to the EIA-608 standard for supplemental data location. When only one of lines 19 or 20 are available, the TP packets and the D(N) packets may be written onto one line. Accordingly, even in the absence of pointers on line 21, the indexing VCR 10 checks lines 19 and 20 for the presence of both TP and D(N) packets.

Interconnected VCRs

Multiple indexing VCRs in the same household create a special problem. The user wants to use an indexed tape interchangeably between all of his indexing VCRs. However, since the directory of HR and RI tapes resides in the VCR and does not travel with the tape, the consequence may seem to be that tapes can only be used in the VCR in which they are created. To solve this problem, the different indexing VCRs in the same household are able to communicate.

Figure 20:
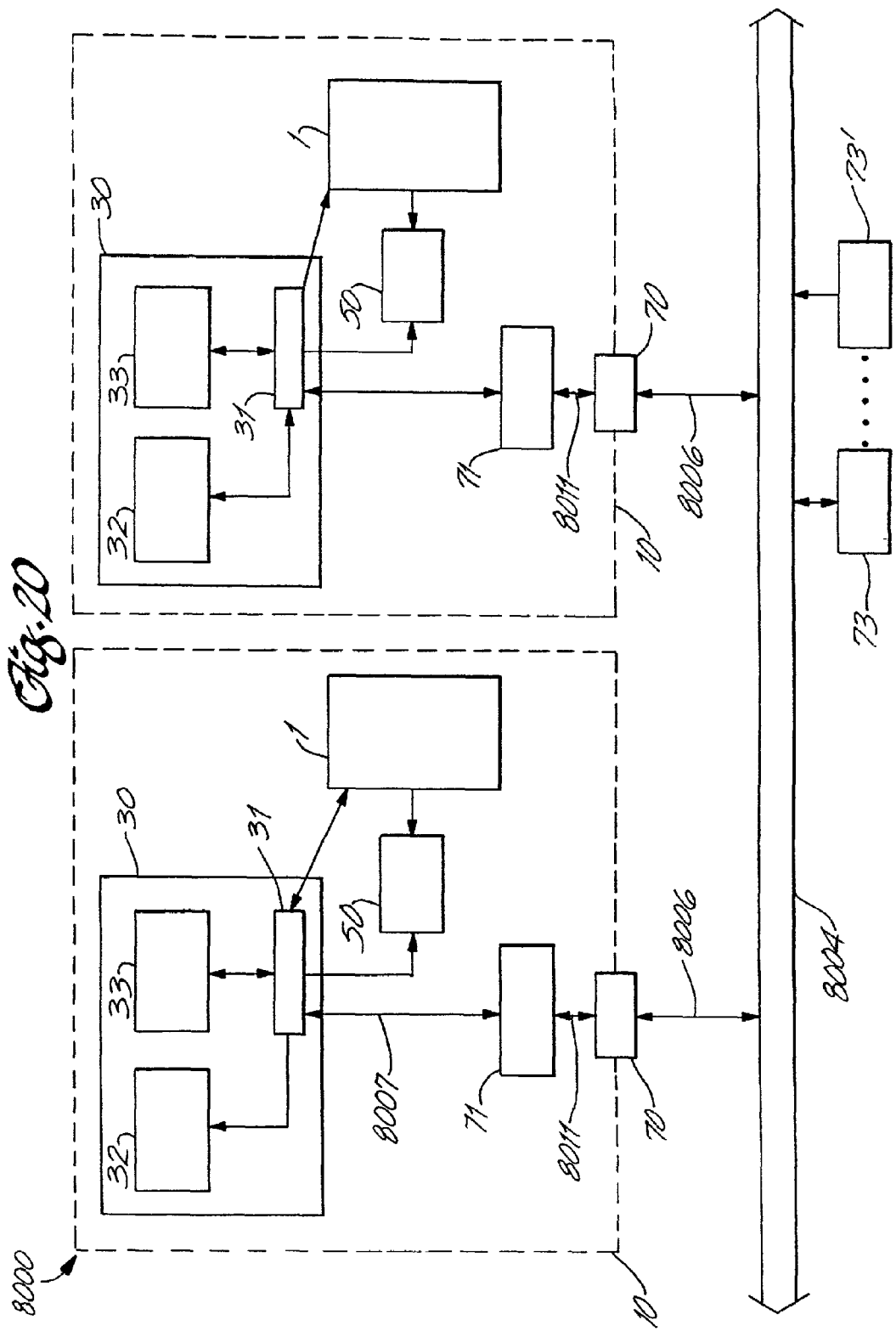
FIG. 20 is a functional block diagram showing a multiple VCR system for transferring directory data between the VCRs over a communication bus.

Referring now to FIGS. 5 and 20, a multiple VCR system 8000 comprises a plurality of indexing VCR systems 10 connected by a bus cable 8006 to a bi-directional bus 8004. The microprocessor controller 31 transmits and receives data and commands over a line 8007 to a bus interface circuit 71 which processes data to communicate between the microprocessor controller 31 and the bus 8004.

In a first embodiment of the bus system, any VCR system 10 on the bus 8004 can acquire the bus and become the talker (also referred to as a driver). At any one time, only one talker is allowed on the bus. During this time, all other units are listeners. Once the related activities are finished, the talker must give up the bus.

The bus interface circuit 71 comprises a transmitter (not shown) for driving signals on the bus and a receiver (not shown) for receiving signals from the bus. The transmitter is preferably a TTL open collector driver. The bus driver preferably is capable of sourcing 48 ma. In addition, it is pulled up to +5 volts by an internal 150 ohm resistor which can be removed to prevent overloading of the bus driver if more than two VCR systems 10 are connected to the bus 8004. In addition, the bus 8004 is preferably active low and stays at the high state when there is no bus activities. The receiver preferably has a maximum load of one standard TTL load on the bus.

The data on the bus is preferably serial data comprising data cells. Each data cell is defined as the time slot between two high to low transitions. The bit length is typically 2.0 milliseconds. Data is preferably encoded in Manchester code. A "zero" is defined as a 25% low to 25% low between the high to low transition and the low to high transition. Conversely, a "one" is defined as a 50% low to 75% low between the high to low transition and the low to high transition. The bus interface circuit 71 communicates over line 8011 through a connector 8008 to the line 8006. The connector 8008 is preferably an RCA phone female connector.

Having described the multiple VCR system 8000, the operation of the system is now described.

One of the VCR systems 10 becomes an initiating unit by desiring to either transmit or receive data over the bus 8004. In particular, when a new home made recording tape is created in a VCR system 10, that VCR communicates this information to the other VCR system 10 on the bus 8004. To request this data, the microprocessor controller 31 of the initiating unit sends a command over the line 8007 to the bus interface 71 for communication over lines 8011 and 8006 with the bus 8004. The microprocessor controller 31 preferably generates one of two types of commands. The first command, a type I command, is a one-to-many broadcast command. All units on the bus other than the initiating unit, which acts as the talker, are addressed. there is no feedback from the addressed units. Thus, for the type I commands, data always flows only from the talker to the listener. The second type of command, a type II command, is a one-to-one communication type. Only one unit is addressed at a time. For the type II commands, the addressed unit sends data to the initiating unit in response to a request for information command from the initiating unit, or the initiating unit sends data to the addressed unit in response to a send information command. Table III summarizes the bus commands.

TABLE III

| Command | Type | Descriptions |
| --- | --- | --- |
| FFFFhex | I | All units receive library |
| 1AAAhex | II | Address unit AAA to report library RAM size |
| 2AAAhex | II | Address unit AAA to receive library |
| Others | | (Reserved for future expansion) |

The bus control commands are bracketed by a leading zero and a trailing zero. An end bit follows the trailing zero. The end bit is the last high to low and back to high transition. Thus, it is a "half" bit. It is not a data bit but a terminator bit. Its width is preferably 2 to 4 times the width of the regular bit length.

Figure 21:
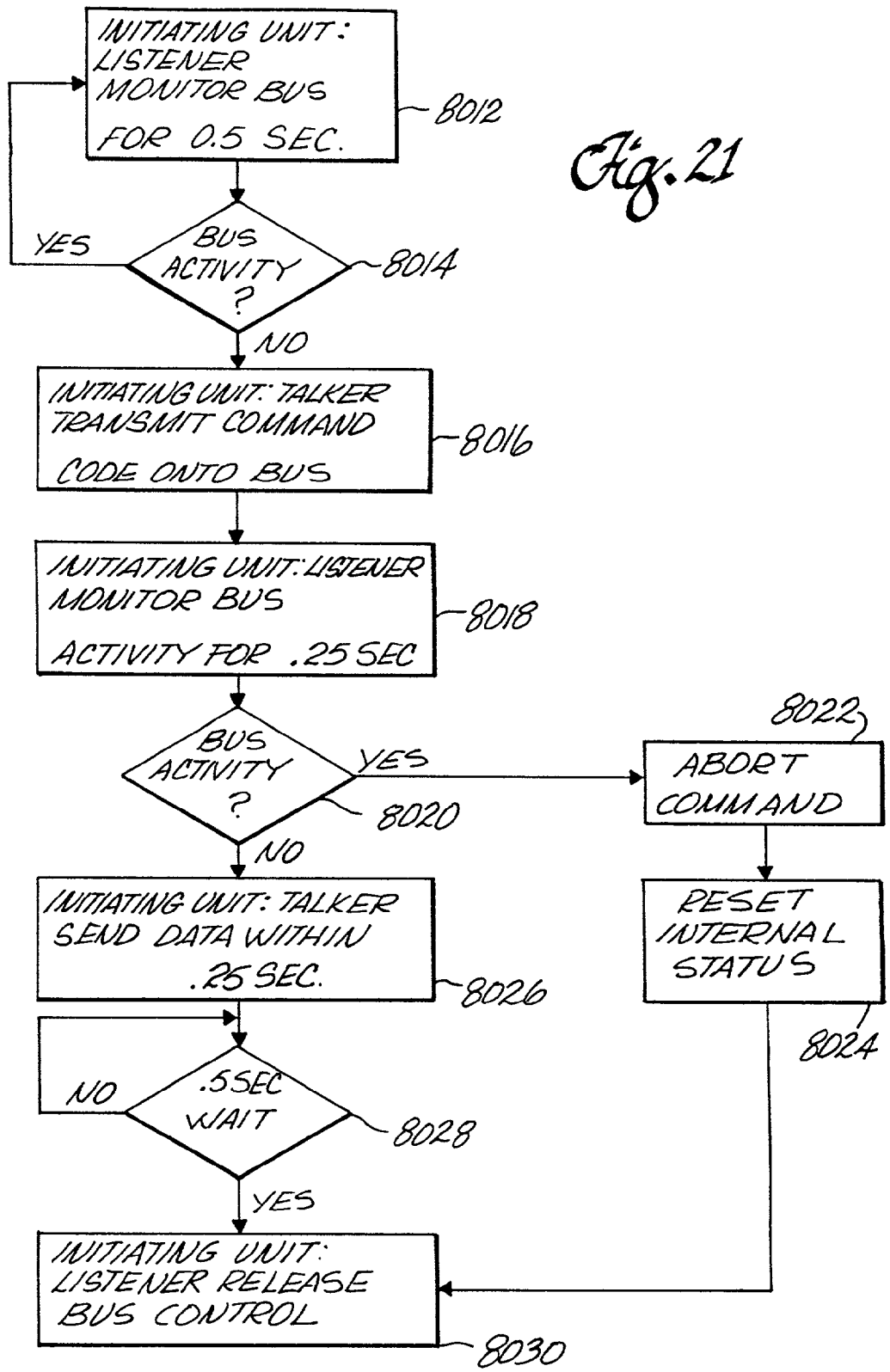
FIG. 21 is a flow chart showing the steps employed in the operation of broadcasting a library to other VCRs for one embodiment of the system shown in FIG. 20.

Referring now to FIG. 21, the initiating unit (VCR system 10) is a listener and monitors the bus 8004 for 0.5 seconds to ensure that there is no bus activity (step 8012). When there is no bus activity (step 8014), the initiating unit becomes a talker and takes control of the bus. The initiating unit transmits a type I-command code (FFFFhex) onto the bus to command all units to receive the library (step 8016). The initiating unit then becomes a listener, and monitors the bus activity for 0.25 seconds for a response (step 8018). If there is bus activity (step 8020), the initiating unit abandons its attempt to become bus controller by aborting the command (step 8-022) and resets its internal status to become a listener (step 8024), thereby releasing control of the bus (step 8030). On the other hand, if there is no bus activity after the command code is transmitted (step 8020), the initiating unit again becomes a talker and sends the data in the library within 0.25 seconds after determining it controls the bus (step 8026). After transmitting all the data, the initiating unit waits 0.5 seconds (step 8028), becomes a listener, and releases bus control (step 8030).

Figure 22:
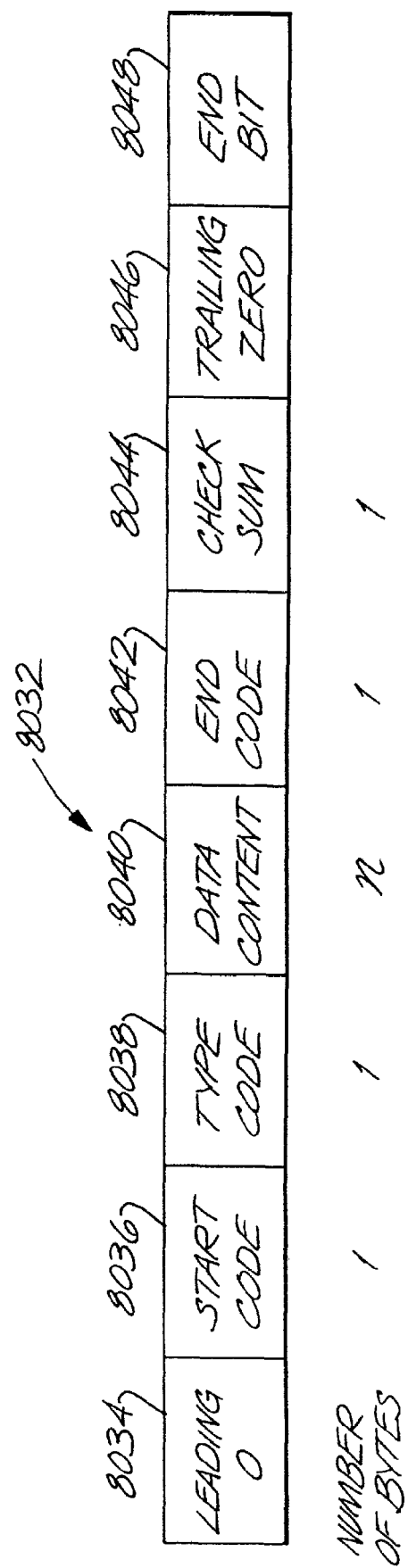
FIG. 22 is a schematic view showing the data packet format for the transmitted data for one embodiment of the system shown in FIG. 20.

Referring now to FIG. 22, the library data is transmitted as a data packet 8032. The data packet 8032 has a leading zero 8034 followed by a start code 8036 having a length of one byte. The start code 8036 preferably has a value of 01 hex. Following the start code, there is a type code 8038 having a one byte long symbol. Its value preferably is between 01 hex and FFhex. The type code 8038 is decoded as follows in Table IV.

TABLE IV

| Type | Descriptions |
| --- | --- |
| 01 hex | Library RAM size packet |
| 02 hex | Library packet |
| 03 hex-FF hex | (Reserved for future expansion) |

Following the type code 8038, a data content 8040 contains the directory or other information that is to be transmitted. The data content 8040 has an n byte length and is preferably coded in ASCII. In the preferred embodiment, only ASCII symbols '0'-'9' and 'A'-'Z' are used. An end code 8042 having a length of 1 byte follows the data content 8040. The end code 8042 preferably has a value of 03 hex. Next, the data packet includes a checksum 8044 that is 1 byte long. The checksum makes the modulo 128 sum of the whole data packet 0, i.e., modulo 128 (start code 8036+type code 8038+ data content 8040 30+end code 8042+checksum 8044)=0. A trailing zero 8046 followed by an end bit 8048 follow the checksum 8044.

Figure 23:
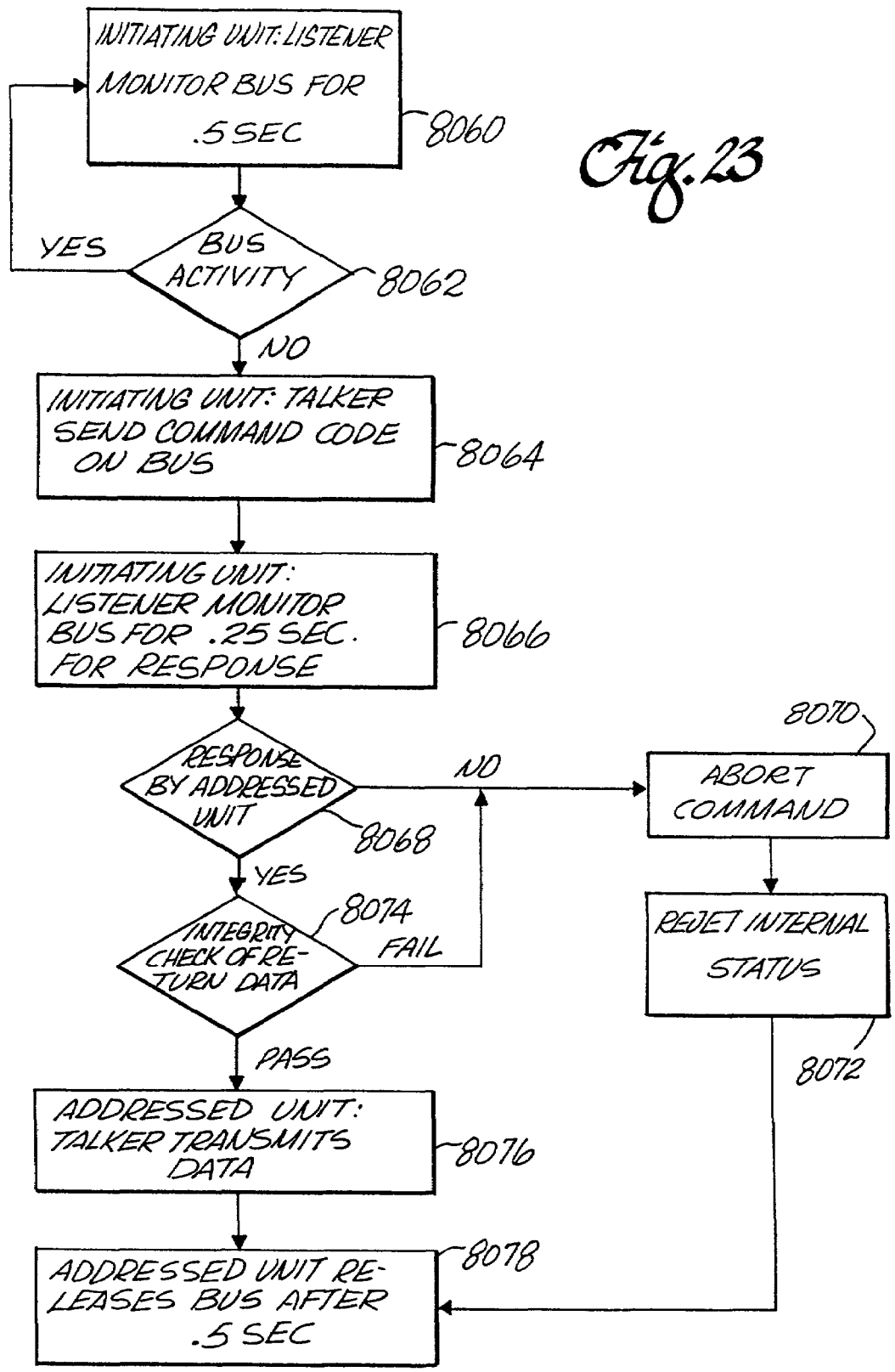
FIG. 23 is the flow chart showing the steps employed in the receiving of library information from another VCR for one embodiment of the system shown in FIG. 20.

Referring now to FIG. 23, a type II command having a value of 1AAAhex is a request from the initiating unit to an addressed unit AAA to report its library RAM size. In order to take control of the bus 8004, the initiating unit operates as a listener and monitors the bus for 0.5 seconds (step 8060) and determines whether the bus is available. If there is no bus activity (step 8062), then the bus 8004 is available and the initiating unit becomes a talker and sends the command code 1AAAhex on the bus 8004 (step 8064). The initiating unit then becomes a listener and monitors the bus 8004 for 0.25 seconds for a response from the addressed unit (step 8066). If there is no response from the addressed unit (step 8068), the initiating unit aborts its command (step 8070) and resets its internal status (step 8072). On the other hand, if, at step 8068, there is a response by the addressed unit, the initiating units checks the integrity of the returned data (step 8074). If there is a failure in the integrity check, the initiating unit aborts its command (step 8070) and resets its internal status (step 8072). However, if the integrity check passes at step 8074, the addressed unit becomes the talker on the bus 8004 and transmits the data (step 8076). The addressed unit releases the bus after 0.5 seconds (step 8078).

For a type II command in which an addressed unit is to receive a library, the flow chart of FIG. 21 is followed for type I commands, except that at step 8026 when the initiating unit is the talker and sends data, the initiating unit sends the library to the addressed unit AAA in response to a type II 2AAAhex command.

Another Bus Embodiment

Bus Description

In a second embodiment of the bus system, the bus 8004 is a bi-directional bus. An external device 73, such as an external RAM, is coupled to the bus 8004. A description of the external device 73 is described below. Within the bus interface circuit 71, a transmitter (not shown) is a TTL open collector driver preferably capable of sinking 16 milliamps. A driver (not shown) is preferably pulled up to +5V by an internal 1.0 kiloohm resistor. The receiver provides a maximum load to the bus of one standard TTL load. The bus 8004 is preferably active low. When there are no bus activities, the bus 8004 stays at the high state. The driver drives the bus 8004 by pulling the bus low. Preferably, the indexing VCR 10 is the master of the bus 8004 and initiates all transactions on the bus. The controller 8008 is preferably an RCA phone female connector.

The data on the bus 8004 is preferably transmitted serially. The data is defined by data cells where each data cell is defined to be the time slot between two successive high to low transitions. The bit length is preferably from 0.2 milliseconds to 2 milliseconds. The data is preferably encoded by 7 bits with an odd parity LSB bit providing a total length of 8 bits first Manchester coding method. (Alternatively, the most significant bit (MSB) may be the parity bit.) The separation between bytes preferably is 1 to 10 milliseconds. The communication is reset, if no data is transmitted for longer than 100 milliseconds, to avoid bus lock ups.

Bus Control Protocol and Command Packet Format

The indexing VCR 10 sends over the bus 8004 a bus command packet to the external device 73 to request data. The command packet has a format:

| Command | [ data ] |
|---------|----------|
| 1 byte  | N byte   |

The command symbol is one byte long and ranges in value from 00 hex to 7F hex. A data symbol follows the command symbol and ranges in length from 0 to N bytes of data. N can be sufficiently large so that the data byte includes the entire directory of a tape. The data is sent in packets with checksums for data integrity. In response to the command packet, the external device 73 sends back either a return code or data based on the command issued by the indexing VCR 10. Table V describes the commands for the bus and the associated data communicated with the command.

TABLE V

| Command | Data | Description |
|---------|------|-------------|
| 01 hex | — | Check if external device 73 is ready. |
| 02 hex | PRI/CSPG | Print PRI/CSPG data. |
| 03 hex | directory | Send directory to external memory 73. |
| 04 hex | — | Request for the first TID stored in external memory 73. |
| 05 hex | — | Request for the next TID stored in external memory 73. |
| 06 hex | — | Request for the previous TID stored in external memory 73. |
| 07 hex | TID | Request external device 73 to send the Xth entry of the specified tape number. |
| 08 hex | TID and number X | Request external device 73 to send copy version number of the tape specified. |
| 09 hex | TID | Request external device 73 to send program number for next recording for the specified tape. |
| Others | | Reserved for later expansion. |

As an overview of the transmission of data on the bus, the indexing VCR 10 issues a command on the bus and waits for a ready signal from the external device 73. The ready signal is a 0.5 ms low pulse on the bus. As a wait time of at least 100 ms, the indexing VCR 10 restarts. Data is then sent one byte at a time on the bus. After each byte, a communication code 00 hex is send by the receiving device if the communication is acceptable. Otherwise the receiving device sends a 3F hex code which indicates a communication error. In response to a 3F hex code, the transmitting device resends the data packet.

The indexing VCR 10 issues a 01 hex command on the bus 8004 to check if the external device 73 is ready. This command is preferably issued before other commands to check the device. After issuing the command, the indexing VCR 10 waits for the return code. If 00 hex is returned on the bus, the external device 73 is ready. If 7F hex is returned, the external device 73 is busy. If no response is received on the bus, the commanded external device 73 may be non-existent. The indexing VCR 10 retransmits the command to again check status. The indexing VCR 10 stops further commands to the external device 73, if the device is not ready.

The indexing VCR 10 issues a 02 hex command on the bus to command the external device 73 to print PRI or CSPG data. After issuing the command packet, the indexing VCR 10 issues the PRI packet to the external device 73. If the external device 73 accepts the packet, it returns a 00 hex code. Otherwise, it returns a 7F hex code.

The indexing VCR 10 issues a 03 hex command to save the directory of one tape to the external RAM 33. Before transmitting the directory, the indexing VCR 10 reformats the information into the DNB packet format described below in conjunction with FIG. 35.

The first data packet is a D0B packet (described below in conjunction with FIG. 36) that includes a TID and all other tape parameters of the directory. DNB packets follow the D0B packet.

Alternatively, the D(N) and TP packet format described below in connection with FIGS. 27 and 29, respectively, may be used. The first packet includes the TID and the copy version number (described below) in the same format as the TP packet. The next packet is the D(0) packet which describes the tape parameters, including tape length and reel diameter. The remaining directory entries are transmitted in the D(N) packet format in the order of their location from the beginning of the tape. A TP packet is sent after the last D(N) packet to indicate the end of transmission. This TP packet includes the TID and the program number for the next recording.

The external device 73 returns a 00 hex code, if it properly receives all packets. Otherwise, it returns a 3F hex communication error code followed by the PN number of the packet in the wrong format. In response thereto, the indexing VCR 10 may resend the data and again wait for the return code.

The indexing VCR 10 issues a 04 hex command to request the first TID stored in the external RAM 73. In response thereto, the external device 73 returns the first TID stored therein. In combination with the 05 hex and 06 hex commands (to be described below), the indexing VCR 10 can use the 04 hex command to read out all the TIDs in the external RAM 73. The external device 73 returns a 7F hex code, if there is no TID inside the device 73.

The indexing VCR 10 issues a 05 hex command to request the next TID stored in the external RAM 73. In response thereto, the external RAM 73 returns the next TID in the RAM 73. After the last TID is returned, the external RAM 73 returns a 3F hex code.

The indexing VCR 10 issues a 06 hex command to request the previous TID stored in the external RAM 73. In response thereto, the external RAM 73 returns the previous TID in the RAM 73. This allows the indexing VCR 10 to read the TID in reverse order. After the first TID is returned, the external RAM 73 returns a 3F hex code.

The indexing VCR 10 issues a 07 hex command and a TP like packet, which includes the TID and a number x, to request the xth directory entry of the specified tape. In response thereto, the external device 73 returns the xth directory entry of the tape in a DNB packet format (or alternatively, a D(N) packet format). If, however, the external RAM 73 does not have the TID, it returns a 7F hex code.

The indexing VCR 10 issues a 08 hex command and the TID in TP packet format with PN set to 0 to request. the copy version number. In response thereto, the external device 73 returns a TP like packet which includes the TID and the copy version number to allow the determination of which directory is the later update. If, however, the TID is not inside the external RAM 73, it returns a 3F hex code.

The indexing VCR 10 issues a 09 hex command and the TID in TP packet with PN set to 0 to request the program number for the next recording. In response thereto, the external device 73 returns a TP like packet which includes the TID and the program number for the next recording. If, however, the TID is not in the external RAM 73, it returns a 7F hex code.

The copy version number is a 12 bit number used to check the updated status of the directory in the external RAM 73. The indexing VCR 10 stores a copy version number for each tape in the RAM 33. When a new tape is created, this number is set to zero. Every time the directory content is changed, the indexing VCR 10 increments the number by one. When a copy of a directory having the same TID is found in both the external RAM 73 and the internal RAM 33, the indexing VCR 10 uses the more updated version which is identified by comparing the copy version number and using the higher number. In this embodiment, the copy version number ranges from 0 to 4095.

In alternate embodiments, the bus interface 71 may be packaged external to the VCRs. In these embodiments, the microprocessor controller 31 communicates over the line 8007 directly to the connector 8011. The bus interface 71 is connected external to the indexing VCR 10 to the connector 8011 and to the bus 8004.

In yet other embodiments, the method of communication may be either radio transmission at UHF or modulation on an AC power line.

One method for transmitting signals on AC power lines is disclosed in U.S. Pat. No. 4,418,333 to Schwarzbach, et al., issued Nov. 29, 1983, the subject matter of which is incorporated herein by reference.

Interface Port

Referring again to FIG. 5, the VCR system 10 has an interface connector 72 which is coupled to the microprocessor controller 31 and allows communication between the microprocessor controller 31 and an external device 73. The connector 72 has preferably an RCA phono female connector. that is accessible from outside the indexing VCR 10 for electrically connecting to the external device 73. The external device 73 may be a memory, a printer, a computer, a telephone line or a specialized machine for communicating with the microprocessor controller 31.

The interface connector 72 also preferably comprises a dual tone multi-frequency (DTMF) generator, an optional modem, and an optional DTMF decoder, each of which are coupled to the phone line terminal and are not shown in the drawings. The microprocessor controller 31 provides a control signal to the DTMF generator for sending standard DTMF telephone tones which are well known to those skilled in the art. The microprocessor controller 31 also has a bidirectional interface to the modem for sending and receiving conventional telephone signals. The DTMF decoder converts received DTMF tones from the phone line and sends them to the microprocessor controller 31.

Within the interface connector 72, a transmitter (not shown) is an open collector driver preferably capable of sinking 16 milliamps and pulling up to 5 volts by an internal 1.0 kiloohm resistor. Also within the connector 72, a receiver (not shown) provides a maximum load of one standard TTL load to devices connected to the connector. The indexing VCR 10 communicates with such a connected device at an operation frequency up to 20 kHz in a pulse mode. Such communication may be on a bus.

In one specific implementation, the external device 73 is a nonvolatile memory such as a battery supported RAM. The directory may be stored in the external device 73. The microprocessor controller 31 may send the directory of the tape (HR tape, RI tape, or a PR tape with a saved directory) from either the RAM 33 or the external device 73. To ensure that the directories in the RAM 33 and the external device 73 are identical, the microprocessor controller 31 updates in both memories the directory of the tape after it is ejected.

In a specific implementation, the microprocessor controller 31 communicates with a printer to print coupons captured using the Auxiliary Information feature described below.

In another specific implementation, the microprocessor controller 31 may print the tape identification number labels for marking the cassette housing. For example, instead of the step 9211 described below in FIG. 88 in which the microprocessor controller 31 displays the TID assigned to the tape that is about to be ejected, the microprocessor controller 31 commands the printer to print a label with the assigned TID and prompts the user on the display to affix the label to the cassette housing.

In yet another specific implementation, the microprocessor controller 31 prints upon user command the directory of any specified tapes stored in the RAM 33.

In an alternate embodiment, in place of the interface connector, an IR detector/emitter in the VCR functions as a data port which can be used to both receive remote control commands and to transmit the directory or other information from the RAM 33 to a printer or a second machine. For example, some VCRs can control cable boxes by transmitting commands to the cable box. These VCRs may also transmit directory data or other information to an external device 73 that can receive IR commands. Alternatively, the IR detector may also be used to receive directory information downloaded from the second machine.

In an alternate embodiment to FIG. 5, as shown in FIG. 20, the interface connector 72 may be the same connector as the bus interface connector 71. In this embodiment, a plurality of external devices 73, 73' may be connected to the bus 8004. The directory may be downloaded from the RAM 33 through a bus transfer to any or all of the plurality of external devices.

In a specific implementation, the directory is downloaded either over the bus 8004 or through the interface connector 72 for backup storage. For example, backup storage may be either a tape in a second VCR or a floppy disk in a disk drive.

In another specific implementation, the external device 73 is a nonvolatile memory such as a battery supported RAM. The external RAM 73 contains sufficient memory, e.g., one megabits, for storing the entire program directory of a plurality of indexing VCRs. The external RAM 73 provides a backup to the RAM 33 in each of the user's indexing VCR 10s to avoid loss of data during power interruptions. Further, the external RAM 73 combines the libraries of all indexing VCRs connected to the bus 8004. Consequently, each indexing VCR 10 provides indexing capability for each of the user's index tapes. The user may transfer directories between the indexing VCRs. The external RAM 73 also includes communication electronics for communicating with each device on the bus. When a tape being played is ejected, the microprocessor controller 31 updates the directory in both the RAM 33 and the external device 73 to ensure that all indexing VCRs that are interconnected can access a common library.

In yet another embodiment, the external device 73 might also include a processor and a character generator. The indexing VCR 10 provides the electronic guide data over the I/O port. The external device 73 captures the data, formats it and stores it within the external RAM. At the appropriate times, the data is outputted via the character generator over the bus 8004 to the indexing VCR 10 for display on the television.

Alternatively, the bus may be an infrared link where the external device 73 has IR emitters and detectors for transmitting and receiving infrared codes to the indexing VCR 10 and television using the infrared detectors and emitters described above.

Similar to the bus interface, communication from the interface port may be either direct cable, radio transmission at UHF, infrared transmission, or modulation on an AC power line, or other memory or communication devices.

Automatic Back-up of the Library in the RAM 33

As noted above, the library is stored in a nonvolatile memory or a battery backed-up RAM 33. Although lithium batteries have a 5-7 year shelf life, this life may be shortened by power outages. In addition, catastrophic chip failures may occur. Consequently, the indexing VCR 10 periodically displays a prompt to the user to back-up the library by downloading the contents from the RAM 33 through the serial port to a magnetic tape, floppy disk or external memory device. Even with this prompt, some users are likely to not back-up the library. In addition, if a low battery warning is provided, the user may also ignore this warning. When the failure occurs, the user will have experienced a catastrophic loss of his entire library when the battery has been drained or the memory chip has failed. The library may be recreated as each tape is played for the first time after the loss in the indexing VCR 10. However, this approach is time consuming and limits the user's ability to perform search functions of the tape library.

The indexing VCR 10 may automatically provide back-up by writing the directory onto a tape while it is making another recording. The backup may occur automatically when the indexing VCR starts recording. The backup is suspended if recording stops (or the user stops the backup). The backup stops when a predetermined number of copies are recorded onto the tape. In particular, the indexing VCR 10 may write the whole library onto a predetermined VBI line, such as line 19. For example, a 250 k bit library may be backed-up during one recording, e.g., assuming 16 bits per line and 1 line per field at 60 fields per second, it takes 273 seconds to complete this library back-up. In a specific implementation, the library and machine ID (defined below in conjunction with FIG. 34) are stored, during normal recording, as ABU packets (defined below in conjunction with FIG. 37) at standard encoding speed on VBI line 19. To maintain desired addressing accuracy, the ABU packets are written separated in time between TPA packets.

Because most recordings are at least half an hour long, the backing-up is completed before the recording has been completed. A complete backup may be defined as recording onto the tape a predetermined number of copies of the directory, e.g., two copies. A nonvolatile memory, such as an EEPROM, may be included as part or separate to the microprocessor controller 31 in the indexing VCR 10 for storing the location of the library copy, e.g., the TID, and the program number or address of the tape on which the directory is recorded, and the length of the program being recorded along with the backup directory. Until the recording is finished, the length is undefined. As a back-up or reserve to the tape being either defective or recorded over in a non-indexing VCR 10, the locations of the latest three copies of the library can be stored in the EEPROM.

Upon the occurrence of a battery failure or a RAM chip failure and after the indexing VCR 10 is repaired (or replaced), the indexing VCR 10 may restore the directory by displaying a prompt on screen requesting the user to insert the tape containing the latest copy of the library by displaying the tape number corresponding to that tape. Upon insertion of the tape, the indexing VCR 10 verifies the TID of the tape and is able to advance or rewind to the location of the directory using the read program number (or address) and the destination program number (or start address) read the EEPROM. As the tape is being read, the indexing VCR 10 uploads the library packet into the RAM 33.

User Selected Back-up of the Library in the RAM 33

As noted above, the user is periodically prompted to back up the library by downloading the contents from the RAM 33 through the serial port to a magnetic tape, floppy disk or external memory device. This backup may be used for restoring a lost library after a power outage or for transferring libraries to another indexing VCR.

Upon user command, the indexing VCR 10 back-ups the library by writing it onto a tape. The indexing VCR 10 may write the whole library onto a predetermined VBI line, such as line 19, or onto a plurality of predetermined VBI lines. In a specific implementation, the library and machine ID (defined below in conjunction with FIG. 34) are stored as DNB packets (defined below in conjunction with FIG. 35) at standard encoding speed (1× format) on the predetermined VBI lines to maintain desired addressing accuracy. The DNB packets are written separated in time between TPA packets. A VISS mark may be written onto the tape when the backup starts to allow faster location of the backup data. Before ejecting the tape from the indexing VCR after the backup library is recorded, the indexing VCR rewinds the tape to the start of the backup data. A complete backup may be defined as recording onto the tape a predetermined number of copies of the directory, e.g., two copies.

Upon user request, the indexing VCR 10 restores the directory by reading the directory from the tape and storing the read data into the RAM 33. If the library cannot be read completely after one reading, the indexing VCR performs multiple readings of the tape.

Data Formats

For the data packets described below in conjunction with FIGS. 24-31, a byte refers to a seven bit data symbol plus an eighth bit which is reserved for a parity bit.

FIG. 24 is a schematic view showing the data format for the directory recorded on pre-recorded tapes. A data packet 9100 begins with a start code 9101 having a length of one byte. The start code 9101 preferably has a value of 01 hex. A type code 9102 follows the start code 9101. The type code has a length of one byte. The type code 9102 preferably has a value 0X01. The next two bytes are a number of titles symbol 9103. The number of titles symbol 9103 represents the binary number coded in seven bit ASCII for the number of titles in the directory. In the preferred embodiment, only ASCII symbols '0'-'9' and 'A'-'Z' are used. For example the ASCII string '1F' represents the number 1FX. Since two ASCII characters are used, the largest number of titles is FF hex (256). Following the number of titles symbol 9103, a first program entry 9104, a second program entry 9105, and an Nth program 9106 contain the information related to N programs (FIG. 24 shows only the first, second and Nth program entries for simplicity and clarity). Each program entry is a fixed length and contains a group of 37 byte long symbols. The first four bytes represent the binary address coded in seven bit ASCII, in a manner similar to that described above, for the number of titles symbol 9103. For example, the ASCII characters string "3F1A" represents the address of 3F1A hex. Since four ASCII characters are used, the largest number is FFFF hex (65535). The fifth byte of the program entry represents the recording mode. A value 0X00 is the Standard Play (SP) mode, a value 0X01 is the Long Play (LP) mode, a value 0X10 is the Super Long Play (SLP) mode, and the values 0X11-0X7F are reserved. The remaining 32 bytes of the program entry represent the program title code. The program title code is preferably coded in seven bit ASCII. An end code 9107 having a 1 byte long symbol follows the Nth program entry 9106. The end code 9107 preferably has a value 03 hex. The data packet 9100 ends with a checksum 9108 that is one byte long symbol. The checksum 9108 makes the modulo 128 sum of the whole data packet equal to zero, i.e., modulo 128 (start code 9101+type code 9102+number of titles 9103+program entries 9104, 9105, 9106+end code 9107+checksum 9108) equals zero. For prerecorded tapes, the directory is repeated as often as space allows in the VBI. Typically this means once every few seconds.

FIG. 25 is a schematic view showing the data packet format for the absolute address packet. An absolute address data packet 9110 is written at the start of each program, at the end of the tape, and periodically during each program. The data packet 9110 has a start code 9111 having a length of one byte. The start code 9111, preferably has a value of 01 hex. Following the start code, there is a type code 9112 having a one byte long symbol. The type code 9112 preferably has a value of 0X02 hex. An absolute address 9113 follows the type code 9112 and has a length of four bytes. The absolute address 9113 represents the address coded in seven bit ASCII. As with the program entries 9104 described above in FIG. 24, only ASCII symbols '0'-'9' and 'A-Z' are used. For example, ASCII character string '3F1A' represents the absolute address of 3F1A hex. Since four ASCII characters are used, the largest number of absolute addresses is FFFF hex (65535). The address is measured as the number of take-up spool spindle revolution counts (typically at 8 counts per revolution) from the beginning of the tape. An end code 9114 having a length of one byte follows the absolute address 9113. The end code 9114 preferably has a value of 03 hex. The absolute address data packet 9110 ends with a checksum 9115 having a one byte long symbol. The checksum makes the modulo 128 sum of the absolute address packet equal to zero, i.e., modulo 128 (start code 9111+type code 9112+absolute address 9113+end code 91114+checksum 9115) equals zero. The absolute address packet 9110 is repeated as often as possible on a line of the VBI, but is interleaved with the tape I.D. packet to be described below in FIG. 26. In the case of pre-recorded tapes, the absolute address packet 9110 is also interleaved with the directory packet.

FIG. 26 is a schematic view showing the data packet format for the tape identification number (TID). For PR tapes, the tape I.D. is written repeatedly on one line of the VBI. For HR and RI tapes, the TID is written on the control track after the address mark at the beginning of each program and at the end of the last program. For HR tapes, the TID is also repeated as often as possible on the tape preferably once every few seconds. For RI tapes, during the first pass of re-indexing, these are no other TIDS. During the next play of the tape, additional TIDS are inserted as often as possible, preferably on the order of once every few seconds. In addition, the TIDS are interleaved with an address packet. As will be described below, the TID is a 48 bit number for HR and RI tapes. This number is composed of a header, a random machine identification number, and a tape number. Consequently, the danger of tapes having the same identification will be minimized. For PR tapes, the TID corresponds to the UPC code of the tape (a 12 digit number). This way city libraries, tape rental or retail stores can all adopt the TID of the indexing system.

A TID data packet 9120 is twelve bytes long. For the TID data packet, a byte refers to a seven bit data symbol plus an eighth bit which is reserved for a parity bit. The data packet 9120 begins with a start code 9121 having a length of one byte. The start code 9121 preferably has a value 01 hex. Following the start code 9121, a type code 9122 having a one byte long symbol and preferably has a value 0X04. A tape I.D. 9123 follows the type code 9122 and is eight bytes long. As noted above, the tape I.D. 9123 is determined differently for the type of tape. For a PR tape, the tape I.D. 9123 is a twelve digit UPC code which is a 48 bit number with most significant bit (MSB) of less than 0F0 hex. For HR and RI tapes, the tape identification 9123 is composed of three parts. The first part is an eight bit header in the MSB which is equal to 0FF hex. The next 24 bits are an identification generated by a random number sequence to generate a high probability of uniqueness for each VCR. The 24 bit machine I.D. is created as a random number which is seeded by some condition that will most likely be different between users. In a first implementation the 24 bits is broken into two twelve bit numbers. At the first power up of the VCR, the counter is initialized with counting pulses of less than 0.25 milliseconds duration. The counter is stopped by the user's first and second key pressing on the remote controller. These two twelve bit random numbers are then combined to form the machine identification. Because the counter is very fast and the key pressed by the user is very random, the machine identification should be sufficiently random so that two VCR's will have a chance of approximately one out of sixteen million to have identical machine I.D.'s. A 16 bit tape number follows the machine I.D. which allows for 65536 tapes in one VCR. An end code 9124 follows the tape I.D. 9123 and is one byte long. The end code 9124 preferably has a value of 03 hex. A checksum 9125 follows the end code 9124 and is one byte long. The checksum 9125 makes the modulo 128 sum of the whole directory packet zero, i.e., modulo 128 of (start code 9121+type code 9122+tape I.D. 9123+end code 9124+checksum 9125) equals zero.

In an alternate embodiment, the machine identification portion of the 48 bits of the tape I.D. 9123 may be the Julien day, hour, and minute when the VCR is first put into use.

Second Embodiment of Data Format

FIG. 27 is a schematic view showing the format for the directory packet recorded in the VBI for prerecorded tapes. The directory preferably provides up to 32 characters per table VI. A D(N) packet 2601 has the following symbols: start code, type, N, start address, stop address, record speed, program category, version, language, title text, expand byte, stop code and checksum. Table VI shows the length in bytes and the value for each symbol. The N symbol represents the program number in the directory when N is greater than 0. Each byte is a coded text number from 30 hex to 3F hex which equates to 0 hex to F hex (when N equals 0, the packet described below in conjunction with FIG. 28 is used to represent the title of the tape). The start address symbol represents the number of minutes measured in the SLP mode from the beginning of the tape to the beginning of the program. The stop address symbol represents the number of minutes measured in the SLP mode from the beginning of the tape to the end of the program. Each byte of the start address and stop address symbols is a coded hexadecimal number from 30 hex to 3F hex which form a number having the largest possible value of FFF hex. A record speed symbol defines the recording speed of the program. The recording speed symbol represents the optimal tape speed at which the indexing VCR 10 should record the program. For example, a super long play speed may be transmitted for programs, such as sports or nature programs, where the user may want to use the freeze frame feature. As another example, a standard play speed may be transmitted for recording long programs so as to conserve tape. If the recording speed is defined to be blank, the length is defined based on SLP for better resolution. An "undefined" recording speed is used when the recording speed changes during a program. Undefined values are reserved for further expansion. A program category (PC) symbol is defined per the EIA-608 standard. The version symbol identifies the version of the program titled format. For versions other than 20 hex, the indexing VCR 10 ignores the following bytes up to a terminator code (which is preferably 1E hex) and displays the titled text as a blank line. A language symbol represents different languages. The title text symbol has a length of M bytes where M is a variable even number, preferably not greater than 40, including the 1E hex terminator code. The title text symbol represents the program title in ASCII and is terminated by the character 1E hex. If the character number is odd, one more null character is added before the terminator code. In addition, an attribute character can be added to the title text to enhance the indexing display. The attribute character starts with a value of 1D hex which is followed by a character in the range 20 hex to 7F hex. Attribute codes are defined below in conjunction with FIG. 84. The expand byte symbol has a length of N bytes where N is a variable even number from 0 to 6. The expand bytes are used for expansion code for the indexing VCR 10. The checksum symbol is defined as the modulo 128 sum of the packet from the start code to the stop code. As will be described below, the D(N) data packet 2601 is encrypted and must be decrypted by an algorithm in the microprocessor controller 31 (FIG. 5) or the controller 702 (FIG. 11) in the indexing VCR 10.

TABLE VI

| Symbol | Length (Bytes) | Value |
|---|---|---|
| Start Code | 1 | 07 hex |
| Type | 1 | 7E hex |
| N | 3 | Each byte coded hex number. 30-3F hex |
| Start Address | 3 | Each byte coded hex number. 30 3F hex |
| Stop Address | 3 | Each byte coded hex number. 30-3F hex |
| Record Speed | 1 | 20 hex: LP  21 hex: SP  22 hex: SLP  23 hex: blank  24 hex: undefined  Others: Reserved |
| Program category (PC) | 1 | Per EIA-608 standard. |
| PC Extension | 1 | 20 hex: non-broadcast indexed material.  21 hex: video magazine.  22 hex: sales catalog.  23 hex: classified ads.  24 hex: 7F hex: reserved. |
| Version | 1 | 20 hex: first version |
| Language | 1 | 20 hex to 7F hex, 20 hex: English |
| Title text | m | Terminator code: 1E hex Expand Byte. Even number 0 to 6; each byte 20 hex-7F hex. |
| Stop Code | 1 | 0F hex. |
| Checksum | 2 | 00 hex-7F hex |

FIG. 28 is a schematic view showing the format for the directory packet D(0) for the tape title recorded in the VBI for prerecorded tapes. A D(0) data packet 2602 has the following symbols in order: start code, type, N, length, reserve, reel diameter, reserved, version, language, title text, expand byte, stop code and checksum.

Table VII shows the length in bytes and the value of each symbol. The D(0) data packet 2602 is similar to the D(N) data packet 2601 described below in FIG. 30 where the parameters, start address, stop address, PC, and record speed are redefined to denote the length of tape and the reel diameter. The D(0) data packet 2602 is predefined as the tape parameter packet for both HR and PR tapes. The length symbol indicates the length of the tape in minutes at the SLP speed. Each byte is a coded hexadecimal number which provides a value in the range of 000 hex to FFF hex. The reel diameter symbol indicates the physical diameter of the tape reel in millimeters. The version symbol indicates the version of the tape title format. For versions other than 20 hex (the first version), the indexing VCR 10 ignores the following bytes up to the terminator code contained within the title text symbol and displays the text title as blank line. The language symbol represents the different languages around the world. Other values for the language symbol may be defined by the manufacturer of the indexing VCR 10. The length of the title text is in bytes where M is a variable even number including the terminator code. The title text symbol represents the tape title in ASCII and is terminated by the character 1E hex. If the character number is odd, one null character is added before the terminator code 1E hex. An attribute character can be added to the text at a later stage. The expand byte symbol has a length of N bytes where N is a variable odd number ranging from zero to five. The value of the check sum is the modulo 128 sum of the packet from the start code to the stop code.

TABLE VII

| Symbol | Length (Bytes) | Value |
| --- | --- | --- |
| Start Code | 1 | 07 hex |
| Type | 1 | 7E hex |
| N | 3 | Byte 1, 2, 3: 30 hex, 30 hex, 30 hex |
| Length | 3 | Each byte coded hex number 03 hex to 3F hex |
| Reserve | 3 | 30 hex, 30 hex, 30 hex |
| Reel Diameter | 2 | Each byte coded hex number, 30 hex-3F hex |
| Reserved | 1 | 30 hex. |
| Version | 1 | 20 hex: first version |
| Language | 1 | 20 hex to 7F hex, 20 hex: English |
| Title text | m | Terminator code: 1E hex |
| Expand Byte | n | Odd number 0 to 5; each byte 20 hex-7F hex. |
| Stop Code | 1 | 0F hex. |
| Checksum | 2 | 00 hex-7F hex |

FIG. 29 is a schematic view showing the format for a TP packet recorded on the VBI for HR tapes and PR tapes. A TP packet 2603 contains both the TID 2604 and the program number. The TP packet has the following symbols: start code, type, TID, reserved, N, stop code and check sum.

Table VIII shows the length in bytes and the value for each symbol. The TID symbol contains 10 bytes where each byte represents 4 bits, as will be described for the TID described in FIG. 30 for an HR tape and in FIG. 31 for a PR tape. The N symbol is defined to be the program number with each byte representing four bits for a total length of twelve bits. For communication between the indexing VCR 10 and the external device 73, the 12 bit item N may be used for other purposes. The checksum is the modulo 128 sum of the packet from the start code to the stop code.

TABLE VIII

| | TP Packet on VBI | |
| --- | --- | --- |
| Symbol | Length (Bytes) | Value |
| Start code | 1 | 07 hex |
| Type | 1 | 7D hex |
| TID | 10 | Each byte is coded hex number 30 hex-3F hex |
| Reserved | 1 | 30 hex |
| N | 3 | Each byte is coded hex number 30 hex-3F hex |
| Stop Code | 1 | 0F hex |
| Checksum | 2 | 00-7F hex |

FIG. 30 is a schematic diagram showing the TID for an HR tape. The TID 2604 is a 5 byte number. Bit 39 and bits 38-31 are 0. Bits 30-16 are the machine ID. Bits 15-0 are the tape number. As described above, the 15 bit machine ID is a random number generated by the indexing VCR 10 at its first power up. This provides a 1 in 32,768 probability that two indexing VCRs have identical machine IDs. A 16 bit tape number allows each indexing VCR 10 to have 65,536 tapes stored in the RAM 33. Alternatively, the tape number may be composed of a different number of bits.

FIG. 31 is a schematic diagram showing the TID for a PR tape. As with the TID for an HR tape, the TID for a PR tape is a 5 byte number. Bit 39 is one, bits 38-0 are the eleven digit UPC number represented in binary form without the parity digit. By using the UPC number, businesses, such as libraries, tape rental stores, and retail outlets, can adopt the TID. Accordingly, usage of PR tapes can be monitored and analyzed. When the TID is stored into the RAM 33, 5 bytes is preferred. However, if only 4 bytes are recorded, bits 0-30 and bit 39 are stored in the RAM 33.

Third Embodiment of Data Format

A data packet comprises, in sequential order, a header, a body and an end. Each header includes both a start code and a type code. The type code identifies the type of data packet. A block number (or program number (PN) for a DN data packet) and a code for the total number of blocks may follow the type code. The body comprises the information bytes of the data packet. The information bytes may be encrypted as described above. The end comprises in sequential order, a checksum, a stop code, and an XOR byte. The checksum makes the modulo 128 sum of the data packet from the start code to the checksum byte equal to 0. A stop code following the checksum is equal to 0F hex to indicate the end of the data packet. The XOR byte provides one bit error correction for the data packet. The XOR byte is equal to the XOR of all bytes from the start code to the stop code. The start code is an odd byte in the VBI line. The checksum byte is an even byte to avoid misinterpreting the checksum as a start code. A null byte equal to 00 hex is provided in the data packet, if the checksum byte or the start code is not in the right position.

DN Packet

Figure 32:
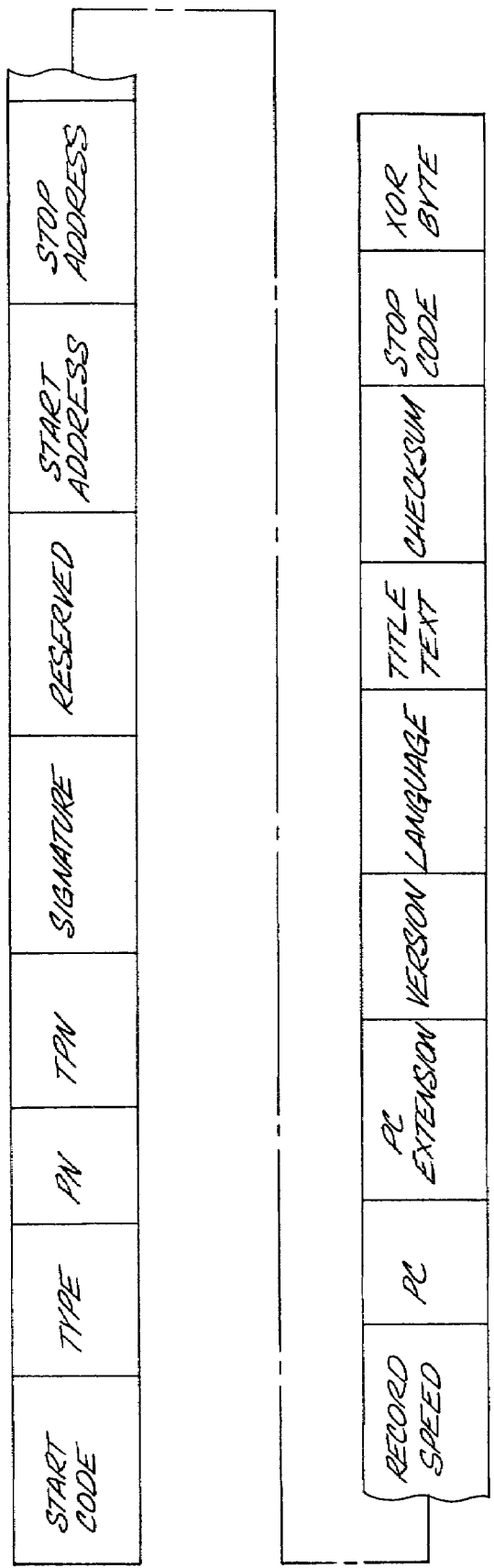
FIG. 32 is a schematic view showing the format for the directory (DN) packet recorded in the VBI for prerecorded tapes.
Figure 33:
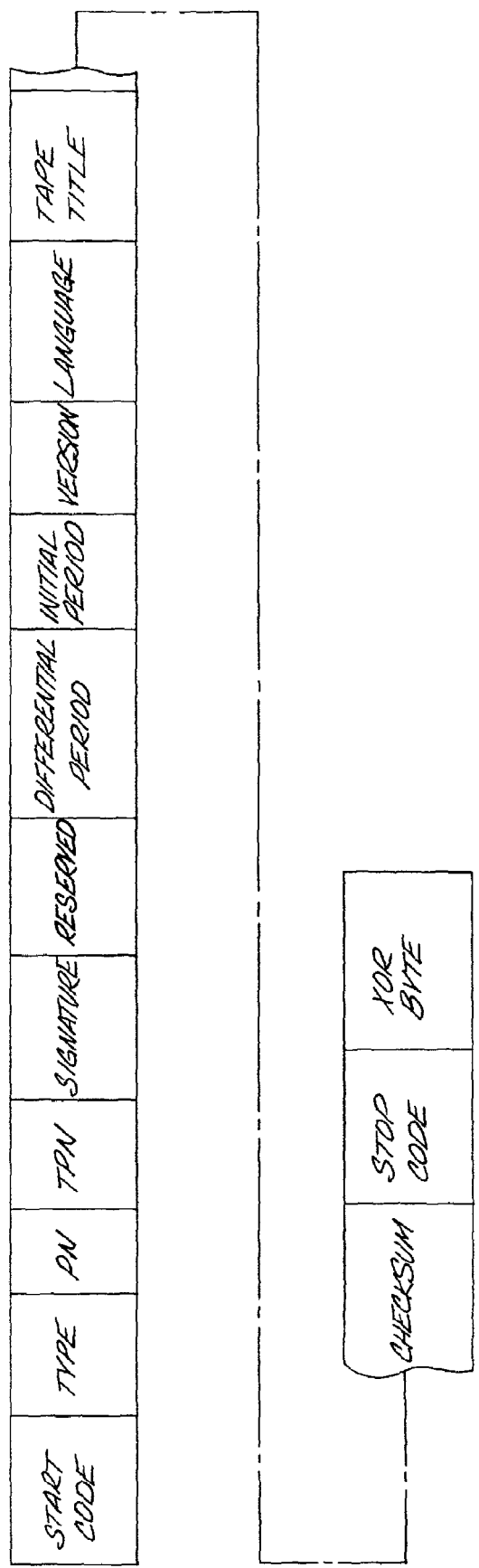
FIG. 33 is a schematic view showing the format for the directory packet D0 for the tape title recorded in the VBI for prerecorded tapes.

FIG. 32 is a schematic view showing the format for the directory (DN) packet recorded in the VBI for prerecorded tapes. The DN data packet contains the information of a program entry in the directory. The DN data packet may be recorded on any VBI line in either the 1× or 2× format. A DN packet 2601' has the following symbols: start code, type, program number (PN), total number of programs (TPN), signature, reserved, start address, stop address, record speed, program category (PC), program category (PC) extension, version, language, title text, checksum, stop code, and XOR byte. The start address, stop address, record speed, program category, program category extension, version, language, and title text symbols are encrypted by an algorithm in the microprocessor controller 31 (FIG. 5) or the controller 702 (FIG. 11) in the indexing VCR 10. The PN symbol represents the program number in the directory when N is greater than 0. Each byte is a coded text number from 30 hex to 3F hex which equates to 0 hex to F hex (when N equals 0, the D0 packet described below in conjunction with FIG. 33 is used to represent the title of the tape). The first byte represents the most significant four bits. The indexing VCR 10 assigns a PN to each recording. The first program recorded is assigned a PN=1 and is increased monotonically for each successive recording. The TPN symbol represents the total number of programs in the directory. The signature symbol identifies DN. The start address symbol represents the number of minutes measured in the SLP mode from the beginning of the tape to the beginning of the program. The stop address symbol represents the number of minutes measured in the SLP mode from the beginning of the tape to the end of the program. Each byte of the start address and stop address symbols is a coded hexadecimal number from 30 hex to 3F hex which form a number having a largest possible value of FFF hex. A record speed symbol defines the recording speed of the program. An "undefined" recording speed is used when the recording speed changes during a program. Undefined values are reserved for further expansion. A program category (PC) symbol is defined per the EIA-608 standard. The version symbol identifies the version of the program titled format. For versions other than 20 hex, the indexing VCR 10 ignores the following bytes up to a terminator code (which is preferably 1E hex) and displays the titled text as a blank line. A language symbol represents different languages. The title text symbol has a length of m bytes where m is a variable even number, preferably not greater than 41, including the 1E hex terminator code. The title text symbol represents the program title in ASCII and is terminated by the character 1E hex. In addition, an attribute character can be added to the title text to enhance the indexing display. The attribute character starts with a value of 1D hex which is followed by a character in the range 20 hex to 7F hex. Attribute codes are defined below in conjunction with FIG. 84. The checksum symbol is defined above.

TABLE IX

| Symbol | Length (Bytes) | Value |
|---|---|---|
| Start code | 1 | 07 hex. |
| Type | 1 | 7E hex. |
| PN | 3 | Each byte coded hex number. Range: 30-3F hex. Tape title: PN = 00. Re-indexed: PN = 4095. |
| TPN | 3 | Same format as PN. |
| Signature | 3 | PR type: 20 hex. |
| Reserved | 2 | Set at 20 hex, 20 hex. |
| Start Address | 3 | Each byte coded hex number. Range: 30-3F hex. |
| Stop Address | 3 | Each byte coded hex number. Range: 30-3F hex. |
| Record Speed | 1 | 20 hex: SP 21 hex: LP 22 hex: SLP 23 hex: blank 24 hex: undefined Others: reserved. |
| Program category (PC) | 1 | Per EIA-608 standard. 20 hex: category refers to PC. 21 hex: video magazine. 22 hex: sales catalog. 23 hex: classified ads. 24 hex-7F hex: reserved. |
| Version | 1 | 20 hex: first version. |
| Language | 1 | 20 hex to 7F hex, 20 hex: English |
| Title text | m | Terminator code: 1E hex. |
| Checksum | 1 | 00 hex-7F hex. |
| Stop code | 1 | 0F hex. |
| XOR byte | 1 | XOR result of bytes from start code to stop code. |
| D0 Packet | | |

FIG. 33 is a schematic view showing the format for the directory packet D0 for the tape title recorded in the VBI for prerecorded tapes. A D0 data packet 2602' has the following symbols in order: start code, type, PN, TPN, signature, reserved, differential period, initial period, version, language, tape title, checksum, stop code, and XOR byte.

Table X shows the length in bytes and the value of each symbol. The D0 data packet 2602' is similar to the DN data packet 2601 described below in FIG. 32 where the parameters, start address, stop address, record speed, and program category are redefined to denote the length of tape, the differential period, and the initial period. The D0 data packet 2602' is predefined as the tape parameter packet for PR tapes. The D0 packets alternate with the DN packets, e.g., D0, D1, D2 . . . Dn, D0, D1, . . . Dn. The type code is the same as that of the DN packet but the PN is zero. The length symbol indicates the length of the tape in minutes at the SLP speed. Each byte is a coded hexadecimal number which provides a value in the range of 000 hex to FFF hex. The differential period is the change in the rotational period of the supply reel in one revolution, measure in microseconds at SLP speed. This period is proportional to the thickness of the video tape. The largest number is 65535 µs (FFFF hex) which corresponds to a tape thickness of 34 0.mm. The initial period is the rotational speed at SLP speed of the supply reel at the hub in units of 0.1 seconds. The largest time is 25.5 seconds. The length of the title text is in bytes where m is a variable even number including the terminator character. The title text symbol represents the tape title in ASCII and is terminated by the character 1E hex. An attribute character may be added to the text at a later stage.

TABLE X

| Symbol | Length (Bytes) | Value |
|---|---|---|
| Start Code | 1 | 07 hex |
| Type | 1 | 7E hex |
| PN | 3 | Byte 1, 2, 3: 30 hex, 30 hex, 30 hex |
| TPN | 3 | Each byte coded hex number. Range 30 hex-3F hex. |
| Signature | 3 | PR tape: 20 hex |
| Reserved | 2 | Set at 20 hex, 20 hex. |
| Length | 3 | Each byte coded hex number 30 hex to 3F hex. Undefined length = 0. Maximum 4095. |
| Differential Period | 4 | Each byte coded hex number. Range: 30 hex-3F hex. Zero: undefined differential period. |
| Initial period | 2 | Each byte coded hex number, 30 hex-3F hex. Zero: undefined initial period. |
| Version | 1 | 20 hex: first version |
| Language | 1 | 20 hex to 7F hex, 20 hex: English |
| Tape title | m | Variable odd number. Terminator code: 1E hex |
| Checksum | 1 | 00 hex-7F hex. |
| Stop Code | 1 | 0F hex. |
| XOR Byte | 1 | XOR result of all bytes from start code to stop code. |

FIG. 34 is a schematic view showing the format for a TPA packet recorded on the VBI for HR tapes and PR tapes. A TPA packet 2603' contains a TID, a year and month indicator for decryption, a program number, and an absolute address. The TPA packet 2603' has the following symbols: start code, type, tape identification (TID), program number (PN), absolute address, year, month, null byte, checksum, stop code, and XOR byte. The TPA packet is written on VBI line 19, both fields in 1× format. For PR tapes, the TPA packet is written repeatedly over the tape in succession. For HR tapes, the TPA packet is written in sections in which recording using indexing is done. The TPA packet is written typically at least once per 1.5 seconds. The TPA packet is not encrypted.

Table XI shows the length in bytes and the value for each symbol. The TID symbol contains 10 bytes where each byte represents 4 bits, as will be described for the TID described below for an HR tape and for a PR tape. The MSB is first. The TID is retrieved either upon user request or, if it is not known, before starting to record. For communication between the indexing VCR 10 and the external device 73, the 12 bit item N may be used for other purposes.

The program number is the current program in video. The absolute address is the current location of the tape preferably in units of ¼ minute measured from the beginning of the tape in SLP speed. The year and month are the year and month, respectively, when the program was recorded.

TABLE XI

| Symbol | Length (Bytes) | Value |
|---|---|---|
| Start Code | 1 | 07 hex |
| Type | 1 | 7D hex |
| TID | 10 | Each byte is coded hex number 30 hex-3F hex |
| PN | 3 | Each byte is coded hex number 30 hex-3F hex. PN = 0: temporary TPA. PN 4095: reserved for re-indexed PN number. |
| AA | 4 | Each byte is coded hex number 30 hex-3F hex. If no absolute address used, set each byte to 3F hex |
| Year | 2 | Hex codes binary, range: 00-99. |
| Month | 1 | Coded hex format 31 hex-3C hex. |
| Null byte | 1 | 00 hex. |
| Checksum | 1 | |
| Stop code | 1 | 0F hex |
| XOR byte | 1 | XOR results of all bytes from start code to stop code. |

The TID for an HR tape is similar to that of the TID for the TP packet shown in FIG. 30. The TID 2604 is a 5 byte number. Bit 39 is zero to identify the tape as an HR tape. Bits 38-31 are reserved and may all be set to 0. Bits 30-16 are the machine ID (MID). Bits 15-0 are the serial number (SN). (In the TID for the TPA packet, the corresponding bits are the tape number). As described above, the 15 bit machine ID is a random number generated by the indexing VCR 10 at its first power up. This provides a 1 in 32,768 probability that two indexing VCRs have identical machine IDs. A 16 bit tape number allows each indexing VCR 10 to have 65,536 tapes stored in the RAM 33. The user may change the tape number. The user may not change the serial number. Alternatively, the tape number may comprise a different number of bits. Also alternatively, one value of the TID such as FFFFhex, may be used as a temporary TID. The TID is generated by the manufacturer or publisher of the PR tape.

In this format, the TID for a PR tape is similar to that of the TID for the TP packet shows above in FIG. 31. As is the TID for an HR tape, the TID for a PR tape is a 5 byte number. Bit 39 is one to identify the tape as a PR tape; bits 38-0 are the eleven digit unified Product Code (UPC) number (or a number generated therefrom) represented in binary form without the parity digit. By using the UPC number, businesses, such as libraries, tape rental stores, and retail outlets, can adopt the TID. Accordingly, usage of PR tapes can be monitored and analyzed. When the TID is stored into the RAM 33, 5 bytes are preferred. However, if only 4 bytes are recorded, bits 0-30 and bit 39 are stored in the RAM 33.

Figure 35:
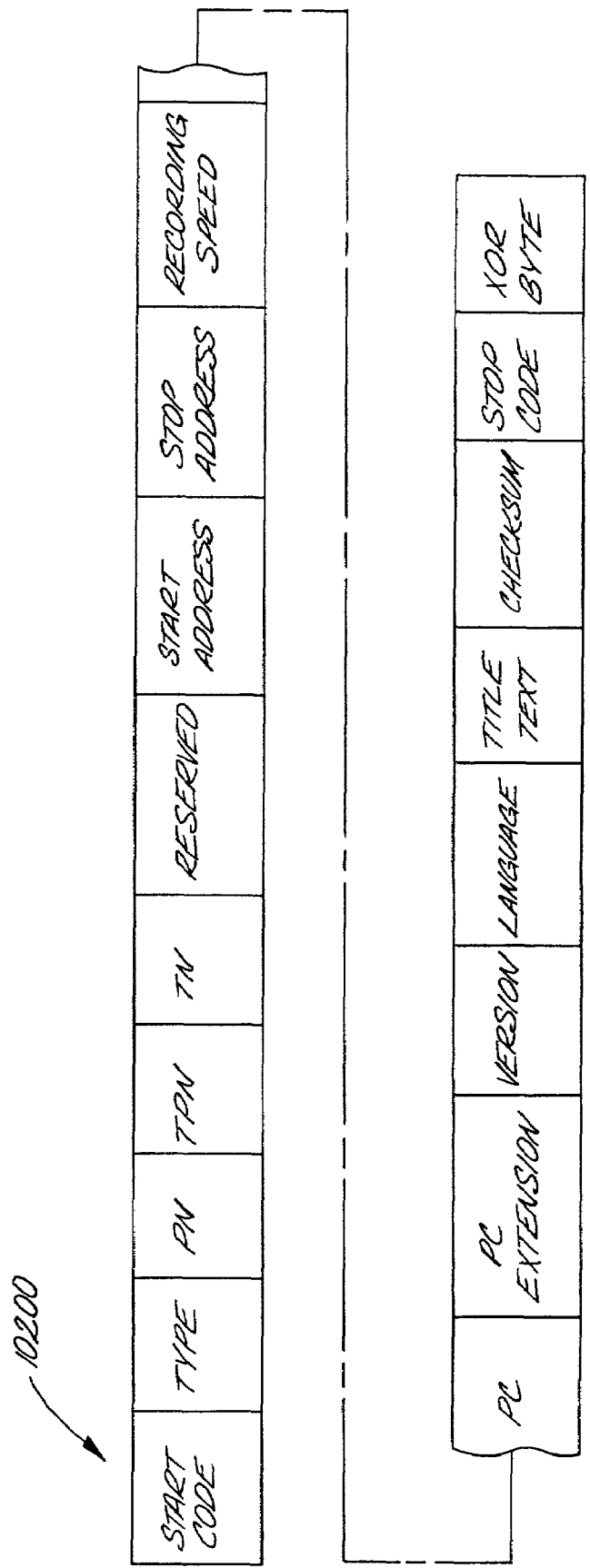
FIG. 35 is a schematic diagram showing the format for the backup directory (DNB) data packet used for manual backup of the entire library in the indexing VCR.

FIG. 35 is a schematic diagram showing the format for the backup directory (DNB) data packet used for manual backup of the entire library in the indexing VCR. A DNB 10200 data packet has the following symbols in order: start code, type, program number (PN), total number of programs (TPN), tape number (TN), reserved, start address, stop address, recording speed, program category (PC), program category (PC) extension, version, language, title text, checksum, stop code, and XOR byte.

Table XII shows the length in bytes and the value of each symbol. The DNB data packet is similar to the D(N) data packet described above in FIG. 32 where the tape number (TN) is attached to each DN and replaces the signature symbol to identify the programs from different tapes. The DNB data packet is written on any VBI lines continuously in the 1× format with each DN separated by 10 to 200 null bytes (00 hex) and each tape is separated by 50 to 200 null bytes (00 hex). Except as described below, the symbols of the DNB data packet have identical definitions to those having identical symbols in the D(N) data packet. The tape number (TN) symbol is the tape number of the directory containing the program of the DNB data packet. For the recording speed symbol, bit 5 of the byte indicates the absence of a VISS mark for a programs that has been over recorded. Each tape directory is written twice before writing the next tape directory, e.g., tape 1, tape 1, tape 2, tape 2 . . . tape n, tape n. (Alternatively, the directory for all tapes may be written before writing the directory again, e.g., tape 1 . . . tape n, tape 1 . . . tape n.)

TABLE XII

| Symbol | Length (Bytes) | Value |
|---|---|---|
| Start code | 1 | 07 hex |
| Type | 1 | 78 hex |
| PN | 3 | Each byte coded hex number. Range: 30 hex to 3F hex. PN = 0: reserved for tape title (see DOB packet below). PN = 4095: reserved for re-indexed PN number. |
| TPN | 3 | Each byte coded hex number from 30 hex to 3F hex. |
| TN | 3 | Each byte is a coded hex number from 30 hex to 3F hex. |
| Reserved | 2 | Reserved for further expansion. Each byte is 20 hex in the current version. |
| Start address | 3 | Each byte is a coded hex number from 30 hex to 3F hex. |
| Stop address | 3 | Same format as start address. |
| Rec speed | 1 | 20 hex: SP<br>21 hex: LP<br>22 hex: SLP<br>24 hex: undefined speed (speed changed during recording)<br>No VISS mark for overrecording.<br>60 hex: SP<br>61 hex: LP<br>62 hex: SLP<br>64 hex: undefined speed<br>Others: reserved |
| Program Category | 1 | Per EIA-608 definition. |
| PC extension | 1 | 20 hex: category refer to PC;<br>21 hex: video magazine;<br>22 hex: sales catalog;<br>23 hex: classified adds;<br>24-27F hex: future expansion. |
| Version | 1 | 20 hex-7F hex. 20 hex: first version. |
| Language | 1 | 20 hex-7F hex, 20 hex: English. |
| Title Text | m | Terminator code: 1E hex. |
| Check sum | 1 | 00 hex-7F hex. |
| Stop code | 1 | 0F hex. |
| XOR byte | 1 | XOR result of all bytes from start code to stop code. |

Figure 36:
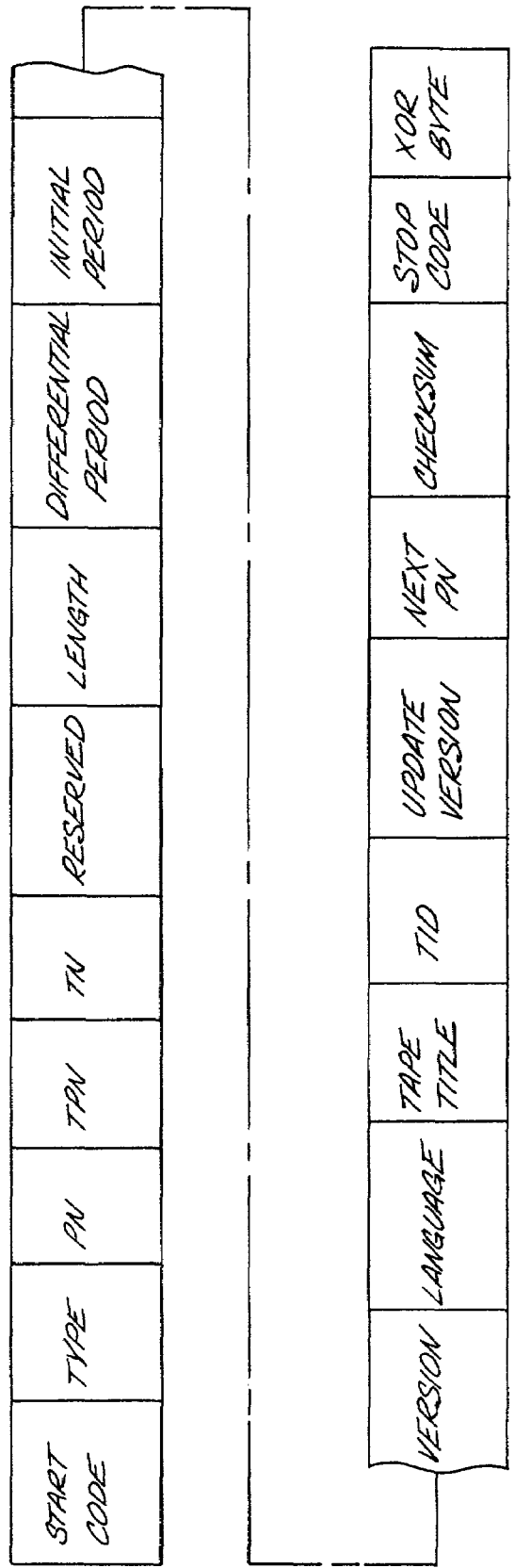
FIG. 36 is a schematic view showing a format for the backup directory (D0B) packet recorded in the VBI of home recorded tapes.

FIG. 36 is a schematic view showing a format for the backup directory (D0B) packet recorded in the VBI of home recorded tapes. The D0B packet 10201 is similar to the DNB data packet, except that the tape identification number (TID), the update version, and the next available program number is added to the DNB packet when the program number (PN) symbol equals 0. The D0B packet has the following symbols: start code, type, program number (PN), total number of programs (TPN), tape number (TN), reserved, length, differential period, initial period, version, language, tape title, tape identification number (TID), update version, next program number (PN), checksum, stop code, and XOR byte. Except as defined below, the symbols of the D0B packet have the same definition as corresponding symbols of the D0B packet defined above. The TPN symbol is the total number of programs in the directory. The TID symbol indicates the TID of the tape which contains the directory. The update symbol indicates the updated version number for comparing the directories stored in external memory and internal memory. The next program number symbol indicates the next available program number of the tape for recording.

TABLE XIII

| Symbol | Length (bytes) | Value |
| --- | --- | --- |
| Start code | 1 | 07 hex. |
| Type | 1 | 78 hex. |
| PN | 3 | 30 hex, 30 hex, 30 hex. |
| TPN | 3 | Each byte is a coded hex number from 30 hex-3F hex. |
| TN | 3 | Each byte is a coded hex number from 30 hex to 3F hex. |
| Reserved | 2 | Set at 20 hex. |
| Length | 3 | Each byte is a coded hex number from 30 hex to 3F hex. Zero: undefined length. |
| Differential | 4 | Each byte is a coded hex number from 30 hex to 3F hex. The largest number is FFFF hex = 65535 us, which is good enough for tape thickness up to 0.34 mm. Zero: undefined differential period. |
| Initial period | 2 | Each byte is a coded hex number from 30 hex to 3F hex. The largest number is 25.5 sec. Zero: undefined initial period; |
| Version | 1 | 20 hex: first version. |
| Language | 1 | 20 hex-7F hex, 20 hex: English. |
| Tape title | m | Variable odd number. Terminator code: 1E hex. |
| TID | 10 | Each byte is a coded hex number 30 hex-3F hex. |
| Update | 3 | Each byte is a coded hex number 30 hex-3F hex. |
| Next PN | 3 | the next available PN of the tape for recording; |
| Check sum | 1 | 0 hex-0F hex. |
| Stop code | 1 | 0F hex; |
| XOR | 1 | XOR result of all bytes from start code to stop code. |

A tape directory (DNT) data packet 10202 (not shown) is used for downloading and uploading the directory of a tape. The DNT data packet 10202 has a format similar to that of the directory (DN) data packet for prerecorded tapes (described above), except that the record speed symbol is also used to allow the indexing VCR to add a no VISS mark flag. For example, bit 6 of the record speed may be set to instruct the VCR not to add a VISS mark. The DNT data packet is not encrypted and is written in an alternate pattern with the TPA data packet, e.g., on VBI line 19.

Table XIV shows the symbols that differ from the DN data packet.

TABLE XIV

| DNT Packet Symbol | Length (bytes) | Value |
| --- | --- | --- |
| Rec speed | 1 | 20 hex: SLP. |
| | | 21 hex: LP. |
| | | 22 hex: SLP. |
| | | 24 hex: undefined speed. |
| | | No VISS for overrecorded program. |
| | | 60 hex: SLP. |
| | | 61 hex: LP. |
| | | 62 hex: SLP. |
| | | 64 hex: undefined speed. |

FIG. 37 is a schematic view showing the format for the automatic backup (ABU) data packet used in the automatic backup function. Because the information in the ABU packet is the backup to a library for a particular indexing VCR, the information need not be readable by another VCR. Accordingly, the content symbol format of the ABU packet may be any format as long as it is readable by the indexing VCR in which the tape was recorded for restoring the library, except the data must not be mistakable for a start code. For the specific implementation herein, the content symbol should not be in the range of 00 hex to 0F hex. The ABU data packet is written in VBI line 19 alternately with the TPA data packet using the 1× format.

Table XV shows the symbols, the length in byte, and the value for the ABU data packet. The ABU data packet 10203 has the following symbols: start code, type, content, checksum, stop code, and XOR byte.

TABLE XV

| ABU packet symbol | Length (bytes) | Value |
| --- | --- | --- |
| Start code | 1 | 07 hex. |
| Type | 1 | 76 hex. |
| Content | m | m can be an odd number from 1 to 59. Any format except that no byte shall be within the start code range of 00 hex to 0F hex. |
| Check sum | 1 | 0 hex-F hex. |
| Stop code | 1 | 0F hex. |
| XOR byte | 1 | XOR result of all bytes from start code to stop code. |

Operation

Figure 38:
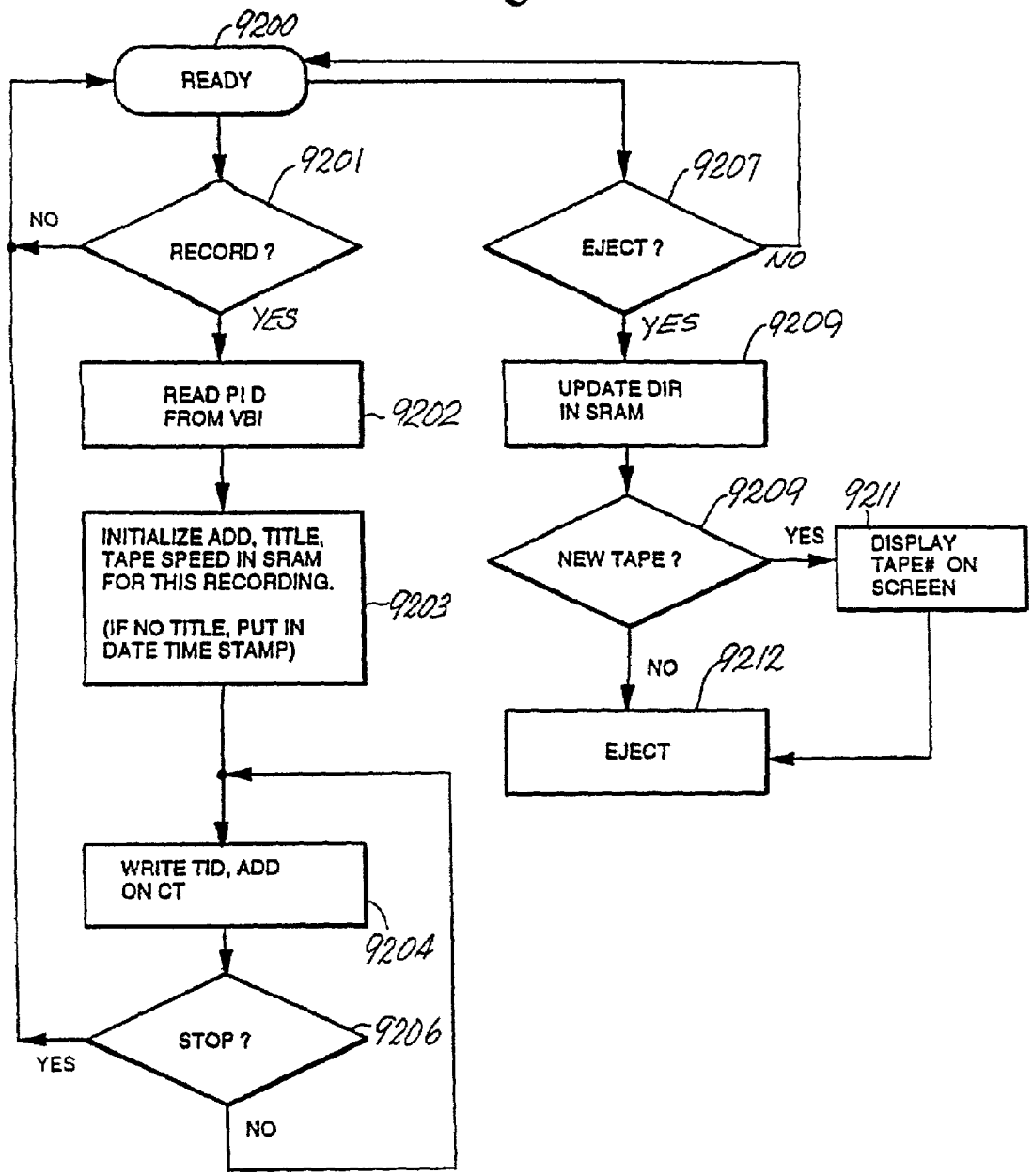
FIG. 38 is a flow chart showing the steps employed in the operation or an indexing VCR using a FMAS addressing system for writing a tape identification number, an address, and a directory to a home recorded tape (HR tape) during recording or ejection.

FIG. 38 is a flow chart showing the steps employed in the operation of an indexing VCR using a FMAS addressing system for writing a tape identification number, an address, and a directory to a home recorded tape (HR tape) during recording or ejection. When a tape is in the VCR and the directory controller 30 knows the present tape identification number and the current address, the VCR is ready for recording on the tape or ejecting the tape (step 9200). The microprocessor controller 31 reads the TID and the address from the control track 42c. For existing HR tapes, the TID and address are read from the control track 42c. For a new blank tape, the microprocessor controller 31 assigns a TID to the tape and resets the address to zero. The microprocessor controller 31 waits for either a record signal or an eject command. If a record signal is received (step 9201), the microprocessor controller 31 reads the program identification number from the VBI of the signal that is to be recorded (step 9202). It is assumed that the microprocessor controller 31 has already retrieved the directory for the inserted tape if the inserted tape is an existing HR tape. For a new blank tape, the microprocessor controller 31 creates a new directory in the RAM 33. For this recording, the microprocessor controller 31 initializes the address, the title and the tape speed in the RAM 33. If no title is read from the VBI (step 9202), the microprocessor controller 31 uses a date time stamp as the title (step 9203). The microprocessor controller 31 then commands the VCR control logic circuit 21 and subsequently the control and audio track head logic circuit 11 to write the TID and the address on the control track 42*c*. (step 9204) The microprocessor controller 31 continues to write the date and address on the control track 42*c* until a command to stop recording is received. (step 9206) The microprocessor control 31 then returns to a ready state where it awaits a further command at step 9200.

On the other hand, if a command to eject the tape is received (step 9207), the microprocessor controller 31 updates the directory that is stored in the RAM 33, including the current tape location (current LOC) flag 1049 (See FIG. 7) which indicates the absolute address of the location of the tape when the tape is ejected referenced to the beginning of the tape. If the tape is a new blank tape (step 9209), the microprocessor controller 31 displays on the video display 50*a* the tape number of the tape, so that the user can then mark the housing of the cassette 40 with this new number for subsequent identification. The VCR control logic circuit 21 then commands the motor and mechanical control circuit 5 to eject the tape (step 9212).

Figure 39:
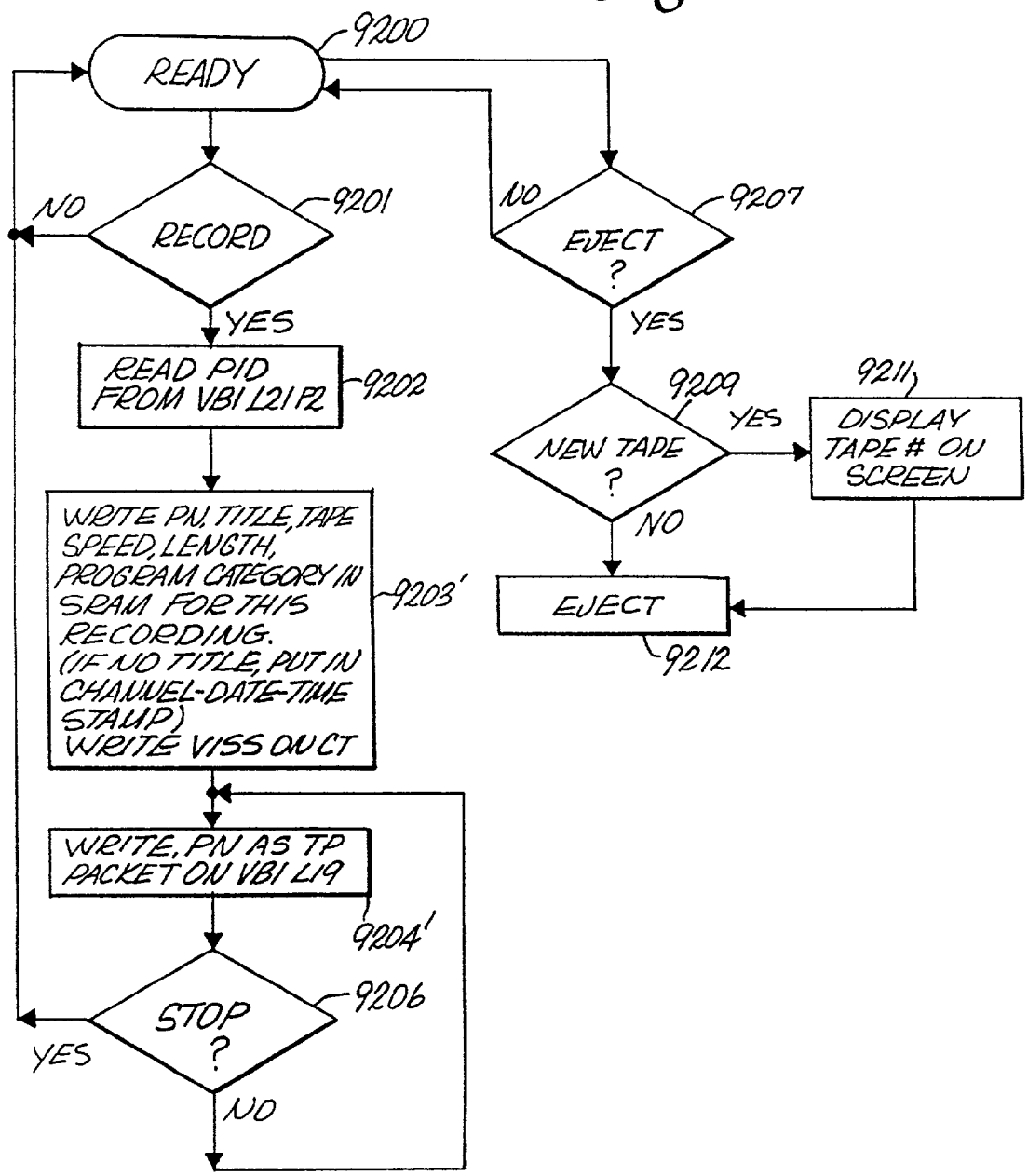
FIG. 39 is a flow chart showing the steps employed in the operation of an indexing VCR using a VISS PLUS TP addressing system of writing a tape identification and a program number to a home recorded tape (HR tape) during recording.

FIG. 39 is a flow chart showing the steps employed in the operation of an indexing VCR using a VISS PLUS TP addressing system of writing a tape identification and a program number to a home recorded tape (HR tape) during recording. Like steps to FIG. 38 have like numbers. When a tape is in the VCR and the directory controller 30 knows the present tape identification and the current program number, the indexing VCR 10 is ready for recording on the tape or ejecting the tape (step 9200). The microprocessor controller 31 reads the TID and the program number from the VBI. For a new blank tape, the microprocessor controller 31 assigns a TID to the tape and resets the program number to one. The microprocessor controller 31 waits for either a record signal or an eject command.

When a record signal is received (step 9201), the microprocessor controller 31 reads the program identification (Program I.D.) from line 21, field 2 of the VBI of the signal that is to be recorded (step 9202). It is assumed that the microprocessor controller 31 has already retrieved the directory for the inserted tape if the inserted tape is an existing HR tape. For a new blank tape, the microprocessor controller 31 creates a new directory in the RAM 33. For this recording, the microprocessor controller 31 initializes the program number (and address in VCRs having an absolute address system), the title, the tape speed, length, and the program category in the RAM 33. If no title is read from the VBI (step 9202), the microprocessor controller 31 uses a date-time stamp as the title. (step 9203') The microprocessor 31 then commands the VCR control logic circuit 21 and subsequently the control and audio track head logic circuit 11 to continuously write the TID and the program number as a TP data packet on line 19 of the VBI (step 9204'), until a command to stop recording is received. (step 9206) The microprocessor control 31 then returns to a ready state where it awaits a further command at step 9200.

On the other hand, when a command to eject the tape is received (step 9207), if the tape is a new blank tape (step 9209), the microprocessor controller 31 displays on the video display 50*a* the tape number of the tape, so that the user can then mark the housing of the cassette 40 with this new number for subsequent identification. The VCR control logic circuit 21 then commands the motor and mechanical control circuit 5 to eject the tape (step 9212).

After the indexing VCR 10 has started a recording, it reads line 21 field 2 to find the title of the show and write it into the directory in the RAM 33. If the clock of the indexing VCR 10 has not been set correctly or if the program starts slightly later than scheduled, the retrieved title may be that of the previous program. In one embodiment, the indexing VCR 10 waits a predetermined time, such as 30 seconds, after the recording starts before reading and storing the title. On the other hand, for the recording of broadcasted video magazines, the indexing VCR 10 may read and store the title right after receiving the VM packet, because the VM packet and the new section title are synchronized.

Retroactively Indexing A Previously Recorded Tape

Figure 40:
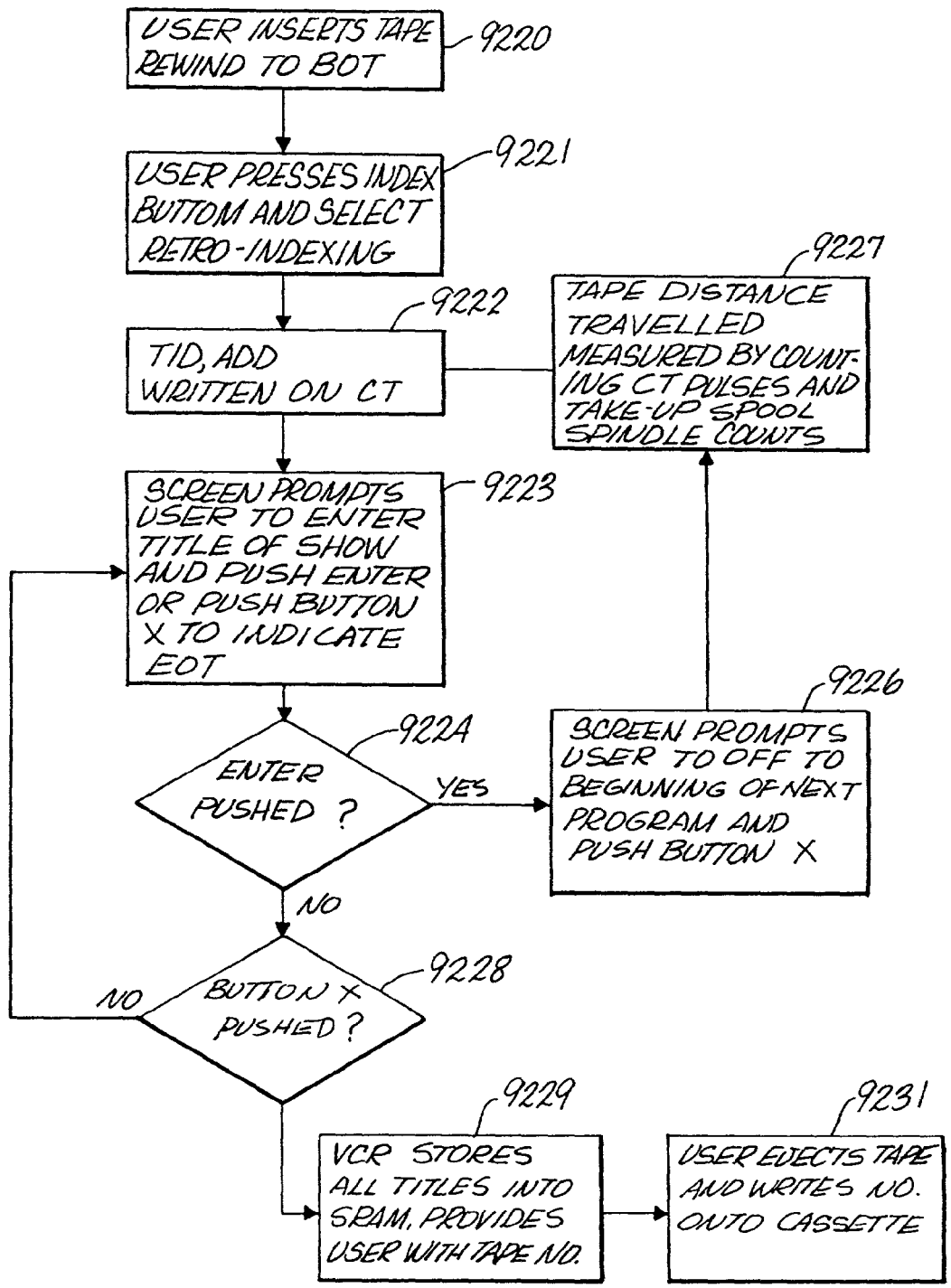
FIG. 40 is a flow chart showing the steps employed to write a tape identification, an absolute address and a directory to create a retroactively indexed tapes by an indexing VCR using a FMAS or LRAS addressing system.

FIG. 40 is a flow chart showing the steps employed to write a tape identification, an absolute address and a directory to create a retroactively indexed tapes by an indexing VCR using a FMAS or LRAS addressing system. As described above, the retroactively indexed (RI) tape has a preexisting plurality of programs recorded thereon. A user who has a VCR or camcorder before owning an indexing VCR also has an existing collection of video tapes. The user may want to retroactively create an index of each tape to be able to utilize the indexing capabilities of the indexing VCR. Thus, in the preferred embodiment, the directory is created and stored in the RAM 33, and the TID and the absolute addresses are stored on the control track 42C of the RI tape.

The user inserts the un-indexed recorded tape (this tape is to become a retroactively indexed tape) into the VCR 1 and rewinds the tape to the beginning of the tape (BOT) (step 9220). The user then presses the index button on the remote controller 75 and selects retro-indexing from the menu display on the screen 50*a* (step 9221). Alternatively, the remote controller 75 may have a Retroactive Index button. Upon that selection, the microprocessor controller 31 then writes a TID and an absolute address on the control track 42C (step 9222). The TID is randomly created in the manner described above in FIG. 26. The microprocessor controller 31 then displays on the display 50*a* a prompt to the user to enter the title of the first program or show on the tape and to press the ENTER button on the remote controller 75 or alternatively to push button X to indicate that it is at the end of the tape (EOT) (step 9223). Button X may be any button on the remote controller 75 that is not used for entering a title, for example the VCR Plus+™ button. Alternatively, the title of programs may be entered after all programs have been numbered. If the ENTER button has been pushed (step 9224), the microprocessor controller 31 then prompts the user on the video display 50 to fast forward (FF) the tape to the beginning of the next program and push button X (step 9226). The microprocessor controller 31 using the monitored signals from the tape movement sensor 22 and processed by the position logic and counter circuit 9 to calculate the tape distance traveled measured by counting the control track pulses and take-up spool spindle counts as described below (step 9227). Tape distance measuring methods are described below. The microprocessor controller 31 then repeats the process of writing the TID and the address on the control track 42C at step 9222 and prompts the user to enter the title of the show at step 9223. At subsequent passes through step 9222, the address now written on the control track 42C is the address calculated from the tape distance that has been traveled during the fast forward to the program at step 9227.

When button X has been pushed to indicate the end of tape (step 9228), the microprocessor controller 31 stores all the titles entered by the user at step 9223 into the RAM 33 in a memory location corresponding to the tape identification number (step 9229). The microprocessor controller 31 also displays the tape number to the user at step 9229 so that when the user ejects the tape he may write the tape number onto the cassette housing (step 9231). The tape has now been retroactively indexed so that the control track 42C contains the TID and address information and the directory information is stored in the RAM 33 of the VCR 1. The operation of the VCR when an RI tape is inserted therein is described below in connection with FIG. 42.

In an alternate embodiment to FIG. 40, at step 9222, the microprocessor controller 31 writes a VISS mark on the control track of the tape. In addition, a program number, such as 1 for the first program, 2 for the second program, and so forth, and a TID number are also written on the control track. The VISS marks are used for addressing when the tape is later played in the VCR. When the tape is inserted into the indexing VCR 10, the VCR reads the TID from the control track 42c. The microprocessor controller 31 then reads the directory associated with the tape from the RAM 33. Now knowing that the tape is a retroactively indexed tape, the microprocessor controller 31 searches the control track 42c for the VISS mark.

In embodiments where the TID is stored in the VBI for PR and HR tapes, when the RI tape is inserted into the VCR, the microprocessor controller 31 tries to read a TID from the VBI. After failing to find a TID in the VBI, the microprocessor controller 31 knows the tape is not a PR or a HR tape, and searches the control track for a VISS mark. When a VISS mark is found, the microprocessor controller 31 reads the TID recorded with the VISS mark and then retrieves the associated directory from the RAM 33.

Alternate Embodiment for Retroactively Indexing A Previously Recorded

In an alternate embodiment to FIG. 40 for indexing VCRs using the VISS+TP addressing system, at step 9222 the microprocessor controller 31 writes a VISS mark on the control track 42c of the tape. The microprocessor controller 31 also generates a program number as described above in conjunction with FIG. 30. The microprocessor controller 31 prompts the user to enter the title of the show and to fast forward to the next program as shown in steps 9223, 9224, 9226, and 9228. In a system without absolute addressing, step 9227 is not performed. However, in systems with absolute addressing (VISS+TP+AA), the microprocessor controller 31 calculates an absolute address at step 9227. After the user has indicated that the last program has been entered at step 9229, the microprocessor controller 31 stores all titles, program numbers and the ejection program number into the RAM 33 and provides the user with a tape number for marking the cassette housing.

When this tape is later inserted into the indexing VCR 10, the microprocessor controller 31 attempts to find a TID in the VBI and when it is unable to find it, it displays a prompt to the user to enter the tape number. From this tape number, the microprocessor controller 31 reconstructs the TID and recovers the directory as well as the ejection program number from the RAM 33. Using the ejection program number as the current program number, the indexing VCR 10 is able to perform the indexing functions.

If the tape has been played in a non-indexing VCR since being indexed, the ejection program number will be different than the tape program number. In systems with absolute addresses, the indexing VCR 10 is able to recalculate its program number by using the detected address to determine its location from the directory, using the recalibration method described below in conjunction with FIGS. 43a-43b.

Figure 41:
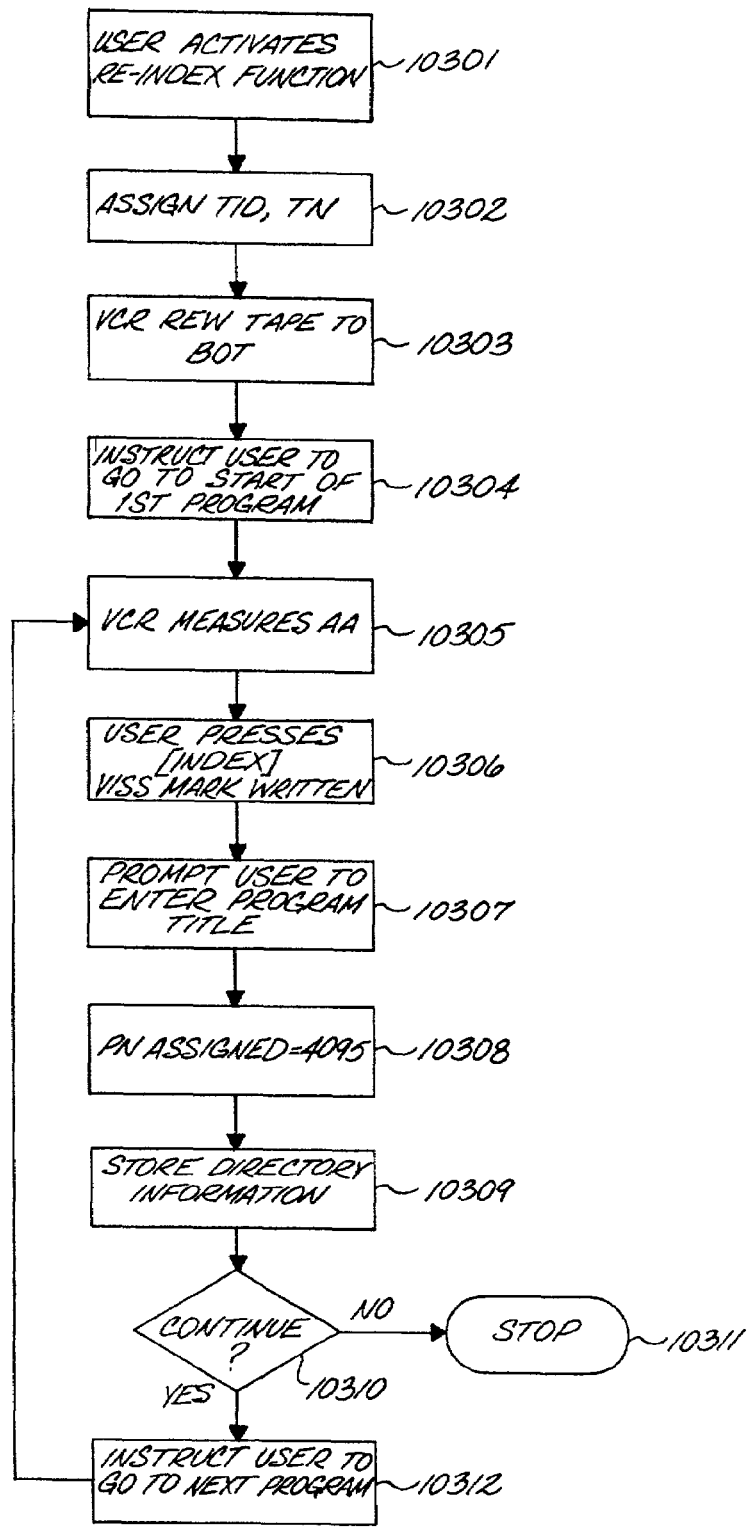
FIG. 41 is a flowchart showing the steps employed to retroactively index a previously recorded tape in an indexing VCR that uses TPA packets.

Alternate Embodiment (TPA Packet System) for Retroactively Indexing A Previously Recorded Tape FIG. 41 is a flowchart showing the steps employed to retroactively index a previously recorded tape in an indexing VCR that uses TPA packets.

In this embodiment, the directory is created and stored in the RAM 33, and VISS marks for indexing are recorded on the control track 42C of the RI tape.

The user inserts the un-indexed recorded tape (this tape is to become a retroactively indexed tape) into the VCR 1 and actuates the re-indexing by entering a selection from the indexing screen (step 10301). The microprocessor controller 31 assigns a tape identification number (TID) as described above in conjunction with FIG. 26 and a tape number (TN) to the tape (step 10302). (The microprocessor controller 31 also displays the tape number to the user so that when the user ejects the tape he may write the tape number onto the cassette housing.) The microprocessor controller 31 commands the VCR to rewind the tape to the beginning of the tape (BOT) (step 10303). The microprocessor controller 31 displays an instruction for the user to advance the tape to the start of the first program (step 10304). During such tape movement, the microprocessor controller 31 measures the absolute address using, for example, one of the methods described below (step 10305). In response to an INDEX command from the user, the microprocessor controller 31 writes a VISS mark in the control track 42c (step 10306). The microprocessor controller 31 then displays on the display 50a a prompt to the user to enter the title of the first program or show on the tape and to press the ENTER button on the remote controller 74 (step 10307). (Alternatively, the title of programs may be entered after all programs have been numbered.) The microprocessor controller 31 assigns a predetermined program number (such as the highest number in the data format, e.g., 4095) to the program (step 10308). (All programs are assigned program number 4095.) The microprocessor 31 then stores the directory information in the RAM 33 at a location for the associated TID (step 10309). The user indicates that the last program on the tape has been reached by pressing a button that is not used for entering a title, for example the VCR Plus+™ button (step 10310) and the indexing VCR exits the reindexing routine (step 10311). Otherwise, the microprocessor controller 31 then prompts the user on the video display 50 to fast forward (FF) the tape to the beginning of the next program (step 10312).

The tape has now been retroactively indexed with VISS marks at the beginning of each program. The associated directory information is stored in the RAM 33 of the VCR 10. The operation of the VCR when an RI tape is inserted therein is described below in connection with FIG. 43a-43b. In this embodiment, the TID is not written onto the tape. To perform indexing functions for this tape, the user enters the tape number in response to a prompt after the indexing VCR does not locate such a number on the tape. As with a home recorded tape, a newly recorded program is given a program number beginning with one for the first program to be recorded after retroactively indexing.

Operation of Identifying Tape and Recovering Directory

Figure 42B:
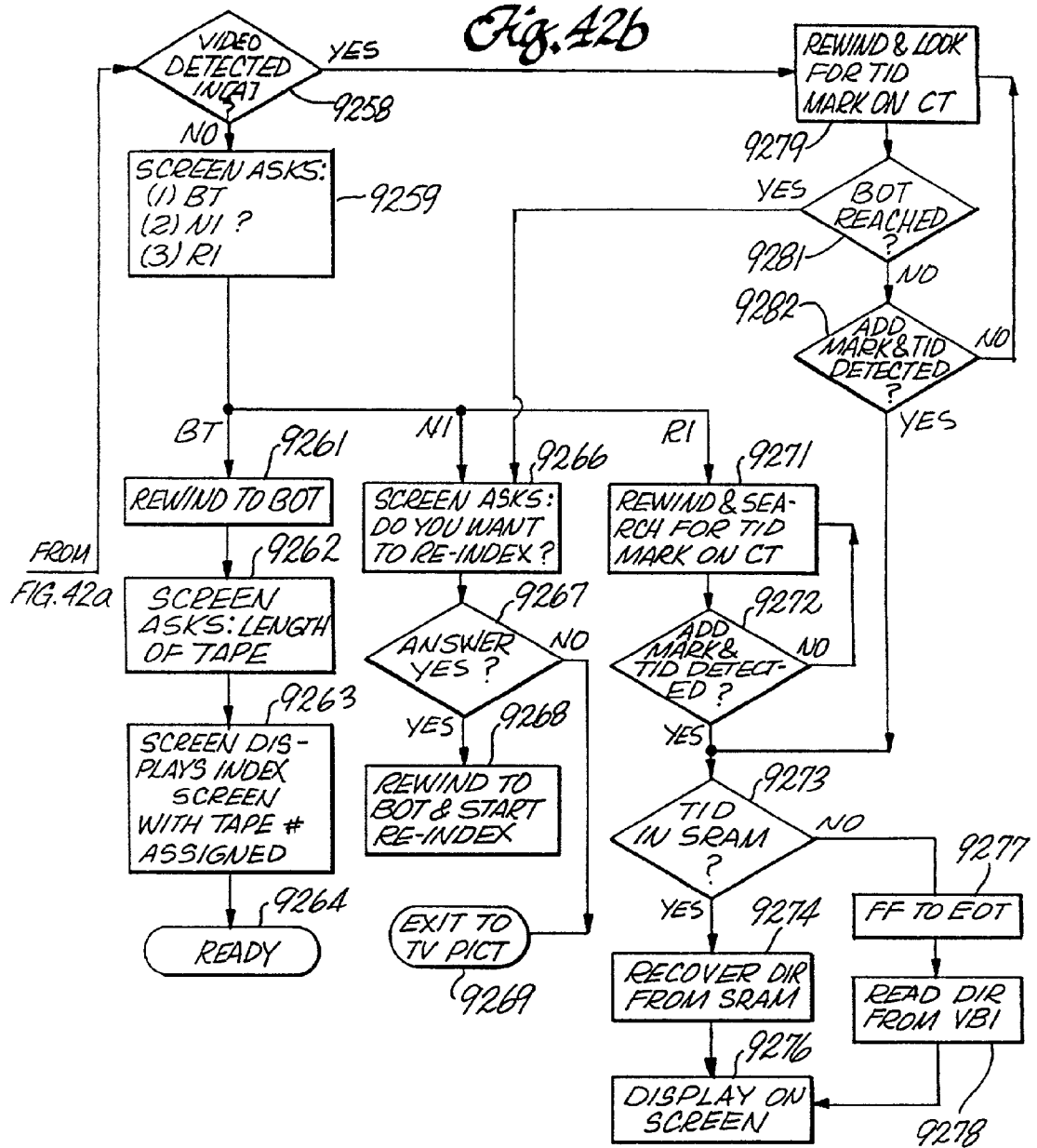

FIGS. 42a-42b are flow charts showing the steps employed in the operation of the indexing VCR using a FMAS addressing system when a tape is inserted therein. When a tape is inserted into the VCR (step 9240), the microprocessor controller 31 commands the VCR control logic circuit 21 to play the tape for N seconds and read the control track for the TID and an address (step 9241: this step is referred to as step [A] in subsequent steps of FIGS. 42a-42b). N is preferably between 3 to 5 seconds. (When the tape was previously ejected, the indexing VCR may rewind the tape for a predetermined time interval, e.g. 5 seconds of play time, to make the retrieval of the TID quicker.) After reading a TID and an address from the tape, the microprocessor controller 31 commands the VCR control logic circuit 21 to stop the playing of the tape (step 9242). The microprocessor controller 31 waits until the INDEX button on the remote controller is pressed (step 9243). When the INDEX button is pressed, if a TID and an address were read at step 9241 (step 9244), the microprocessor controller 31 determines from the TID whether the tape is (1) a home recorded tape (HR), (2) a prerecorded tape (PR), or (3) a home recorded (HR) loaner (step 9246).

If at step 9246 the tape is a HR tape (step 9247), the microprocessor controller 31 recovers the directory 33a corresponding to the tape with that TID from the RAM 33 (step 9248). The microprocessor controller 31 then displays the recovered directory on the video display 50a (step 9249) and then enters a ready mode (step 9251). The ready mode is a mode in which the microprocessor controller 31 knows the current address and the TID.

If at step 9246 it is determined that the tape is a prerecorded tape (step 9252), the microprocessor controller 31 reads the directory to determine if the TID is stored in the RAM 33 (step 9253). If it is in the RAM 33, the microprocessor controller 31 recovers the directory from RAM 33 as described above in step 9248. On the other hand, if the TID is not in the RAM 33, the microprocessor controller 31 commands the VCR control logic circuit 21 to play the tape so that the microprocessor controller 31 can read the directory from the VBI on the tape (step 9254) and then displays the read directory on the screen at step 9249. Alternatively, the indexing VCR 10 may read a portion of the directory, e.g., 10 programs, and store this portion in a temporary buffer. As the indexing VCR 10 continues to read the directory, it displays the portion of the directory in the temporary buffer. This allows the user to begin reviewing the directory more quickly than if the entire directory was read first and then displayed.

On the other hand, if the tape is determined to be a home recorded loaner tape (an HR tape that is indexed on a first indexing VCR that is played in a second indexed VCR that is not interconnected to the first VCR) at step 9246 (step 9256) the microprocessor controller 31 commands the VCR to fast forward (FF) to the end of tape (EOT) (step 9257) to read the directory from the VBI at step 9254.

However, if at step 9244 the VCR had not read a TID and address at step 9241, and referring now to FIG. 42b, the microprocessor controller 31 determines whether video was detected at step 9241 (step 9258). If no video was detected, the microprocessor controller 31 displays on the screen a query as to whether the tape is a blank tape, (BT), a non-indexed tape (NI), or a retroactively indexed tape (RI) (step 9259). If at step 9259 the tape is a blank tape, the microprocessor controller 31 commands the VCR control logic circuit 21 to rewind the tape to the beginning of tape (BOT) (step 9261) and display on the screen 50a a question asking the user to enter the length of the tape (step 9262). Alternatively, the microprocessor controller 31 may automatically determine the length of the tape using one of the length determination methods described below. The microprocessor controller 31 generates a new tape identification number for the blank tape in a manner described above in FIG. 25 and displays an index screen with the assigned TID (step 9263). The microprocessor controller 31 then enters a ready mode (step 9264).

On the other hand, if at step 9259 the tape is a non-indexed tape, the microprocessor controller 31 displays on the screen 50a the question "Do you want to re-index?" (step 9266). If the user answers yes (step 9267), the microprocessor controller 31 commands the VCR to rewind the tape to the beginning of the tape and start re-indexing the tape as described above in FIG. 40. (step 9268) If, however, the user does not want to re-index the tape, (step 9267) the microprocessor controller 31 removes the screen and commands the VCR control logic circuit 21 to display the TV picture read from the videotape. (step 9269).

If, however, the tape is a retroactively indexed tape at step 9259, the microprocessor controller 31 commands the VCR to rewind the tape and search for a TID mark on the control track. (step 9271) The rewind and search continues until an address and TID are detected (step 9272). The microprocessor controller 31 then searches the RAM 33 for a program with the detected TID, and if the microprocessor controller finds the TID in the RAM 33. (step 9273), the controller 31 recovers the directory of the tapes associated with the TID on the RAM 33 (step 9274) and displays the recovered directory on the screen 50a (step 9276). On the other hand, if the microprocessor controller 31 does not find the TID in the RAM (step 9273), it commands the VCR to fast forward to the end of tape (step 9277) to read the directory from the VBI. (step 9278) The read directory is then displayed on the screen at step 9276.

If video is detected at step 9241, the microprocessor controller 31 proceeds from step 9258 described above, to command the VCR to rewind the tape and look for a TID mark on the control track 42c (step 9279) If the beginning of the tape is reached (step 9281), the microprocessor controller 31 proceeds to treat the tape as a non-indexed tape at step 9266 described above. However, if the beginning of the tape has not been reached the VCR continues to rewind until an address mark and TID is detected in the control track 42c (step 9282) and the microprocessor controller 31 determines whether to recover the directory from the RAM 33 or the VBI at step 9273 described above.

Figure 43A:
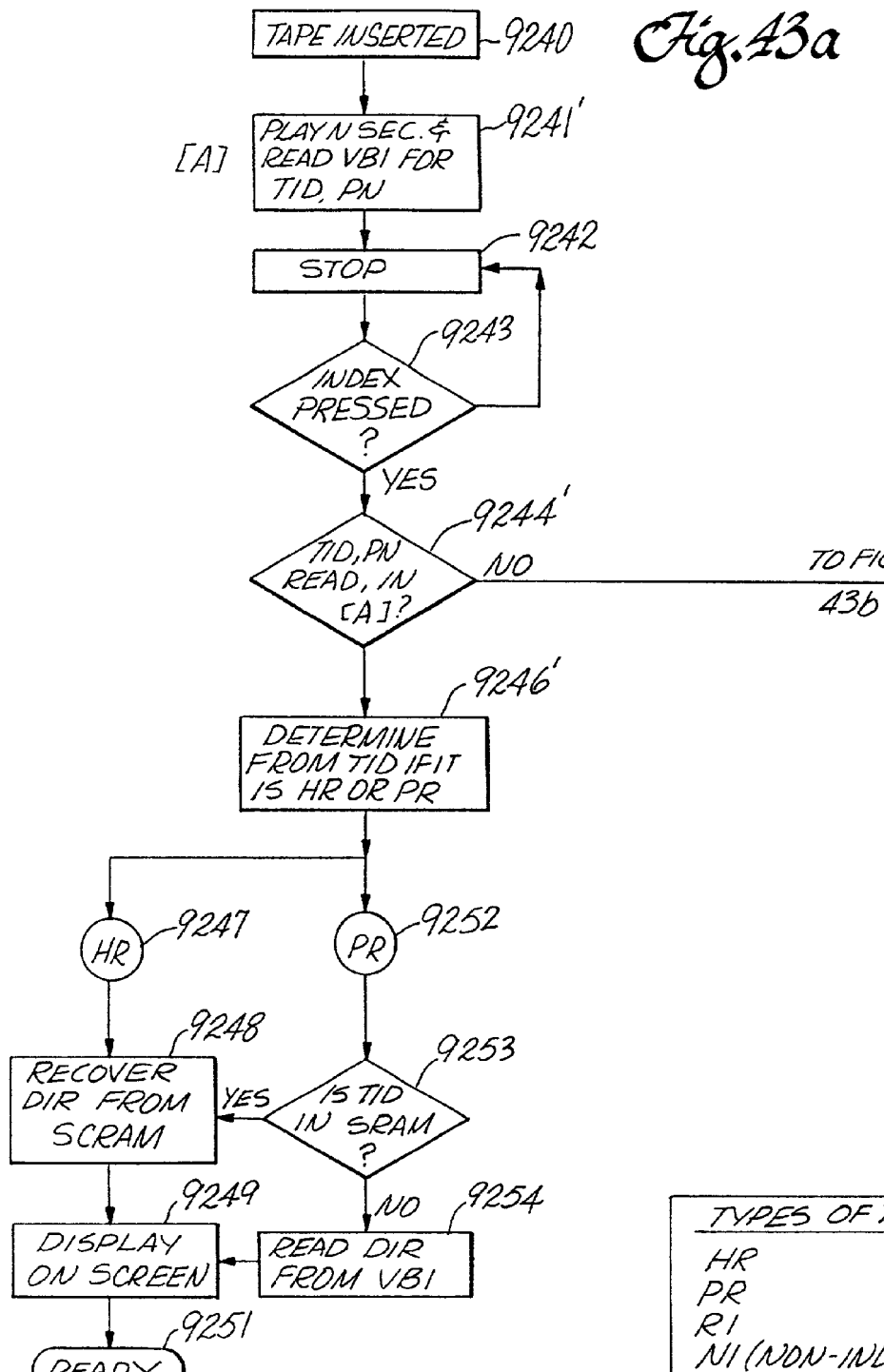
FIGS. 43*a*-43*b* are flow charts showing the steps employed in the operation of the indexing VCR, using the VISS PLUS TP addressing system, when a tape is inserted therein.
Figure 43B:
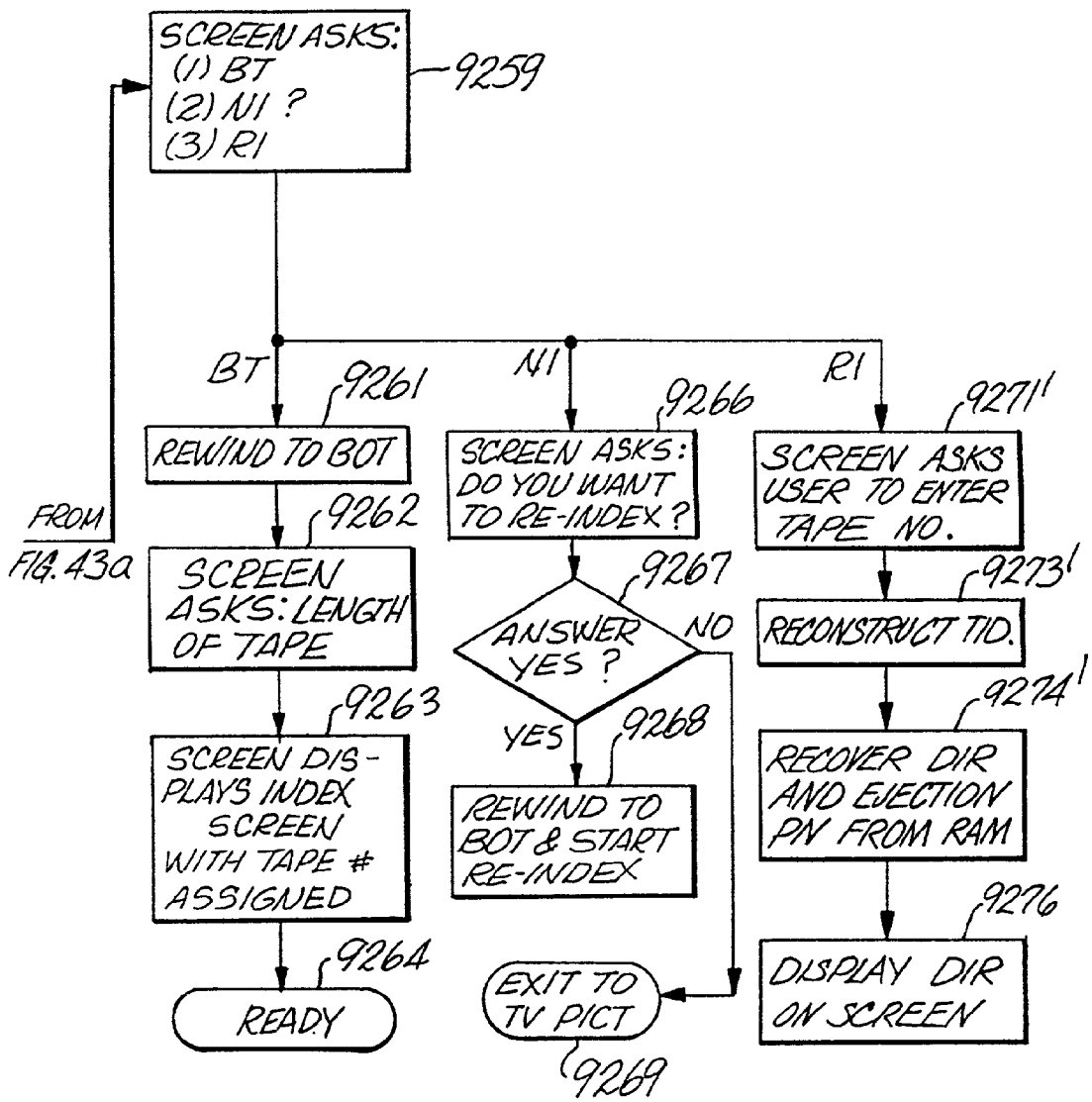

FIGS. 43a-43b are flow charts showing the steps employed in the operation of the indexing VCR, using the VISS PLUS TP addressing system, when a tape is inserted therein. Like steps to FIGS. 42a-42b have like numbers. When a tape is inserted into the VCR (step 9240), the microprocessor controller 31 commands the VCR control logic circuit 21 to play the tape for N seconds and read the VBI for a TID and program number (step 9241': this step is referred to as step [A] in subsequent steps of FIGS. 43a-43b). The time N is preferably between 2 to 5 seconds. (When the tape was previously ejected, the indexing VCR may rewind the tape for a predetermined time interval, e.g. 5 seconds of play time, to make the retrieval of the TID quicker.) In an indexing VCR using a VISS PLUS TP addressing system and an absolute addressing system, the VCR also determines the absolute address. After reading a TID and program number from the tape, the indexing VCR 10 stops playing the tape (step 9242). After waiting for the INDEX button on the remote controller to be pressed (step 9243), if a TID and a program number were read at step 9241', the microprocessor controller 31 determines from the TID whether the tape is a home recorded tape (HR) or a prerecorded tape (PR) (step 9246'). The microprocessor controller 31 then operates as in FIGS. 42a-42b as described above for steps 9247 through 9254.

On the other hand, if at step 9244' the indexing VCR 10 had not read a TID and program number (or a TPA packet in such as system) at step 9241', and referring now to FIG. 43*b*, the microprocessor controller 31 displays on the screen a query as to whether the tape is a blank tape, (BT), a non-indexed tape (NI), or a retroactively indexed tape (RI) (step 9259). (Alternatively, the query may be for the user to enter a tape number for NI or RI tapes or define the tape as a blank tape.) If at step 9259 the tape is a blank tape, the microprocessor controller 31 operates as in FIGS. 42*a*-42*b* as described above for steps 9261 through 9264. On the other hand, if at step 9259 the tape is a non-indexed tape, the microprocessor controller 31 operates as in FIGS. 42*a*-42*b* as described above for steps 9266 through 9269.

If, however, the tape is a retroactively indexed tape at step 9259, the microprocessor controller 31 displays on the screen 50*a* a prompt to the user to enter the tape number of the inserted tape (step 9271'). From this number, the microprocessor controller 31 reconstructs the TID of the tape (step 9273') and recovers from the RAM 33 the directory of the tape associated with the TID (step 9274') and displays the recovered directory on the screen 50*a* (step 9276).

When a RI tape is inserted into the VCR, the program number calculated from the ejection program number may be verified and recalibrated in an indexing VCR having an absolute addressing system. At step 9241', the indexing VCR calculates the absolute address using one of the methods described below in conjunction with FIGS. 38-41. At step 9274' after recovering the directory, the microprocessor controller 31 determines the program number related to the measured absolute address. If the tape has been played in a non-indexing VCR or in an indexing VCR that is not coupled to the user's VCR, the ejection program number will differ from the calculated program number. The VCR then recalibrates itself by using the calculated program number instead of the ejection program number.

FIG. 44 is a flow chart showing the steps employed in the search for a program on an indexed tape using a FMAS addressing system. The microprocessor controller 31 is in a ready mode by knowing the current address of the tape and the destination address of a user selected program entry from the directory (step 9290). The microprocessor controller 31 first enters a fast search stage. The microprocessor controller 31 loads into a count down counter the value of the number of control track pulses between the current position and the destination position (N) subtracted from the number of counts before the destination (n) (step 9291). Based on the direction to the destination address, the microprocessor controller 31 commands the VCR to either fast forward or rewind the tape (step 9292), and during the fast forward or rewind, monitors the read control track pulses and counts down from the N value loaded at step 9291 (step 9293). The fast forward or rewind continues until the count is not greater than zero (step 9294). The microprocessor controller 31 now enters a soft landing stage in which the VCR is commanded to play an search for the address marks on the control track (step 9296). This search continues until an address mark is detected (step 9297). Upon detection, the microprocessor controller 31 enters a confirmation stage. The address mark is read (step 9298), and, if the read address does not equal the address of the destination (step 9299), the microprocessor controller 31 loads a new count into the countdown counter at step 9291 described above. Otherwise, when the address equals the address of the destination, the tape is at the requested location and the microprocessor controller 31 commands the VCR to stop (step 9301).

The addressing system used in FIG. 44 may use any of the location determination methods described below, such as counting the number of control track pulses between the current address and the destination address or counting the take-up spool spindle revolution counts.

Figure 45:
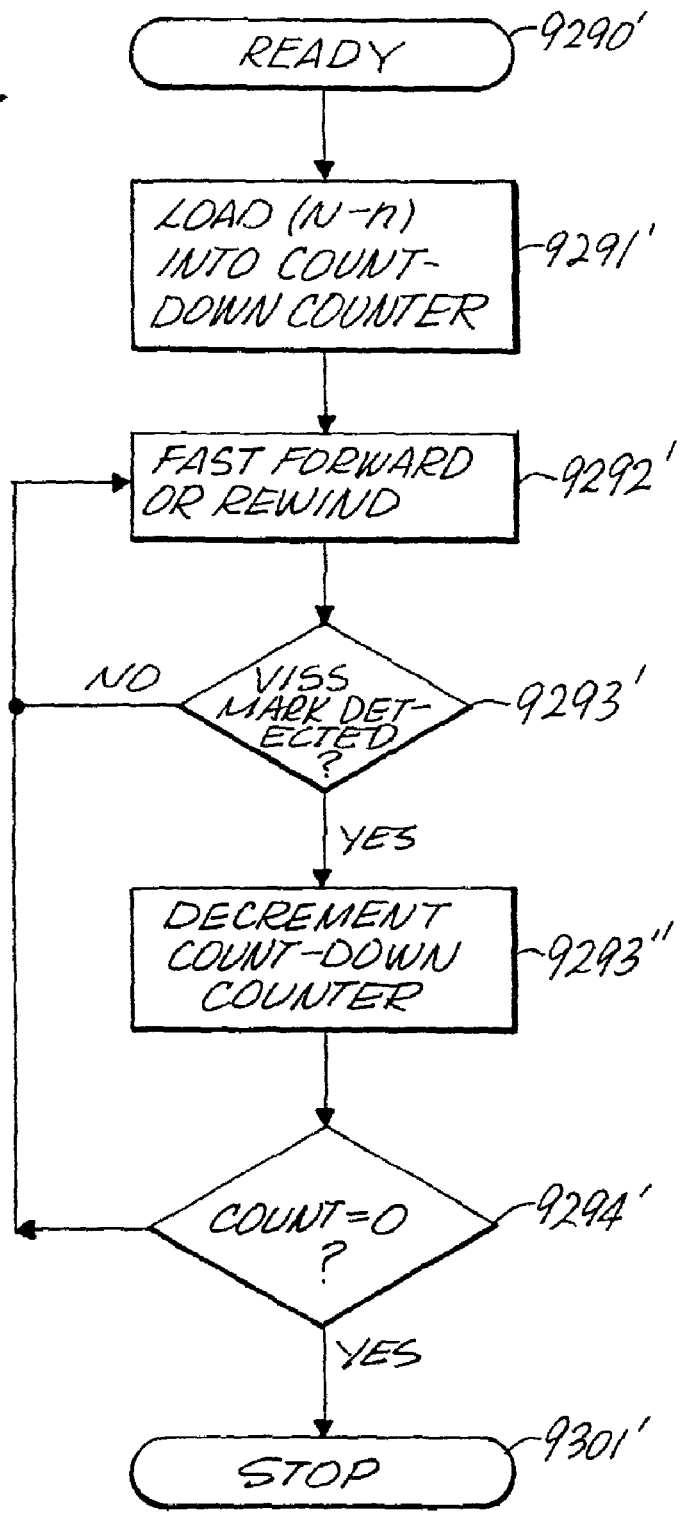
FIG. 45 is a flow chart showing the steps employed in the search for a program on an indexed tape using a VISS PLUS TP addressing system.

FIG. 45 is a flow chart showing the steps employed in the search for a program on an indexed tape using a VISS PLUS TP addressing system. The microprocessor controller 31 is in a ready mode by knowing the current program number (n in FIG. 45) of the tape and the destination program number (N in FIG. 45) of a user selected program entry from the directory. (step 9290'). The microprocessor controller 31 loads into a count down counter the value of the number of VISS marks between the current position and the destination position (N-n)(step 9291'). Based on the direction to the destination address, the microprocessor controller 31 commands the VCR to either fast forward or rewind the tape (step 9292'), and during the fast forward or rewind, monitors the read VISS marks on the control track 42*c* (step 9393') and counts down from the N-n value loaded at step 9291' (step 9293"). The fast forward or rewind continues until the count equals zero. (step 9294'). The VCR then stops (step 9301').

Figure 46:
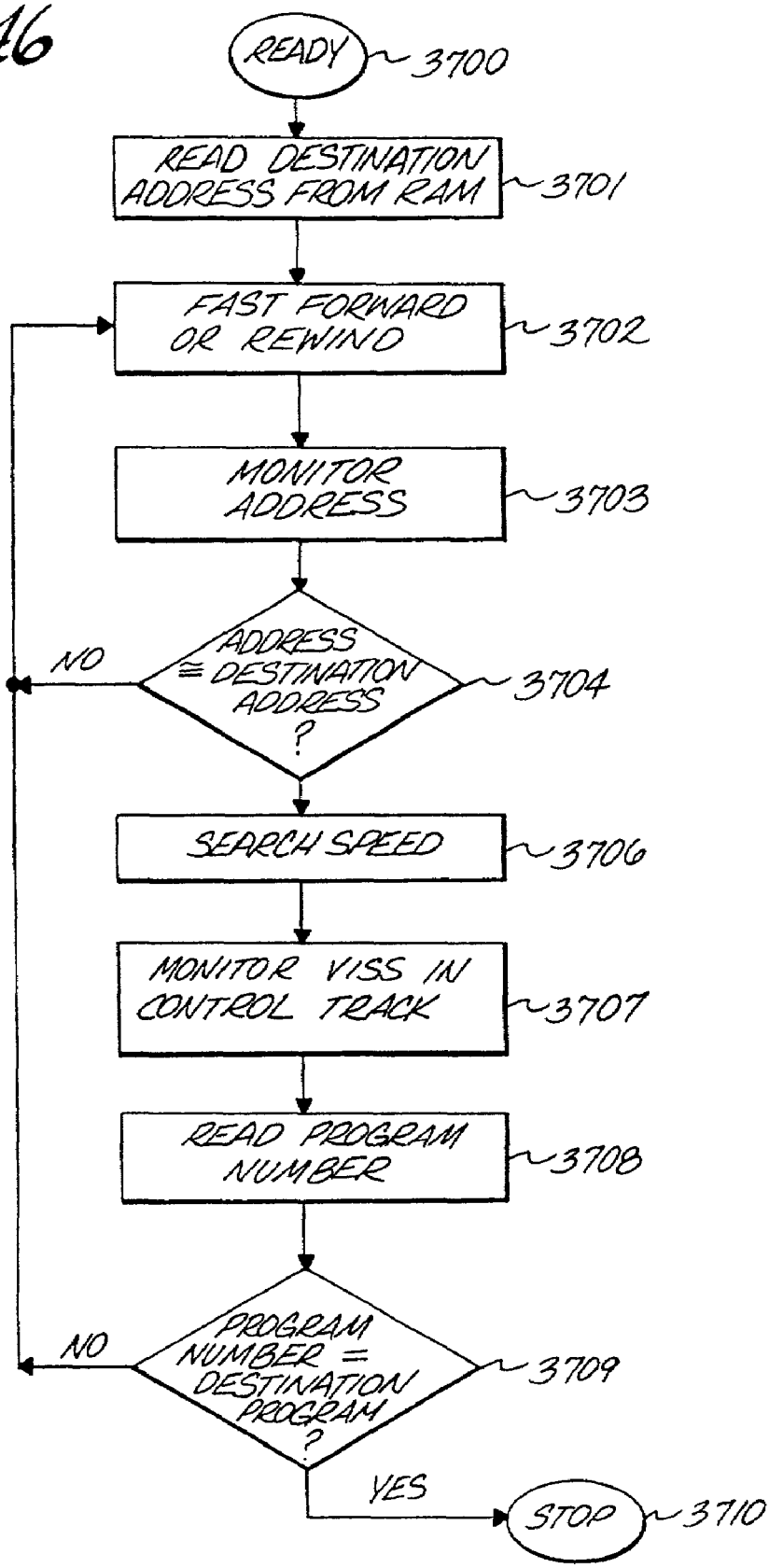
FIG. 46 is a flow chart showing the steps employed in the search for a program on an indexed tape using a VISS PLUS TP addressing system and an absolute addressing system.

FIG. 46 is a flow chart showing the steps employed in the search for a program on an indexed tape using a VISS PLUS TP addressing system and an absolute addressing system. As in FIG. 45, the microprocessor controller 31 is in a ready mode by knowing the current program number (n in FIG. 46) of the tape and the destination program number (N in FIG. 46) of a user selected program entry from the directory. (step 3700). The microprocessor controller 31 first enters a fast search stage. The microprocessor controller reads the absolute address of the destination program from the RAM 33 (step 3701). Based on the direction to the destination address, the microprocessor controller 31 commands the VCR to either fast forward or rewind the tape (step 3702), and during the fast forward or rewind, monitors, using the absolute addressing system, the address of the tape (step 3703). By using an absolute address system such as the reel ratio system, the fast search can be conducted at high speed. The fast forward or rewind continues until the present address equals to the destination address. (step 3704) The microprocessor controller 31 now enters a soft landing stage in which the VCR is commanded to a search speed (step 3706) and searches for the VISS marks on the control track 42*c* (step 3707). Upon detection of the VISS mark (step 3708), the VCR confirms the program number by reading the VBI (step 3708) and when the program number equals the destination program, the VCR stops (step 3710). Otherwise, the VCR reenters the first search at step 3702.

In an alternate embodiment that uses the TPA packet format, if no TID is found on the tape, the indexing VCR 10, upon receipt of a record command, starts recording and simultaneously writing on the VBI a TPA packet containing a temporary TID with the serial number of a predetermined and otherwise unused value, e.g. FFFF hex, and a program number of a predetermined and otherwise unused value, e.g., 0. The microprocessor controller 31 displays a prompt requesting the user to either enter a tape number or define the tape as a blank tape.

If the user enters a tape number not found in memory (after an opportunity to correct the entry), the microprocessor controller 31 generates a new TID and records it along with a program number of 1 as part of the TPA packet. On the other hand, if the tape number is found in the RAM 33, the microprocessor controller 31 uses for the TPA packet both the TID for that type number and the next program number (i.e. the program number of the last recording plus 1). If the user defines the tape as a blank tape, the microprocessor controller 31 assigns both a new TID and a new tape number to the tape.

If the user does not respond to the prompt within a predetermined time, e.g. one minute, the microprocessor controller 31 assigns both a new TID and a new tape number. The microprocessor controller 31 informs the user of the assigned tape number by displaying such information on the display 50a. After the TID is defined or assigned, the microprocessor controller 31 proceeds with the normal procedure of recording.

Figure 47:
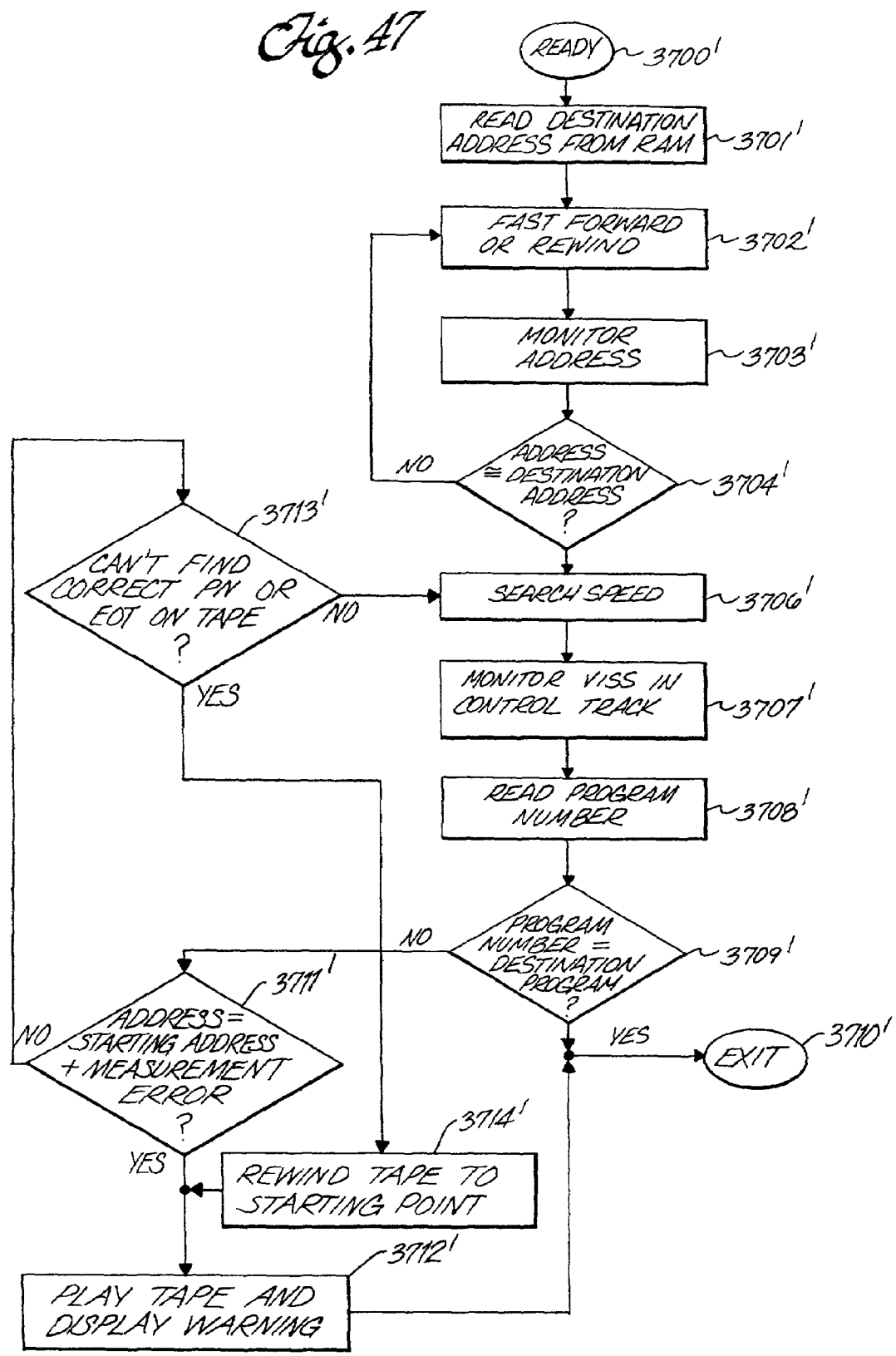
FIG. 47 is a flow chart showing the steps employed in the search for a program on an indexed tape using VISS marks and TPA packets.

FIG. 47 is a flow chart showing the steps employed in the search for a program on an indexed tape using VISS marks and TPA packets. As in FIG. 46, the microprocessor controller 31 is in a ready mode by knowing the present (or starting) absolute address, the current program number of the tape, and the destination program number of a user selected program entry from the directory. (step 3700'). The microprocessor controller 31 enters a first search stage. The microprocessor controller reads the absolute address of the destination program from the RAM 33 (step 3701'). Based on the direction to the destination address, the microprocessor controller 31 commands the VCR to either fast forward or rewind the tape (step 3702'), and during the fast forward or rewind, monitors, using the absolute addressing system, the address of the tape (step 3703'). By using an absolute address system such as the reel ratio system (described below in conjunction with FIGS. 48-51), the fast search can be conducted at high speed. The fast forward or rewind continues until the present address equals the destination address plus a measurement error. (step 3704') The microprocessor controller 31 now enters a second search stage in which the VCR is commanded to a search speed (step 3706') and searches for the VISS marks on the control track 42c (step 3707').

Upon detection of a VISS mark (step 3708'), the VCR confirms the program number by reading the TPA in the VBI (step 3708'). If the program number equals the destination program number or the program number is a temporary program number (defined above in conjunction with FIG. 34), the VCR plays the tape and exits the search routine (step 3710'). (Alternatively, if the program number is the destination program number, the indexing VCR 10 may stop the tape and wait for further user inputted commands.) Otherwise, the microprocessor controller 31 determines whether the current address equals the starting address within a measurement error (step 3711'). If the tape is within a measurement error of its starting point, the microprocessor controller 31 plays the tape and displays a warning to the viewer that the selected program could not be found (step 3712') and exits the search routine (step 3710'). Otherwise, if the tape is not within a measurement error of the starting point (step 3711'), the microprocessor controller 31 determines whether it has exhausted its search possibilities or reached the end of the tape (EOT) (step 3713'). If it has, the microprocessor controller 31 commands the VCR 1 to rewind the tape to the starting point (step 3714') and to play the tape and display a warning that the requested program could not be found (step 3712'). Otherwise if the microprocessor controller 31 has not determined that the program cannot be found or the end of the tape has not reached (step 3713'), the VCR fast forwards to the next VISS mark at step 3706'.

The destination program may not be marked by a VISS mark. For example, in one embodiment, an overlapped program shall remain in the directory if a predetermined length, (e.g., six minutes in SLP or 2 minutes in SP mode) remains of the program after a portion has been overrecorded but a VISS mark is not written at the beginning of the remaining portion. (In contrast to the embodiment shown in FIG. 19). Instead, a flag is set in memory to indicate that a VISS mark is missing. For such an embodiment, the indexing VCR 10 forgoes the VISS mark search.

As it does for re-indexed tapes or programs recorded by a non-indexing VCR for some programs and by an indexing VCR for others, the microprocessor controller 31 forgoes the program number confirmation if the program to be searched does not have a TPA packet.

During the search, if a temporary TID region is reached (e.g., SN=2 FFF hex and PN=0), the microprocessor controller 31 advances the tape a predetermined time. The microprocessor controller 31 again reads the TID. The predetermined time is typically 1 minute.

In addition to searching by program number or title, the user may search for a specified point on the tape. Such points may be the start or end of a program, a blank section of tape, or a specified address. Upon reaching the specified point, the indexing VCR 10 may be programmed to either stop, play, or record.

For tapes with video magazines, the search process is modified. For video magazines each section of the magazine has a VISS mark. In addition, the VM packet has a different section number for each section of the magazine. The user requests a selection from the video magazine. Selections of sections may be made as are selections of programs. Within a video magazine, a number of sections with section numbers (displayed or hidden) are displayed. The selection is made by entering the number or selecting a highlighted section from the display. The indexing VCR 10 counts the number of VISS marks equal to the difference between the current section number and the target section number. If the section selected by the user is greater than the total number of sections in the magazine, the microprocessor controller 31 displays a failure message to the user. Similarly, if the indexing VCR 10 reaches the end of the tape without finding the requested section, the microprocessor controller 31 displays a failure message and stops the tape. Otherwise, when the requested section is found, the microprocessor controller 31 stops the tape and displays a message indicating such.

Location Determination

Figure 48:
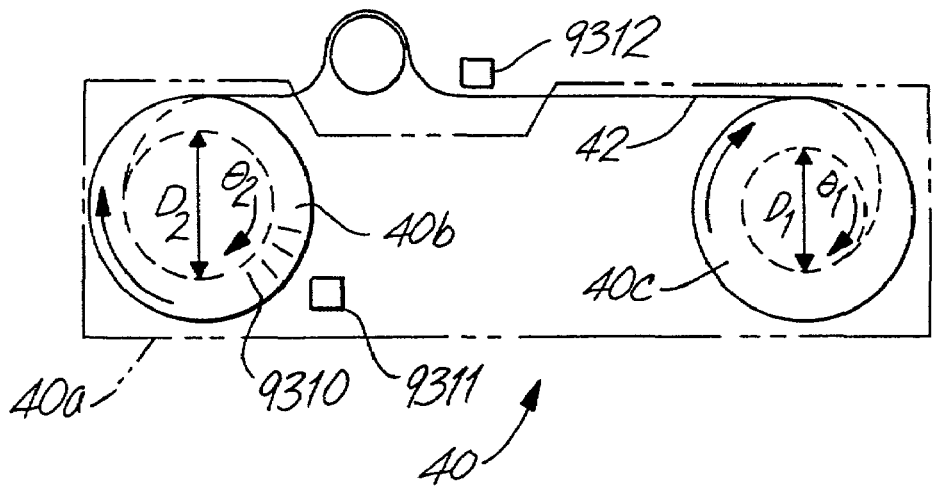
FIG. 48 is a schematic view of a system for determining the absolute program location of videotape without using address marks.

FIG. 48 is a schematic view of a system for determining the absolute program location of videotape without using address marks. To a degree of accuracy, the absolute position of the tape can be determined by measuring the amount of tape wound on either of the cassette reels 40b, 40C for the embodiment shown in FIG. 48. Two automatic methods are proposed for accomplishing the tape position measurement which do not require any additional hardware calibration or index marks over that currently found in conventional VCR's that is easy to implement in a VCR or a stand alone rewinder. As background, the amount of tape on a cassette spool is related to the diameter of the tape wound thereon. Errors occur in this relationship which are a function of the tape tension during fast forward and rewind which introduce a "zone of uncertainty" (ZOU) as to the absolute location. However, in some of the embodiments, the error is within acceptable limits.

A first method is now described for measuring the location on the tape. The diameter (D1) of the tape on a spool can be indirectly measured by measuring the length of tape (X) wound onto the spool for a given angular rotation ($\theta 1$) of the spool or measuring the angular rotation $\theta 1$ for a given tape length. In other words, X is approximately equal to $D1 \times \theta 1/2$. For previously recorded tapes, the control track sync pulses represent a convenient and accurate measure of tape length and can be detected by the control track head in any mode such as fast forward, rewind or play.

By way of background, measurement of spool angular rotations presently accomplish the VCR's for purposes of driving a front panel index counter. Methods of these measurements include magnetic pulses and optical pulses where for example, eight pulses represent one spool revolution. In an alternate embodiment, greater angular resolution may be obtained by an optical system that includes a reflected light photo optical detector 9311 and a disc attached to the VCR spindle which has a plurality of reflective lines 9310 printed or etched thereon. In a typical embodiment, there are hundreds of reflective lines 9310. High resolution angular rotation measurement is achieved by counting reflective light pulses during spool rotation. Tape length is then accurately measured by counting sync pulses using the existing control track head.

Having described the method, the details of the system operation are described for a VCR with the address capability built therein. When a program is first recorded on the tape, the system in the record mode counts the number of reflective lines and thus angular rotation on the take-up spool for a given number of sync pulses which are being recorded. The microprocessor controller 31 stores this number in the directory for this program as the "start" absolute location. The system continues to monitor and store in a scratch pad location of the RAM 33, the angular pulses and group of sync pulses during recording. When the stop mode is initiated, the last angular rotation data in the scratch pad memory is also stored in the program directory as the "end" absolute location. Thus the directory for each program has stored in it data which brackets the absolute location range for that program. Alternatively, the number of sync pulses written for a given number of reflective lines may be stored.

With the directory now created, when the recorded tape is reinserted into the machine for a second play, the play mode is activated for typically less than one second and the angular rotation/sync pulse data is read by counting the sync pulses and the reflective lines and comparing it with the absolute location range data stored, either on the control track or in the RAM 33, in the directory for all the programs on the tape. From this comparison, a determination can be made as to which program is at the present tape location. It should be noted that, although the recording tape speed (e.g. EP, SP, SLP) effects the linear spacing along the tape between sync pulses, the VCR automatically plays the tape at the same speed as it was recorded so that tape speed is not a problem.

As noted above, there is a zone of uncertainty in positioning the tape as a result of tape tension variations. Because the absolute end number and start number stored in the directory are essentially the same for concurrently recorded programs, if the tape is positioned exactly at the start of the program, the system cannot accurately determine if it just passed or just before the start of this program. In these cases, if it is detected that the present location is within the zone of uncertainty of the stored start/end location, the system rewinds the tape, for preferably less than one second, and now knows without any ambiguity that it is in the previous program. Once this information is known the system can fast forward or rewind to the user selected programs simply by counting a bookmark which is a VISS type mark placed on the control track to mark the starting point of each recorded program. This system no longer has a need to encode a program number into the bookmark.

This first method is now described with respect to a stand alone rewinder. When the user is creating the directory by manually locating in his VCR the start of each program, then transferring the tape to the rewinder. The rewinder first goes into the fast forward mode, rewind or play modes and collects the angular rotation/sync pulse data using the reflective disc and the control track head and stores this information in the RAM 33 for each program in a manner similar to that described above. This data is used during playback as above to locate the present position of the tape. Note however, that for this implementation to work for programs recorded at different recording speeds, the rewinder must have the ability to detect the recording speed which then is used to calculate a new location.

In an alternate embodiment, the second automatic method is described. As an overview of this method, the absolute location of the tape is found by measuring the diameter of tape on each of the two spools D1, D2 and using the ratio of these measurements to approximate the absolute tape location. This method eliminates the need for linear tape measurements using sync pulses, and hence can be used to determine absolute tape position, even if the tape location has never been recorded upon the tape (because no recording has been done, there are no sync pulses to be counted). The ratio of the spool diameters (D1/D2) is proportional to the ratio of angular displacement of the spools, ($\theta 1/\theta 2$) with errors introduced by uneven tape tensioning. By incorporating a reflective disk and a reflective light sensor 9311, each of the two spindles with relative displacements of each being measured in a ratio determined using suitable software.

The use of this method for a built-in VCR is now described. When a program is first recorded on the tape, the system in the record mode, fast forward or rewind mode counts the number of reflective lines 9310 (angular rotation) on the take-up and unwind spools for a given number of reflected pulses. The microprocessor controller 31 stores these numbers or the ratio in the directory for this program as the start absolute location. The system continues to monitor and store a scratch pad memory, the angular pulses/ratio during recording. When the stop mode is activated, the last angular rotation data in the scratch pad memory is also stored in the program directory as the "end" absolute location. The directory now has for each program stored in it, data which brackets the absolute location range for that program.

To resolve the zone of uncertainty caused by the tape tension variations, method 2 can also use the rewind to the previous program method described above for method 1.

Method 2 is applied to a stand alone rewinder in a similar manner to that described above for method 1.

Figure 49:
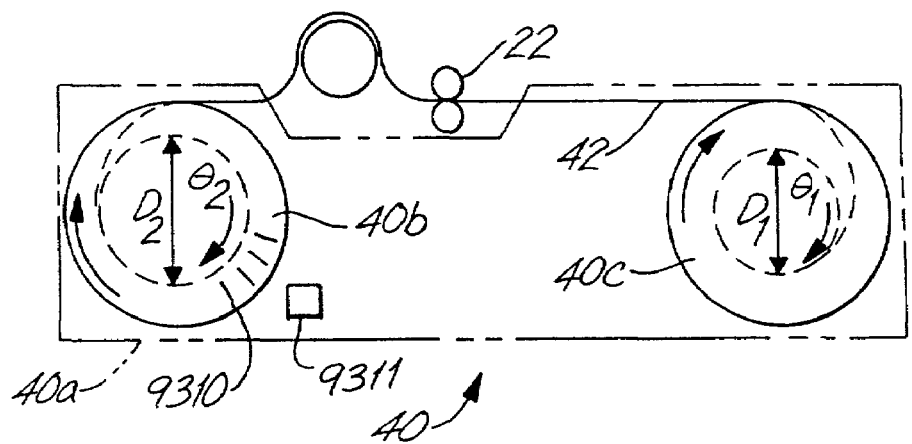
FIG. 49 shows an alternate embodiment for determining tape length.

FIG. 49 shows an alternate embodiment for determining tape length. This embodiment is based on the assumption that a measurement of the full spool diameter of tape is sufficient to unambiguously determine the tape length. In this embodiment no mechanical components need to be added to a conventional VCR.

As described above, the diameter D2 tape on a spool can be indirectly measured by measuring a length of tape X wound onto the spool for given angular rotation $\theta 2$ of the spool or measuring the angular rotation $\theta 2$ for a given tape length X, because X is approximately equal to $D2 \times \theta 2/2$.

When the VCR is in the play mode, the linear movement of the tape as a function of time is accurately controlled. Thus the amount of tape X wound onto or off of the spool in the play mode can be accurately measured by measuring time. The angular rotation of at least one tape spool is already measured using either a magnetic or optical system as described above. In measuring the time it tapes for a full spool (fully rewound tape) to rotate a specific number of degrees, for example, one or two revolutions in the play mode, the full spool tape diameter is determined and from the relationship noted above, the tape length is also determined. By starting a timer, when the rotation sensor generates a first pulse, and stopping the timer after the sensor has generated a pre-determined number of pulses corresponding to a known angle of rotation. The elapsed time is proportional to the tape length.

In an alternate embodiment, the tape length can be measured at other than the fully rewound position by measuring the diameter of tape on each of the two tape spools. In this embodiment, each spool has angular rotation sensors. Two timers can be used, each start and stop by angular sensor pulses and the two spools while in the play mode comparing the two elapsed time yields data on the tape diameters for both spools. By using a look up table, the tape length of any point along the tape can be determined without rewind.

Figure 50:
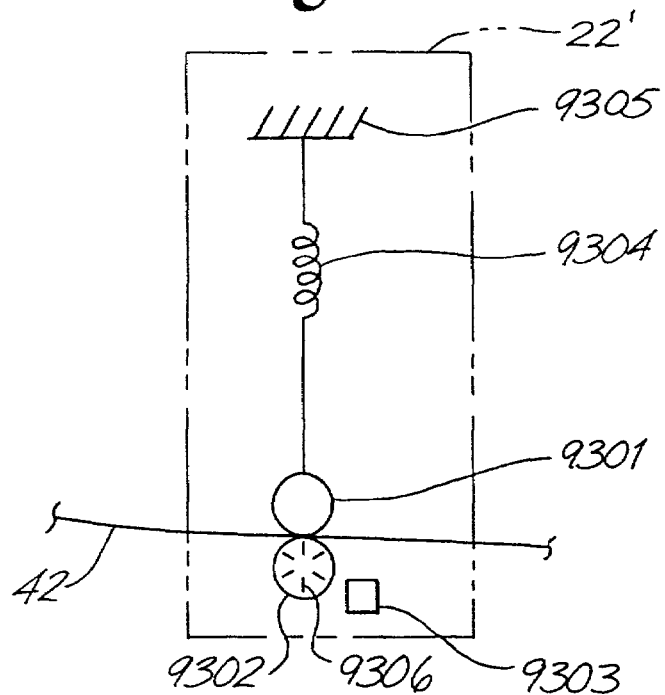
FIG. 50 is a schematic view of an alternate embodiment for the tape movement sensor.

FIG. 50 is a schematic view of an alternate embodiment for the tape movement sensor. In the embodiments of FIGS. 48-49, the address is determined by either counting sync pulses on the control track 42c or counting spindle rotation. However, the accuracy of these systems depends on uncontrolled variables such as tape winding tension, which is related to the start, stop, play, rewind and fast forward history of the tape. The embodiment of FIG. 50 determines tape position by measuring linear tape travel during play, record, fast forward, and rewind.

A tape movement sensor 22' has a fixed roller 9302 in contact with one side of the tape 42. The fixed roller 9302 has a plurality of reflective lines 9306 that reflect light from a revolution counter 9303 that counts the number of detected pulses reflected from the fixed roller 9302 as the tape is advanced. A biasing roller 9301 is mounted to a first end of a spring 9304 whose second end is mounted to a frame 9305. The biasing roller 9301 is in spring biased contact with the other side of the tape 42 so that the movement of the tape between the biasing roller 9301 and the fixed roller 9302 causes both rollers to rotate. The revolution counter 9303 counts the number of reflected pulses and provides this count to the position logic and counter circuit 9 which communicates the count through the VCR control logic circuit 21 to the microprocessor controller 31. The microprocessor controller 31 then converts the angular rotation pulse count into distance travelled by the distance traveled=diameter of roller×pulse count×
angular spacing between pulses.

This distance travelled is then used as an address for the location of the tape.

Figure 51:
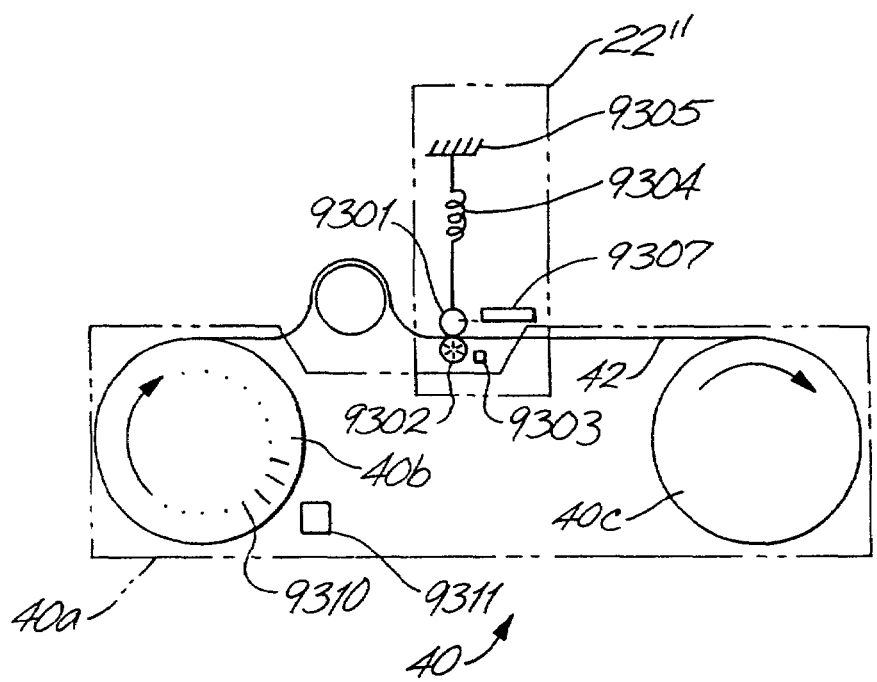
FIG. 51 is a schematic view of an another alternate embodiment determining the location on the tape using a tape movement sensor.

FIG. 51 is a schematic view of an another alternate embodiment determining the location on the tape using a tape movement sensor in conjunction with a spindle revolution counter. A tape movement sensor 22" is similar to the tape sensor 22' in FIG. 50, except the tape movement sensor 22" contains a linear position sensor 9307 which detects the distance between the biasing roller 9301 and the fixed roller 9302. When the tape 42 contacts both rollers, the distance between the rollers is the thickness of the tape 42. A revolution counter 9311 counts the number of pulses reflected from a plurality of reflective lines 9310 on the tape reel 40b in a manner similar to that described above for the revolution counter 9303. In a manner similar to that described above in FIG. 49, with the tape fully rewound, the tape diameter is measured by measuring the linear motion/angular ratio as indicated by the two revolution counters 9303, 9311. Given the full reel tape diameter and the measured tape thickness, the overall tape length can be determined.

In another embodiment to those described above, the TID may be entered manually either in addition to or in lieu of recording the TID on the tape.

Title Downloading

Program titles are broadcasted by TV stations on line 21 field 2 of the VBI. These are decoded and inserted into the directory. For programs without program title information, a channel-date-time stamp is inserted automatically.

Playing Indexed Tape in Non-Interconnected VCRs

To play using indexing functions an indexed tape in a second VCR where the original directory information resides in a RAM of a first VCR requires the transfers of the directory. The directory is first downloaded in the first VCR onto a predetermined location on the tape. The directory is written in DNT packets described above in standard speed format on VBI line 19. The DNT packets are written alternately with the TPA packets. Preferably at least two complete copies of the tape directory are written for redundancy in case of download errors. The second VCR then reads the downloaded directory from the tape in order to utilize the indexing capability for the tape. If the tape is changed by recording additional programs or erasing existing programs, a new directory must be created on the tape if the tape is to be played in the first VCR or in yet another VCR.

Figure 52A:
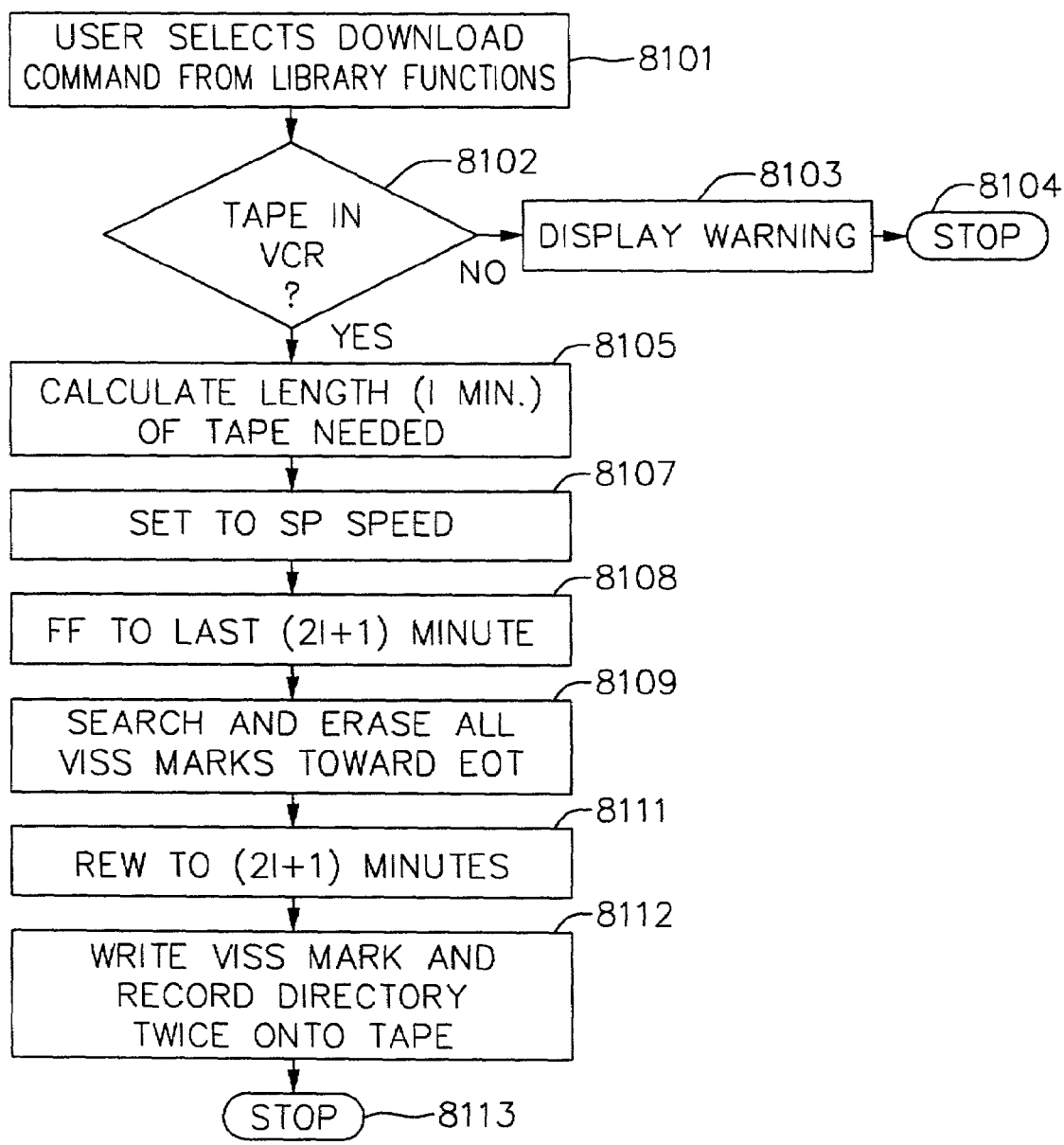
FIGS. 52*a*-52*c* are flow charts showing the steps employed in the operation of transferring a directory along with the tape to a second VCR that is not connected to the first VCR.
Figure 52B:
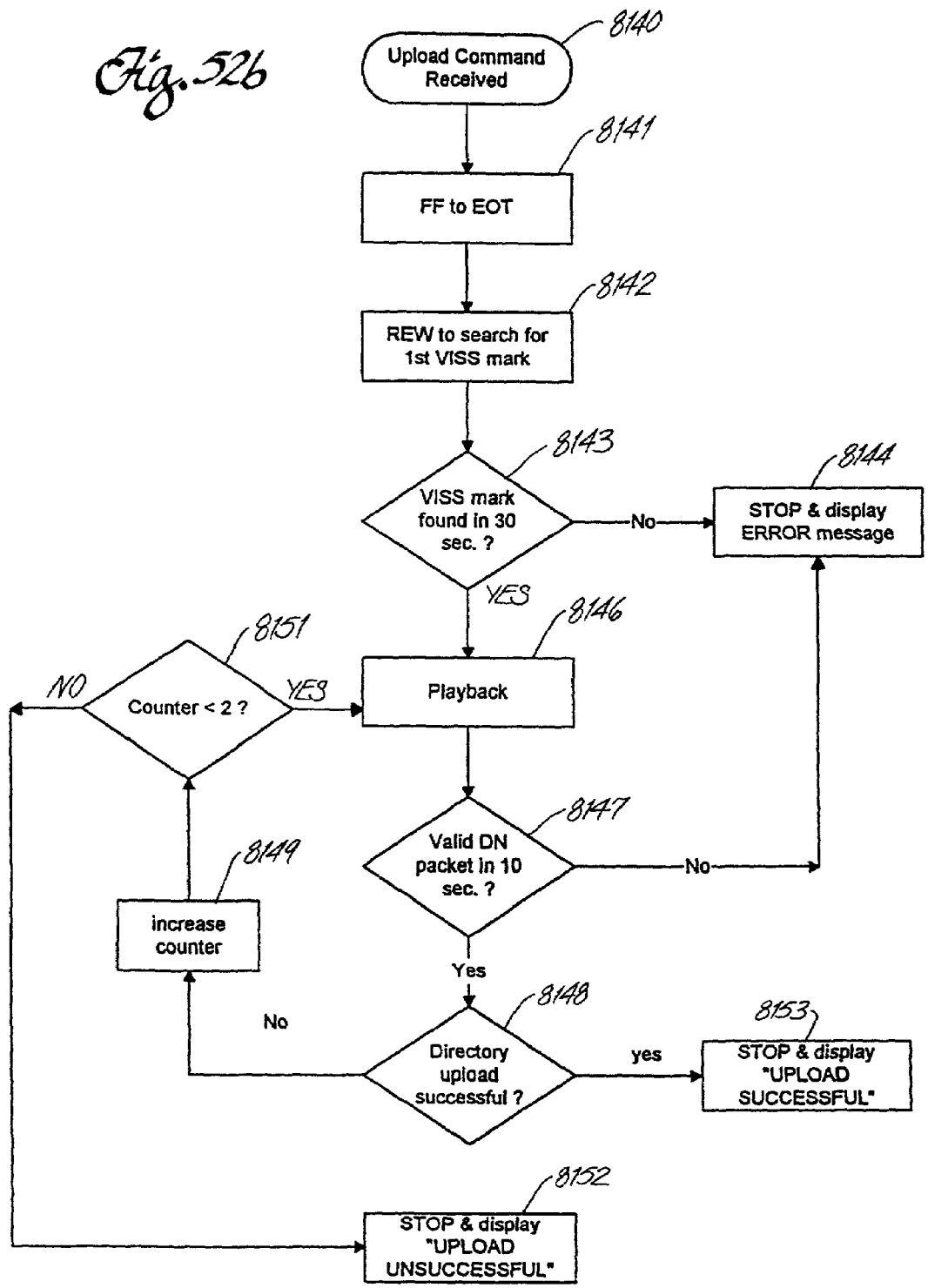
Figure 52C:
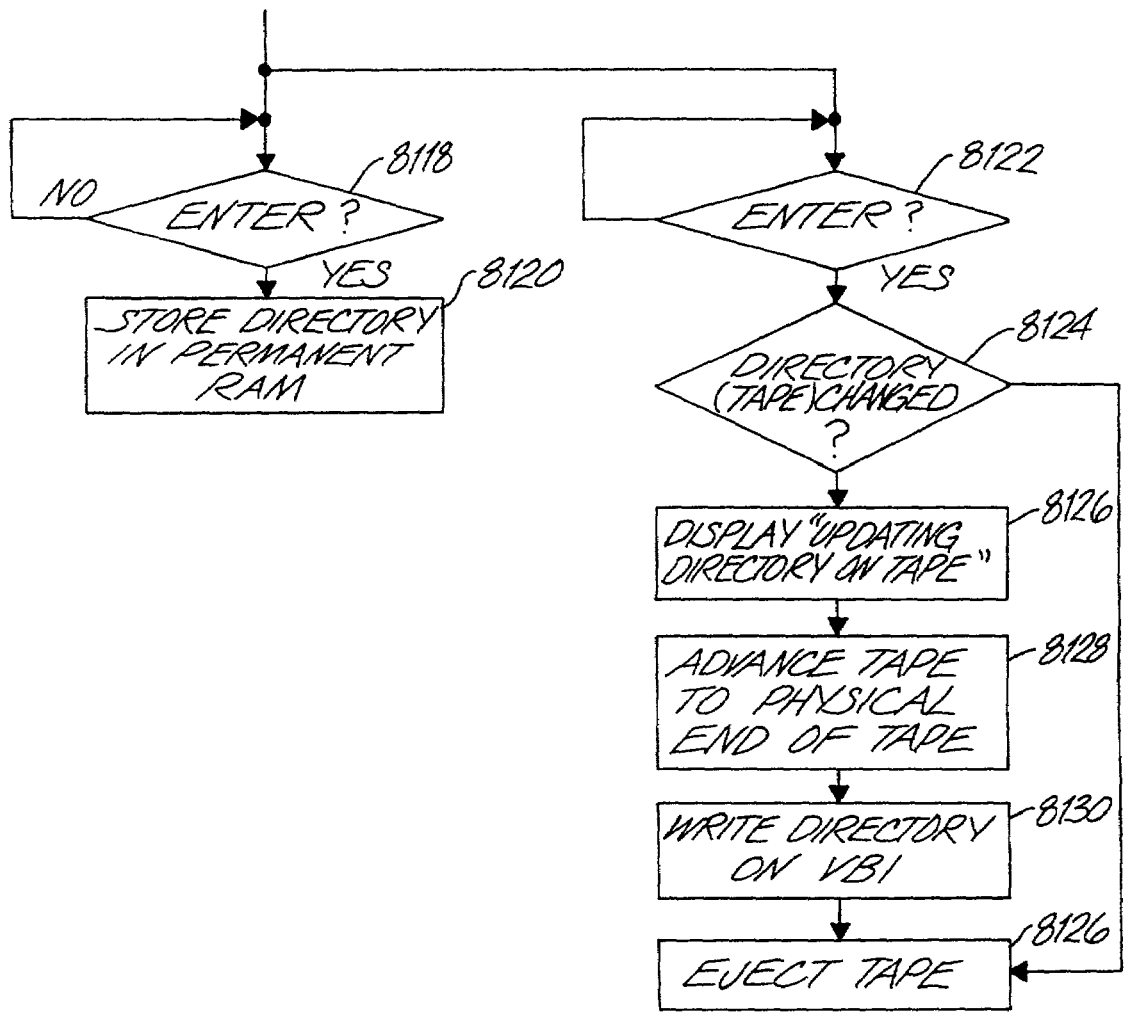

FIGS. 52a-52c are flow charts showing the steps employed in the operation of transferring a directory along with a tape indexed in a first VCR to a second VCR that is not connected to the first VCR.

Referring specifically to FIG. 52a, the user selects a download command from the library functions (step 8101). The indexing VCR determines whether a tape is in the VCR (step 8102). If a tape is not in the VCR, the microprocessor controller 31 displays a warning to the user (step 8103) and stops (step 8104). As part of the normal tape insertion procedure, the indexing VCR 10 already has detected the TID from the tape and retrieved the directory from the RAM 33. The indexing VCR 10 calculates the length in minutes (l) of taps needed to write one copy of the directory onto the tape (step 8105). The microprocessor controller 31 sets the reading speed of the VCR 1 at standard play (SP) (step 8107). The microprocessor controller 31 advances the tape to the last 2 l+1 minutes of the tape (for two copies plus a safety margin) (step 8108). Before writing the directory, the microprocessor controller 31 searches the tape from the 2 l+1 minute point to the end of the tape (EOT) and erases all VISS marks (steps 8109). The microprocessor controller 31 then rewinds the tape back to the 2 l+1 minute point (step 8111). The microprocessor controller 31 writes a VISS mark and then twice records the directory onto the tape using the DNT packet format described above (step 8112). Any prior directories are overwritten. After such recording, the microprocessor controller 31 stops the tape (step 8113).

The user removes the tape from his VCR and provides the tape to the second user who inserts the tape 40 into a second VCR 1. Referring now to FIG. 52b, when the user wants to operate in the indexing mode, he selects an UPLOAD command from the library functions using the remote controller 75 (step 8140). The microprocessor controller 31 fast forwards (FF) the tape to the end of the tape (EOT) (step 8141). After which, the microprocessor controller 31 rewinds the tape (step 8142) and searches for a predetermined time, e.g., 30 seconds, for the first VISS mark from the end of the tape (step 8143). If a VISS mark is not found within 30 seconds, it is assumed that the tape does not have a downloaded directory recorded thereon. The microprocessor controller 31 stops the tape and displays an error message (step 8144).

Otherwise, when a VISS mark is reached, the microprocessor controller 31 plays the tape and decodes the data recorded in the VBI (step 8146). If a valid DN packet is not found within a predetermined time, e.g., 10 seconds (step 8147), the microprocessor controller 31 stops the taps and displays an error message (step 8144). Otherwise, the microprocessor controller 31 determines whether the directory upload was successful (step 8148). If the upload was not successful, a counter (or a location in the RAM) is increased (step 8149). Because two copies of the directory are stored on the tape, if the count of the counter is less than 2 (step 8151), the microprocessor controller 31 continues to playback the tape (step 8146). On a count of two, i.e., a second directory has been unsuccessively read (step 8151), the microprocessor controller 31 stops the tape and displays "UPLOAD UNSUCCESSFUL" (step 8152).

If the directory upload is successful (step 8148), the microprocessor controller 31 stops the tape and displays "UPLOAD SUCCESSFUL" (step 8153). The directory is stored in a temporary portion of the RAM 33.

Referring now to FIG. 52*c*, as for a PR tape, the second user may store the directory in permanent memory (or the RAM 33) by pressing the enter key on the remote controller (step 8118). In response to the enter command, the microprocessor controller 31 of the second VCR 1 stores the directory in the permanent RAM 33 (8120). When the second user has finished playing the tape and wishes to remove it, he presses the eject button on the VCR (step 8122). The microprocessor controller 31 determines whether the tape, and consequently the directory, has changed (step 8124). If it has not changed, the VCR ejects the tape (step 8126). On the other hand, if the directory has been changed at step 8124, the microprocessor controller 31 displays on the display 50 "updating directory on tape" (step 8126). The microprocessor controller 31 advances the tape to the physical end of the tape (step 8128) and writes the directory on the VBI (step 8130). The VCR then ejects the tape (step 8126).

On the other hand, if the user does not desire to add the tape to his library, the uploaded directory is erased from the RAM 33 after tape ejection.

In an alternate embodiment, when the user ejects the tape from the second VCR, steps 8124 through step 8130 may be performed only if the user requests the recording of the directory in a manner similar to that described above in step 8106 of FIG. 52*a*.

In yet another alternate embodiment, the second user may be warned not to record on the loaner tape.

Auxiliary Information Display

Referring back to FIG. 5, as described above, by using the VBI decoder and the RAM 33, the indexing VCR 10 can capture data broadcasted on the VBI and display it either concurrently with or at a later time to the data transmission. The broadcasted data may be transmitted on a plurality of lines of the VBI including line 21. Per the EIA-608 standard, Extended Data Services provide for pointers on line 21 (supplemental data location) to point to lines other than line 21. By using data on these other lines in the same format as data on line 21, the VBI decoder 60*a* can decode the other line data. The auxiliary information is preferably broadcasted in a 35 characters ×15 rows format to match the display 50*a* (see FIG. 5) format. In the preferred embodiment, three types of auxiliary information data are transmitted: program identification (program ID or PID), channel specific program guide (CSPG) and program related information (PRI).

The viewer is alerted to the existence of the auxiliary information in several ways. In a first method, before the program is transmitted, the indexing VCR 10 displays on the screen a prompt to the user that the information is forthcoming. The prompt may be a flashing icon, such as the letter "i," or a new screen, such as a blue background with white text. The indexing VCR 10 requests the user to enter a command, for example by pressing the "i" button, to store in the RAM 33 the auxiliary information, or in some embodiments, to record in the record stack the "PLUSCODE™" number corresponding to the program that is to be recorded. As will be described below, the user may later recall this information. To indicate that the command was received, the indexing VCR 10 may either stop flashing the icon display, display an acknowledgement, such as "stored" or "saved," or display a separate screen. The user may request the information before, during, or after the broadcast. Alternatively, the auxiliary information may be transmitted and stored in a temporary buffer in the RAM 33 before the viewer is prompted to enter a command. In this embodiment, the indexing VCR 10 transfers the auxiliary information from the temporary buffer to a permanent buffer in response to the user's commands.

Alternatively, in a second method, the indexing VCR 10 may provide the prompt after the program is viewed. In this embodiment, the auxiliary information may be transmitted before the program, during the program, or after the prompt. In a third method, the prompt is displayed concurrently with the program.

For each method, the user has a predetermined amount of time after the prompt to request the auxiliary information. When the auxiliary information is requested, the indexing VCR 10 displays it for either a predetermined time, until the user cancels it (for example, by pressing the program ID button a second time), until the next auxiliary information is requested, or until the broadcaster transmits a cancel command in the VBI.

Because the auxiliary information is normally used for advertising, it is desirable to not alert the user to stop recording a program when a commercial occurs. Thus, the time that the auxiliary information is transmitted is preferably adjusted so that the user cannot generate in response to the auxiliary information a signal for shutting off the VCR. For example, if the auxiliary information is always transmitted 30 seconds before the commercial (i.e. 30 seconds is always the lead time), the user may program his VCR to stop recording 30 seconds after the detection of the auxiliary information and start recording again 60 seconds after the VCR stops recording. But if, the lead time is variable, the user misses recording a portion of the program. For example, if the next commercial uses a 60 second lead time, the viewer shuts off the VCR 30 seconds early if the user is using a 30 second lead time. Furthermore, the auxiliary information may also be transmitted after the commercial so that the viewer cannot shut off the VCR in advance.

Alternatively, the prompt may be a number that the user enters to indicate which group of auxiliary information is to be recorded.

Describing the program ID first, the broadcast station preferably broadcasts the program identification information on line 21, field 2 of the VBI according to EIA specifications.

This information may include:
 Title of program
 Program length in minutes
 Today's day and date (when viewing TV broadcasts) or day and date of recording (when viewing taped shows)
 Station call letters (e.g. KCET or KCAL) or 4-letter abbreviation of station name (e.g. SHOW for Showtime)
 Channel number In a preferred mode of operation, when the user changes the channel or when recording or playback of a tape begins, the program ID is automatically displayed for a predetermined length of time, e.g., five seconds, and then disappears. Alternatively, when the user presses a program ID button on the remote controller, the indexing VCR 10 displays the program ID. If there is not program ID in the VBI, the channel, date, and time are displayed.

When a program is recorded, the program title is stored in the directory and also inserted in the VBI portion of the recorded program. A viewer can access the title of the program being shown by pressing the "Program ID" key. When the key is pressed, the microprocessor controller 31 sets the VBI decoder to decode selected field and lines of the VBI either from the broadcasted signals or from the reproduced signals depending upon its mode of operation.

The program I.D. information for a plurality of viewed channels is stored in the RAM 33. Although some of the program I.D. information changes with the program (e.g., program title, start time, length, program category), this information is quickly retrievable from the memory when the user switches channels and requests the program I.D. to be displayed. Using the start time and length of the program, the indexing VCR 10 checks, periodically or in response to a Program I.D. command, whether the information is still within the valid time before displaying it on screen.

The channel specific program guide is the combination of the program IDs for a plurality of programs that will be broadcasted in an upcoming predetermined time. In addition to the information included in the program ID, the channel specific program guide may also include the start times, the titles, the "PLUSCODE™" numbers and a description of the programs. In addition, the information that is displayed may be controlled by attribute codes, which are described below in conjunction with FIG. 84 contained within the program guide. For example, the "PLUSCODE™" numbers may be printable on screen, but if it is preceded by a "non-print" attribute, the indexing VCR 10 does not display it. As a second example, special events may be highlighted by using a character attribute.

A broadcasting station broadcasts on a periodic basis, the channel specific program guide in the VBI of the broadcast. The VBI decoder in the indexing VCR 10 continuously decodes the channel specific program guide from the VBI and stores it in the RAM 33. Because of unexpected events, such as sport programs that overrun their scheduled broadcast time or news breaks that shift programs, the broadcaster may update the program guide and transmit the new guide. Accordingly, as the new guide is read, the indexing VCR 10 stores it in the RAM 33.

The program guide may also include a video program guide of special programs such as video magazines, video sales catalogs, video classified ads, and infomercials. The program guide allows the user access to a television program listing for those who do not have a periodical listing or newspaper listing, or those who misplaced their listings.

The format of the channel specific program guide data packet is described below in conjunction with FIG. 84. As the data is decoded, the data stored in the RAM 33 is updated by each subsequent CSPG data packet. The quantity of information supplied in the CSPG data packet is determined by the broadcaster. For example, the broadcaster may provide program schedules for the subsequent eight hours but provide only the description of the programs for the first two hours. In addition, the guide may also include special events for the upcoming few days. By viewing the listing before the viewer goes to work or goes to sleep, the user may program his indexing VCR 10 using the program guide for recording shows during his absence or sleep.

The indexing VCR captures the CSPG information from the VBI of the current channel. The microprocessor controller 31 stores the guide in the CSPG buffer in the RAM 33c. When the viewer switches to a different channel (either in the indexing VCR or by a cable box—the channel change is detected by the change in the program ID), the indexing VCR 10 will begin reading and storing the CSPG data for the new channel. However, because many viewers switch between channels, sufficient memory may be provided so that the program guides for at least two channels may be stored in the RAM 33. Alternatively, the CSPG buffer may be cleared to remove the CSPG for the previous channel.

The stored program guide may be used to implement timer programming of the VCR. The user programs the indexing VCR 10 to record the desired program by moving the cursor to this program pressing the Record button. In embodiments in which the "PLUSCODE™" numbers are displayed on the screen, the viewer may also program the indexing VCR 10 by entering on the remote controller the "PLUSCODET™" number for the program he would like to record. In response thereto, the indexing VCR 10 stores the "PLUSCODE™" number into its programming stack for execution as described above.

The contents of the PRI or the CSPG may be printed on a printer by reformatting the contents of the PRI buffer or the CSPG buffer. and sending the reformatted data through the I/O port to a printer.

FIG. 53 is a flow chart showing the steps employed in the processing of program related information. Program related information (PRI) is information broadcasted in the VBI that is related to a program being aired which is available upon user command either concurrently with the program or at a later time. The use of PRI extends the time of an advertisement because the viewer is able to view the information at a later time at a pace selected by the viewer. Examples of PRI include statistics of baseball players during a baseball game, recipes given out during a cooking lesson, and problem assignments and answers after an educational program. In other examples, many commercials have a message during the program urging the viewer to call a toll free number to get further information or to place an order or giving details about an upcoming sales event or promotion. Under existing systems, such information which is conveyed in the video is fleeting because most viewers are either not disposed to take any action on the spur of the moment or are unprepared to take such action. The information transmitted as part of the PRI in the VBI may be captured and displayed on screen at the command of the user. Thus, the information may repeat the information provided during the commercial or program or may contain additional information. For example, the commercial may be a promotion about an upcoming movie while the PRI for this commercial may provide additional details of the cast or plot of the movie. Further, a "PLUSCODE™" number may be provided so that at the press of a single button the "PLUSCODE™" number is used to program the indexing VCR 10 to record the requested program. Alternatively, the commercial may be a short commercial which is a promotion for a long commercial such as an infomercial aired in the middle of the night. In yet another embodiment, the PRI may be an electronic coupon that is outputted through the serial data link to a printer or other devices to print or store the coupon which may then be later redeemed at participating retailers or stores for the promoted discounts. In another embodiment, a prerecorded tape may have a PRI recorded thereon.

Referring now in particular to FIG. 53, the broadcast station broadcasts the PRI in a time window during which it is related to the program or commercial being broadcasted. Alternatively, the PRI may be broadcast offset in time from the program or commercial. The PRI is typically repeated throughout the time window. For example, the PRI for a 30 second commercial is broadcasted during the commercial. For a PRI message that is 8 seconds long, the PRI is transmitted four times wherein the first three times are the complete PRI and the fourth time is an incomplete message. The PRI is preferably sent on one or more VBI lines referenced by pointers on line 21, field 2, as described below. The indexing VCR 10 continuously reads the VBI for the PRIs (step 3715). Each PRI has a ID number so that the indexing VCR 10 may recognize when the PRI is repeated during a commercial or in a rerun of the commercial. When the ID number of the present PRI equals the ID number of a PRI in either the temporary or the storage buffers (step 3716), the indexing VCR 10 overwrites the old PRI in the buffer (step 3717). Otherwise, if there is not a match of ID numbers, the indexing VCR 10 determines whether the temporary buffer is full (step 3718). If it is full, it overwrites previously stored PRIs on a first-in-first-out (FIFO) basis (step 3719). Otherwise, the indexing VCR 10 stores the new PRI in the temporary buffer (step 3720). In addition to monitoring the VBI for detected PRIs, the indexing VCR 10 also monitors for user selected commands. If a store command is detected (step 3721), the indexing VCR 10 determines whether a storage enable bit is set (step 3722), which if it is not set during the broadcast then the PRI is not storable (i.e., the PRI can be stored only in the temporary buffer and not in the storage buffer). If the storage enable bit is set, the indexing VCR 10 deletes the PRI from the temporary buffer and stores it in a storage buffer. The indexing VCR 10 then displays an acknowledgement message such as "stored" on the TV screen, if an acknowledgement bit is set (step 3723). The indexing VCR 10 then continues monitoring the PRI at step 3715.

If, however, a store command has not been set or the storage enable bit is not set, if a review command is not detected (step 3724) the indexing VCR 10 returns to reading the PRI. Otherwise, the indexing VCR 10 displays the titles of the PRIs (the first line of the PRI) stored in the buffers in a display such as that shown in FIG. 54 (step 3725). The viewer is able to move through the displayed PRIs using the cursor keys on the remote controller (step 3726). The PRI that is pointed to is highlighted by reverse video or by other methods well known in the art. If a play command is sent (step 3727), the indexing VCR 10 plays the PRI (step 3728). If the PRI is being read from a recorded tape, the VCR enter a pause mode and suspends motion of the tape when the PRI is displayed. After the PRI is displayed, the VCR resumes playing the tape. When the PRI is displayed, the user must either store the PRI in the storage buffer, by pressing the store button (steps 3729-3730), or delete the PRI from either temporary or storage buffer by pressing the erase button (steps 3731-3732). By pressing the print button (step 3733), the user can print the PRI (step 3734). Printing may be done either to a printer or another device connected to the serial port by pressing the record or send button. As shown in FIG. 54, PRI B and PRI D are stored from earlier broadcasts. The PRIs E, F, G, H are from later broadcasts and are stored in the temporary buffer. At a later time when the user presses the Review button again, the PRIs E, F, G, H may be replaced by new PRIs, while PRIs B and D remain in the storage buffer. Alternatively, the displayed PRI, in FIG. 54 may be in a single list with a notation of which PRI's are stored.

For PRIs that contain "PLUSCODE™" numbers referring to other related programs that are to be broadcasted later, when the user presses the second button (step 3735) the indexing VCR 10 stores the "PLUSCODE™" number in its programming stack for subsequent recording (step 3736).

The indexing VCR 10 continues to display the buffer content until the user presses the exit key (step 3737).

The embodiment discussed above uses the STORE button and the REVIEW button for storing and reviewing PRIS. Alternatively, these functions may be done by a single button, such as the i button. Pressing the i button one time may invoke the storage function while pressing it twice in a row may invoke the review function.

Figure 55:
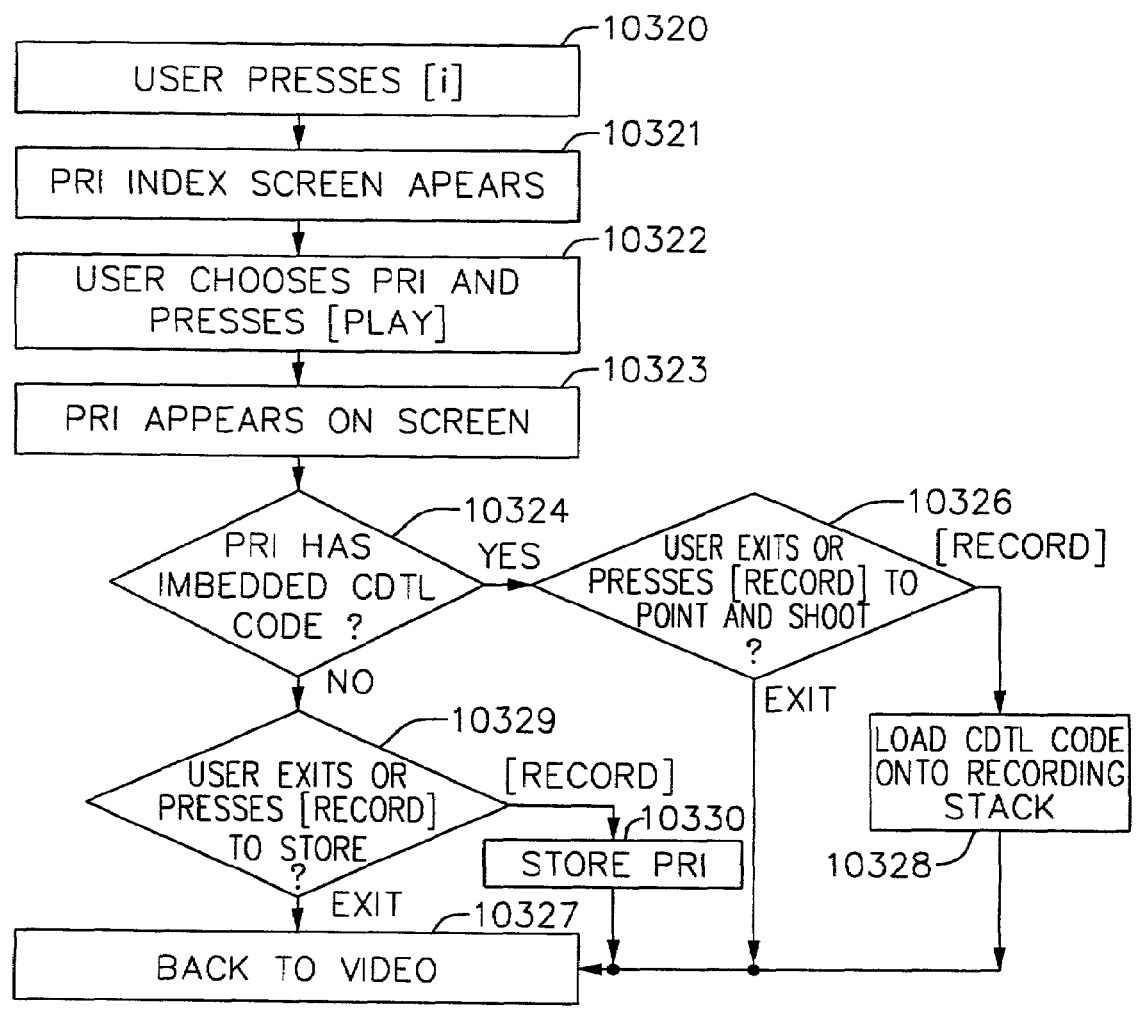
FIG. 55 is a flow chart showing the steps employed in an alternate embodiment for processing of program related information during broadcast.
Figure 51:
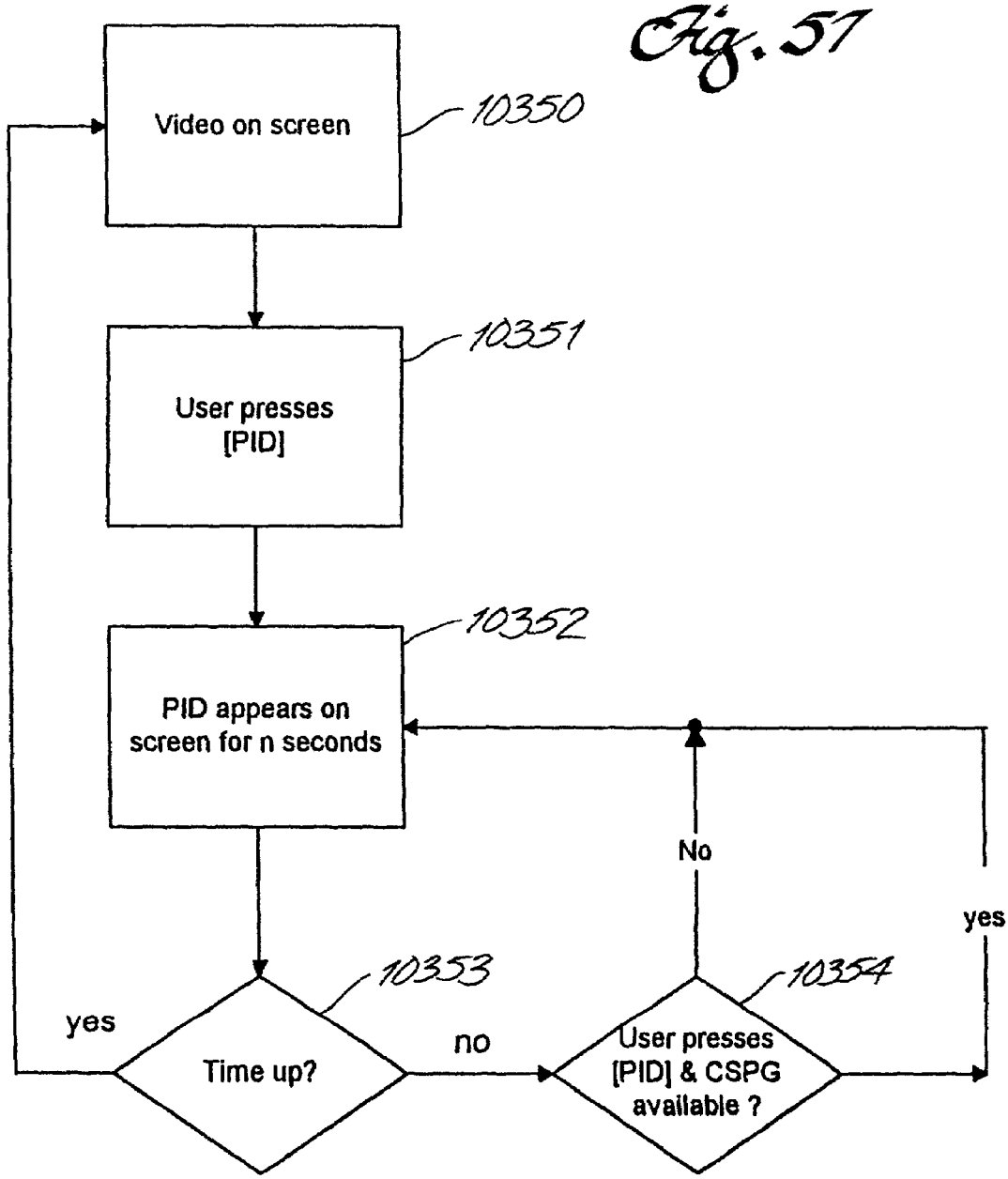

FIG. 55 is a flow chart showing the steps employed in an alternate embodiment for processing of program related information during broadcast. In this embodiment, the PRI data is stored into the temporary buffers described above in steps 3715-3720 of FIG. 53.

In addition to monitoring the VBI for detected PRIs, the indexing VCR 10 also monitors for user selected commands. When the user sends an "i" command (step 110320), the microprocessor controller 31 displays a PRI index screen as shown in FIG. 54, which shows the titles of the PRIs stored in the buffers, and described above in conjunction with FIG. 53 (step 10321). The viewer is able to move through the displayed PRIs using the cursor keys on the remote controller 75. The user chooses the desired PRI and presses the PLAY button (step 10322). The microprocessor controller 31 retrieves the PRI from the RAM 33 and displays it on the display 50a (step 10323).

If the PRI has an embedded CDTL code (step 10324), the user can select to exit and not record or can record the corresponding program (step 10326). If the user sends an exit command, the microprocessor controller 31 removes the PRI from the display and returns to displaying the video signal from the tuner (step 10327). Otherwise if the user selects to record to point and shoot (step 10326), the microprocessor controller 31 stores the CDTL code in its programming stack for subsequent recording (step 10328). The indexing VCR 10 then displays the video signal from the tuner (step 10327).

If on the other hand, the PRI does not have an embedded CDTL code (step 10324), the user can select to exit and not save the PRI or can save the PRI (step 10329). If the user sends an exit command, the microprocessor 31 removes the PRI from the display and returns to displaying the video signal from the tuner (step 10327). If the user sends a record command, the microprocessor controller 31 stores the PRI into permanent storage (step 10330) and displays the video signal from the tuner (step 10327).

FIG. 56 is a flow chart showing the steps employed in an alternate embodiment for processing of program related information during playback of a tape. In this embodiment, the PRI data that was either broadcast with the transmitted signal for HR tapes or recorded directly onto the VBI for prerecorded tapes is stored in the VBI on the magnetic tape. As the tape is being played, the PRI data is read from the VBI and stored into the temporary buffers as described above in steps 3715-3720 of FIG. 53.

When the user sends an "I" command (step 10335), the microprocessor controller 31 determines whether an embedded CDTL code is in the current PRI (step 10336). If it is, the microprocessor controller 31 decodes the CDTL code (step 10337) and determines whether the date calculated therefrom has passed (step 10338) If the date has passed, the CDTL code is removed from the PRI (step 10339). In either case, the microprocessor controller 31 displays the current PRI on the screen (step 10341). The microprocessor controller 31 then commands the VCR 1 into a pause mode (step 10342). If the PRI has a CDTL code (step 10343), the microprocessor controller 31 proceeds as described above in steps 10326 and 10328 for FIG. 55, except that instead of displaying the video signal from the tuner at step 10327, the VCR 1 resumes playing the video tape (step 10344). Otherwise, if the PRI does not have a CDTL code (step 10343), the microprocessor controller 31 proceeds as described above for steps 10329-10330, in FIG. 55. After which the microprocessor controller 31 commands the VCR 1 to resume playing the tape (step 10344).

PID, CSPG Display Sequence During Playback

FIG. 57 is a flow chart showing the steps employed for processing requests for program identification and channel specific program guides during tape playback. During tape playback, the microprocessor controller 31 is commanding the VCR 31 to provide the video signal reproduced from the video tape 42 onto the display 50*a* (step 10350). While viewing the program, the user presses the program identification (PID) button on the remote control 75 (step 10351). In response thereto, the microprocessor controller 31 retrieves the program identification from the PDI and displays the PID on the display 50*a* for a predetermined time, e.g., n seconds (step 10352). After the n seconds has elapsed, the microprocessor controller 31 removes the PID from the screen (step 10353) and returns to providing the video to the display 50*a* (step 10350). Until the n seconds has elapsed (step 10353), if the user subsequently presses the PID button and a channel specific program guide is available (step 10354), the microprocessor controller 31 continues to display the PID (step 10352). Alternatively, the microprocessor controller 31 retrieves the channel specific program guide as described below, although a CSPG is typically dated when played from a tape). Otherwise, the microprocessor controller 31 continues to display the PID (step 10352).

PID, CSPG Display Sequence During Broadcasting

Figure 58:
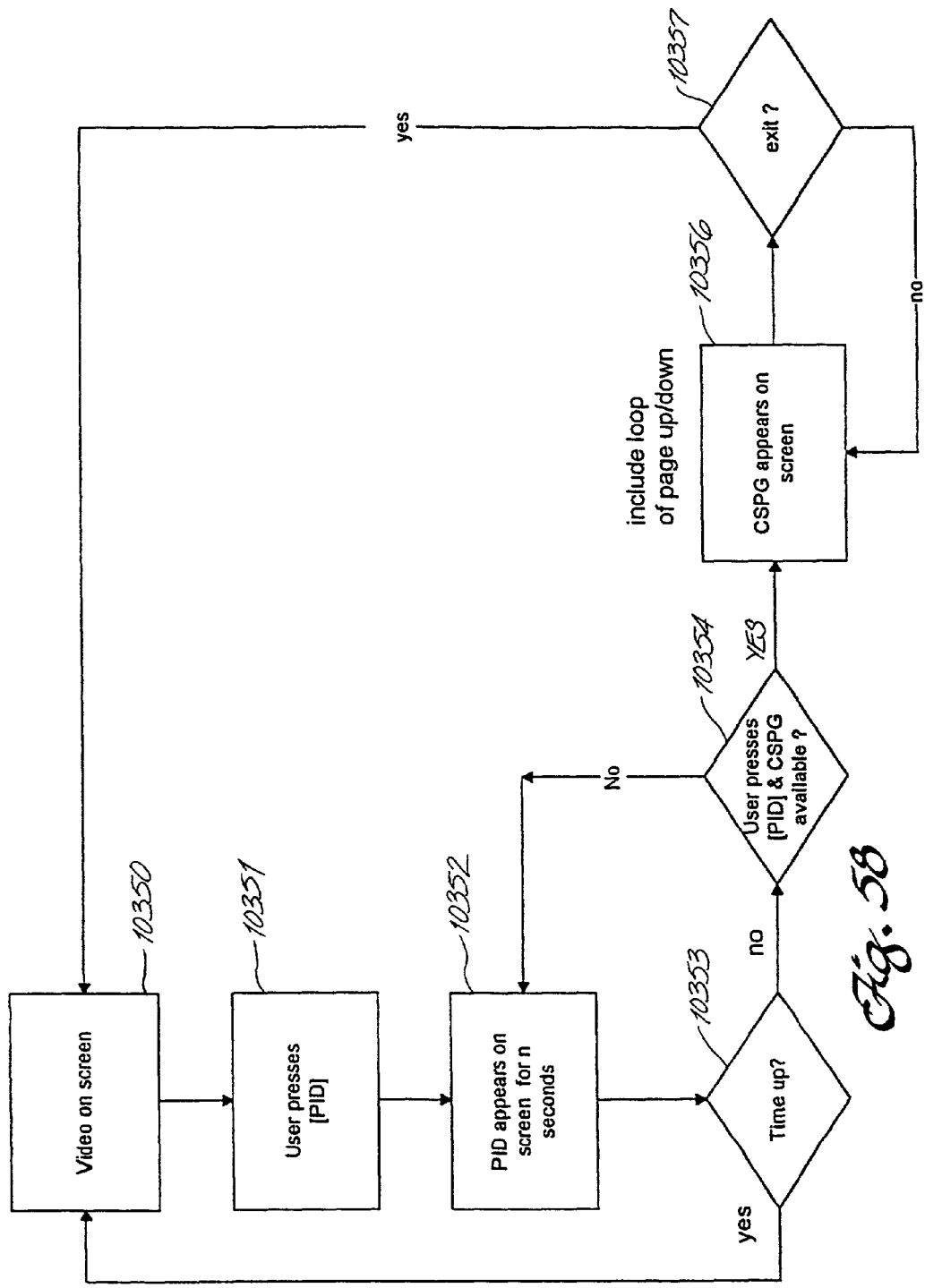
FIG. 58 is a flow chart showing the steps employed for processing of program identification and channel specific program guide during broadcast.

FIG. 58 is a flow chart showing the steps employed for processing of program identification and channel specific program guide during broadcast. As described above for steps 10350-10354 of FIG. 57 for selecting PID and channel specific program guide during tape playback, the PID is similarly retrieved. When the channel specific program guide has been selected (step 10354), the microprocessor controller 31 retrieves the channel specific program guide from the VBI of the broadcasted signal and displays such guide on the display 50*a* as described below (step 10356). The microprocessor controller 31 continues to display the channel specific program guide until the user exits by again pressing the PID button (step 10357). The microprocessor controller 31 returns to displaying the video on the display 50*a* (step 10350).

Point & Shoot During CSPG (During Broadcast)

Figure 59:
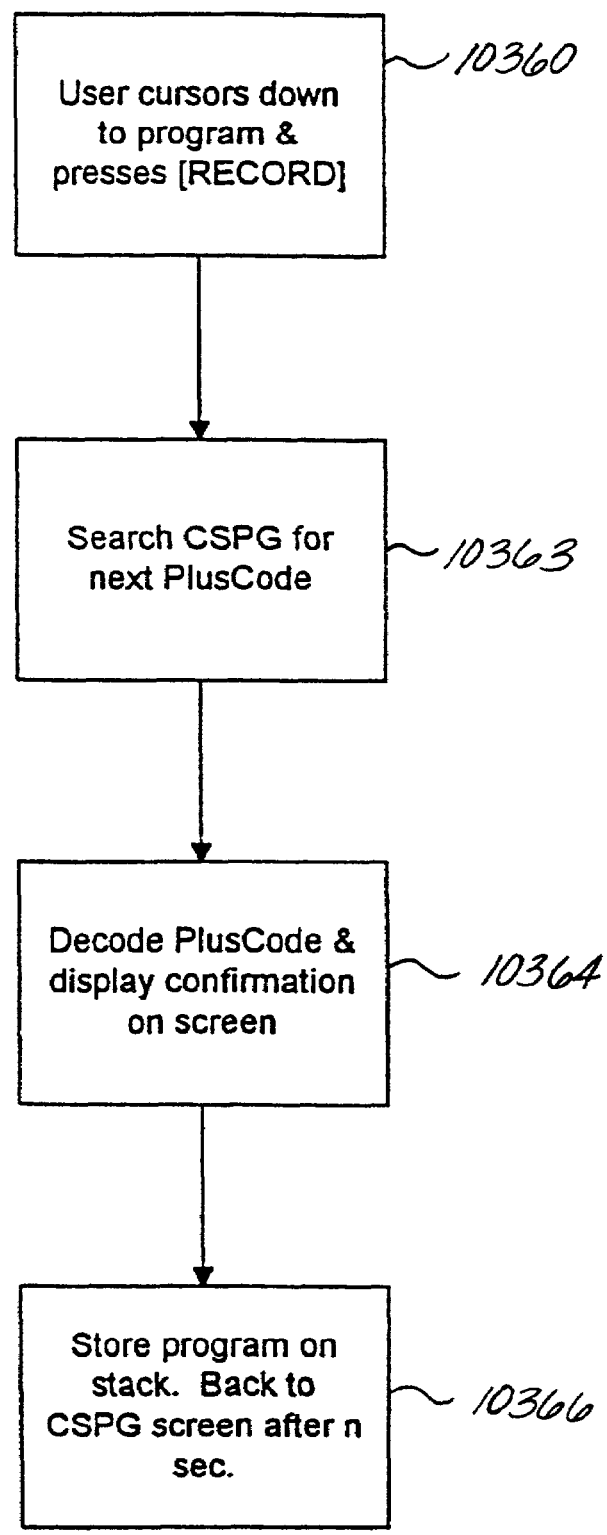
FIG. 59 is a flow chart showing the steps employed using the point and shoot feature of the channel specific program guide during broadcast.

FIG. 59 is a flow chart showing the steps employed using the point and shoot feature of the channel specific program guide during broadcast.

Figure 60:
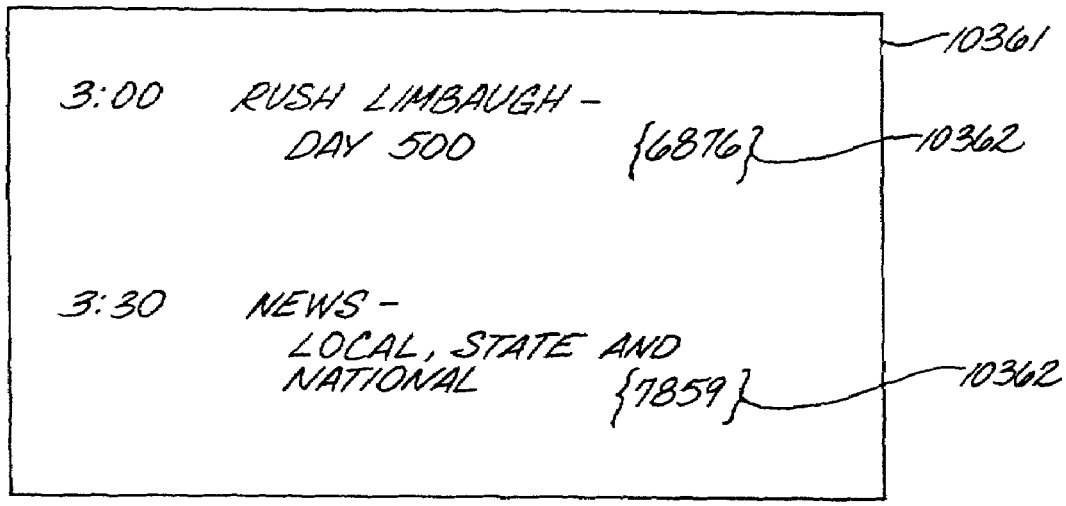
FIG. 60 is a schematic showing a CSPG display.

FIG. 60 is a schematic showing a CSPG display.

While the channel specific program guide is being displayed as screen 10361 in FIG. 60, the user can cursor through the pages using both cursor and page buttons on the remote control 75 (step 10360). When the user reaches a desired program, the user presses the record button (step 10360). As shown in FIG. 60, a channel specific program guide screen 10361 has the time of programs and a description of the program. A CDTL code 10362 can be displayed on the screen or can be in the memory at the end of each program but not displayed. A cursor pointing to any of the lines of the screen retrieves the corresponding CDTL code when the user presses the record button. In response to the record command, the microprocessor controller 31 searches the CSPG for the next CDTL code (step 10363). The CDTL code is decoded and the corresponding channel, date, length and time information is displayed on the display 50*a* for confirmation by the user (step 10364). Upon confirmation, the CDTL information is stored in the recording stack for timer programming as described above. The microprocessor controller 31 then returns back to the CSPG screen after a predetermined time, e.g., n seconds (step 10366).

Special Handling for VM Packet.

Figure 61:
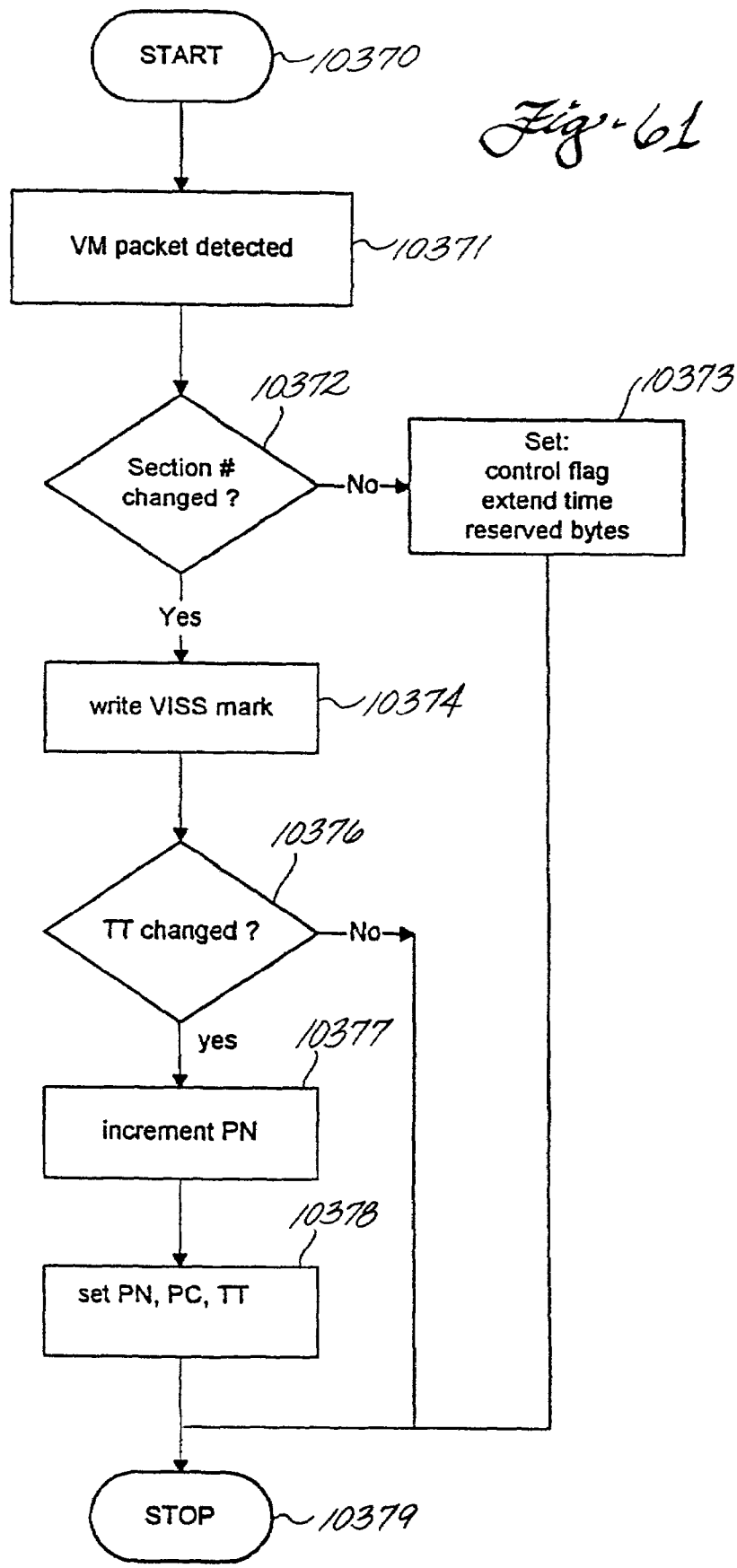
FIG. 61 is a flow chart showing the steps employed in the operation of processing VM packets.

FIG. 61 is a flow chart showing the steps employed in the operation of processing VM packets.

The microprocessor controller 31 constantly monitors the VBI (step 10370) and when a VM packet is detected (step 10371), the microprocessor controller 31 determines whether the section number contained within such packet has changed (step 10372). If the section number has not changed, the microprocessor controller 31 sets the control flag and extends time reserve bytes (step 10373) and then returns back to monitoring the VBI (step 10374).

On the other hand, if the section number has changed, the microprocessor controller 31 commands the VCR 1 to write a VISS mark on the control track 42*c* (step 10374). The microprocessor controller 31 then determines whether the program name or tape title (TT) has changed (step 10376). If the tape title has not changed the microprocessor controller 31 then returns to monitoring the VBI (step 10374). Otherwise, if the tape title has changed (step 10376), the microprocessor controller 31 increments the program number (step 10377) and sets the program number, the program category and the tape title (e.g., by using function code 22, described below) for creating a new program for the current tape in the RAM 33 (step 10378). The new program title is added to the directory. The microprocessor controller 31 then returns to monitoring the VBI (step 10374).

Switching Between Video and Text and Video

Figure 62:
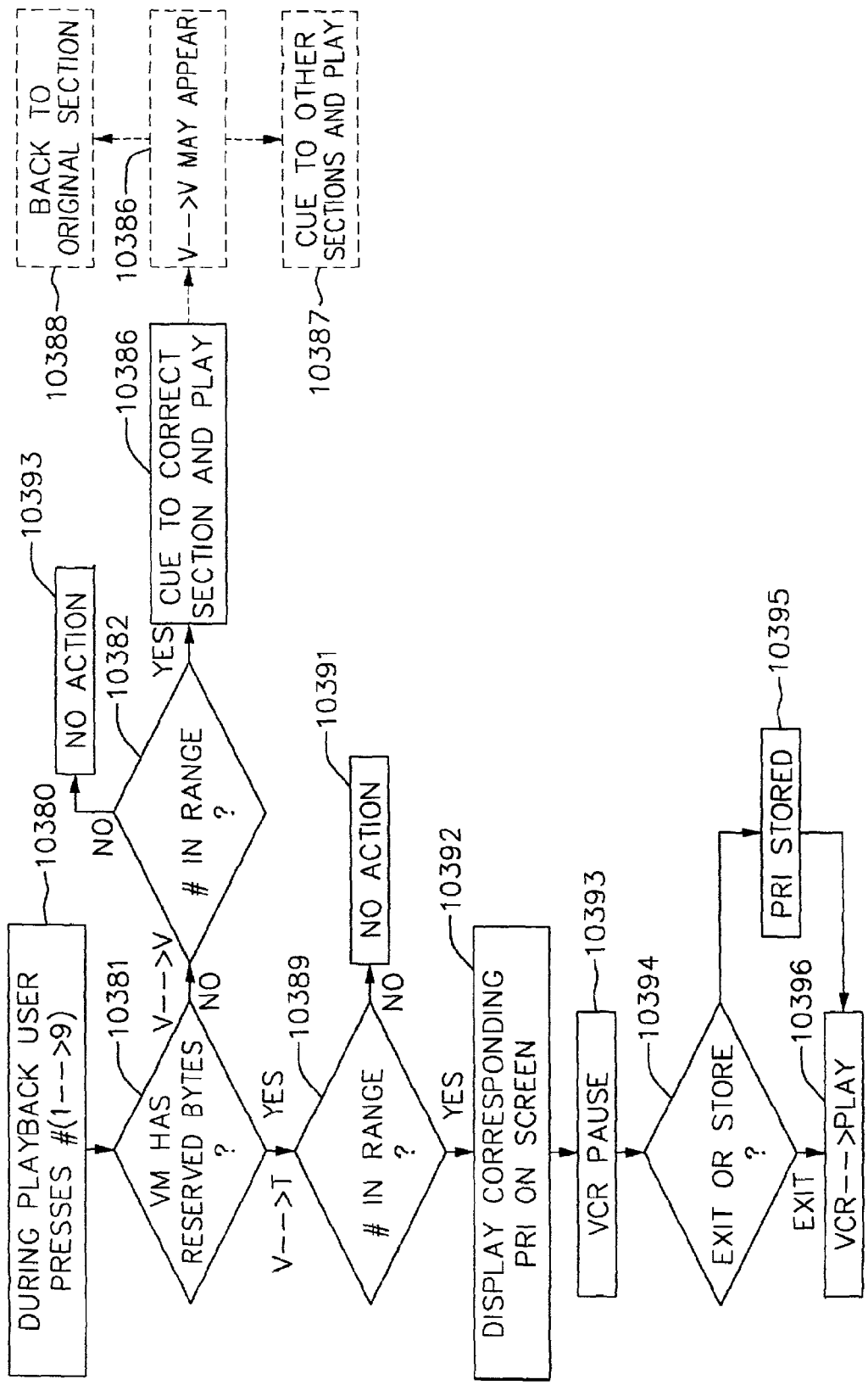
FIG. 62 is a flow chart showing the steps employed in the operation of switching between video and text and video.

FIG. 62 is a flow chart showing the steps employed in the operation of switching between video and text and video.

During playback of the tape, a lookup table of numbers for PRI's and numbers for video sections on the tape are downloaded (step 10380).

During such playback, the user may request a selection from the screen by pressing a display number corresponding to a selection. The number on the screen is typically between 1 and 9 inclusive.

If the VM packet does not have reserved bytes (step 10381), the microprocessor controller 31 enters a video-to-video mode and determines whether the selected number is within a valid range (step 10384). If not, the microprocessor controller 31 ignores the command and takes no action (step 10383). Otherwise, if the number is in a valid range, the microprocessor controller 31 then cues the tape to the correct section and plays the requested section (step 10384). Such cueing is done by retrieving from the directory either the number of VISS marks between the present location and the requested location and advancing the tape accordingly or using an absolute addressing system, both systems being described above. During the play of the selection, the video is being displayed (step 10386). During such time, the user may cue to another section and play the subsequent section (step 10387). Otherwise, the microprocessor controller 31 returns back to the original section (step 10388).

On the other hand, if the VM packet does have reserved bytes (step 10381), the microprocessor controller 31 goes into a text mode. If the requested section number is not within a valid range (step 10389), the microprocessor controller 31 takes no further action (step 10391). Otherwise, the microprocessor controller 31 displays the PRI corresponding to the requested number on the screen (step 10392). The microprocessor controller 31 then commands the VCR 1 to a pause mode (step 10393). The microprocessor controller 31 then waits for the user to enter either a exit or a store command (step 10394). If a store command is returned, the microprocessor controller 31 stores the requested PRI in the RAM 33 (step 10395). The microprocessor controller 31 then releases the VCR 1 from the pause mode and puts it into the play mode (step 10396). Similarly, if an exit command is made, the microprocessor controller 31 returns the VCR 1 to a play mode (step 10396).

Video Publishing Through Broadcast

As described above, a PR tape has a directory recorded on the VBI throughout the tape. However, a single video program that is being broadcasted may similarly have a plurality of video segments that are each separate video programs. For example, one airing of the television show "60 Minutes" typically has three news segments and one segment with commentary by Andy Rooney. Other examples include video magazines, video sales catalogs and video classified ads. Another example are video books such as karaoke or how to books, e.g. on exercise or cooking. The user normally wants to watch positions of the video magazine at later times. Under the standard recording method described above, the indexing VCR 10 reads only one program title in the VBI of the broadcasted program, since the recording is in one continuous session. (The resultant recording will have a single constant program number in the TP packet on line 19. In addition, only one VISS mark is recorded which is at the beginning of the recording.) However, many users want each video segment to be indexed. Accordingly, extra control signals are broadcast to provide additional indexing to each individual section.

A pointer, described below in conjunction with FIG. 83, in line 21 points to a VBI line which contains a video magazine (VM) packet. The VM packet is broadcast in the VBI line at the starting point of the second section and of each section thereafter. As described below in conjunction with FIG. 85, the VM packet contains the encrypted title of the section. At the same time, the directory is broadcasted repeatedly on line 20 of the VBI. The format of the directory is identical to the format of directories for prerecorded tapes.

Figure 63:
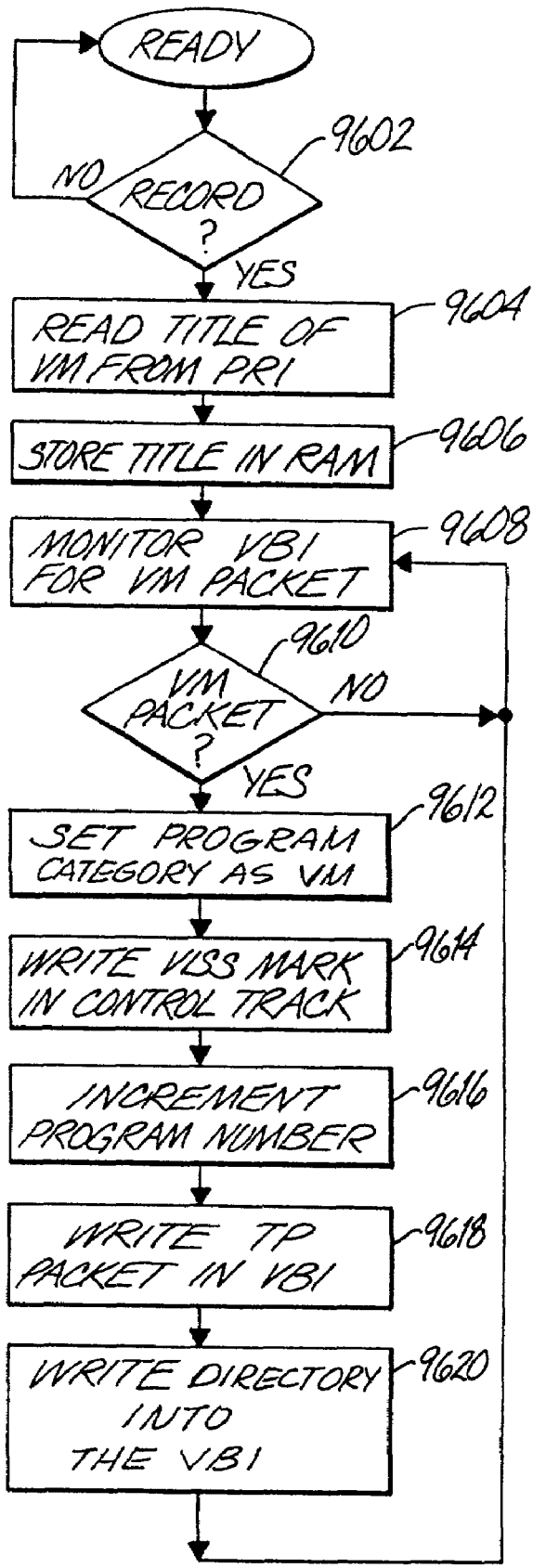
FIG. 63 is a flow chart showing the steps employed in the operation of the indexing VCR 10 for video magazines.

FIG. 63 is a flow chart showing the steps employed in the operation of the indexing VCR 10 for video magazines. FIG. 63 is discussed in light of an illustrative example in which a tape has two regular programs and one video magazine, which is recorded after the two programs, on the tape. After the user presses the Record button, (step 9602), the indexing VCR 10 reads the title of the video magazine from the PRI (step 9604) and stores it in the RAM 33 (step 9606). (When recording is started, the indexing VCR 10 uses the existing TID if the tape has one, or otherwise, the indexing VCR 10 creates a TID if the tape is a blank tape.) In the illustrative example, the title is stored as the third program. The indexing VCR 10 monitors the VBI for VM packets (step 9608). Upon detection of a VM packet in the VBI (step 9610), the microprocessor controller 31 sets the program category in the directory to indicate that the program is a video magazine (step 9612). In an embodiment where a pointer is used to note the line on the VBI, upon detection of the pointer, the indexing VCR 10 monitors the designated line of the VBI for the occurrence of a VM packet.

In response to receiving the VM packet, The microprocessor controller 31 writes a VISS mark on the control track 42c to identify the start of the next section (step 9614). The microprocessor controller 31 then increments the previous program number by one (step 9616) and writes it as the program number in the TP packet on line 19 of the VBI (step 9618). The indexing VCR 10 reads and decrypts the directory from line 20 of the VBI of the broadcast signal and writes it onto the VBI of the tape (step 9620).

For the illustrative example, if the tape is somewhere in a program, such as program 2, other than the video magazine when the user later inserts the tape, the directory will appear as:

| Program | Length |
|---|---|
| Cheers | 60 |
| →Eyewitness news | 30 |
| Entertainment Week (VM) | 60 |

The sectional titles of the video magazine "Entertainment Week" do not appear. When the user is in program 3 and presses the Index button, because the indexing VCR 10 reads the VM flag indicating that the current tape location is a video magazine, it reads the directory of the magazine from line 20 of the VBI. The VCR then displays a directory as follows:

| Program | Length |
|---|---|
| Cheers | 60 |
| Eyewitness news | 30 |
| →Entertainment Week (VM) | 60 |
|    Dining out | |
|    Music | |
|    Plays, musicals | |
|    Sports | |
|       Chess | |
|    Museums | |
|    Life entertainment | |
|    Special events | |

This directory does not show the length of the individual sections of the magazine. In other illustrations, the individual lengths may be shown. A section of the video magazine may have subsections, such as illustrated where chess is a subsection of sports.

The VM packet and subsequently the directory recorded on the tape for the video magazine includes the program numbers, the start address, and the stop address of the video magazine. In a first embodiment, the first program of the magazine as a program number 1. As in the illustrative example, "Entertainment Week" has a program number 1, "Dining out" has a program number 2, and so forth. The start address of "Entertainment Week" is 0. The microprocessor controller 31 adjusts these numbers to reflect the relative position of the video magazine in the index. As per the illustration, "Entertainment Week" is adjusted to be program 3 with a start address corresponding to the end of program 2.

In an alternate embodiment, the directory of the video magazine is stored in the RAM 33 instead of the tape. By storing the directory in the VBI, less RAM memory space is used for storage.

The created tape is structurally the same as an HR tape with VISS marks on the control track, and TP packets written on the VBI of the tape and directory packets for the video magazine written on the VBI and section titles stored in the RAM 33.

Addressable Auxiliary Information

Figure 64:
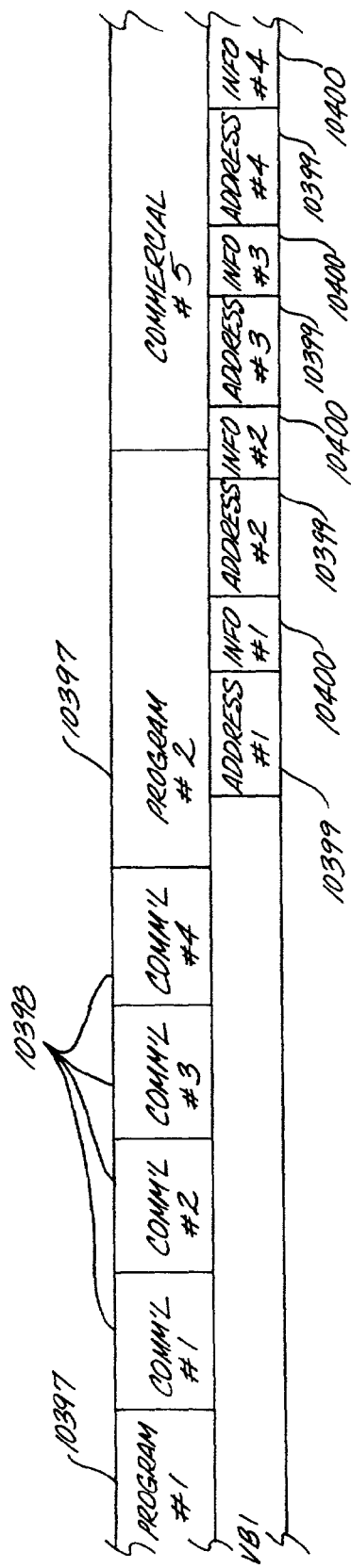
FIG. 64 is a schematic view showing the timing of television programs and commercials that are transmitted as video signals and addressable auxiliary information that is broadcast in the VBI of the video signals.

FIG. 64 is a schematic view showing the timing of television programs and commercials that are transmitted as video signals and addressable auxiliary information that is broadcast in the VBI of the video signals.

Figure 65:
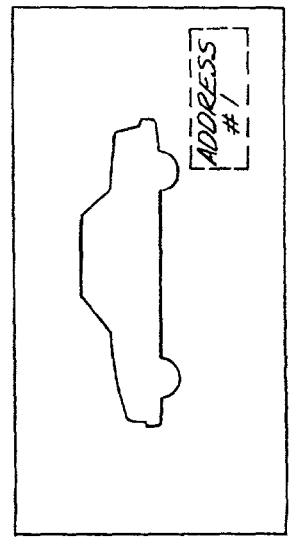
FIG. 65 is a schematic view showing the screen displayed during a commercial.

FIG. 65 is a schematic view showing the screen displayed during a commercial.

FIG. 66 is a schematic view showing the video signals transmitted over a plurality of channels containing programs and commercials and a secondary channel containing the addresses and addressable auxiliary information.

Referring now to FIG. 64, a plurality of programs 10397 are transmitted on a video channel. For example, program #1 and program #2 are broadcast on a channel 1. Between these programs, commercials 10398, e.g., commercials #1 through #4, are transmitted. During a commercial, a prompt containing a unique address (or identifier) is provided to the viewer. The address may be an alphanumeric character that is provided audibly or visually. For example, referring now to FIG. 65, commercial #1 for a car has displayed address #1. (Alternately, the address could be provided prior to or after the commercial as aired.) The address references addressable auxiliary information that is transmitted in the VBI. Referring back to FIG. 64, the address is serially transmitted in the VBI. For example, address #1 is followed by the addressable auxiliary information #1 for commercial #1. Similarly, the address #2 for commercial #2 is followed by the addressable auxiliary information for commercial #2, and so forth.

The processing of the addressable auxiliary information operates as follows. Commercials #1 through #4 are transmitted after program #1. During commercial #1, the user is informed that auxiliary information pertaining to the product advertised in commercial #1 is available by entering the displayed address on the remote controller 75. Similarly, commercial #2 informs the viewer that additional information is available by entering address #2 and so forth through commercial #4. Say for example, that the viewer wants additional information for commercial #2. The user enters the displayed address #2 on his remote controller which the micro-processor controller 31 stores in the PRI buffer which is described above. The indexing VCR 10 constantly monitors the VBI of the incoming video signal. The micro-processor controller 31 compares the requested addresses to the received addresses. When a PRI having the requested address, here address #2, is detected, it is stored in the PRI buffer for later recall by the user. (Normally, as described above, PRI is stored in the temporary PRI buffer and only becomes stored after receiving a store command.) In embodiments in which the addressable auxiliary information is transmitted after the commercial, it is only necessary to store the requested PRI. In the example in which the user has requested information related to commercial #2, upon detecting address #2, the microprocessor controller 31 stores the information #2, which relates to commercial #2, in the permanent PRI buffer. Unless requested, the microprocessor controller 31 does not store the auxiliary information #3 or #4. The auxiliary information stored in the permanent PRI is processed as described above.

Alternately, the addressable auxiliary information may be broadcast prior to and during the commercials. In these embodiments, it is necessary for the microprocessor controller 31 to store in the temporary PRI buffer the addressable auxiliary information for all commercials.

The timing of the broadcast of the addressable auxiliary information after the broadcast of the commercials is preferably selected so that the viewer has sufficient time to enter the address but is broadcast soon enough to reduce delays if the viewer quickly requests the viewing of the information. Although not shown in FIG. 64, the addressable auxiliary information may be broadcast several times following the commercial to provide the viewer a longer time for requesting such information.

Referring now to FIG. 66, the programs and commercials are broadcast in a plurality of channels. In FIG. 66, channels 1-4 are shown. A secondary channel contains the addressable auxiliary information for the plurality of channels. Here channel 5 contains the addressable auxiliary information for channels 1-4. The format of channels 1-4 for commercials and programs is similar to that as shown above in FIG. 64, i.e., commercials are broadcast between programs and the commercials provide an address. The addressable auxiliary information broadcast in channel S may be done in several ways. First, the data for each day (such date includes titles, messages and CDTL programming codes) may be predetermined each morning and transmitted on a continuous and recurring basis throughout the day. This allows the VCR in response to both user requested addresses and CDTL codes stored in memory to retrieve from the continuous data stream the requested information that matches the addresses.

Alternately, the addressable auxiliary information for each program may be sent near the start time of the broadcast of that program and either not repeated or repeated only during the broadcast of the program to which it pertains.

In this embodiment, it is necessary for the indexing VCR 10 to monitor the secondary channel, here channel 5, to retrieve the requested addressable auxiliary information. Depending on the user's equipment, it may be necessary to have a second tuner in the indexing VCR. For example, if the indexing VCR provides the video signal to the television on a predetermined channel, for example channel 3, (of systems in which the television does not have a tuner and functions only as a monitor) the operation of this system is as follows. The viewer, while watching a channel, say channel 2 sees a commercial #6 about which the viewer decides that he wants additional information. In response to the prompt in the commercial, the user enters the address #6 corresponding to commercial #6. In response thereto, the microprocessor controller 31 monitors the tuner for channel 5 (or in embodiments having a second tuner monitors the second tuner on channel 5, the first tuner being on channel 2). When address #6 is detected, the microprocessor controller 31 stores the auxiliary information #6 that follows the address in the permanent PRI buffer. Information #6 is added to the directory of PRIs stored in the PRI buffer. This PRI may be retrieved and played at a later date in a manner as described above.

The addressable auxiliary information may, as does the auxiliary information described above, contain a CDTL code for timer programming the VCR. The operation of such programming is described below.

Electronic Program Guide with Video Clips

In another implementation of the video magazine, an electronic program guide having a plurality of video clips is broadcast as a video magazine. The electronic program guide may include video clips for the following day or several days. The guide may also include shows and other broadcasted programs such as movies and sports. Each video clip represents an upcoming show and includes a teaser for that show. Each video clip corresponds to a chapter or segment in the video magazine. The corresponding video data packet includes the title of the magazine which is the channel number/name, the date and the words "program guide". The subtitle of each chapter is the name of the show and the time and date of the broadcast. In addition, the "PLUSCODE™" number for each show is also broadcast in the VM data packet.

Figure 67:
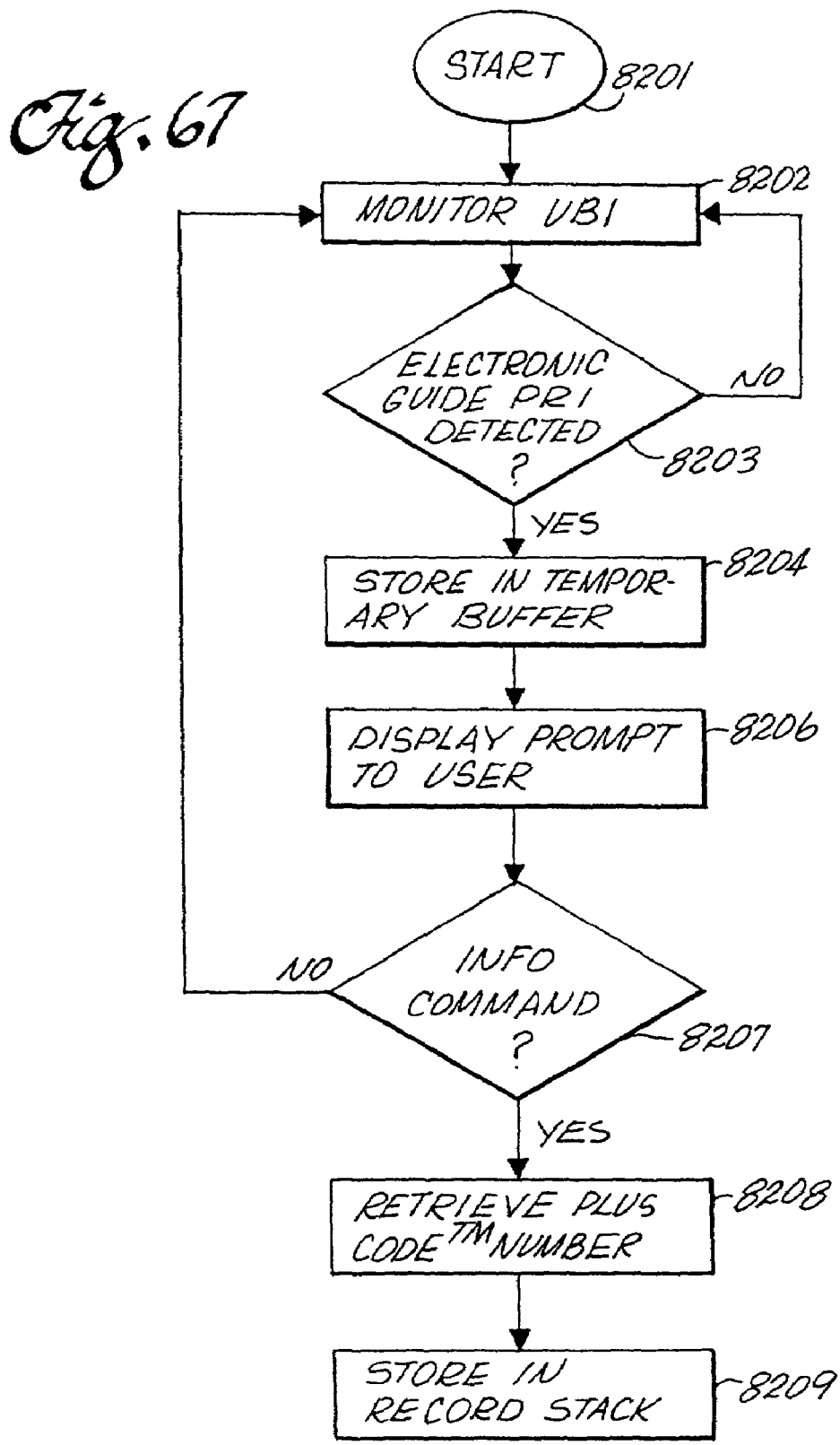
FIG. 67 is a flow chart showing the steps employed in the operation of recording an electronic program guide.

FIG. 67 is a flow chart showing the steps employed in the operation of recording an electronic program guide. At the start of normal system operations (step 8201), the indexing VCR 10 monitors the VBI for the program related information (PRI) (step 8202) until a program guide PRI is detected (step 8203). The microprocessor controller 31 stores the program guide PRI, which includes the "PLUSCODE™" number corresponding to the electronic guide which is broadcasted at a later time, and, in some implementations, on a different channel, in the temporary buffer (step 8204). The indexing VCR 10 displays a prompt to the user to alert him that he may capture the "PLUSCODE™" number to record the electronic program guide at a later time (8026). If the info button is pressed (step 8207), the microprocessor controller 31 retrieves the "PLUSCODE™" number from the temporary buffer (step 8208) and decodes it to generate the channel-date-time-length information which is stored in the VCR record stack as described above (step 8209).

Figure 68:
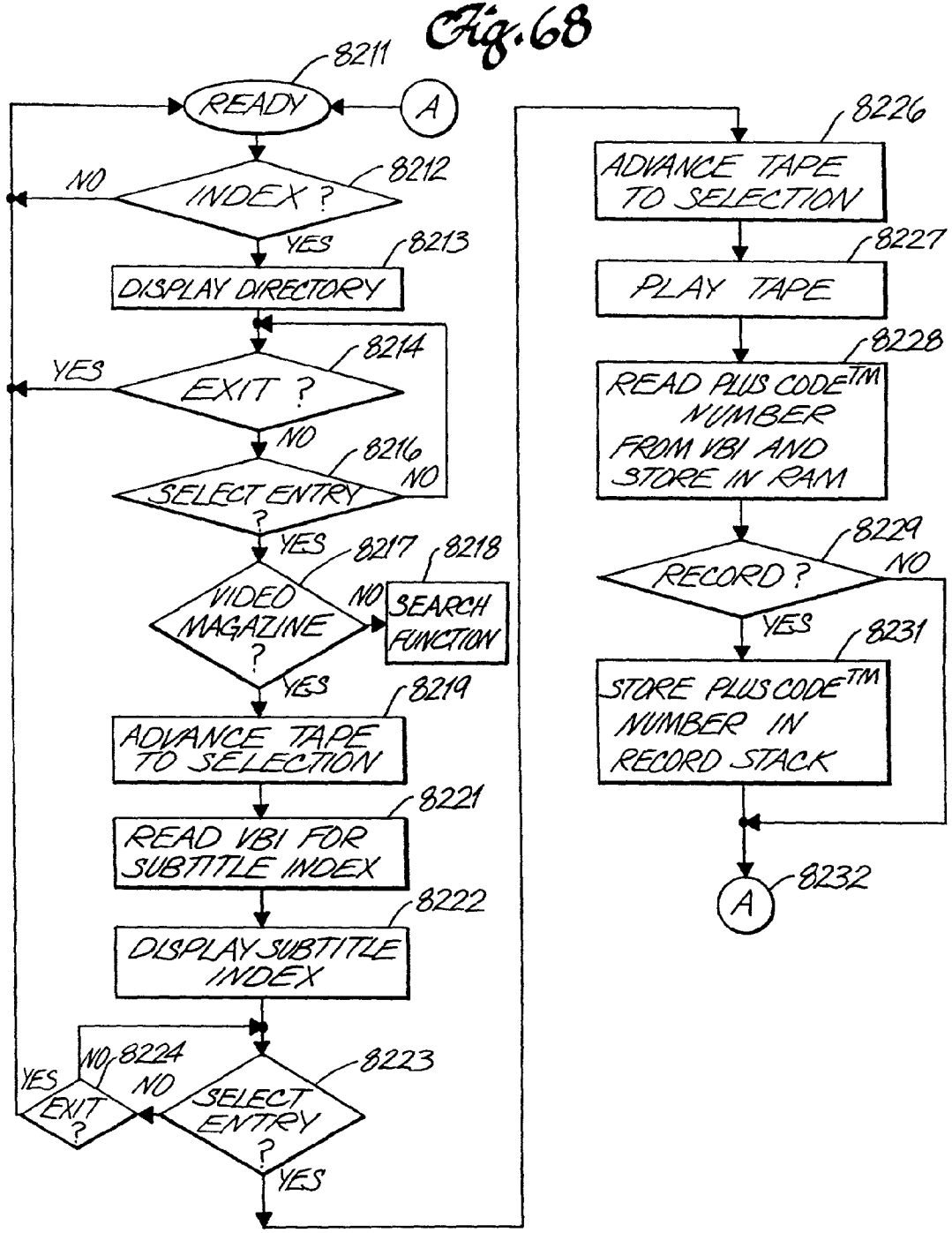
FIG. 68 is a flow chart showing the steps employed in the operation of the index functions for an electronic guide using the indexing VCR.

FIG. 68 is a flow chart showing the steps employed in the operation of the index functions for an electronic guide using the indexing VCR. While the indexing VCR is in a ready mode (step 8211), it monitors whether an index command has been transmitted (step 8212). When it has, the indexing VCR 10 displays a directory as shown in FIG. 69 (step 8213). If an exit command has been sent (step 8214), the VCR enters a ready mode at step 8211. Otherwise, the VCR waits for the user to exit or select an entry from the displayed index (step 8216). If the selected entry is not "video magazine" (step 8217), the indexing VCR 10 performs a search function in accordance to that described above in conjunction with FIG. 44 (step 8218). The count of VISS marks for programs on the tape after the video magazine is adjusted to include the number of VISS marks within the video magazine. On the other hand, if video magazine has been selected at step 8217., the indexing VCR 10 advances the tape to the selected video magazine (step 8219) and reads the subtitle index from the VBI (step 8221). The indexing VCR 10 then displays the subtitle index as shown in FIG. 70 (step 8222). The indexing VCR then waits for either the user to select an entry (step 8223) or for the user to exit (step 8224). If the user has entered a selection from the subtitle index, the indexing VCR 10 advances the tape to the selection (step 8226) and begins playing the tape (step 8227). The VCR then reads the "PLUSCODE™" number from the VBI and stores it in the RAM 33 (step 8228). If the user presses the record button (step 8229), the indexing VCR 10 decodes the "PLUSCODE™" number and stores the corresponding channel-date-time-length information in the record stack for timer programming of the VCR and returns to the ready mode at step 8211 (step 8232).

In an alternate embodiment to FIG. 68, at step 8221, the indexing VCR 10 also reads the "PLUSCODE™" numbers associated with the programs and stores them in the RAM 33 when the subtitle index information is transferred from the VBI to the RAM for display. Further, at step 8223 the user can record an entry while looking at the display subtitle index of FIG. 70 by pressing the record button on the remote controller. The indexing VCR 10 then retrieves the "PLUSCODE™" number from the RAM, decodes it into the channel, date, time and length information and stores it in the record stack at step 8231. This embodiment allows the user the option of selecting shows from the directory screen for recording without viewing the corresponding video clip.

Electronic Program Guide with a Video Grid and Video Clips

In yet another embodiment of the video magazine, the broadcaster broadcasts an electronic program guide wherein the electronic guide includes the program title, channel, date, and time of upcoming programs as well as an associated video clip which is identical to the video clips previously described above in the Electronic Program Guide With Video Clips embodiment. In that embodiment, the electronic guide is transmitted in the form of VBI text data. Unlike that embodiment, this electronic program guide transmits both the menus and the video clips as full frame video. Accordingly, all the information displayed on the screen is transmitted as video. The display is not limited by the character generator in the VCR.

To produce an electronic guide, the broadcaster or guide producer creates graphics by computer or other electronic devices or by hand. The broadcaster then generates video images of the graphics by filming or recording. The video images are then broadcasted as a video magazine. Along with the video images, the broadcaster transmits addressing information for correlating the images on the screen with other video images, "PLUSCODE™" number or channel-date-length-time corresponding to a program depicted in the guide with a future broadcast, and position information for correlating positions on the screen with the program and the other information broadcasted in the VBI.

Figure 71:
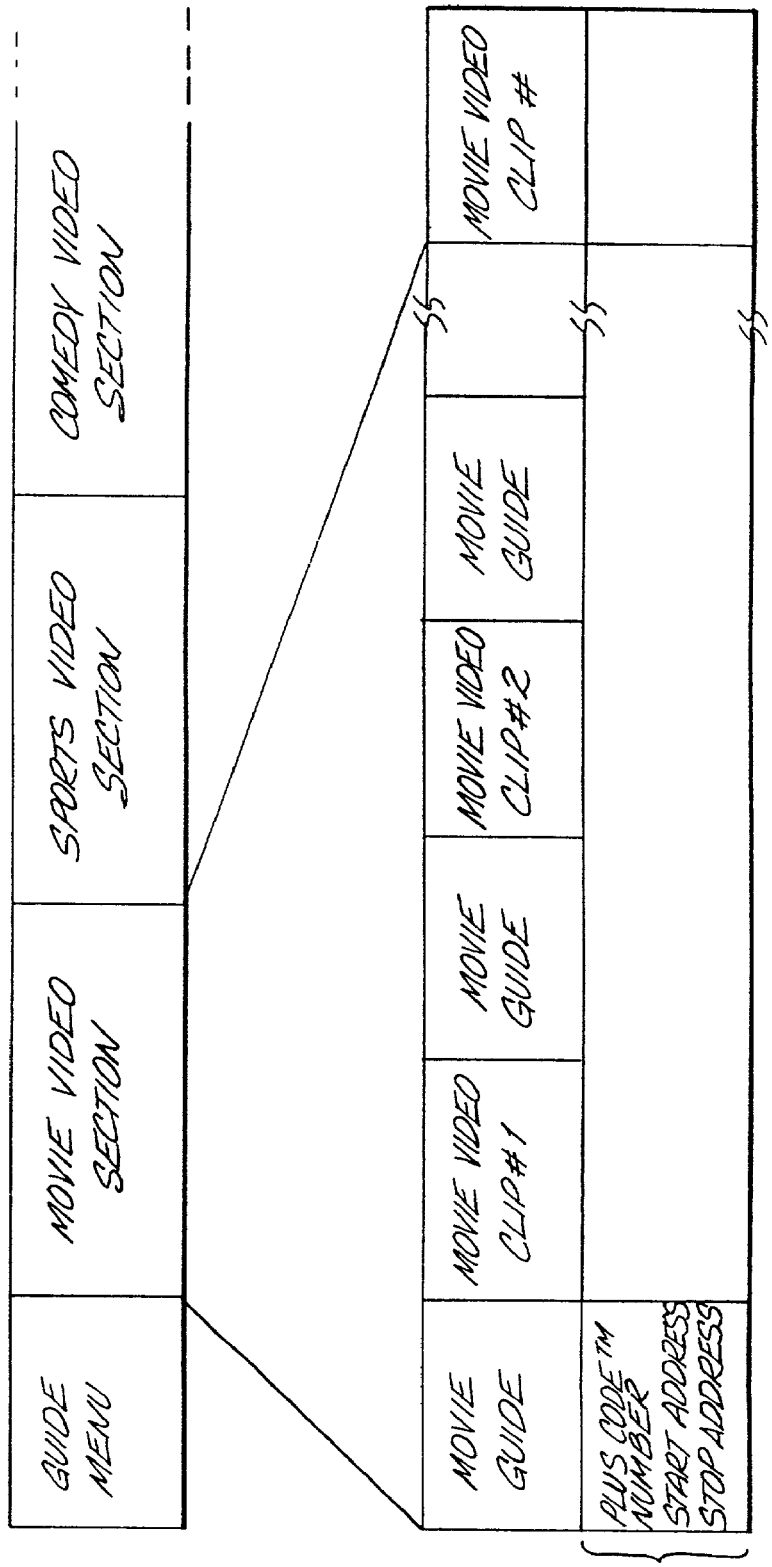
FIG. 71 is a schematic diagram illustrating the electronic program guide with a video grid and video clips with an exploded view of a movie guide portion of the guide.

FIG. 71 is a schematic diagram illustrating the electronic program guide with a video grid and video clips with an exploded view of a movie guide portion of the guide. An electronic program guide 3740 has a guide menu and a plurality of video sections (also called video chapters). The guide menu contains information for the title and descriptions of the video sections displayed in locations (or cells) arranged in a grid pattern on the screen. Along with the guide menu, the broadcaster transmits in the VBI the location of each cell of the grid and the start address and the stop address for the corresponding video section. Each video section represents the program listings for one of a plurality of categories of programs, such as movies, sports or comedy. Furthermore, each video section has a plurality of chapter menus spaced apart in time in the broadcasted guide or along the tape after recording and a plurality of movie video clip sections between the video menus. As part of the video menu, part of the information related to the upcoming programs for the associated broadcaster is transmitted or recorded as a video image. This information is arranged so that when the associated video is displayed, the information for each program of the menu is displayed in cells arranged in a grid on the screen. This information may be in different fonts and colors. It may also include pictures of actors or scenes of the show or advertiser or show logos. Information relating to the position of each cell, the start and stop addresses, and the "PLUSCODE™" numbers for the corresponding video clip is transmitted in the VBI of the first video menu of the video section. The addresses may be timed at a particular tape speed or length.

Within each grid, a plurality of programs and associated information is displayed in a respective location on the grid. The character generator in the VCR provides a cursor which is superimposed over the video grid displayed on the screen. The user controls the position of the cursor using the remote controller. The microprocessor controller 31 tracks the cursor position and correlates it to the associated program and video clip for that position stored in the VBI.

Although shown pictorially in FIG. 71 as being along side the movie guide, the information associated with each cell in the grid is transmitted in the vertical blanking interval along with each of the video sections. After reading the VBI, the microprocessor controller 31 stores this information in the RAM 33. Alternatively, the information in the VBI may be broadcasted with each subsequent video guide and read from the VBI as each subsequent guide is displayed.

Figure 72:
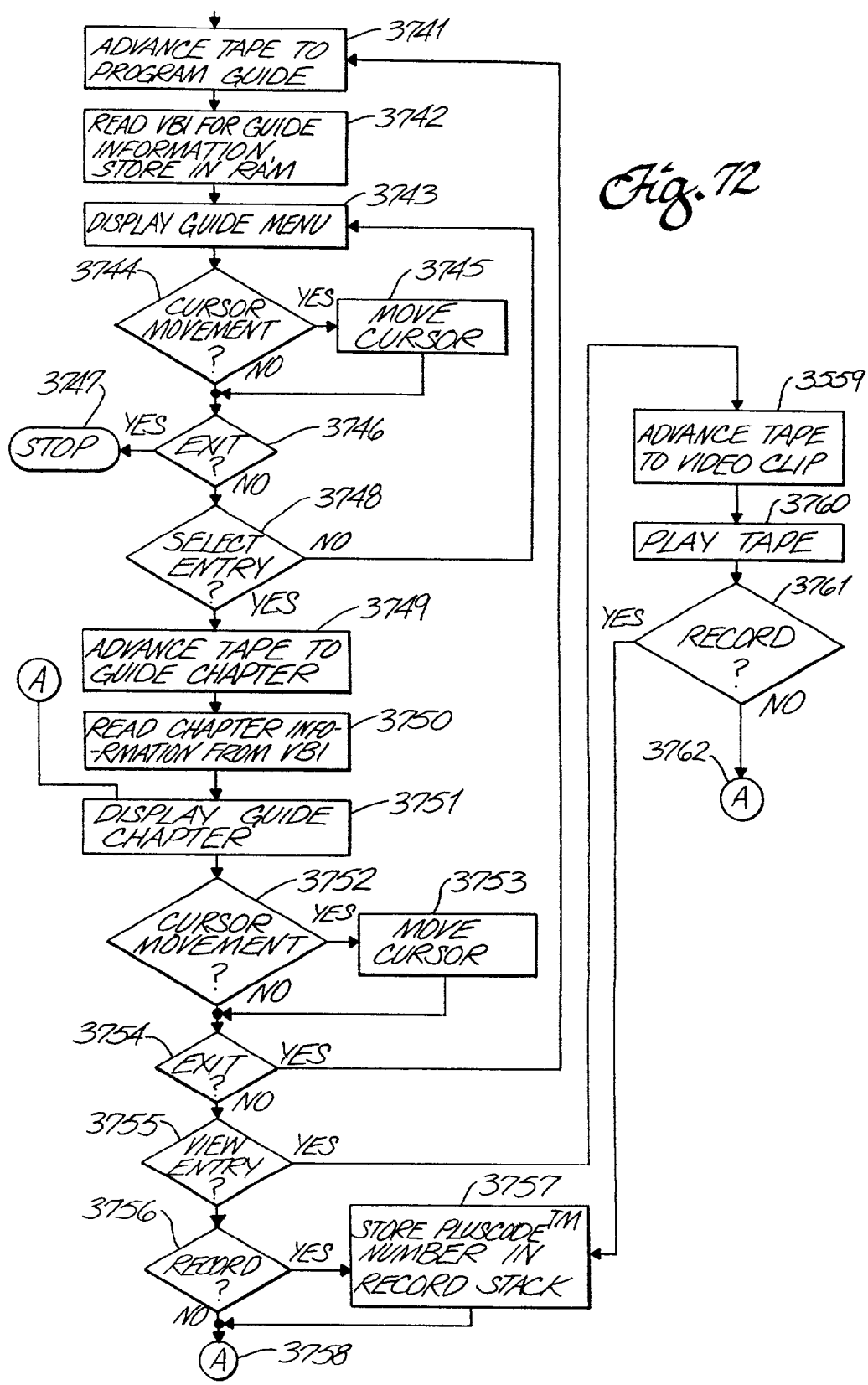
FIG. 72 is a flow chart showing the steps employed in the operation of the indexing VCR for an electronic program guide using a video grid and video clips.

FIG. 72 is a flow chart showing the steps employed in the operation of the indexing VCR for an electronic program guide using a video grid and video clips. As a precursor to beginning the operation in FIG. 72, in a manner similar to steps 8211-8217 of FIG. 68, the user has selected the indexing function of the VCR and from the displayed directory selected the entry on the directory corresponding to the electronic program guide with video grids and video clips. In response to the user having selected the electronic program guide, the indexing VCR advances the tape to the beginning of the program guide, using the tape directory (step 3741). The VCR reads the vertical blanking interval for the guide information and stores it in the RAM 33 (step 3742). The guide information includes the start and stop addresses and the cursor location for each of the video sections. The guide information functions as the directory information. The indexing VCR reads the category guide menu from the video tape and displays it on the screen (step 3743). The length of the guide menu on the tape may be a single frame or frames covering several minutes. For guide menus having a few frames, the VCR is in the play and still frame mode allowing the user to browse the guide menu. Alternatively, the images of the still frame may be stored digitally and then displayed. If the guide menu contains multiple pages, the user advances pages by commanding the VCR to advance by using the frame advance button, or alternatively, a page button. In this mode, the VCR responds to a page command as it would a frame advance command. By using the cursor buttons on the remote controller (step 3744), the user can move the cursor on the screen (step 3745). By pressing the exit button (step 3746), the user may return to the directory of the entire video tape (step 3747). Otherwise, the user selects from the category guide menu using the enter button to select the highlighted menu entry (step 3748). As an illustrative example, the selected entry will be described in view of the movie guide shown in FIG. 71. While discussed as a movie guide, this description also pertains to the other guides. After the user selects the movie guide, using the addressing information, the VCR fast forwards the tape to the position for the movie guide grid which it knows from the information read from the VBI after the tape advances to the program guide (step 3749). The VCR reads the chapter information from the VBI where the chapter corresponds to the information for the movie video section (step 3750). As noted above, this information relates the position of each cell, the start and stop addresses, and the "PLUSCODE™" numbers for the corresponding video clip to the title of the program. The VCR stores this information in the RAM 33. As described above for the displaying the category guide menu, the VCR similarly displays the chapter guide for the movie video section (step 3751). As with the guide menu, by using the cursor keys (step 3752), the user moves the cursor through the chapter guide (steps 3753). Alternatively, the user may exit the chapter guide and return to the guide menu as described above (step 3754). If the user elects to view an entry from the movie guide (step 3755), the VCR reads from the RAM 33 the start address for the selected program and advances the tape to the video clip (step 3759). The VCR then enters the play mode and plays the video clip (step 3760). If the viewer wishes to record the program associated with the clip that he is viewing, the user presses the record button (step 3761). In response thereto, the VCR reads from the RAM 33 the "PLUSCODE™" number associated with the video clip and stores the number in the record stack for later recording (step 3757). The VCR then advances to the guide chapter. If the viewer does not record a selection after the video clip, the video clip ends and by detecting the stop address of the video clip (step 3762), the VCR knows the detected video from the video tape is a movie guide and displays the guide chapter at step 3751.

From the guide chapter menu, the viewer may record the program without viewing the video tape (step 3756). In response to a record command, the VCR reads from the RAM 33 the corresponding "PLUSCODE™" number, stores it in the record stack (step 3757), and continues to display the guide chapter at step 3751.

In various alternate embodiments, the number of grid cells displayed for the program guide or the guide chapter may be variable with the number of grid cells transmitted in the VBI data. In other embodiments, the layout of the video tape may have one movie guide section with video clips following serially on the tape. Upon the end of each video clip the VCR having detected the stop address then advances the tape to the corresponding movie guide. In yet another embodiment, several chapter guide menus may be dispersed throughout the tape so that access time of these menus is reduced.

Other Features

FIG. 73 is a flow chart showing the steps employed in the operation of temporarily indexing portions of a video tape between VISS marks.

FIG. 74 is a flow chart showing the steps employed in the operation of playing temporarily indexed portions of a video tape between VISS marks.

As an overview, a user may wish to access video information recorded between VISS marks. As an alternative to marking the selected portion with an additional VISS mark or another type of mark, the indexing VCR 10 stores the absolute addresses of the selected video portion in response to user selected commands. This feature may be used for example when one VISS mark in a real estate magazine designates the start of homes for sale in Pasadena, while the next VISS mark designates the start of homes in La Canada. After viewing the recording of the houses in Pasadena and the PRI accompanying the video, the user may want to show his wife one particular house at a later time. Referring now to FIG. 73, while the user is playing a tape (step 8240), the indexing VCR 10 monitors the VBI for the presence of a PRI (step 8241). When a PRI is detected (step 8242), the PRI is stored in the temporary buffer (step 8243). Steps 8241-8243 correspond to the monitoring steps described above for the PRI. When the user wants to mark the video for later viewing, he presses button X on the remote controller. Button X may be any button, such as the VCR PLUS+™ button, on the remote controller that is not used in the PRI processing routine. When button X is pressed (step 8244), the indexing VCR 10 stores the current PRI in the storage buffer (8246). The indexing VCR calculates the absolute start address of the location of the tape indicated (step 8247) and stores the absolute start address in the RAM 33 (step 8248). The indexing VCR 10 then waits for a second X command to indicate the end of the selected video portion (step 8249). In response to the X command, the indexing VCR 10 calculates the absolute stop address (step 8251) and stores it in the RAM 33 (step 8252).

When the user wishes to later find the temporary indexed video portion, referring now to FIG. 74, the user pulls up the stored PRI menu as described above in connection with FIG. 53. The user selects the PRI (step 8260) and transmits a play command (step 8261). The indexing VCR 10 retrieves the TID and the absolute addresses from the memory (step 8262). The indexing VCR 10 measures the present address of the tape (step 8262) and depending on the direction to the selected video portion, fast forwards or rewinds the tape (step 8264) until the measured present address equals the start address retrieved from memory (step 8266). The indexing VCR 10 then starts playing the tape (step 8267) and measures the present address of the tape (step 8268), and when the present address equals the stop address (step 8269), the VCR stops the tape (step 8271).

A portion of the auxiliary information changes infrequently. For example, in the program ID, the broadcast channel call letters may change only as often as every several years. By storing these relatively time independent variables in the RAM 33, the access time to this portion of the auxiliary information is reduced.

With the channel call letters stored in memory, the indexing VCR 10 retrieves the call letters when the user changes the television to a new channel and displays the new channel call letters on the television without retrieving or having to wait to retrieve the new program ID information from the VBI. The channel call letter library may be collected either during an initial set-up procedure of the indexing VCR 10 by scanning all channels and reading the program ID from line 21 for each channel or, alternatively, the program ID may be read during the first use of each channel and the channel call letters stored in the RAM 33.

By way of background, the VCR PLUS+™ video programmer uses a channel mapping system in which the channel numbers are assigned to certain cable channels in each area of the country which differ from the received channel number. For example, the cable channel HBO may be assigned channel 33. Further broadcast channel frequencies are often mapped to different cable channel frequencies by the local cable operators, for example, the broadcast channel 28 for station KCET may appear as cable channel 6. The channel map relates the guide channel numbers to the received channel numbers. Similar to channel call letters, the channel mapping numbers are changed infrequently. Thus, in a similar manner, the indexing VCR 10 can automatically collect a channel map data, either after first use of each channel or during an initial set-up routine in which all channels are scanned. The "PLUSCODE™" numbers used by a VCR PLUS+™ video programmer inherently include the guide channel numbers as part of the encode channel-date-time-length data. The broadcast stations, as part of the program related information or the channel specific program guide, may broadcast the "PLUSCODE™" numbers. The indexing VCR 10 reads these numbers, decodes them, and establishes the relationship of the decoded channel numbers with the received channel numbers.

Another parameter that changes infrequently are the pointer attributes, such as line number, data rate, error correction, and encryption, of VBI lines for CSPG. Although CSPG may be transmitted more or less continuously on one or more VBI lines, the pointers to such lines may not be repeated at a high rate on line 21, because other fields of data are present. As a result, when a user switches to a new channel and requests the CSPG, he may have to wait until the next CSPG pointer appears on line 21. By storing the pointer attributes for the CSPG lines in memory, the indexing VCR 10 can reads those lines immediately after the user has switched the channel.

Electronic Program Guide Tape with Video Grid and Video Clips

In still yet another embodiment of the Video Magazine, an information provider produces the video guide with video clips and a video grid and records the guide onto a video tape. The information provider mass-produces the electronic program guide tape and distributes the tapes through distribution chains to retail outlets or directly mails the tapes to subscribers. In yet another implementation, the information provider provides a master electronic program guide tape to a plurality of guide tape updating machines. The recipient of the program guide updates the guide by bringing an old guide tape and inserting it into the guide updating machine which may either record on the newly inserted tape the updated guide from the master tape or may provide a new guide tape and then update the guide on the newly inserted tape which will be provided to a subsequent user. The guide updating machine and its operation is described below in conjunction with FIG. 98.

Figure 75:
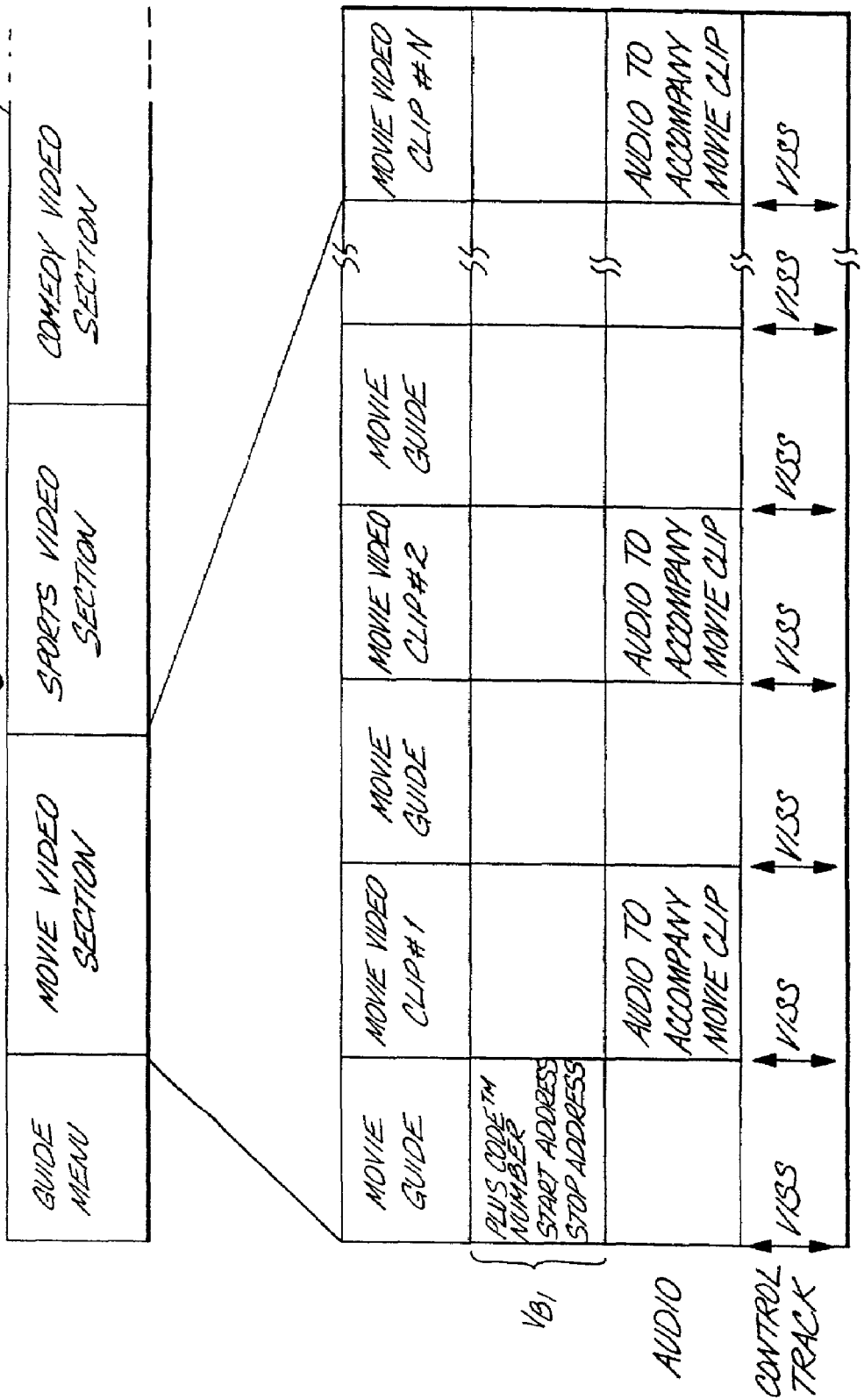
FIG. 75 is a schematic diagram illustrating the electronic program guide tape of a video grid and video clips with an exploded view of a movie guide portion of the guide.

FIG. 75 is a schematic diagram illustrating the electronic program guide tape of a video grid and video clips with an exploded view of a movie guide portion of the guide.

In a manner similar to the electronic program guide 3740 described above in conjunction with FIG. 71, an electronic program guide tape 10402 has a guide menu and a plurality of video sections (also called video chapters). The guide menu and the video sections are identical to those described above for the electronic program guide 3740 (FIG. 71). However, they are recorded on the video tape. Information relating to the position of each cell in the grid of the guide, start and stop addresses and, the CDTL numbers for the corresponding video clip is recorded in the vertical blanking interval of the first video menu of the video section. Audio information related to the movie clips is recorded in the audio tracks of the video tape in a predetermined relationship with the video clips. A VISS indexing mark is recorded in the control track at the beginning of each guide menu and chapter menu and video clip. Accordingly, the start and stop addresses of the video clips and guides may be absolute addresses or relative increment counts of VISS indexing marks.

Although shown pictorially in FIG. 75 as being along side the movie guide, the information associated with each cell in the grid is recorded in the vertical blanking interval along with each of the video sections.

Transmitted Buyer Guide Subscription Service

As described above in connection with FIG. 2, either the local network affiliate or the local cable station may insert data into the vertical blanking interval of the transmitted composite television signal. Although some of the information that is being broadcast may be provided to users without charge, other types of information are to be provided on a subscription or pay-per-view basis. As an overview, the subscription services will be described in terms of an electronic program guide for illustrative purposes; although the invention is not so limited. The electronic program guide is broadcast in an encrypted or scrambled form or both as described above in conjunction with FIG. 2 in the VBI of a particular television station in each metropolitan area. One approach to scrambling and encrypting is disclosed in application Ser. No. 08/167,678, filed Dec. 15, 1993, which is incorporated herein by this reference. Referring to FIG. 5, the indexing VCR 10 contains a VBI decoder 60a capable of decoding the data both by descrambling and decrypting, for presentation to the user on the screen. For some types of data, the VBI decoder 60a does not descramble or decrypt the data, unless enabled by receiving a code number via the remote control 75 within a predetermined time period after such number is provided over the telephone to the user. The user obtains the code number by calling a telephone number that bills the telephone account of the caller such a telephone call, such as the 900 area code or 976 prefix telephone number allocation commonly used in the United States. In response to a user provided number, the operator (which may be automated) who answers the telephone provides a code number to the user. The user then must provide that number to the indexing VCR 10 within a predetermined time after receiving it over the telephone.

Figure 76:
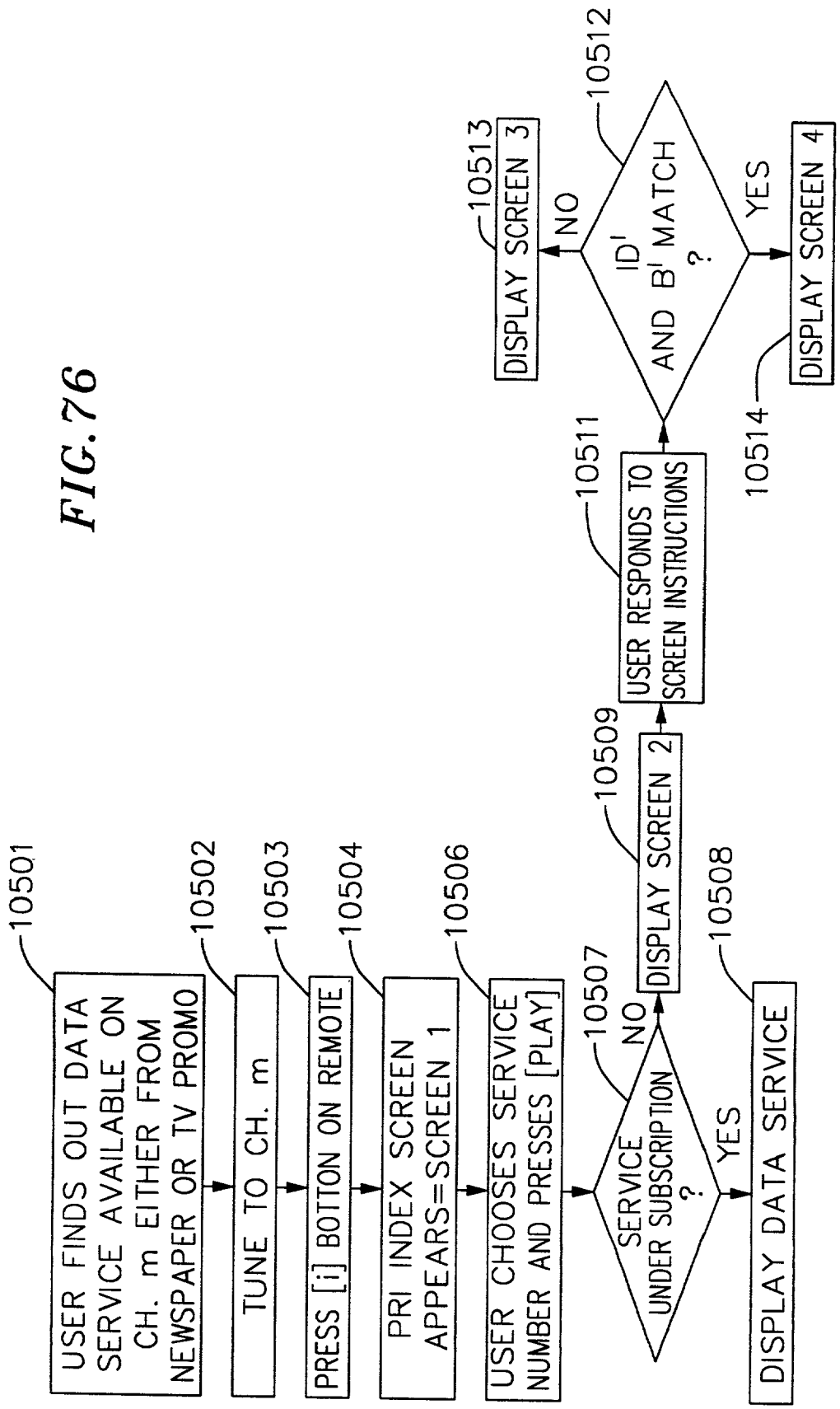
FIG. 76 is a flow chart showing the steps employed in the authorization of the user in the subscriber service.

FIG. 76 is a flow chart showing the steps employed in the authorization of the user in the subscriber service.

FIG. 77 illustrates the screen displayed by the VCR to show the viewer the available subscription services.

FIG. 78 illustrates the screen displayed by the indexing VCR to provide instructions to the viewer for obtaining authorization to the subscriber services.

Figure 79:
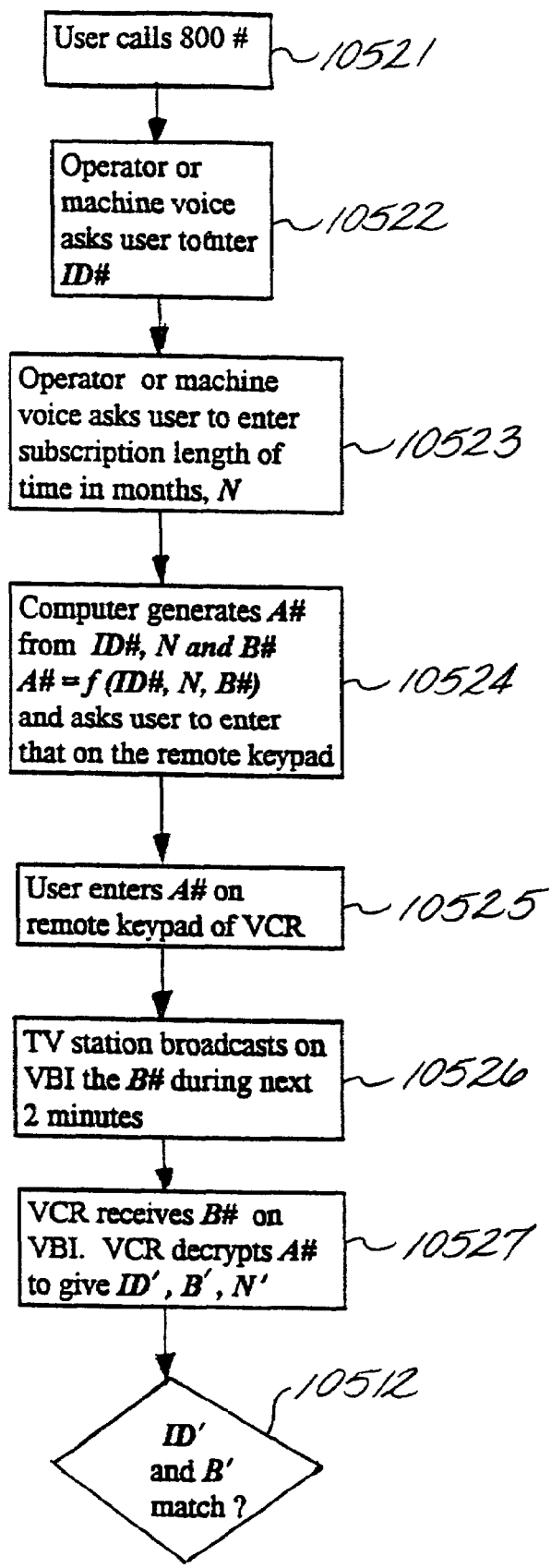
FIG. 79 is a flow chart showing the steps employed in the operation of the subroutine for viewer authorization.

FIG. 79 is a flow chart showing the steps employed in the operation of the subroutine for viewer authorization.

Figure 80:
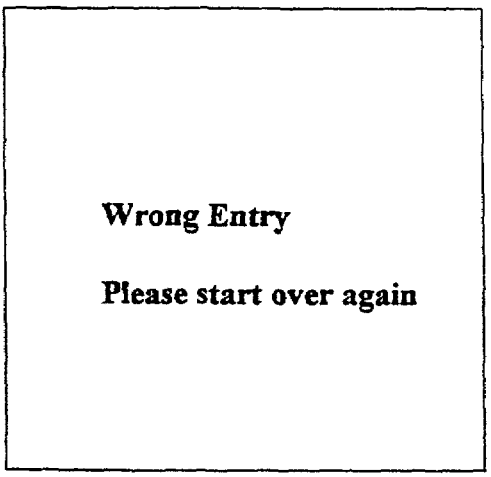
FIG. 80 illustrates the display of the indexing VCR when the viewer makes an incorrect entry while requesting subscriber services.

FIG. 80 illustrates the display of the indexing VCR when the viewer makes an incorrect entry while requesting subscriber services.

Figure 81:
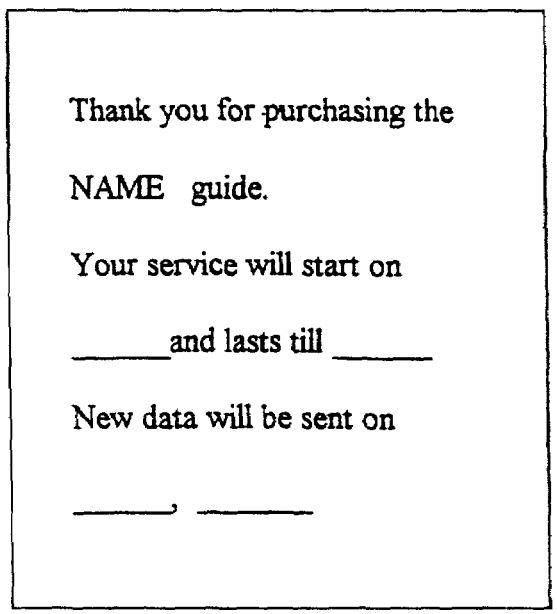
FIG. 81 illustrates the display of the indexing VCR acknowledging the acceptance of the viewer's subscription and providing details of the same.

FIG. 81 illustrates the display of the indexing VCR acknowledging the acceptance of the viewer's subscription and providing details of the same.

Referring now to FIG. 76, the user becomes aware of the data services available on a particular channel, for example, channel M, either from newspaper or television promotions, word of mouth, by scanning television channels, and the like (step 10501). When the user decides to subscribe or view, the user tunes his indexing system to channel M (step 10502). To select and then index on available data services, the user presses the "i" button on the remote controller 75 (step 10503). In response thereto, the indexing VCR 10 displays an index screen of the program related information as shown in FIG. 77 (step 15004).

The user makes a selection from the available subscription services, for example, by using the curser keys to move an arrow that points to the desired selection or by entering the number of the selection (such as 4) on the keyboard of the VCR or keypad of the remote controller 75. Here, the user selects to "Airline Discount Seats" and then presses the "enter" (or "play") button on the remote control 75 (step 10506).

Because the user may have previously subscribed to the requested service, the indexing VCR 10 first determines whether the user has previously subscribed to the requested service at (step 10507). If the user has, the indexing VCR then displays the data service (step 10508).

Otherwise, if the service is not under subscription at step 10507, the indexing VCR 10 displays the screen of FIG. 78 (step 10509) and proceeds to the authorization subroutine of FIG. 79 which operates in response to the user's responses to the displayed screen instructions (step 10511).

Referring now to FIGS. 78-79, the indexing VCR displays the screen of FIG. 78 which provides the price of the guide and instructs the user to call a displayed 900 number to a service provider. (Alternatively, a toll free (800) number or another telephone number may be used.) The user may be billed directly for the services or indirectly through a charge to a credit card account. If the user decides to request the service, the user dials the displayed 900 number (step 10521). The operator (or machine voice in an automated system) asks the user to enter the identification number ID# displayed in FIG. 78 (step 10522). To provide the viewer with flexibility, the operator (or machine voice) requests the user to enter a subscription length of time N, for example, in months (step 10523). In response thereto, a computer at the service provider generates an authorization number A# from the identification number ID#, the length N, and a broadcast number B#, where the broadcast number B# is generated by the computer and serves as the number that is broadcast. In other words, the authorization number A# is a function of the identification number ID#, the subscription length N, and the broadcast number B#. The operator (or machine voice) asks the user to enter the authorization number A# on the remote controller 75 (step 10524).

The user enters the authorization number A# on the remote controller 75 of the indexing VCR 10 (step 10525). The user may cancel the entry of data by pressing the cancel button. During a predetermined time after receiving the authorization number A#, e.g., the next two minutes, the television station broadcasts on the VBI the broadcast number B# (step 10526). The indexing VCR 10 receives the broadcast signal which includes the broadcast number B# on the VBI and decrypts the authorization number A# provided by the user to derive a calculated identification number ID', a calculated broadcast number B', and a calculated subscription length N' (step 10527). When the calculated identification number ID' matches the identification number A# of that particular VCR and the calculated broadcast number B' matches the broadcast number B# received by the VCR, the VCR is enabled to receive the subscription services.

Returning now to FIG. 76, if the identification number ID# provided by the VCR matches the calculated identification number ID' and the received broadcast number B# does not match the calculated broadcast number B' (step 10512), the indexing VCR 10 displays screen 3 of FIG. 80 saying that the wrong entry has been made and requests the user to start over again (step 10513).

Otherwise, if there is a match (step 10512), the indexing VCR 10 displays screen 4 of FIG. 81, thanking the user for purchasing the subscription guide and provides the start date and the last date of the subscription (step 10514). Further, the indexing VCR provides on the screen the channel and date and time that new data will be provided and updated for the subscription service.

The identification number ID# may be generated in one of several ways. First, the identification number ID# may be a time dependent machine identification number. Second, the number may be a random number generated for this particular subscriber application. Third, the identification number may consist of two randomly generated numbers that are concatenated. Where the ID number consists of two concatenated numbering it may, for example, be a ten digit number consisting of two random numbers each of five digits in length. In this method, as the electronic guide is being transmitted on a relatively continuous basis in the VBI, a continuous series of random number (five digits in length for this example) are also being transmitted on the VBI on a periodic basis such as every 30 seconds. As described above, when the user calls the 900 number and is billed for a subscription, he receives a string of two five digit numbers which correspond to the next two random numbers to be broadcast over the channel where the electronic guide is broadcast in the user's area which the user will receive because the user has previously tuned his VCR 1 to that channel. To subscribe, the user enters the ten digit string into his remote control 75 which in turn, transmits it to the indexing VCR 10. The indexing VCR 10 then compares the first and second five digit numbers to the next two random numbers received in the VBI. If either of the five digit numbers match either of the two broadcast numbers, the electronic guide service is enabled for the selected subscription period. The subscription length can be determined by the battery backup clock in the indexing VCR. By giving the user two numbers, it minimizes the problem where the user is not fast enough to send the numbers to the VCR, and consequently, misses the next broadcast of the random number. The user is provided a period of time such as 30 seconds to enter the number correctly. Multiple time length durations in this embodiment can be achieved, for example multiple month subscriptions, by receiving multiple strings of numbers either by directly loading from the telephone into the VCR or by using a voice synthesizer to provide the numbers. The user is sent multiple strings of numbers where the indexing VCR checks the multiple number of matches corresponding to the multiple months of subscription against the multiple numbers that have been broadcast.

A fourth way of deriving the ID # is where each indexing VCR or its remote controller is assigned a serial number which is stored in the RAM and serves as the ID #. For example, the serial number may be five digits. Such serial number is also provided to the user either in the operating manual, on a screen display or the like. This serial number is provided by the user as identification number. The number provided by the computer A' is equal to the serial number provided by the user plus a random number. Accordingly, the user enters this number and the indexing VCR subtracts the serial number, which it knows, from the inputted number to arrive at the number B' that is to be broadcast. This prevents users from using the same number on different indexing VCRs to enable such VCRs to receive the subscription for the price of a single subscription. Alternatively, the random number may be subtracted, multiplied or otherwise combined to generate the number B.

Figure 82:
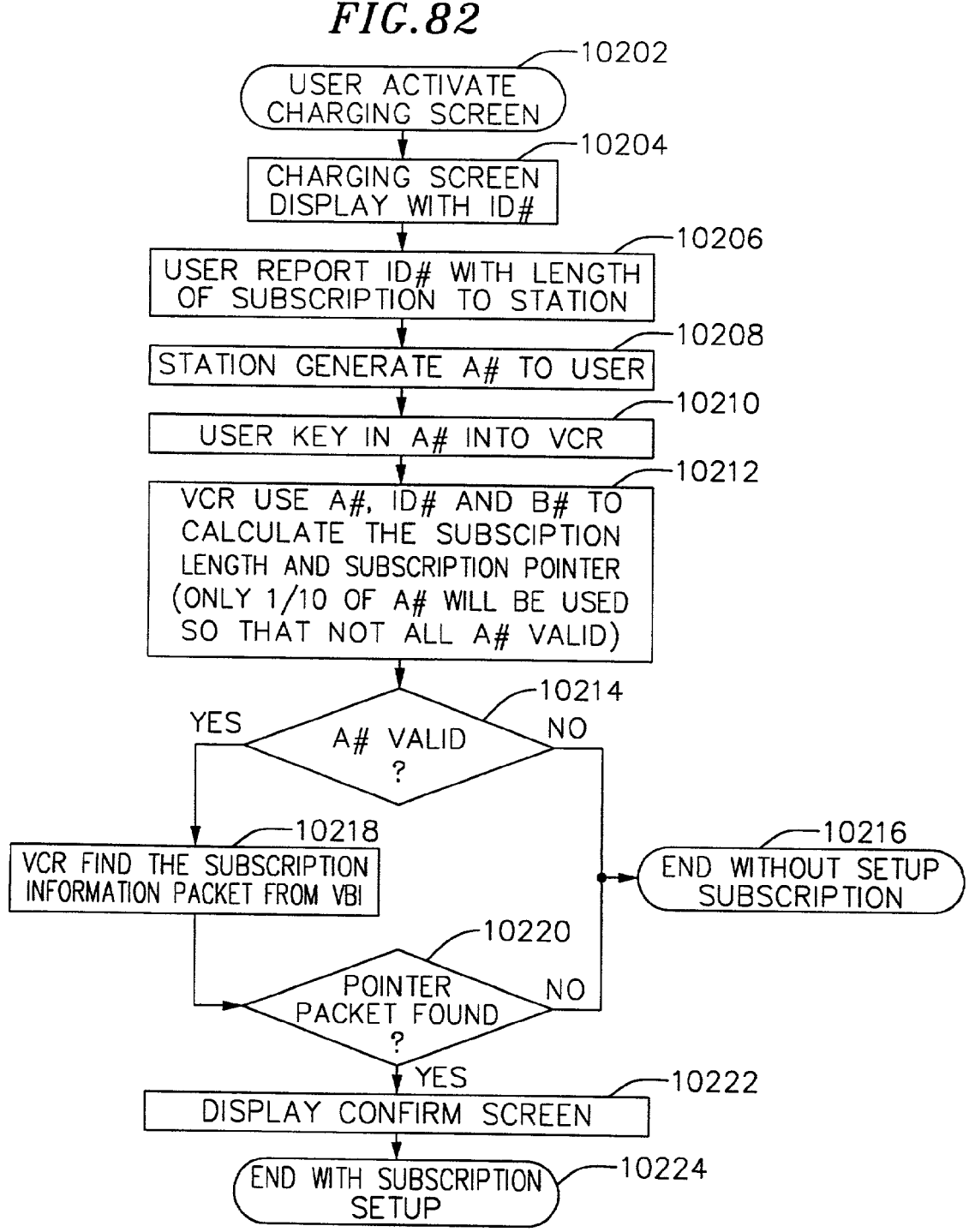
FIG. 82 is a flow chart showing the steps employed in an alternate embodiment of the authorization of the user in the subscriber service.

FIG. 82 is a flow chart showing the steps employed in an alternate embodiment of the authorization of the user in the subscriber service.

After the user becomes aware of the subscription service and tunes his system to the channel carrying the service, the user selects and indexes on available by pressing the "i" button on the remote controller 75 (step 10202). In response to the user making a selection as described above, the indexing VCR 10 displays a screen displaying the user identification number ID# (step 10204). If the user decides to request the service, the user dials the displayed 900 number and provides both the displayed identification number ID# and the subscription length N to the service provider or transmitting station (step 10206). The station generates and provides an authorization number A# to the user (step 10208). Using the remote controller 75, the user provides the authorization number A# to the indexing VCR 10 (step 10210). Concurrently, the indexing VCR 10 monitors the VBI for a broadcast number B#, which is a predefined random number that is broadcasted in the VBI and is changed periodically, e.g. every 5 minutes.

From the authorization number A#, the microprocessor controller 31 uses the authorization number, the identification number ID#, and the broadcast number B# to calculate both a subscription length N and a subscription pointer (step 10212). The subscription pointer points to a particular subscription information packet which is numbered and transmitted on the VBI. The pointer is determined from a predetermined combination or calculation of the authorization number, the identification number ID#, and the broadcast number B#. The indexing VCR 10 then determines whether the authorization number is valid using these three number (step 10214). If the authorization number is not valid, the indexing VCR 10 does not setup the requested subscription (step 10216). Otherwise, if the authorization number A# is valid, the indexing VCR 10 monitors the VBI to find the subscription information packet using the pointer (step 10218). If the pointer is not found (step 10220), the indexing VCR 10 does not setup the requested subscription (step 10216). Otherwise, if the pointer is found (step 10220), the indexing VCR sets up the subscription service and displays a confirmation screen (step 10222) and ends the setup routine (step 10224).

Format for Data Received on the VBI

The auxiliary information (program ID, CSPG, PRI) described above is broadcasted on line 21, field 2 of the VBI, according to the specification proposed by the EIA. This information shall be decoded by the indexing VCR 10 according to the specifications.

The channel specific program guide and the program related information are broadcast as text data on some VBI lines, which are referenced by pointers on line 1, field 2. The recording waveform is identical to the EIA-608 standard, line 21, field 1-2 waveform. The text data format is similar to the EIA-608 standard, line 21 Text Mode Data Services and the Extended Data Services. However, the data is encrypted before being sent. The following data format allows for future expansion.

Pointer

FIG. 83 is a schematic view showing the format for the pointer packet data broadcasted in the VBI for auxiliary information. The pointer packet is similar to the EIA-608 standard line 21 field 2 Supplemental Data Location packet. It is used as a pointer to point to another VBI line. Four to thirty-two informational characters are used to indicate the line number where the information is located. A pointer packet data packet 2605 has the following symbols: start code, type, additional ID, pointer description (1) and pointer (1) through pointer description (m) and pointer (m), stop code and check sum.

Table XVI shows the length in bytes and the value for each symbol. The start code indicates the packet is either a new pointer packet (by the value 07 hex) or a continuation packet of the prior packet (by the value 08 hex). The pointer description and the pointer for each of the m pointers have the same data format. The additional number ID symbol further identifies that the packet is an indexing pointer packet to further distinguish it from other data service systems that may co-exist on line 21, field 2. For multiple line application, the sequence of the Pointers within a given kind of packet indicates the VBI data sequence to be used to re-assemble the data at the receiving end. The checksum is the modulo 128 sum of the packet from the start code to the stop code.

TABLE XVI

| Symbol | Length (Bytes) | |
|---|---|---|
| Start Code | 1 | 07 hex |
| | | 08 hex |
| | | (continuation packet) |
| Type | 1 | 7C hex |
| Additional ID | 2 | ASCII 'G'; ASCII 'S' |
| Pointer Description (1) | 1 | 61 hex D(N) |
| | | 62 hex TP |
| | | 63 hex PRI |
| | | 64 hex CSPG |
| | | 65 hex VM |
| Pointer (1) | 1 | bits 6-5 (Field): |
| | | 0 0 not used |
| | | 0 1 odd field |
| | | 1 0 even field |
| | | 1 1 both fields |
| | | bits 4-0 |
| | | (Line number) |
| | | Lines 10-25 |
| * | * | * |
| * | * | * |
| * | * | * |
| Pointer Description (m) | 1 | Same as pointer description (1) |
| Pointer (m) | 1 | Same as pointer (1) |
| Stop code | 1 | 0F hex |
| Checksum | 2 | 00 hex-7F hex |

CSPG/PRI Packet Data Format

FIG. 84 is a schematic view showing the format for the CSPG/PRI packet data recorded in the VBI as pointed to by the pointer in line 21 of the VBI. The CSPG and PRI packets are similar in structure and are differentiated by the type code. The packet 2606 comprises the symbols: start code, type, usage, information, stop code and check sum. Table XVII shows the length in bytes and the values for the symbols.

The CSPG and PRI packets are encrypted before they are encoded onto the VBI. The data stream contains an even number of bytes. An error correction code assures data integrity at the receiving end. A 4 byte long lead-in code on two consecutive VBI lines signifies the start of an encrypted data stream. The decryption circuitry may use it to either reset all or synchronize its decode circuitry or decode algorithm as necessary. Multiple packets may be cascaded back to back for encryption. The encrypted data stream is concluded by a 4 byte long termination code on two consecutive VBI lines. For the encrypted and error correction coded data stream, all 8 data bits may be used. The data slicer/decoder ignores the parity check error detected on the encrypted data.

The CSPG and PRI packets contain displayable text information. When received, these packets are stored according to their types in different locations of the memory. As described above in conjunction with FIG. 29, the RAM 33 contains a PRI packet data temporary buffer and a PRI packet data storage buffer. In addition, the RAM 33 has a CSPG buffer. The CSPG buffer preferably has at least 9600 bits of memory. The PRI storage buffer preferably has at least 7680 bits of memory. The PRI temporary buffer preferably has at least 15,360 bits of memory. As described above, both buffers operate as temporary buffers in a circular mode in which the old data packet data is overwritten by new packet data that is received. Similarly, the CSPG packet data buffer is also a temporary buffer wherein the old packet data is overwritten by new packet data received. Referring again to FIG. 84, the information field contains displayable text characters, non-displayable control characters and non-displayable attribute characters. The control characters and attribute characters are executed immediately upon receipt. A control character or an attribute character remain effective until it is overwritten by the same control character or an attribute character of a different value.

A default mode is defined for each type of control code and attribute. The default is effective at the start of a new data stream. Within the data stream, the default remains effective until it is overwritten by a control character or an attribute character.

The general form of the information field is as follows:
CRTL ATTR displayable . . . displayable ATTR displayable . . .

Table XVII shows the control codes and attributes. The basis embodiment includes the default control codes and attributes. The control codes and attributes for the default mode are the basic types and preferably at least these types that are implemented. Alternately, the indexing VCR 10 may use the optional control codes and attributes.

Alternatively to Table XVII, the character generator may determine the number of rows and columns in the full page and half page mode.

The telephone number attribute indicates that the data is a telephone number. The microprocessor controller 31 transmits this number to a remote controller that has telephone capability. The user may press dial on the remote controller and automatically call the goods or service provider. The product description attribute indicates that the associated text is a description of the product including a phone number that may be used to describe the product when calling a provider of the product. The question number attribute indicates that the associated text is a number for the question of a game show. The number is in a coded format. The VCR stores in the RAM the question number with the user's answer. This information is transferred at a later time to a contest coordinator who determines from the user's answer the user's score or prize.

Other miscellaneous text display related control codes include a Tab code for causing the cursor to shift right three spaces until it reaches the right most column. An indent control code causes the cursor to shift three spaces from the beginning of a new line. A new line control code causes the cursor to go to the beginning of the next line. A CSPGEra control code causes the CSPG packet to be erased from the memory buffer. A PRIEra control code causes the last received PRI packet to be erased from the memory buffer.

TABLE XVII

CSPG/PRI packet data format

| Symbol | Length (bytes) | Value |
|---|---|---|
| Start Code | 1 | 0D hex |
|  |  | 0E hex for continuation packets. |
| Type | 1 | 7B hex CSPG |
|  |  | 7A hex PRI |
| Usage | 2 | Byte 1 |
|  |  | bit 0: 0 storable |
|  |  |        1 non-storable |
|  |  | bit 1: 0 store in temporary buffer. |
|  |  |        1 store in external RAM |
|  |  | bit 2: 0 print to printer |
|  |  |        1 print to IR |
|  |  | bits 3-5: expansion |
|  |  | bit 6: 1 |
|  |  | Byte 2 |
|  |  | bits 0-5: expansion |
|  |  | bit 6: 1 |
| Information | 2-128 | 00 hex: no-operation byte |
| Stop Code | 1 | 0F hex |
| Checksum | 2 | 00 hex-7F hex |

TABLE XVIII

Control and attribute codes

Control codes

Text display size

| | |
|---|---|
| 10 r × 24 c (Default) | 1D 5C |
| 15 r × 32 c | 1D 5D |
| don't care | 1D 5E |

Text page size

| | |
|---|---|
| Full page (Default) | 1D 40 |
| Half page | 1D 42 |

Text display mode

| | |
|---|---|
| Pop-on style (Default) | 1D 43 |
| Scroll up style | 1D 44 |
| Single line "crawl" style | 1D 45 |

Character set:

| | |
|---|---|
| Standard line 21 character set (default) | 1D 46 |
| Extended character set (as defined in the Draft EIA-60B) | 1D 47 |
| Japanese Character set I. | 1D 48 |
| Japanese Character set II. | 1D 49 |
| PRC Character set GB 2312-80. | 1D 4A |
| Korean Standard Character set: KSC 5601-1987 | 1D 4B |

Print Destination

| | |
|---|---|
| Disable (Default) | 1D 4E |
| Print to IR port. | 1D 4F |
| Print to serial port. | 1D 50 |
| Print to IR and serial port. | 1D 51 |

Miscellaneous

| | |
|---|---|
| Tab (3 spaces) | 1D 52 |
| Indent (3 spaces) | 1D 53 |

TABLE XVIII-continued

Control and attribute codes

| | |
|---|---|
| Newline | 1D 54 |
| CSPGEra | 1D 55 |
| PRIEra | 1D 56 |

Attribute codes

Color

| | |
|---|---|
| Blue background white characters. (Default) | 1C 40 |
| Optional background and foreground color | 1C 41 |
| (color combination: broadcaster selectable) | **** |
| | 1C 4A |

Character set

| | |
|---|---|
| Normal size (Default) | 1C 4B |
| Double size | 1C 4C |

Printable

| | |
|---|---|
| Printable (Default) | 1C 4D |
| Non-printable (hidden). | 1C 4E |

"PLUSCODE ™" Number

| | |
|---|---|
| Non-"PLUSCODE ™" Number (Default) | 1C 4F |
| "PLUSCODE ™" Number | 1C 50 |

Telephone Number

| | |
|---|---|
| Non-telephone number (Default) | 1C 51 |
| Telephone number | 1C 52 |

Product description

| | |
|---|---|
| Non-product description (default) | 1C 53 |
| Product description | 1C 54 |

Question number

| | |
|---|---|
| Non-question number (Default) | 1C 55 |
| Question number | 1C 56 |

Electronic coupon

| | |
|---|---|
| Non-electronic coupon (Default) | 1C 57 |
| Electronic coupon | 1C 58 |

Keyword

| | |
|---|---|
| Not keyword (Default) | 1C 59 |
| Keyword | 1C 5A |

Others

Reserved

VM Packet

FIG. 85 is a schematic view showing the VM packet used for video magazines. A VM packet 2607 comprises the symbols: start code, type, PID, stop code, and check sum. Table XIX shows the length in bytes and values for the symbols. As described above, in connection with FIG. 63, during the broadcast of video magazines, a set of VM packets are transmitted in the VBI within the program to trigger the indexing VCR 10 to record VISS marks on the control track and TP packets on line 19 of the VBI and create a corresponding directory that is stored in the RAM 33. The VM packets are located on at least one VBI line which is referenced by a pointer on line 21, field 2 of the VBI. The pointer packet data format is described above in connection with FIG. 83 where the pointer description equals 65 hex, which indicates a VM packet. The checksum is the modulo 128 sum of the packet from the start code to the stop code.

TABLE XIX

VM Packet

| Symbol | Length (Bytes) | Value |
|---|---|---|
| Start Code | 1 | 0D hex |
| Type | 1 | 79 |
| PID | | same as line 21, field 2 ID packet less start code, type code, end code and checksum |
| Stop Code | 1 | 0F hex |
| Checksum | 2 | 00 hex-7F hex |

In an alternate embodiment, the VM packet does not include a PID symbol. Instead, the directory is transmitted as a D(N) data packet in the VBI. Consequently, the video magazine is transmitted as a PR tape except that the indexing VCR adds the VISS marks in response to the detection of the VM packet.

Alternate Format for Data Received on the VBI

In an alternate format for data received on the VBI (CSPG, PRI, VM packets), the packet has the same general format as the packets described above in conjunction with FIGS. 84-85.

CSPG/PRI Packet Data Alternate Format

FIG. 86 is a schematic view showing the format for the CSPG/PRI packet data recorded in the VBI as pointed to by the pointer in line 21 of the VBI. The CSPG and PRI packets are similar in structure and are differentiated by the type code. The packet 2606' comprises the symbols: start code, type, block number, block total, signature, reserved, content, check sum, stop code, and XOR byte. Table XX shows the length in bytes and the values for the symbols. The block total symbol indicates the total number of blocks per message. The signature symbol identifies the individual CSPG/PRI, which in this format can identify 260,000 messages. The content symbol indicates the content of the CSPG/PRI.

The CSPG and PRI packets are encrypted before they are encoded onto the VBI. The CSPG/PRI packet is transmitted in either the 1× or the 2× format on any VBI line. The CSPG and the PRI are transmitted in blocks. Every message of the CSPG/PRI is transmitted more than once to allow subsequent opportunities to receive the message if an error is detected. If any block has an error during reception, the indexing VCR 10 continues to read the corresponding block in the next transmission for completing the message. A message is completely received when all the messages are received without error.

The CSPG and PRI packets contain displayable text information. When received, these packets are stored according to their types in different locations of the memory. The operation of the indexing VCR 10 in this alternate packet format is similar to the operation for the first packet format described above in conjunction with FIG. 84. Table XX shows the control codes and attributes. The basis embodiment includes the default control codes and attributes. The control codes and attributes for the default mode are the basic types and preferably at least these types are implemented. Alternately, the indexing VCR 10 may use the optional control codes and attributes.

The attribute character has a two byte format. The first byte has a value ranging from 10 hex to 1F hex. The second byte has a value ranging from 20 hex to 7F hex. Attributes marked with default are set if no attribute character is received. If the indexing VCR 10 does not recognize an optional attribute character, it ignores the unrecognized character.

TABLE XX

CSPG/PRI packet data format

| Symbol | Length (bytes) | Value |
|---|---|---|
| Start Code | 1 | 07 hex. |
| Type | 1 | 7B hex: CSPG; 7A hex: PRI. |
| Block Number | 3 | Each byte is a coded hex number from 30 hex-3F hex. |
| Block Total | 3 | Each byte is a coded hex number from 30 hex-3F hex. |
| Signature | 3 | Each byte is a coded hex number from 40 hex-7F hex. |
| Reserved | 2 | Reserved. |
| Content | m | m: even number from 2-52. May add attribute characters. |
| Check sum | 1 | |
| Stop Code | 1 | 0F hex. |
| Checksum | 2 | 00 hex-7F hex. |
| XOR byte | 1 | XOR result of all bytes from start code to stop code. |

TABLE XXI

Control and attribute codes

| | Value (hex) |
|---|---|
| Page size | |
| Full page size | 1D 40 (default) |
| Half page size | 1D 42 |
| Text display mode | |
| Solid background (opaque) | 1D 43 (default) |
| Superimpose (transparent) | 1D 44 |
| Character size | |
| Normal size | 1D 45 (default) |
| Double size | 1D 46 |
| Page format | |
| Carriage return for 10 × 24 screen | 10 20 |
| Carriage return for 15 × 32 screen | 10 21 |
| Carriage return for TBD screen | 10 22 |
| Carriage return plus indent (3 spaces) for 10 × 24 screen | 10 23 |
| Carriage return plus indent (3 spaces) for 15 × 32 screen | 10 24 |
| Carriage return plus indent (3 spaces) for TBD screen | 10 25 |
| Carriage return plus indent (6 spaces) for 10 × 24 screen | 10 26 |
| Carriage return plus indent (6 spaces) for 15 × 32 screen | 10 27 |
| Carriage return plus indent (6 spaces) for TBD screen | 10 28 |
| Page break for 10 × 24 screen | 10 30 |
| Page break for 15 × 32 | 10 31 |
| Page break for TBD screen | 10 32 |
| Visible in 10 × 24 screen | 10 40 (default) |
| Visible in 15 × 32 screen | 10 41 (default) |
| Visible in TBD screen | 10 42 (default) |
| Invisible in 10 × 24 screen | 10 50 |
| Invisible in 15 × 32 screen | 10 51 |
| Invisible in TBD screen | 10 52 |
| Miscellaneous | |
| Visible to all screen size | 10 53 (default) |
| Invisible to all screen size | 10 54 |
| Non-CDTL code | 1C 5F (default) |
| CDTL code | 1C 50 |
| Indent (3 spaces) | 1D 53 |
| Indent (6 spaces) | 1D 54 |
| Non-electronic coupon | 1C 59 (default) |
| Electronic coupon | 1C 5A |
| Non-telephone number | 1C 51 (default) |
| Telephone number | 1C 52 |
| Not product description | 1C 53 (default) |
| Product description | 1C 54 |
| Not question number | 1C 55 (default) |
| Question number | 1C 56 |

TABLE XXI-continued

Control and attribute codes

| | |
|---|---|
| Not an answer | 1C 57 (default) |
| Answer | 1C 58 |
| Not keyword | 1C 5B (default) |
| Keyword | 1C 5C |
| Not National CDTL code | 1C 5D (default) |
| National CDTL code | 1C 5E |
| Not Price | 1D 55 (default) |
| Price | 1D 56 |
| Not date | 1D 57 (default) |
| Date | 1D 58 |

Optional Attributes

| Foreground Color | Normal | Underline |
|---|---|---|
| White | 1C 40 | 1C 41 |
| Green | 1C 42 | 1C 43 |
| Blue | 1C 44 | 1C 45 |
| Cyan | 1C 46 | 1C 47 |
| Red | 1C 48 | 1C 49 |
| Yellow | 1C 4A | 1C 4B |
| Magenta | 1C 4C | 1C 4D |
| Italics | 1C 4E | 1C 4F |
| Black | 17 2E | 17 2F |

| Background Color | Opaque | Semi-Transparent |
|---|---|---|
| White | 1C 20 | 1C 21 |
| Green | 1C 22 | 1C 23 |
| Blue | 1C 24 | 1C 25 |
| Cyan | 1C 26 | 1C 27 |
| Red | 1C 28 | 1C 29 |
| Yellow | 1C 2A | 1C 2B |
| Magenta | 1C 2C | 1C 2D |
| Black | 1C 2E | 1C 2F |
| Transparent (superimpose) | 17 2D | |

Alternate VM Packet

FIG. 87 is a schematic view showing the VM packet used for video magazines.

A VM packet 2607' comprises the symbols: start code, type, section number, total section, control flag, extend time, reserved, program name, check sum, stop code, and XOR byte. Table XXII shows the length in bytes and values for the symbols. The section number symbol indicates the current section of the program. The section numbers range from 1 to 96.

As described above, the microprocessor controller 31 writes a VISS mark whenever it detects a change in the section number of the VM packet 2607' during recording. The total section symbol indicates the total number of sections in the current program. The control flag controls the operation of the indexing VCR. The extend time symbol indicates the estimated time for a program to be extended. In response to this symbol, the microprocessor controller 31 extends the timer recording past the scheduled end time when this symbol is not zero and stops recording when the symbol becomes zero. The program name symbol indicates the current program title.

As described above, in connection with FIG. 61, during the broadcast of video magazines, a set of VM packets are transmitted in any line of the VBI at the beginning of video segments within the program to trigger the indexing VCR 10 to record VISS marks on the control track. The VM packets are transmitted at least one packet every 5 seconds in either the 1× or 2× format. The VM packet may be encrypted. A VM packet in memory is erased if another packet is not received within a predetermined time, e.g., 15 seconds, or a VM packet with an erase VM flag control (bit 1 of the flag symbol) set to 1 has been received.

TABLE XXII

VM Packet

| Symbol | Length (Bytes) | Value |
|---|---|---|
| Start Code | 1 | 07 hex |
| Type | 1 | 79 hex |
| Section Number | 1 | 20 hex-7F hex |
| Total Section | 1 | Same as section number. |
| Control Flag | 1 | bit 0: 1 (continues to play after PN changes) bit 1: 1 (clear VM in memory) bit 2-5: reserved bit 6: 1 bit 7: parity |
| Extend Time | 3 | Minutes. Each byte is a coded hex number from 30 hex-3F hex FFF hex: not extended. |
| Reserved | 27 | Reserved |
| Program name | m | m: even number 1-41. |
| Check sum | 1 | |
| Stop code | 1 | 0F hex |
| XOR Byte | 1 | XOR result of all from start code to stop code. |

Encryption and Scrambling of Data

The data transmitted within the auxiliary information data packets (VM packet, program I.D., CSPG, PRI) is both encrypted and scrambled.

The data is encrypted using a secret key encrypto-system such as the data encryption standard (DES) proposed by IBM and adopted by NBS in 1978.

After encryption, the data is scrambled by using a scrambling key to swap the bits of the encrypted data. The scrambling key is preferably a predetermined set of numbers that are selected from a number that is associated with the data transmitted in the VBI or on tape. For example, for prerecorded tapes, a predetermined number of bits of the tape identification number are used as a key. For example, seven bits, such as bits 22-28, of the tape identification number may be used. The tape manufacturer uses these bits to scramble the data recorded on the tape. In the indexing VCR 10, the tape identification number is read from the VBI and the predetermined set of bits are used to de-scramble the encrypted data. As a second example, for broadcasted information, a predetermined number of bits of the data type symbol are used as a key. For example, four bits of the data type symbol may be used. The manufacturer of a master tape used by the broadcaster or the broadcaster itself may use these bits to scramble the data. The indexing VCR 10 reads the type symbol from the broadcasted VBI and retrieves the predetermined set of bits as a key. The indexing VCR 10 then uses this key to descramble the broadcasted data.

One example of scrambling and de-scrambling is to apply the 7 bits to pairs of alpha numeric characters in the data and depending upon whether the bit is one or a zero, swap the characters. For example, where a one digit appears the characters of the pair are swapped, where a zero appears, the characters are not swapped. For example, for a seven bit sequence of 1011001, the phrase CHRISTIE PARKER HALE becomes scrambled by switching the C and H of the first character pair to read HC for the first one in the seven bit sequence. The RI is not swapped because the second bit is a zero; the ST is swapped to TS because the third bit is a 1; the IE is swapped to read EI because the fourth bit is 1; and so forth. In addition, the pattern is repeated for each set of seven pairs. Spaces are included as a character. Thus, CHRISTIE PARKER HALE becomes HCRITSEI PAREK RHAEL. By applying the same seven bit sequence 1011001, the character sequence can be de-scrambled.

Recovering and Displaying of Directory On-Screen

The general preference is that, when a tape is inserted into the indexing VCR 10, the directory is displayed on the screen as soon as possible after the user presses the Index button. However, several methods exist for displaying the directory.

In the first embodiment, the TID, program number, and directory are automatically read when the tape is inserted. In this method, when the tape is inserted, even without the Index button being pressed, the indexing VCR 10 automatically reads the TID and program number from line 19 of the VBI. After determining the type of tape, the indexing VCR 10 then recovers the directory from either the RAM 33 (for HR tapes) or line 20 of the VBI (for PR tapes). The indexing VCR 10 is then in a ready state for any user command. When the user presses the Index button at any later time, the indexing VCR 10 displays the directory on screen instantaneously. However, if the user requests non-indexing functions right after he inserts the tape, the indexing VCR 10 will not be ready until after the indexing VCR 10 has read the TID, address and directory.

In the second embodiment, the TID and program number are automatically read at tape insertion and the directory is read when the Index button is pressed. In this method, after the indexing VCR 10 reads the TID and program number at tape insertion, the indexing VCR 10 is then ready for user commands. When the user presses the Index button, the indexing VCR 10 recovers, having previously identified the type of tape, the directory from the RAM 33 or the VBI. By reaching the ready state sooner, the user is able to control the indexing VCR 10 sooner.

In an alternate embodiment to the second embodiment, the indexing VCR 10 reads and displays a portion of the directory, e.g., the first page, after the Index button is pushed. This takes less time than reading the entire directory. As the user is reading the displayed directory, the indexing VCR 10 recovers the remainder of the directory. Alternatively, the indexing VCR 10 recovers the remainder of the directory only in response to a user command, such as next page.

In the third embodiment, the indexing VCR 10 takes no action upon tape insertion. After the tape is inserted, the indexing VCR 10 is ready for user commands. When the user presses the index button, the indexing VCR 10 reads the TID, program number, and directory.

Directory in VCR RAM

As described above, a library memory (LIBMEM) can be set up in the VCR, either as part of the RAM or separate from the RAM. In a specific embodiment, instead of storing directory information on a secondary memory (e.g. magnetic strip or semiconductor) or on the control track or video track of the tape, they are stored in the library memory LIBMEM.

In accordance with this specific embodiment, each tape for which a directory is stored in the LIBMEM is assigned a volume label (e.g. a volume number). When the tape is inserted into the VCR, the volume label is used to access the corresponding directory from the library.

It is anticipated that a tape, for which a directory is created in the LIBMEM of one machine, may be transported to another VCR. Such transportation poses several problems. First, if a machine wherein the above-described functions are not implemented, the tape position may be disturbed so that when the tape is returned, the current tape position is incorrect and the value of VOLNO as well as the value of the tape reel counter at the eject point are lost. Second, even if the machine to which the tape is transported is capable of providing the above described functions, it may not have stored the directory of the tape.

According to the above implementation, a counter, VOLCNTR, is kept in a non-volatile memory. The counter provides a count of the number of tapes of which a corresponding directory is already kept in the LIBMEM (hereinafter called an "indexed tape"). The value VOLNO 1016 (see FIG. 6) of VOLCNTR can therefore be used for assigning a unique volume number to an unindexed tape (i.e. one which does not have a directory stored in the LIBMEM).

Refer to the flow chart shown in FIG. 88. When a tape 40 is inserted into the VCR 1, the microprocessor controller 31 checks whether the tape is indexed by reading the tape, at the point of insertion, for a volume number (step 4601). If a volume number is present, the tape is an indexed tape and the volume is used to retrieve a directory from the library (step 4602).

If a volume number is not present, the tape is searched for a volume number (step 4603). If a volume number is not found, the microprocessor controller 31 creates a directory for the tape in the library (step 4604). The creation includes the steps of retrieving the value of VOLCNTR from the memory, assigning that value to the tape (the VOLCNTR is also updated) and based upon the value of VOLNO allocating a space in the library to the tape. The space may be allocated based upon the value of VOLNO, such as by using the formula:

ADDR(new directory)=BASE+VOLNO*volsize

That is, the address of the directory for the inserted tape is equal to a base number (which may be equal to the starting address of LIBMEM plus a constant) plus VOLNO times the size of a directory.

The value of VOLNO is also displayed on a screen (step 4605). Preferably, numbered stickers are provided by the cassette manufactures and packaged with a new cassette. The user can then use the appropriate sticker(s) to label the cassette and/or its case or jacket.

Although not performed in this implementation, the microprocessor controller 31 may also write the value of VOLNO at this step to a predefined position of the tape (e.g., the beginning), using one of the methods described above. For example, the value of VOLNO may be written on a predefined location (such as the beginning) of the control track, or in a predefined VBI portion. It needs to be pointed out that if VOLNO is written on the control track, existing sensing and electronic components can be used in reading its value and it can be accessed at fast forward or rewind speed, whereas if VOLNO is written on the VBI of the video track, a VBI encoder, such as the one disclosed above, is required and the value of VOLNO can be accessed only at PLAY speed.

Instead of writing it at the beginning of the tape, the value of VOLNO is written when the tape is ejected. When the tape is ejected, the value of VOLNO is written and the tape is rewound to the original stopping point (the "eject point") The address of the eject point (e.g. the tape reel counter value) is also stored in a predefined field in the corresponding directory.

If a VOLNO is found on the tape, the tape position where the volume label is found is noted (step 4606). The volume label is then used to retrieve a directory from the memory (step 4607). The tape is then rewound to the beginning and the tape counter is reset. From the directory, the tape counter value of where the VOLNO should be found is also noted (step 4608). If these numbers match the tape position as noted in step 4606 (step 4611), the directory is assumed to be the right directory and the directory is used (step 4610). If the two numbers do not match, a directory is created in a temporary memory space; and when the tape is ejected, this directory will be deleted (i.e. not stored into the library) (step 4609).

In the above described embodiment, the contents of LIBMEM and VOLCNTR must not be lost due to a power failure of the VCR. In one implementation, the memory space of LIBMEM and VOLCNTR is provided by non-volatile memory devices such as electrically erasable programmable read only memory (EEPROM). In another implementation, battery backup is provided for the memory which form the two memory spaces. In another implementation, the directory of a tape is written back to the tape itself (either on the control track or in the VBI portion of the video track) at the point of ejection, so that the directory can be used, if necessary for recovery. In still another implementation, the content store in LIBMEM is periodically backed up to a "directory backup tape", which can then be used to recover the library after a power failure.

In another implementation, if the VCR fails to read the VOLNO when a tape is inserted, the microprocessor controller 31 sends a message to the screen to prompt the user for the value of VOLNO. The user can enter the VOLNO based upon the value shown on the sticker carried on the cassette housing. Based upon the inputted value of the VOLNO, the directory of the tape is accessed.

Enhanced Functions

The functions provided by the VCR in one specific embodiment of the present invention are shown in the flow charts of FIGS. 89a-89f.

Operation

Referring to the flow-chart shown in FIG. 90a, when a cassette tape 40 is loaded into the VCR 1, the microprocessor controller 31 is interrupted (step 2710). The microprocessor controller 31 then performs a check to see whether the inserted cassette tape is an enhanced cassette or a standard cassette (step 2711). An enhanced cassette is a cassette provided with a secondary memory for storing directory information; however, if the VCR is implemented in such a way that directory information is stored on the cassette tape (e.g. control track or VBI), step 2711 can be skipped. Depending upon the implementation, the secondary memory can either be a semiconductor memory or a magnetic strip carried by the cassette. The test can be performed in any one of many techniques, including the techniques described above, i.e. detecting for presence of an electrical conductor or a light-reflective material on the cassette, or reading a predefined code on the magnetic strip.

If the cassette is an enhanced cassette, the feature control field FTCNTL 1013 in the operation flags of the RAM 33 is filled. Other control parameters, such as the length of the cassette tape 1012, and access parameters (e.g. bit density of a magnetic strip) of the secondary memory is read and stored in appropriate fields in the operation flags (step 2712).

The microprocessor controller 31 then locates a directory from the secondary memory (step 2713). If the VCR is implemented in such a way that directory information is stored on the cassette tape, or in a library stored in the RAM indexed by a tape number or volume number stored on the cassette tape, as previously described, the microprocessor controller 31 may have to activate the motor and mechanical control logic circuit 5 as well as the control and audio track head logic circuit 11 to search for the directory. If the directory information is found (step 2714), it is read into the in-use directory area 1021 (see FIG. 6) in the RAM 33 (step 2715). The directory information is used to fill a screen such as the one shown in FIG. 91a (step 2716). If the cassette is not an enhanced cassette, the microprocessor controller 31 performs one of the searches described above for identifying the tape (step 2717). If the directory is not found, a blank screen or a warning screen may be shown.

Referring to FIG. 91a, the enhanced screen contains a listing of the titles and lengths of the programs recorded on the cassette. In one implementation, six programs are displayed each time. The programs not shown can be accessed by scrolling or paging, using either the "PG DN" key for scrolling or paging forward or the "PG UP" key for scrolling or paging backward. The enhanced directory screen 1101 comprises several columns. The first column contains the indexes of the displayed programs, each represented by a number of 1-2 digits, with no leading zeros.

In a first embodiment, the index number (or program number) is generated by the microprocessor controller 31. In a second embodiment, the indexing VCR 10 does not generate the index number. The index number is part of the text title. For PR tapes or video magazines, the program or section numbers are included as part of the text. This allows the publisher to control the layout of the display. In a third embodiment, the indexing VCR 10 generates the index number for HR tapes and the broadcaster/publisher generates them for video magazines and PR tapes. Alternatively, a "bullet" symbol may be used instead of a program number.

The second column contains the titles of the programs. A title can have a length of up to 32 characters. Valid characters are alphabets from A-Z in upper case, numerals 0-9, and punctuation marks such as

| | |
|---|---|
| comma (",") | period (".") |
| semicolon (";") | colon (":") |
| exclamation mark ("!") | at/each ("@") |
| pound sign ("#") | slash ("/") |
| question mark ("?") | space (" ") |

The title may be obtained from the VBI. Optionally, it may be input by the user (e.g. entry #3). If a recorded program has no accompanying title information broadcasted in the VBI, the broadcast date and time of the program are used as the title (e.g. entry #4). When a tape segment has no program recorded thereon, the corresponding second column shows the word "BLANK" (e.g. entry #2). The last entry of the second column has an entry with the word "END" in the title field (entry #5). If the tape is a blank tape, "END" would be the only entry on the screen.

The third column contains the lengths of the corresponding programs, each represented by a number (1-3 digits long) indicating the number of minutes of the corresponding program. If the cassette is blank, the screen would show a single "END" entry and the corresponding length field would equal the total length of the cassette. If there is no blank space between the last program on the tape and the end of the tape, a zero will be displayed in the length field of the "END" entry.

Optionally but advantageously, the screen also shows the current operating speed of the VCR; that is, whether the VCR is set at SP, LP, SLP, etc. Moreover, in one implementation of the present invention, if the operating speed of the VCR is changed, respective lengths of the programs will be recalculated and displayed with the recalculated value.

Identifying A Recorded Program

The enhanced tape allows a user to select a program from the directory screen for playback by entering the corresponding number of the program as displayed on the first column of the enhanced screen and then press the "PLAY" key. For example, to watch program number #3, the "3" key and the "PLAY" key are pressed in sequence.

Referring to FIG. 90b, when the microprocessor controller 31 receives a number key (step 2720), it retrieves a variable ("NO.") and adds the entered number by concatenating it to that variable (step 2721). The microprocessor controller 31 then waits for another key input (step 2722). When a key is entered, the microprocessor controller checks to see if the newly-entered key is another number key (step 2723). If the newly-entered key is another number key, its value is again added to the variable "NO." Typically, the number is added by shifting "NO." by one digit and adds the newly-entered number thereto (step 2721). The microprocessor controller 31 waits for a non-number key (e.g. "PLAY", "RECORD") to be entered (step 2722). When a non-number key is received, the microprocessor controller 31 checks to see if the tape is positioned at the program with the input number. If the tape is not positioned at the selected program, either a rewind or a fast forward operation is performed, depending on the current position of the tape, to move the tape to the beginning of the program having the input number, and a screen, such as FIG. 91b, is displayed (step 2724).

After the tape is moved to the selected program, the function specified by the non-number key is then performed (step 2725).

Playing A Recorded Program

Figure 90C:
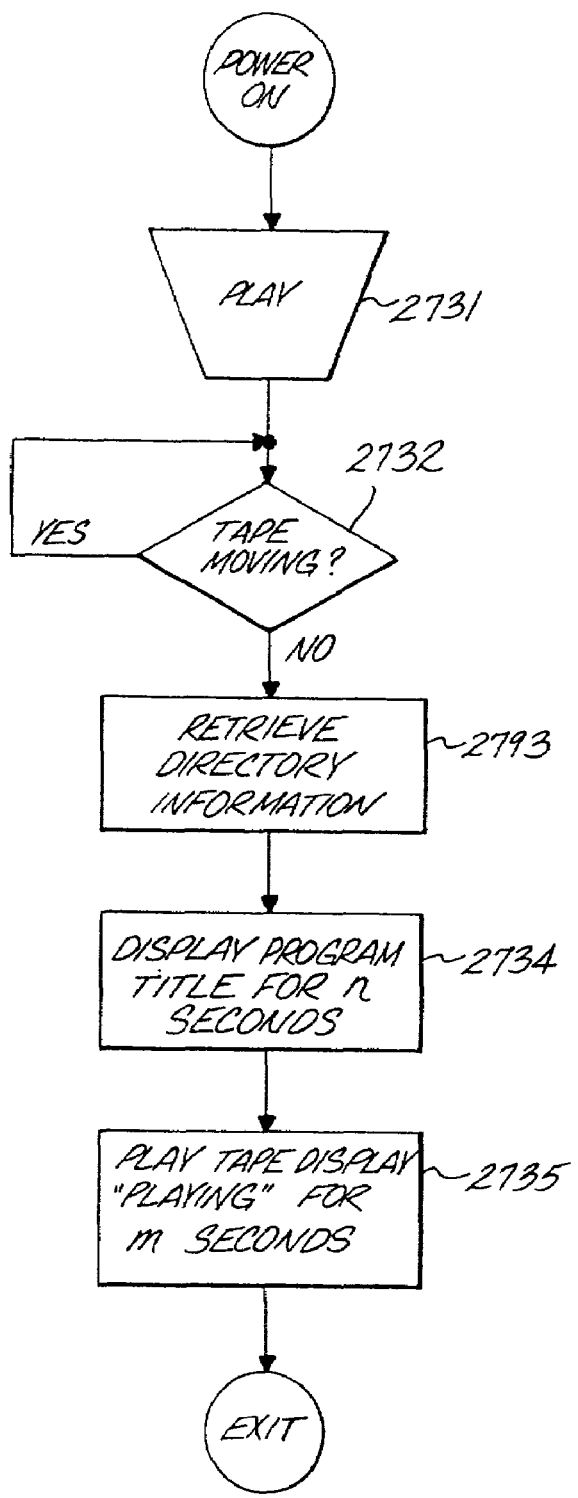
Figure 91B:
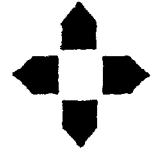
FIGS. 91a-91p illustrate the different screens displayed by the VCR embodying the present invention.

Referring to FIG. 90c, when the "PLAY" key is pressed (step 2731), the microprocessor controller 31 waits until the tape stops moving (step 2732). When the tape stops, the microprocessor controller 31 retrieves directory information of the program (step 2733) and displays it on a screen (step 2734) as shown in FIG. 91c for a few seconds. Thereafter, the microprocessor controller 31 initiates the VCR to play the cassette (step 2735). The time of occurrence of the play command and the title of the viewed program are stored in the monitoring data memory 33c of the RAM 33. Optionally, in the first few seconds after the tape is started, the word "PLAYING" is displayed on the screen (step 2735). The VCR continues to play the tape until it reaches the end of the program as indicated by either the change in a PN in the TPA packet, upon reaching a VISS mark, a match of the current absolute address with the stop address or until it receives a STOP command. Upon stopping, the microprocessor controller 31 displays a directory.

Alternatively, the stopping may be disabled by the user's request or if a "continue play" flag in the VM packet 2607' is set.

Instant Recording

Instant recording is an option which allows a user to record a program for a selected length of time. The option can be initiated at any time instant, whether the user is watching a television broadcast or a taped program. Referring to. the flow-chart shown in FIG. 90d, when the microprocessor controller 31 is interrupted by the RECORD key (step 2741), it displays a screen, such as FIG. 91d, to prompt the user to enter the length of recording desired (step 2742). The length can be entered as a three-digit number representing the number of minutes desired (step 2743). Numbers with less than three digits are appended by leading zeros, either automatically or manually, depending on the implementation. The entered numbers are confirmed by the "ENTER" key (step 2744). If three zeros are entered, they are interpreted as a "CANCEL" command (step 2745).

Instant recording may be initiated when the tape is positioned within a recorded program, within a blank space, or at the end of the tape (step 2746). When the microprocessor controller 31 receives the "ENTER" key, it checks the current tape position against the tape directory (step 27410).

Figure 90E:
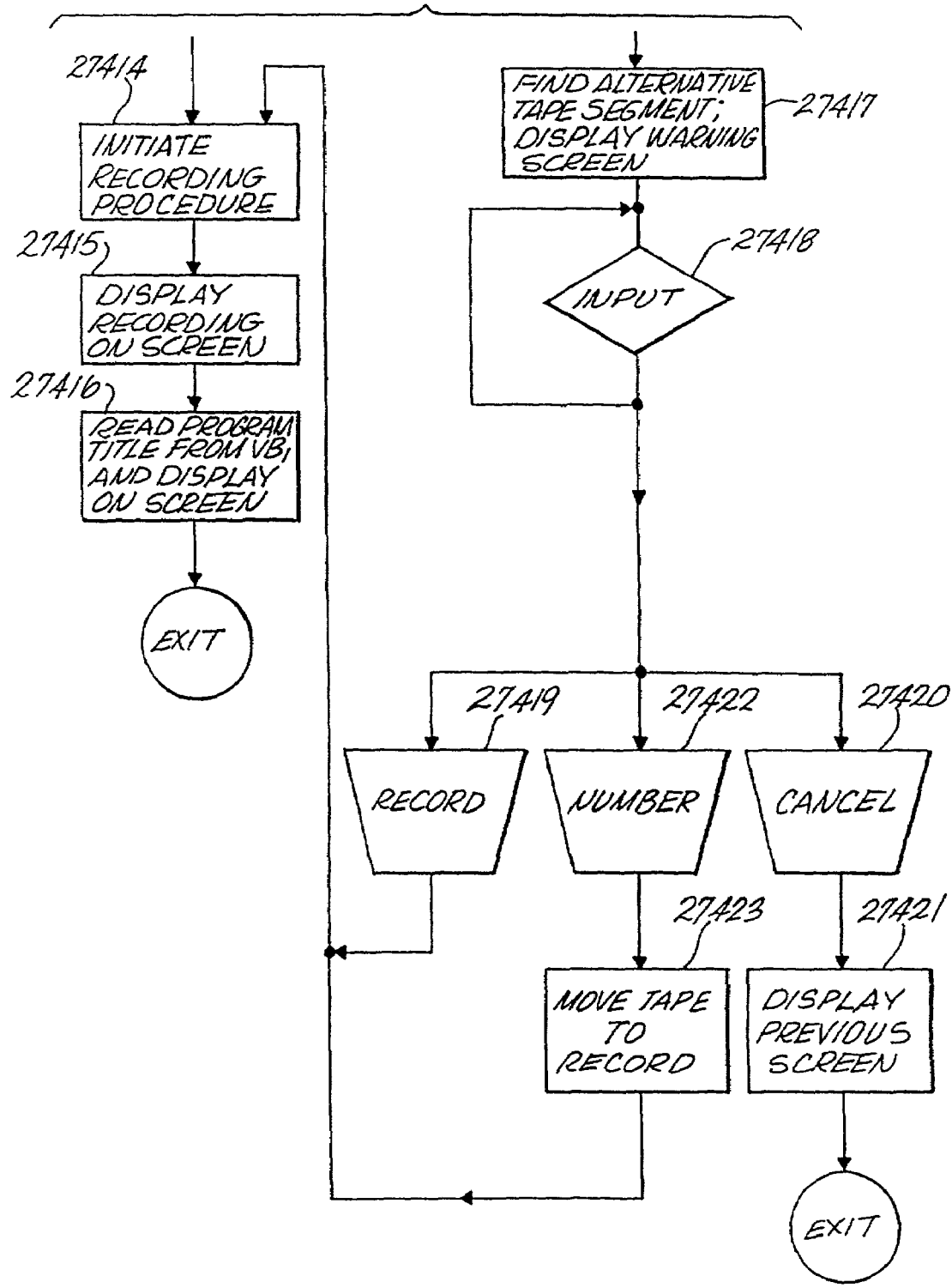

If the current tape position is at a blank area which has a length equal to or longer than the entered length of the recording (step 27411), the microprocessor controller 31 initiates a Recording Procedure to record the program (see FIG. 90e).

Referring now to FIG. 92a, there is shown a flow chart illustrating the general steps of the Recording Procedure. When an appropriate tape segment is found, the address of the segment is passed to the Recording Procedure. In step 3000, the microprocessor controller 31 stores the current value of the tape counter. In step 3001, the microprocessor controller 31 calls a VBI Decode Procedure to set up the VBI decoder 60a in order to obtain program information (e.g. title) from the VBI.

Referring now to FIG. 92b, there is shown a flow chart illustrating the general steps of the VBI Decode Procedure. The VBI Decode Procedure has two parameters, a VBI line number (LINE#) and a VBI field number (FIELD#). The microprocessor controller 31, in response to these parameters, sets the VBI decoder 60a to decode line 21 and field 2 of the VBI (step 3101).

When the VBI decoder 35a detects VBI line 21 and field 2, it interrupts the microprocessor controller 31 (step 3102) and passes the value of line 21 and field 2 of the VBI to it.

Referring back to FIG. 92a, after the microprocessor controller 31 initiates the VBI Decode Procedure, it sets the VCR 1 to record (step 3002). During the recording, the microprocessor controller 31 writes TID, PN, and absolute addresses in the form of TPA packets on the tape as described above. When the microprocessor controller 31 is interrupted by the VBI decoder 60a, it receives the output from the VBI decoder and checks the control code and type code of the output (steps 3003 and 3004). Under the EIA-608 standard, if the control code is "01" and the type code is "03", the microprocessor controller 31 reads the VBI output and puts it into the "program title" field of the corresponding directory entry (step 3005). If the control code is "01" and the type code is "04", the microprocessor controller 31 reads the VBI output and puts it into the "program type" field of the corresponding entry (step 3006). If the control code is "01" and the type code is "05", the microprocessor controller 31 reads the VBI output and puts it into the "program audience" field of the corresponding entry (step 3008). If the control code is "07" and the type code is "01", the microprocessor controller 31. reads the VBI output and stores it in a temporary time-of-day variable (step 3007).

The microprocessor controller 31 then checks to see if the program title from the VBI is a blank (step 3009). If so, then it puts the date, time and channel of the program into the program title field of the directory entry (step 3010). The time of occurrence of the recording and the title of the program being recorded (or date-time-channel if there is no title in the VBI) are recorded in the monitoring data 33c.

Figure 92C:
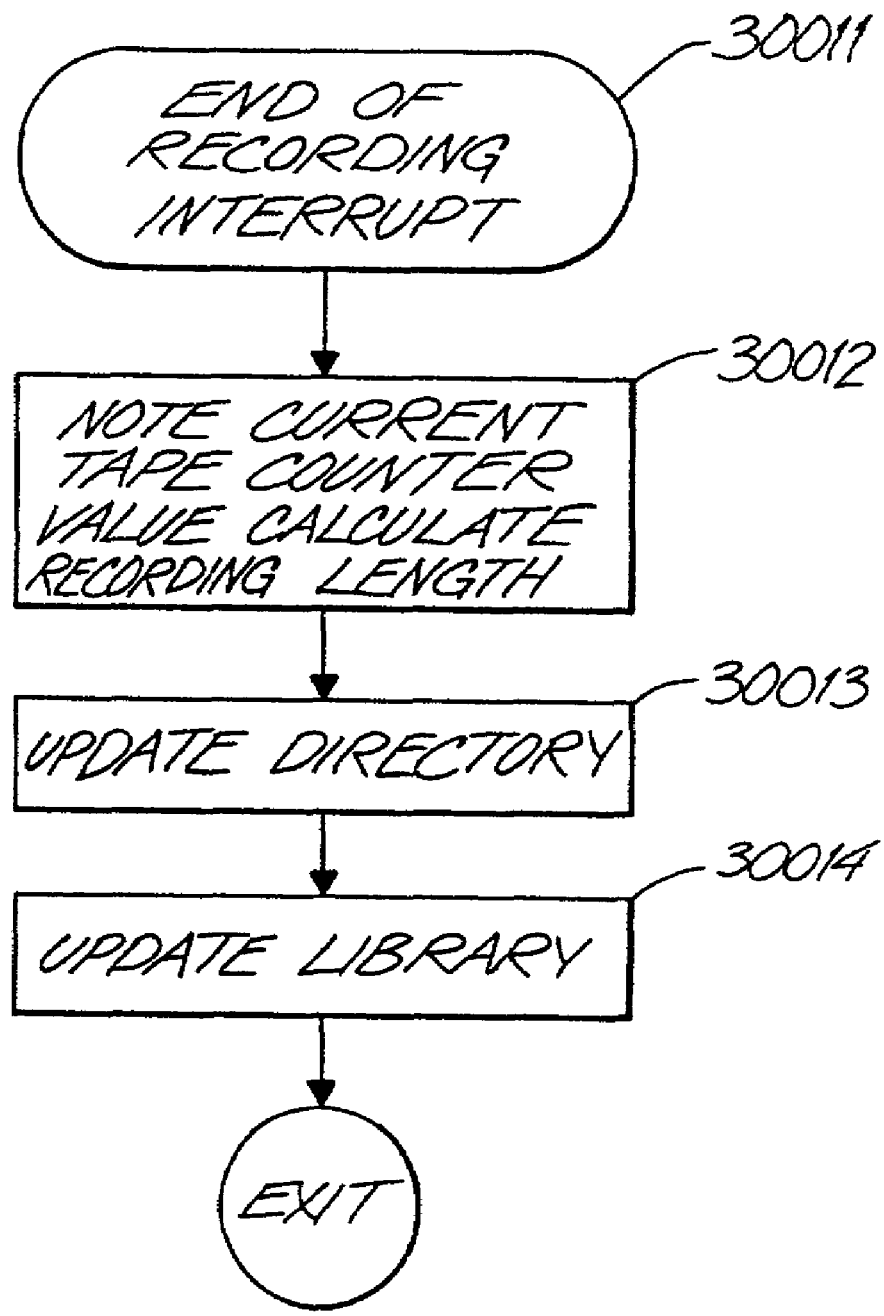

Referring to FIG. 92c, when the recording finishes, the microprocessor controller 31 is interrupted (step 30011). It then notes the current value of the tape counter and subtracts it from the value stored at the beginning of the recording to find the length of the recorded program (step 30012). In step 30013, the directory of the cassette is updated. In step 30014, if there is an entry in the VCR library for the tape (as will be described below), the library is updated.

Referring now to FIG. 90e, optionally, when the screen is showing a broadcast program, the microprocessor controller 31 indicates the recording procedure (step 27414) and displays the word "RECORDING" (step 27415) on the lower part of the screen. Moreover, if the program title is transmitted, it is read and displayed on the screen (step 27416) next to the word "RECORDING".

Referring back to FIG. 90d, if the current position of the tape is at a non-blank segment (step 27412) or if the current position is at a blank segment but the blank's length is shorter than the length of the desired recording (step 27413), the microprocessor controller 31 performs a search procedure to select the directory for an appropriate segment for performing the recording. The appropriate segment can be selected in several ways. One way is to search, starting from the beginning of the directory, for the first blank segment whose length is longer or equal to the requested length of the recording. If the programs recorded on the tape are as shown in FIG. 91f and the required length of the recording is 20 minutes, segment #4 (length=120 minutes) will be selected. However, such selection would cause inefficient use of the tape. Therefore, another way is to search the directory for the shortest blank segment whose length is longer or equal to the required length of the recording. Using the example of FIG. 91f, segment #6 (length=24 minutes) will be used. In this way, segment #4 can be used for recording a longer program.

Figure 91E:
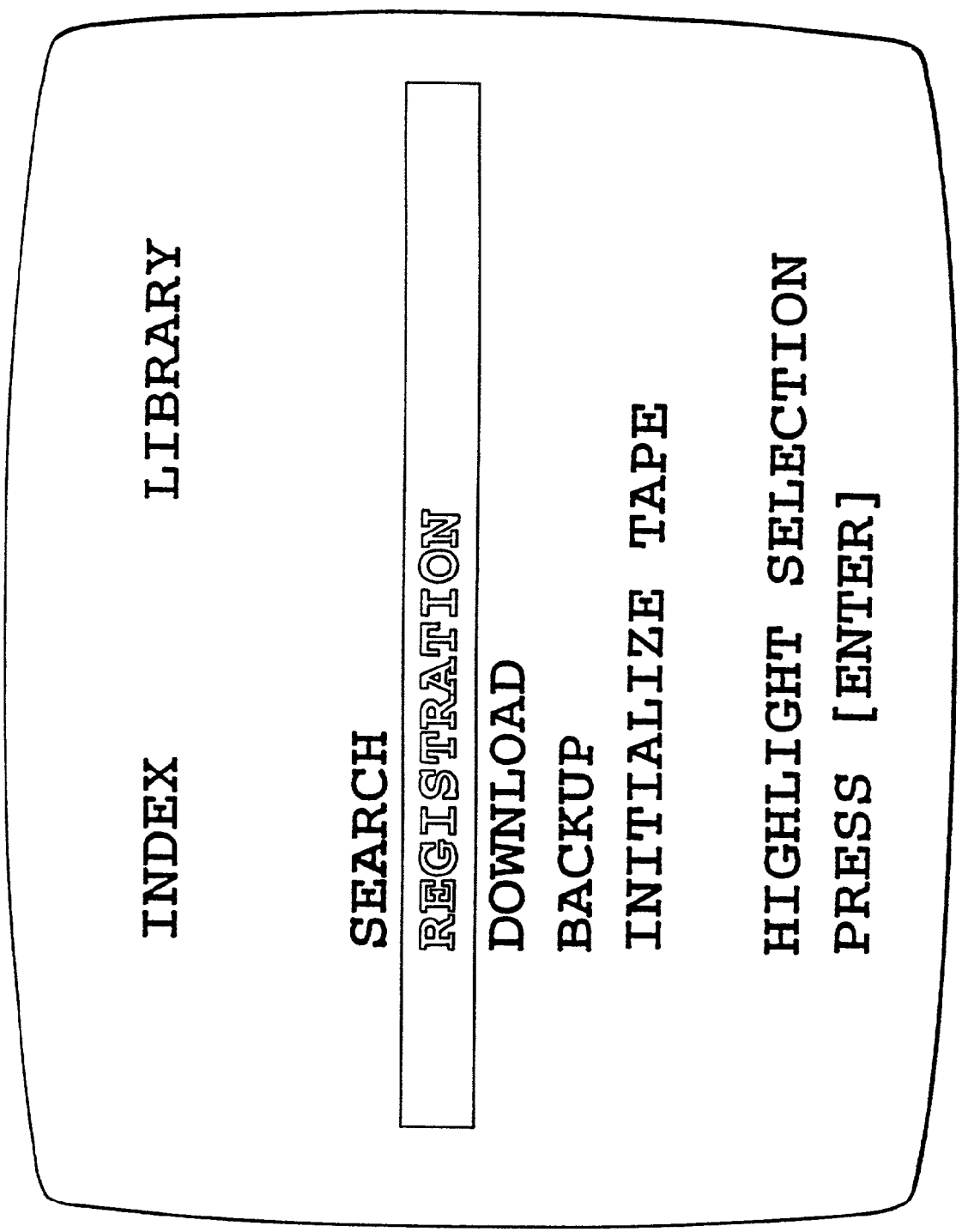

Returning to FIG. 90e, after the microprocessor controller 31 searches for an appropriate segment, it displays a warning screen, such as the screen shown in FIG. 91e, on the screen (step 27417), suggesting to the user to perform the recording on segment #6.

After the warning screen of FIG. 91c is displayed, the microprocessor controller 31 monitors for an input from the user (step 27418). If the user presses the RECORD key (step 27419), the microprocessor controller 31 then performs operations described in steps 27414, 27415 and 27416 described above. If the user presses the CANCEL key (step 27420), the recording is cancelled and the previous screen is displayed (step 27421). If the user presses the number key that corresponds to the number shown on the screen (step 27422), the microprocessor controller 31 moves the tape to the position corresponding to the entered number (step 27423) and starts recording. When the tape is moved, a screen such as FIG. 91b is shown.

During all recording, whether instant or timer, the microprocessor controller 31 writes, in one embodiment, a TPA packet on a line (typically line 19) of the VBI. (In another embodiment, a TP packet is written.) For PR tapes, a DN packet is written on a line (typically line 20). After a recording, the program information in the DN packet is stored in RAM.

It is preferred to start each recording at the end of a previous program to minimize blank or dead space between recordings.

VCR PLUS+™ Recording

The VCR can optionally be initiated to perform a "PLUS-CODE™" number recording, in a similar way as a VCR PLUS+™ remote controller from Gemstar Development Corporation of California. "PLUSCODE™" number recording is also described in U.S. patent application Ser. No. 07/676,934 filed Mar. 27, 1991 and is incorporated herein by reference. "PLUSCODE™" and VCR PLUS+™ are trademarks of Gemstar Development Corporation. "PLUS-CODE™" number recording is initiated by a "VCR PLUS+™" key, which can be performed at any time, even when a broadcast or a recording is being watched, or when a rewind or fast forward operation is in progress, or when there is no cassette tape loaded in the VCR.

In a specific implementation, enough memory space is provided in the CDTL buffer 1024 for, storing eight "PLUS-CODE™" number settings. Referring to FIG. 90f, when the microprocessor controller 31 is interrupted by the VCR PLUS+™ key (step 2751), it first checks whether the CDTL buffer 1024 is full (step 27516). If the buffer is not full, the microprocessor controller 31 displays a screen, such as FIG. 91g, on the television screen (step 2752). The microprocessor controller 31 then waits for an input from the user (step 2753). If the input is a number key (step 2754), it is added to the entered digits (step 2755). If the input is the ERASE key (step 2756), the already-received digits are erased (step 2757). If the input is the ENTER key (step 2758), the microprocessor controller 31 checks whether the input is a valid "PLUS-CODE™" number (step 2759).

If the input is an invalid "PLUSCODE™" number, a screen such as FIG. 90h is displayed to prompt the user to re-enter the "PLUSCODE™" number (step 27510) If the "CANCEL" key is pressed (step 27514) under that screen, the "PLUS-CODE™" number recording is cancelled (step 27515).

If the "PLUSCODE™" number is valid at step 2759, a check is made to determine whether there is a "PLUS-CODE™" number conflict (step 27516). A conflict occurs when the "PLUSCODE™" number setting is for a recording which will occur at the same time as another scheduled recording. Referring to FIG. 90g, if there is no conflict, a prompt screen such as FIG. 91i is displayed (step 27511) The user can then press:

"1" to set the recording for once only;
"2" to set the recording weekly;
"3" to set the recording every weekday.

Pressing any key other than these three keys would have no effect (step 27512).

Upon receiving one of these three keys, the input is saved (step 27513), a confirmation screen is displayed for confirming the recording data, such as
channel number
Date (MM/DD/YR)
Start Time (in either 24-hour or in 12-hour AM/PM format)
Stop Time (in either 24-hour or in 12-hour AM/PM format)
Recording option, that is, whether the recording is to be performed once, weekly or daily.

If the data on the confirming screen is correct, the user presses the "ENTER" key and the recording is set. The time of occurrence of the enter command for the "VCR PLUS+™" programmer recording and the "PLUSCODE™" number are stored in the monitoring data 33c. If the data is incorrect, the user can press the "CANCEL" key to re-enter the "PLUS-CODE™" number.

If the CDTL buffer 1024 is already full when the "VCR Plus+", key is pressed, a warning screen such as FIG. 91j is displayed (step 27517). The warning screen advises the user that the buffer is full and that he needs to delete a program from the buffer before another program can be added. Under FIG. 91j, the user is advised that he review the list of programs stored in the CDTL buffer 1024 so that he/she can delete one or more setting to make room for the new setting. The user is also advised that he can press the "CANCEL" key to exit "PLUSCODE™" number recording.

"PLUSCODE™" number settings can be reviewed by pressing the "REVIEW" key. A review operation can be performed at any time and can even be performed when there is no tape in the video player. With reference to FIG. 90k, when the microprocessor controller 31 is interrupted by the REVIEW key (step 2761), it retrieves all the "PLUS-CODE™" number settings (step 2762) from the CDTL buffer 1024. Based upon the data, a screen such as FIG. 91k is displayed (step 2763).

If the REVIEW option is entered as a result of a full CDTL buffer 1024 during the VCR Plus+™ operation, the screen of FIG. 91k would list eight programs.

On a review screen, each entry would comprise the following columns:

Number of the entry. This number is used for ordering and reference. "PLUSCODE™" number settings are listed in chronological order so that the program to be recorded first will appear at the top of the screen and the programs to be recorded last will appear at the bottom of the screen.

Channel number of the program to be recorded.

Date of the program, expressed in MM-DD format. If the program is to be recorded daily (i.e. Monday to Friday), the letter "D" would appear immediately to the right of the date. If the program is to be recorded weekly, a letter "W" would appear immediately to the right of the date.

Time of the program. This information is expressed in 24-hour clock and in HH:MM format. Alternatively, the information may be expressed in 12-hour AM/PM clock format.

Length of the set recording. This information is expressed in number of minutes.

Tape status. This information is displayed when a tape having the enhanced features is used. The microprocessor controller 31 checks the feature control field (FTCNTL) to see if an enhanced tape is inserted (step 2764). If the inserted tape is an enhanced tape, the microprocessor controller 31 searches the directory to see if there is a blank segment for each setting (step 2765). If there is enough blank space on the tape to accommodate a setting, the word "OK" is written in the sixth column of the corresponding entry (step 2766). If there is not enough blank space on the inserted tape for the corresponding setting, the word "NO" will appear in this field. The value in this field may chance if a different tape is inserted for the new tape has different amount of blank space.

After the review screen is displayed, the microprocessor controller 31 waits for an input from the user (step 2767). Referring now to FIG. 90l, when the user enters a number key (1-8 in the example of a full CDTL buffer noted above) (step 2768), the corresponding entry is selected (step 2769). If the user then presses the ERASE key (step 27610), the selected entry is deleted from the CDTL buffer 1024 (step 27611). If the "REVIEW" key is pressed again under the review screen (step 27612) or if the tape is ejected from the VCR, the review operation is terminated.

Referring back to step 27516 of FIGS. 90f and 90g, if the newly-entered "PLUSCODE™" number conflicts with an existing "PLUSCODE™" number, a screen such as FIG. 91l is displayed which shows such data as the channel, date, start time and stop time of both the new setting and the existing setting (step 27517). The microprocessor controller 31 then waits for the user to press the CANCEL key (steps 27518 and 27519). If the "CANCEL" is entered, the new "PLUS-CODE™" number is erased and the "VCR Plus+™" programmer recording operation is re-started (by going back to step 2753). The time of occurrence of the cancel command and the "PLUSCODE™" number are stored in the monitoring data 33c.

A timer is kept in the indexing VCR. Whenever the timer is empty, the microprocessor controller 31 puts the starting time of the first "PLUSCODE™" number entry (if one exists) into the timer. When the timer equals to the time-of-day clock 31b, the microprocessor controller 31 is interrupted, which will then execute the Recording Procedure described above.

Library

In the specific embodiment of the present invention, a user is given the option to create a library of the directories for a set of selected tapes. Storage space is created in the RAM 33 for storing the library. The storage space of the library is divided into more than one group of entries, each for storing the directory of a tape (or a volume). A volume ID of the corresponding tape is stored in a predetermined location of each entry.

The library option is initiated when a "LIBRARY" key or the index key is pressed. The key can be pressed at anytime, such as when the user is recording a broadcast program or watching a recorded program from a cassette. Moreover, the key can be pressed when there is no cassette in the VCR.

Refer to FIG. 90h, when the microprocessor controller 31 is interrupted by the INDEX key (step 2771), it displays a screen such as FIG. 91o to prompt the user to enter one of two options (step 2772). Option 1 is an option to add a tape directory into the library, it can be selected only when a enhanced cassette is loaded in the VCR (step 2773). The option is typically used when a user adopts an indexed tape from a friend or wants to add a PR tape to the directory stored in the RAM 33. Option 2 is an option which allows the user to access content of the library and is typically selected by the user to search for a special program or a special type of program (step 2774).

Figure 90I:
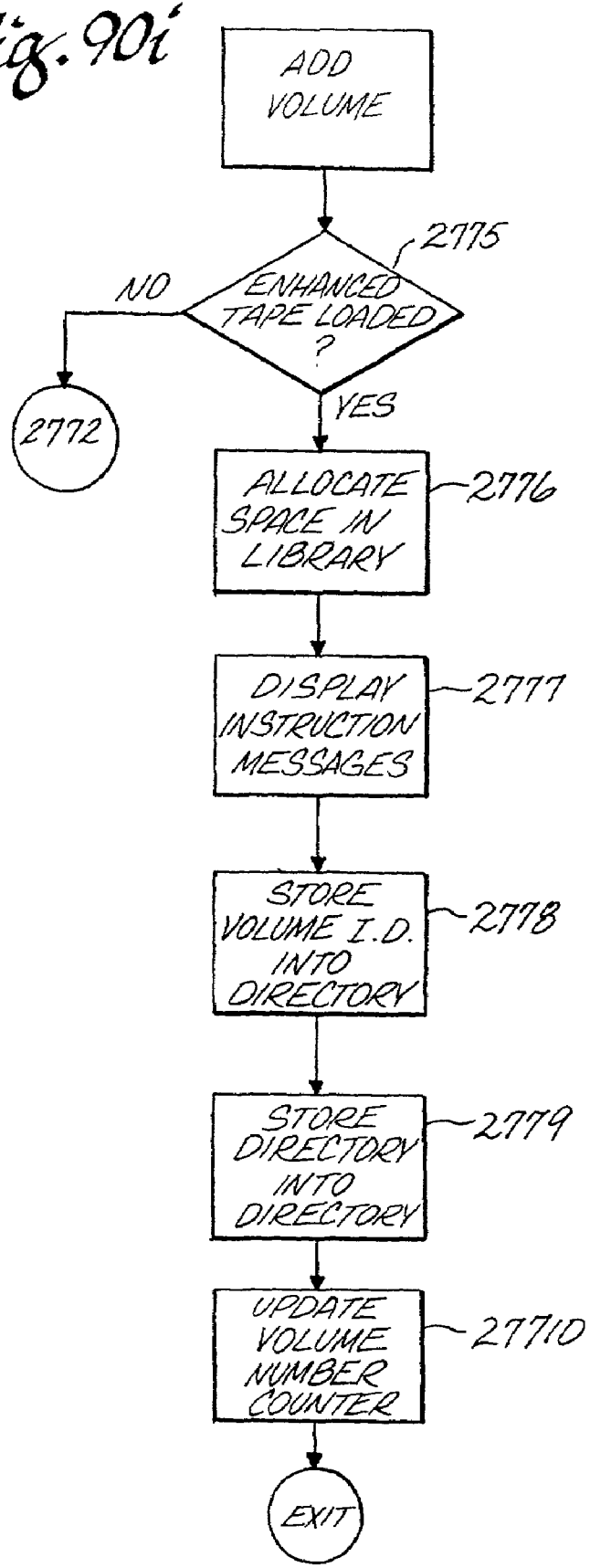

With reference to FIG. 90i. When Option 1 is selected, the microprocessor controller 31 detects whether a cassette is loaded in the VCR (step 2775). If no cassette is loaded, the microprocessor controller 31 displays a message, such as:

"THIS OPTION NEEDS AN INDEXED TAPE"

on the screen and returns to step 2772 of FIG. 90h. If an enhanced or indexed cassette is loaded in the VCR, the microprocessor controller 31 will allocate space in the library area for adding the directory (step 2776). In one implementation, the microprocessor controller 31 then prompts the user to enter an volume label (or tape number). In a preferred implementation, a Volume Number Counter 1016 is kept in the RAM 33, (e.g. inside the operation flags area). This counter 1016 stores the next volume number (or program number) to be assigned to a newly-added tape. When execution of the add option begins, the microprocessor controller 31 takes the next available volume number or tape number (assuming for purposes of illustration that it is 59) from the Volume Number Counter and assigns this volume number (or tape number) to the tape. (Numbers are not reused so that two tapes do not end up with the same number.) Advantageously, if the library is implemented in such a way that each directory has a fixed amount of memory space, the volume number of a tape can be used as an index to address the corresponding directory from the library.

In step 2777, the assigned volume number is displayed on the screen, accompanied by a message such as:

"THE VOLUME NUMBER ASSIGNED TO THIS TAPE IS 59"

"PLEASE AFFIX LABEL TO CASSETTE WITH THIS NUMBER"

For convenience, numbered stickers are provided from cassette manufactures and packaged with a new cassette. The user can then use the appropriate sticker(s) to label the cassette and/or its case. Alternatively, the microprocessor controller 31 may provide the tape number to a printer via the interface port to print the tape number.

The microprocessor controller 31 also generates a TID for an HR tape the first time a recording is made onto the tape or uses the TID read from a PR tape in a manner described above. The TID for an HR tape is preserved during overrecording.

A TID is assigned to an RI tape when it is re-indexed. For HR tapes, the microprocessor controller 31 chooses the next available serial number (SN) rather than revise an old serial number that has been deleted, unless the serial number has overflowed, i.e., stepped through the number range allowed by the data format. This prevents an old deleted tape from being mistaken for a new tape.

The microprocessor controller 31 then stores the assigned volume number into a predetermined location (VOL ID) of the cassette's directory (step 2778). The VOL ID field in a directory can be used as an indication to the microprocessor controller 31 that such directory is stored in the library, so that the library can be updated if the directory is changed (e.g. when a recording is performed). The microprocessor controller 31 then writes the directory into the allocated library area (step 2779) and increments the volume number counter as the directory is successfully added to the library.

Although the indexing VCR 10 assigns tape numbers, the user can renumber the tapes so long as the tape number is not being used for another tape. (Some numbers, such as 0 and 4095, may be reserved for special functions as described herein.) In an alternate implementation, the microprocessor controller 31 displays as part of the library menu an option entitled Change Tape Number. Using the cursor and the enter keys, the user renumbers selected tapes. The microprocessor controller 31 verifies that there is no number duplication. This number is preferably changed before recording the program. This feature is useful when multiple tapes are required for a single show, such as a three part mini-series that is recorded on different tapes. Although the tape number has changed, the tape identification number (TID) used by the microprocessor controller 31 is not changed. In a similar manner, the user may manually create, delete, or change the title of a program in its memory.

Figure 90J:
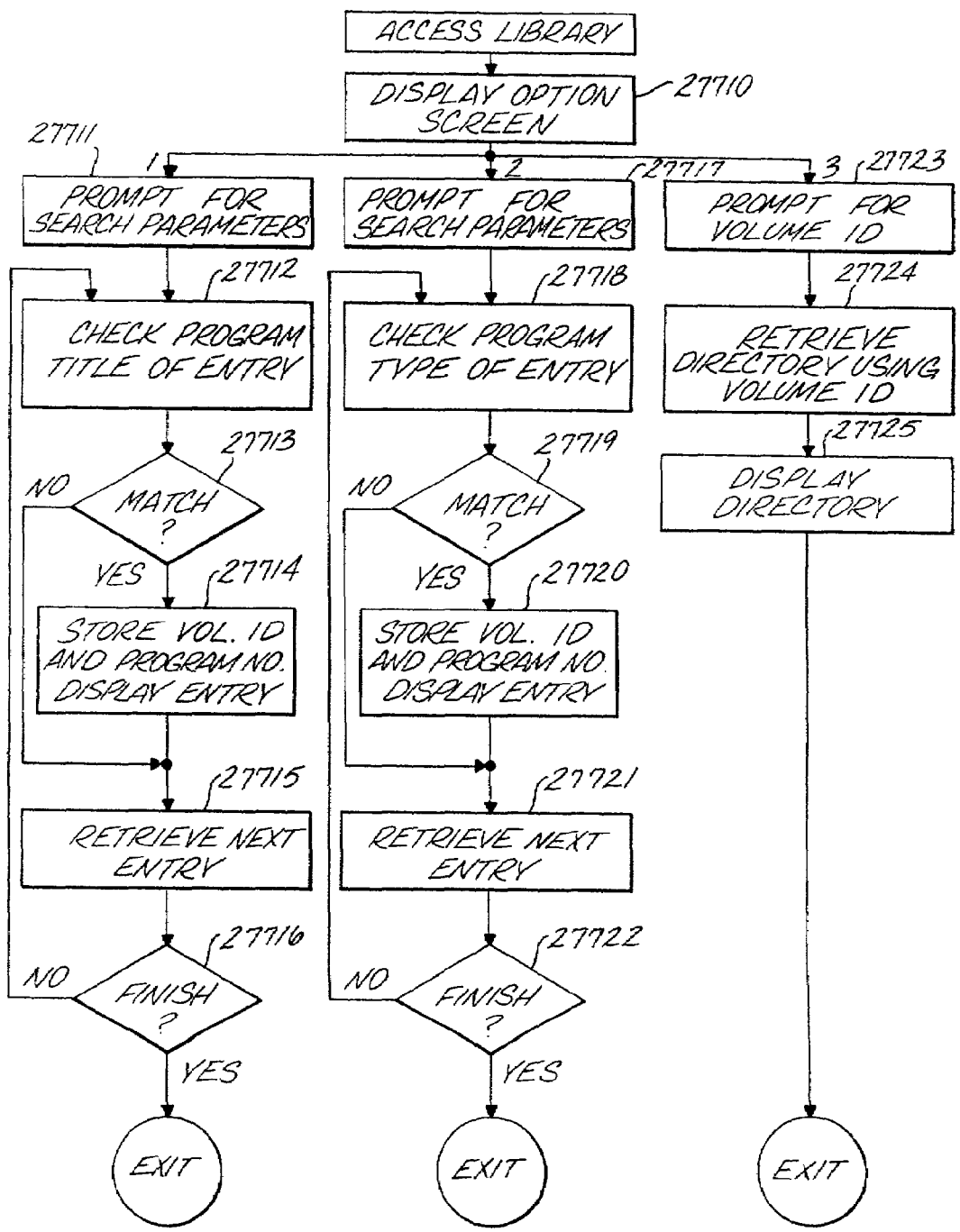
Figure 90K:
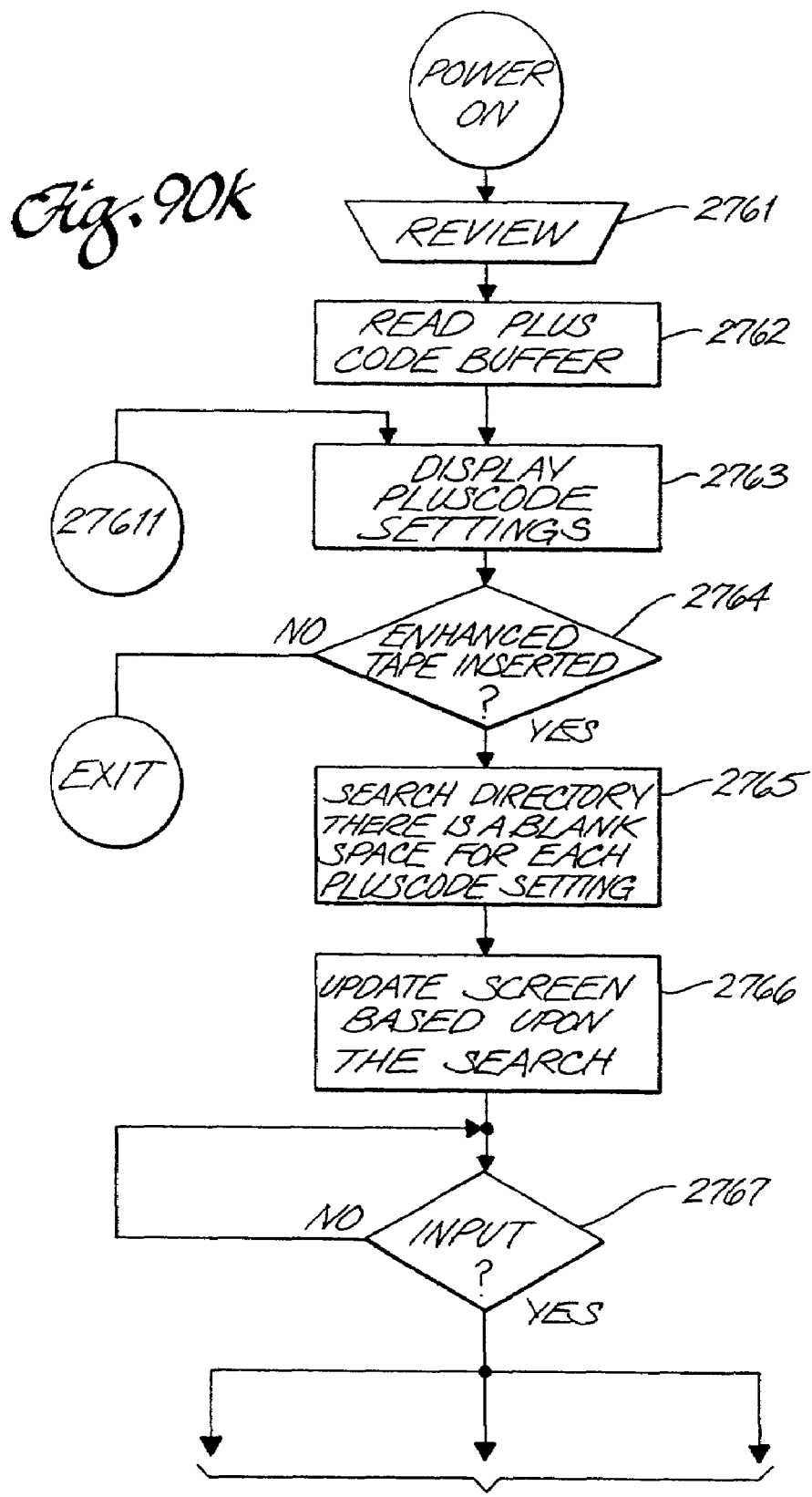

When Option 2 is selected at step 2774 and referring now to FIG. 90j, a screen such as FIG. 91p is displayed (step 27710). The user is given three options. Under the first option of FIG. 91p, the user can search for programs with specific program titles or subtitles (for example, programs which have a title containing the word "Yankee" or which has a letter "Z", "CA", etc.) (step 27711). Under the second option of FIG. 91p, the user can search a specific type of programs (e.g. a sports program) (step 27717). Under the third option of FIG. 91p, the user can display the directory of a particular tape volume (step 27723).

When option 1 of FIG. 91p is selected, the microprocessor controller 31 prompts the user for the search parameters by displaying the following message on the screen:

"PLEASE ENTER THE SEARCH TITLE/CHARACTERS"

Upon receiving the input, the microprocessor controller 31 searches through the directories of the library (step 27712). For each entry that matches the search request (step 27713), the microprocessor controller 31 displays the entry's program title and volume number (step 27714). Such a display may list title in alphabetical order. The entry's volume number and program number within the directory are stored in a search buffer. The microprocessor controller 31 retrieves the next entry (step 27715) until it finishes (step 27716).

When option 2 of FIG. 91p is selected, the microprocessor controller 31 prompts the user for search parameters by displaying the following message on the screen:

"PLEASE ENTER THE TYPE OF PROGRAMS FOR THE SEARCH"

Advantageously, if the user does not remember the type classification, he can press a HELP key and all the available types are listed on the screen. When the user enters the type, the microprocessor controller 31 searches through the directories of the library. For each entry which matches the search request (step 27719), the microprocessor controller 31 displays the entry's program title and volume number (step 27720). The entry's volume number and program number are stored in a search buffer. The microprocessor controller 31 retrieves the next entry (step 27721) until it finishes (step 27722).

Option 1 and option 2 can be combined. When an option is finished, the user can press the "C" key before he selects the next option. The microprocessor controller 31, in response to such key sequence, performs the search using the content in the search buffer, removing from the search buffer those entries that do not match the parameters of the second search. For example, if the first search is for sports programs and results in filling the search buffer with address of entries that have a program type of "sports". If the user then press the "C" key and then selects option (1) to search of the word "YAN-KEE" in the program titles, the entries stored in the search buffer that do not have the word "Yankee" in the program title field are deleted. The user can continue the search for several times. When the second search is completed, the entries that remain in the search buffer are displayed.

When option 3 of FIG. 91p is selected, the microprocessor controller 31 prompts the user for the volume number by displaying the following message on the screen:

"PLEASE ENTER THE VOLUME NUMBER"

When the volume number is entered, the microprocessor controller 31 uses the volume number as index to retrieve the corresponding directory (step 27724). When the directory is retrieved, its entries are displayed on the screen (step 27725).

Auxiliary Information

For example, in one specific implementation of the present invention, the VBI is used to transmit auxiliary information relating to a program being broadcasted. One example of the auxiliary information is the channel-date-time-length (CDTL) information or "PLUSCODE™" number information of a related program. Another example of the auxiliary information is ordering information and/or more detail description of a product shown in a commercial.

The use of the auxiliary information is now illustrated with reference to FIG. 93. Assume that a network 3201 is broadcasting a prime time movie. At certain intermissions of the movie, the network introduces an upcoming program (e.g. a miniseries). Assuming that the upcoming show will be broadcasted for three consecutive days starting two weeks later (say, January 1) and will be broadcast at 9:00 pm for two hours each day. Normally, excerpts of miniseries are shown during the intermissions. When the excerpts 3202 are broadcasted, the VBI 3203 of the broadcasted signals would contain the CDTL or "PLUSCODE™" number information of the miniseries. The CDTL information or the "PLUSCODE™" number can be put, for example, in the composite packet-1 (i.e. line 21, field 2, control code=01, type code=0C). A mark, such as a character "I" 3204 flashing at the lower right hand corner of the screen 3205, is shown when the excerpts are shown. The flashing "I" 3204 informs a user that, if the user is interested in recording the miniseries, he can press an I-key and the VCR will be automatically set to record the miniseries using the information broadcasted in the VBI. The VCR indicates to the user that the information has been stored by either stopping the flashing of the "I" or by displaying a message, such as "SAVED" on the screen. Other prompts and the variations in the timing relationship with the program may be used as described above for auxiliary information.

Figure 90M:
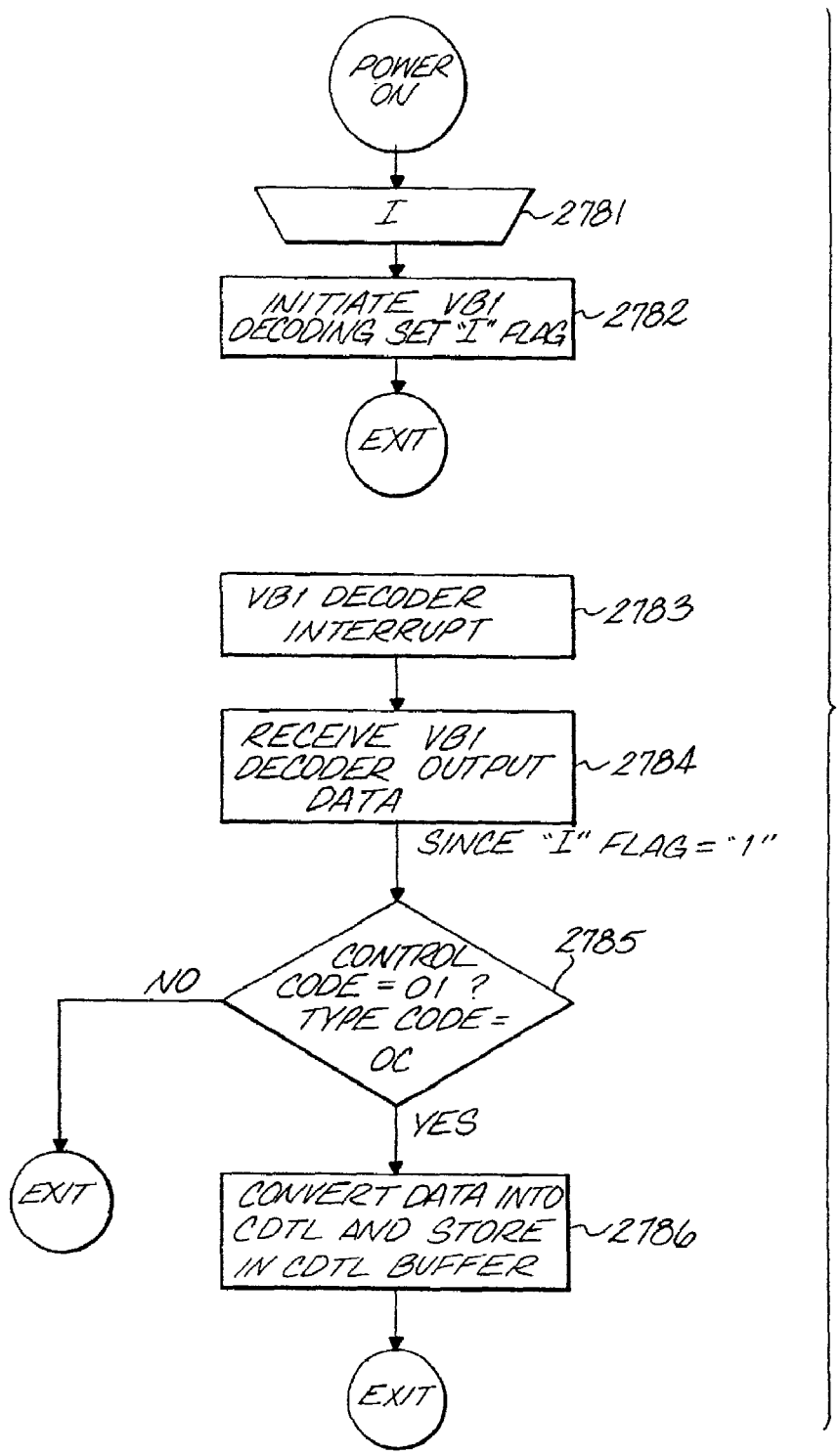

Referring to the flow chart of FIG. 90m, the microprocessor controller 31, upon interruption by the I-key (step 2781), executes the VBI Decode procedure to set the VBI decoder to decode the VBI (step 2782). When the VBI decoder detects VBI line 21, field 2, it interrupts the microprocessor controller 31.

When the microprocessor controller 31 is interrupted (step 2783), it receives the VBI data (step 2784). Since the I-key was pressed, the microprocessor controller 31 checks to see if the control code is equal to 01 and the type code is equal to 0C (step 2785). If so, the VBI decoder output is converted into CDTL data and stored into the CDTL buffer (step 2786).

As another example of the use of the VBI, assume an advertiser would like to present 30 minutes of commercial, including one minute of introductory information and 29 minutes of auxiliary information (e.g. such as ordering instructions) to the audience. While prime time airing may be more effective, its cost is usually high. The present invention allows the advertiser to air the one minute of introductory information at prime time, but provides easy access of the auxiliary information at a less expensive time slot. In the specific implementation of the present invention, the CDTL of the less expensive time slot in which the auxiliary information will be shown is broadcasted in the VBI. When the introductory information is aired at prime time, a flashing "i" is shown on the screen. Responsive to the flashing "i", an interested user can press the i-key and the VCR will be automatically set to record the auxiliary information in the RAM. At a later time, the user can retrieve the auxiliary information and display it on the television. The time of occurrence of both the command to record and to view the auxiliary information and the channel-date-time of the auxiliary information are stored in the monitoring data 33c.

Referring to the flow chart of FIG. 90n, the microprocessor controller 31, upon interruption by the i-key (step 2787), executes the VBI Decode procedure to set the VBI decoder 60a to decode the VBI (step 2788). When the VBI decoder 60a detects VBI line 21 field 2, it interrupts the microprocessor controller 31.

When the microprocessor controller 31 is interrupted (step 2789), it receives the VBI data (step 27810). Since the i-key was received, the microprocessor controller 31 checks to see if the control code is equal to 01 and the type code is equal to 0C (step 27811). If so, the VBI decoder output is stored into the RAM 33 (step 27812). In one implementation, the text information is put in the composite packets 1 and/or 2 of line 21, field 2 of the VBI. In another implementation, the text information is put in the composite packet 1. However, when the text is too long for the packet, a pointer is set in composite packet 2 pointing to the location of the other parts of the text.

Timer Programming

Timer programming allows a show to be recorded on any channel at a later time using the traditional recording features built into the video player. Before programming the VCR with its traditional programming functions, the directory information can be used to set the tape at a specific blank segment. This is accomplished by entering the number corresponding to the blank space and then pressing the "STOP" key. After the user enters the segment number, he can also wait for a time-out, the effects of which is the same as though the STOP key is pressed. In response to the key sequences, the microprocessor controller 31 sets the VCR to rewind or fast forward the tape to the selected position. The user can then set the VCR to conventional timer recording.

In an alternate embodiment, before timer programming, the indexing VCR 10 identifies the tape using the TID. If the TID is not known when the user starts timer programming, the indexing VCR 10 automatically performs a TID search as described above. If no TID is found, the indexing VCR 10 treats the tape as a blank tape (or unindexed tape) and assigns a TID to it. The indexing VCR 10 returns the tape to its position before searching for a TID. With the TID known, the indexing VCR 10 may now perform indexing functions to allow the user to move the tape to an approximate blank segment.

Erasing Programs from the Tape

A program can be erased by deleting its entry from the directory. When the tape directory is displayed on the screen, the user enters the number of the program to be erased and then presses "ERASE". The key sequence causes the microprocessor controller 31 to display a screen as shown in FIG. 91*m*. A confirmation screen, such as the one shown in FIG. 91*n*, is displayed whereby the user is asked to confirm the erasure. The user can press "ENTER" to confirm the erasure or "CANCEL" to cancel the erasure. After the program entry is deleted from the directory, the word "BLANK" is filled into the title field. If the newly erased program is preceded and/or followed by a blank segment, the length of this segment will be merged into the newly created blank segment, and the corresponding entry or entries will be merged into one. In one implementation, the program is not actually erased from the tape, but it is only removed from the directory.

The title of the erased program and the time of such erasure are stored in the monitoring data 33*c*.

Positioning the Tape

From the directory screen, the position of the tape can be set in several ways. One way is to enter the number corresponding to the desired position of the tape and then press "STOP". Another way is to enter the number corresponding to the desired position of the tape. If no input is made in a predetermined time interval (e.g. 5 seconds), a timeout will occur and the results are the same as if the user has pressed "STOP". The words "XX STOP" will be displayed on the screen next to the word "COMMAND:". The words "MOVING TO XX" are also displayed (where XX is the number of the selected program). The tape will either rewind or fast forward, depending upon its current position relative the selected position. If the tape is already at the selected position, only the word "XX STOP" will be displayed.

Editing A Program Title

The title of a recorded program can be edited under the directory screen. To edit a program title, the corresponding number of the program is first entered and the "EDIT" key is then pressed. An edit screen, such as FIG. 91*o* is displayed, in which the title of the selected program is displayed at the top of the edit screen. Underneath the title are a cursor (represented by a "+" sign) and one or more underscore characters representing the new title. The cursor can be moved backward within the title by pressing the "REWIND" key and forward by pressing the "FF" key. A character in the title can be changed by pressing a key such as the "CH UP" key to scroll the current character forward, for example, from "R" to "S", then to "T", or by pressing a key such as the "CH DN" key to scroll the current character backward, for example, from "Q" to "P" and then to "O". A blank space can be inserted into the title at the cursor position by pressing the "ERASE" key. A character or a character can be deleted from the title by pressing the " " key. When the editing is complete, the "ENTER" key can be pressed so that the new title is stored. After the "ENTER" key is pressed, the directory screen is re-displayed and the new title is displayed in the corresponding entry. To cancel any changes in the program title, the "CANCEL" key can be pressed, whereby the directory screen re-appears and the title of the corresponding program remain unchanged.

Recording Extension

When the VCR is recording a program, there is a possibility that duration of the program may be extended. One obvious example is when the broadcast program is a sports event (e.g., a football game) which goes into overtime. According to one optional improvement of the present invention, when the time of recording, as set by the user, is reached, the VBI is checked to see if the show is extended. The check can be performed in several ways.

By way of example, refer to FIG. 94, when the VCR is recording a program as set, the content of the program title field in the VBI is registered by the microprocessor controller 31 (step 4301). The program title of the program being received is retrieved from the VBI at predefined time intervals (e.g., 15 minutes) (step 4302) and compared against the title previously registered (step 4303). If the scheduled termination time of recording is reached and if the title received from the VBI is not the same as the registered title (step 4304), recording is terminated (step 4305). Otherwise recording continues.

In another implementation, when the indexing VCR 10 starts scanning the program ID for the program name, the scheduled stop time is ignored unless no program name is detected. If the name is found, the VCR continues to record until the program name changes.

In another implementation, the indexing VCR 10 extends the recording in the timer recording mode if it receives a non-zero extend time command inside a VM packet (defined above in conjunction with FIG. 87) before the scheduled end time. The automatic program extension using the VM packet preferably takes precedence over the program name change method.

In still another implementation, a special code, used for representing whether a show is extended is added to the VBI along with the newly scheduled ending time. These data can then be monitored to detect an extension of the program being recorded.

In yet another implementation, the VCR constantly monitors the program I.D. which contains the program length. The broadcaster updates the program length which the VCR then uses to automatically extend the recording.

Advantageously, the user is provided with an option of whether to use the extension feature.

Most modern video players provides a user with an option of selecting a tape speed for recording and playing operations. The speed commonly provided are Standard Play (SP), Long Play (LP), and Super Long Play (SLP). A higher speed may provide better recording quality but uses up more tape space. According to another feature of the present invention, the recording speed of the VCR is automatically changed to a lower value when the length of the recording space is less than the length of the desired program, provided the user has not overridden such an automatic speed change. Specifically, when a recording is assigned to a designated tape location, a determination is made on the lengths which the assigned space can record under different speed, as follows:

Length of selected segment/speed(SP)=available time (SP)

Length of selected segment/speed(LP)=available time (LP)

Length of selected segment/speed(SLP)=available time(SLP)

Recording of a program will then be performed in a speed at which the available time is greater than the specified time of recording. If more than one speed is possible, the user is notified and allowed to select the speed of recording. Under another implementation, the highest speed in which complete recording is possible is automatically selected so as to achieve the best recording quality. In another optional implementation, a list of the available blank segments is displayed and the user can then select the segment he wants for recording a program.

Other Embodiments for Storing the Directory

The directory may alternatively be stored on a predetermined portion of the tape, such as the end of the tape. In two other specific embodiments, directory information is recorded on a secondary memory carried by the cassette. The secondary memory may be a magnetic strip carried on the exterior of the cassette housing. In one such embodiment, the content of the magnetic strip is read and written, while the cassette is inserted and ejected, respectively, into the VCR, by a magnetic head that is stationary. In another such embodiment, the magnetic strip is read/written by a magnetic head that is movable over the magnetic track(s) on the strip or alternatively the magnetic track(s) on the strip are is movable over the magnetic head. The secondary memory may be a RAM on the housing. The RAM contains the directory for the tape. After the tape is inserted into the VCR, electrical contact is made with the RAM by the VCR so as to be able to read and write to the RAM. In embodiments in which the directory is on the tape, the location of such directory may be marked by writing pulses on the control track. Alternatively, the location of the directory may be stored in a secondary memory on the housing.

Exemplary implementations of such secondary memories are disclosed in the parent patent application Ser. No. 08/066,666.

Soft Editing

Another feature of the indexing VCR is the ability to pre-program, prior to playing the video tape, a plurality of recorded programs thereon, in a user defined sequence. The term "soft edit" is defined to be the effective editing of portions of a video tape without physically removing (e.g., by erasing) such programs from the video tape. This is done by programming the indexing VCR to play programs in the user defined sequence using the indexing features herein.

Figure 95:
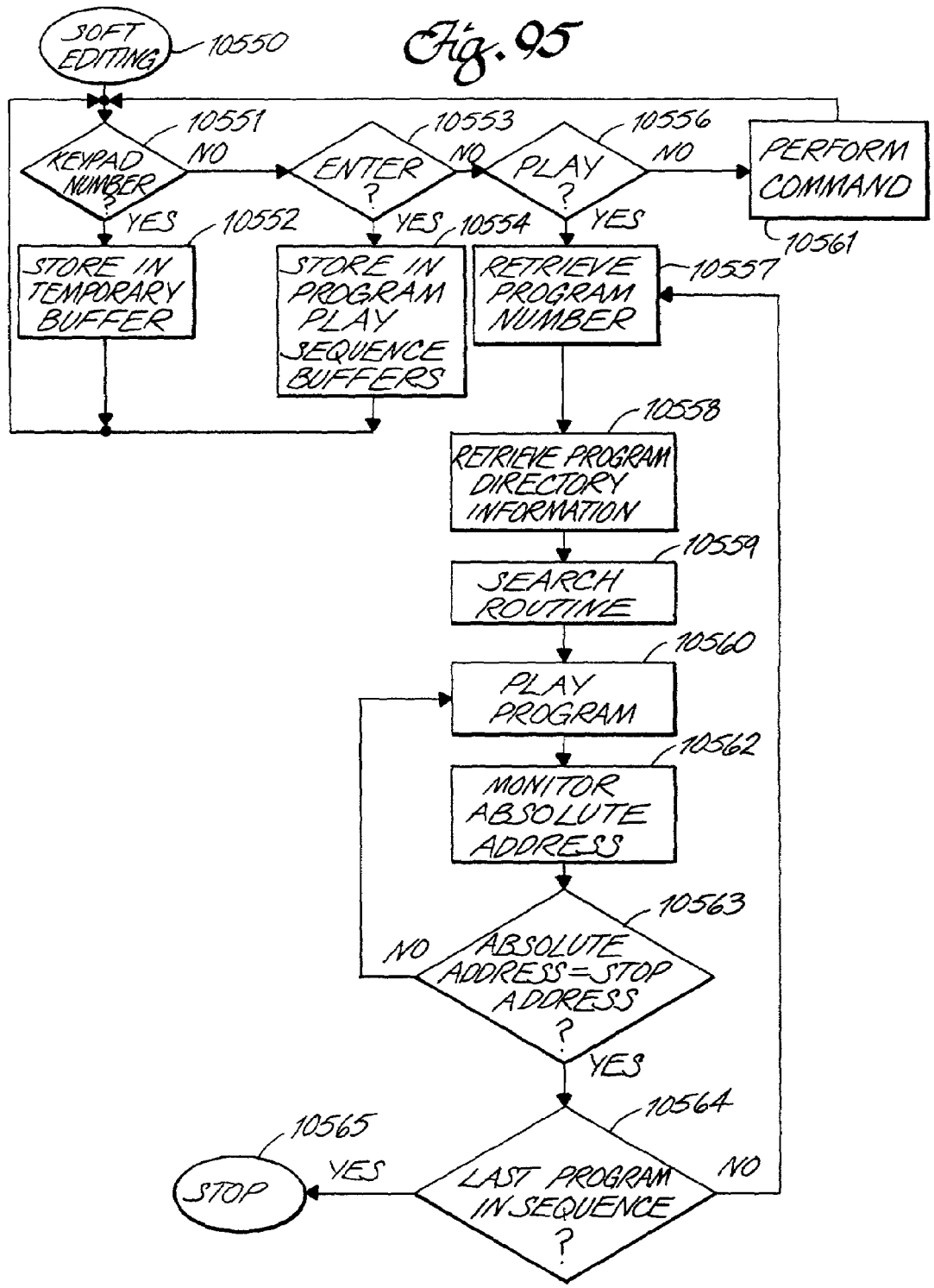
FIG. 95 is a flowchart showing the steps employed in the application of soft editing.

FIG. 95 is a flowchart showing the steps employed in the opposition of soft editing.

While the directory of the tape inserted in the indexing VCR is being displayed, the user may select the soft editing feature by a selection from an index menu or pressing a soft editing button on the remote control 75 (step 10550). In this mode, the microprocessor controller 31 monitors the remote signal receiver for commands from the remote controller 75. When a keypad number has been transmitted (step 10551), the received keypad number is stored in a temporary buffer in the RAM 33 (step 10552). This keypad number corresponds to the digits of the program number that the user wishes to select in his user defined sequence. For example, the first program to be played from the tape may be program 13. As the user enters the 1 and 3, each is serially transmitted from the remote controller 75 to the indexing VCR 10 which stores the program number "13" in the temporary buffer. Upon receipt of an enter command from the remote controller 75 (step 10553), the microprocessor controller 31 stores the selected program number (in the example, program number 13) in the next available program play sequence buffer which is part of the RAM 33 (step 10531). When the user finishes entering the sequence of desired programs, the user presses the play button. If the command is not a play command but another command (step 10556), the microprocessor controller 31 performs the command and continues to monitor the next command (step 10561). Upon receipt of the play command (step 10556), the microprocessor controller 31 retrieves the first program number from the program play sequence buffers (step 10557). The microprocessor controller 31 then retrieves the program directory information for the first program number (step 10558). Using one of the search routines described above, the microprocessor controller 31 advances or rewinds the tape to the desired program (step 10559). One such search method is counting VISS marks in the control track in a fast stage of monitoring and then entering a slow stage of monitoring in which absolute addresses are retrieved from the TPA data packet in the VBI. Upon reaching the desired program, the microprocessor controller 31 then commands the VCR to play the desired selection (step 10560). During the play, the microprocessor controller 31 monitors the absolute address of the tape as described above (step 10562). Until there is a match between an absolute address and the stop address of the desired program as indicated from the directory (step 10563), the VCR 1 continues to play the requested program (step 10560). Upon a match, the microprocessor controller 31 determines whether the program that has been completed is the last program in the sequence stored in the program play sequence buffers (step 10564). If not, the microprocessor controller 31 returns to retrieve the next program number in the program play sequence buffer (step 10557). Otherwise, the microprocessor controller 31 stops the play of the program and returns the indexing VCR 10 to its normal mode of monitoring for the next remote control command (step 10565).

Parental Control

Figure 96:
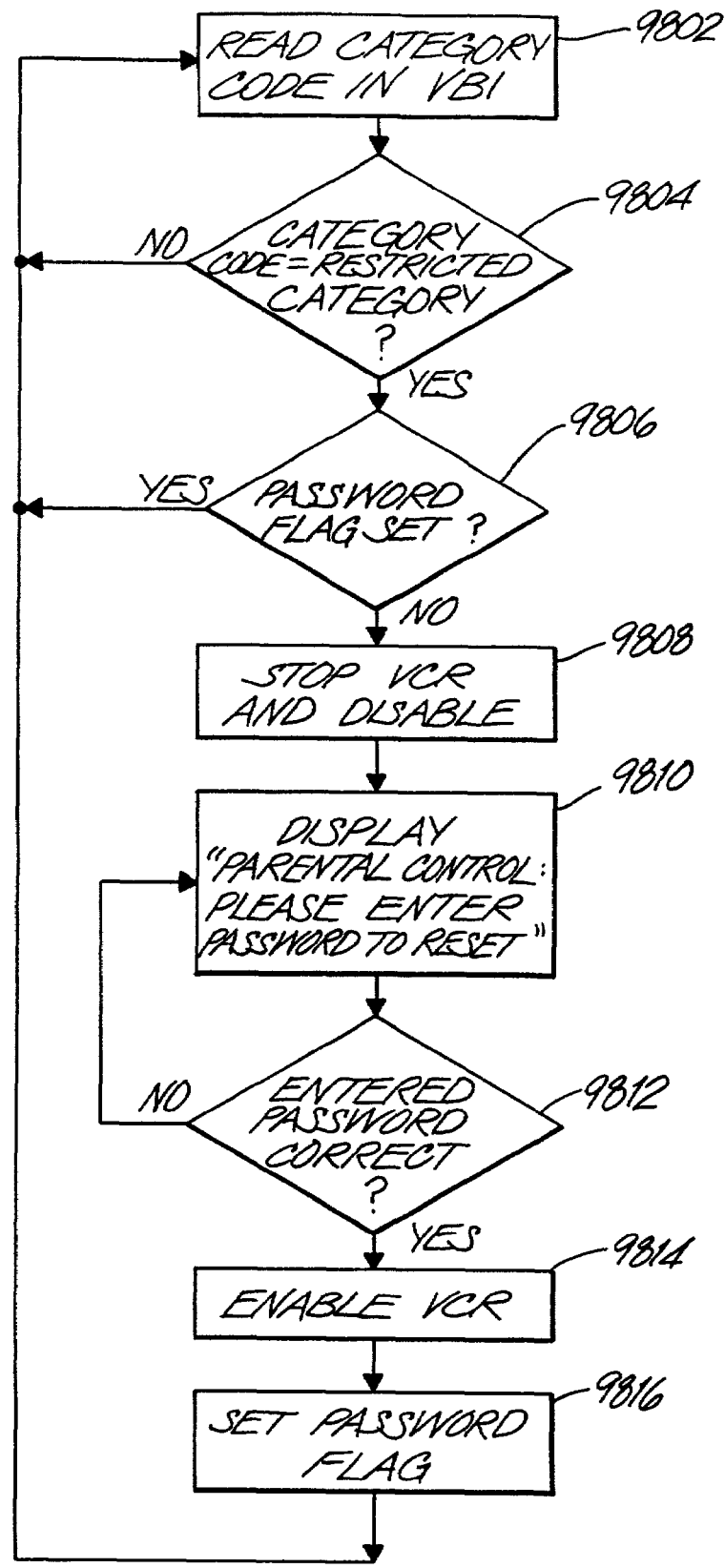
FIG. 96 is a flowchart showing the steps employed in the operation of the parental control feature of the indexing VCR.

FIG. 96 is a flowchart showing the steps employed in the operation of the parental control feature of the indexing VCR. Because programs may be broadcasted that parents do not want their children to view or record, the indexing VCR 10 uses the program category information in the VBI to institute a Parental Control Program for screening out program categories not deemed desirable for the children in the household. The program category may include categories, such as adult shows, that parents do not want their children to view or record. By selecting these categories, the indexing VCR 10 prevents children from viewing or recording these shows. Alternatively, the program category may be recorded in the VBI of a prerecorded tape which when selected by parental control prevents the tape from being played in the VCR. Alternatively, the TID of the PR tape may be flagged in the RAM 33 as being restricted.

During a set up mode of the indexing VCR, the user may impose parental control to prevent a viewer from watching or recording particular television programs or a selected channel. This mode may be entered by selecting from a menu display on the screen 50a, or, alternatively, by pressing a Parental Control Key on the remote controller. As part of the initial set up of the indexing VCR 10, the parent sets a unique password to allow access to setting parental control commands. When the user presses the Parental Control Key and enters the correct password, the indexing VCR 10 displays a list of categories. As the user scrolls through the list, the indexing VCR 10 highlights the selection. By pressing the Parental Control key, the user toggles the category as being restricted (i.e. under parental control) or unrestricted. A restricted program requires the user to enter a password to gain access to the program.

Referring in particular to FIG. 96, the indexing VCR periodically monitors the program being viewed or recorded to prevent access to the restricted categories of shows. The microprocessor controller 31 periodically reads the category code in the program I.D. (step 9802) and compares it to the stored parental control category list. If there is not a match between the category of the program being watched or recorded and the restricted list, the VCR returns to step 9802 to continue monitoring the VBI (step 9804). Otherwise, if the category is restricted, the VCR checks to see if the password flag allows access to the program (step 9806). The password flag is set when the proper password is entered by the user. If the flag allows access, the VCR returns to step 9802 to continue monitoring the VBI (step 9806). The compare between the program being viewed and the parental control flag is done periodically, for example every minute, to prevent long periods of unauthorized viewing before the next comparison.

If the program is restricted, the microprocessor controller 31 stops and disables the VCR (step 9808) and displays on the screen 50a the message "parental control: please enter password to reset" (step 9810). The microprocessor controller 31 ignores VCR control commands and channel number commands. The VCR continuously requests the password to be entered until a proper password is entered (step 9812). Alternatively, the VCR may allow a fixed number of incorrect passwords before ignoring all passwords for a predetermined time. When the correct password has been entered, the VCR restores control to the user (step 9814) and sets the password flag (step 9816). Setting the password flag allows the authorized viewer to continue watching the show or recording it without being periodically interrupted for a password request.

In an alternate embodiment, the controller 31 allows the user to select channels other than those that are forbidden. Alternatively, different passwords allow television shows to be blocked for some viewers such as children under age 13 but allows others, such as children above age 13, to view the shows, while restricting the children above age 13 from watching another show.

Specific Implementation

FIGS. 97a-97l' are schematic views of displays according to a specific implementation of the invention.

Figure 97A:
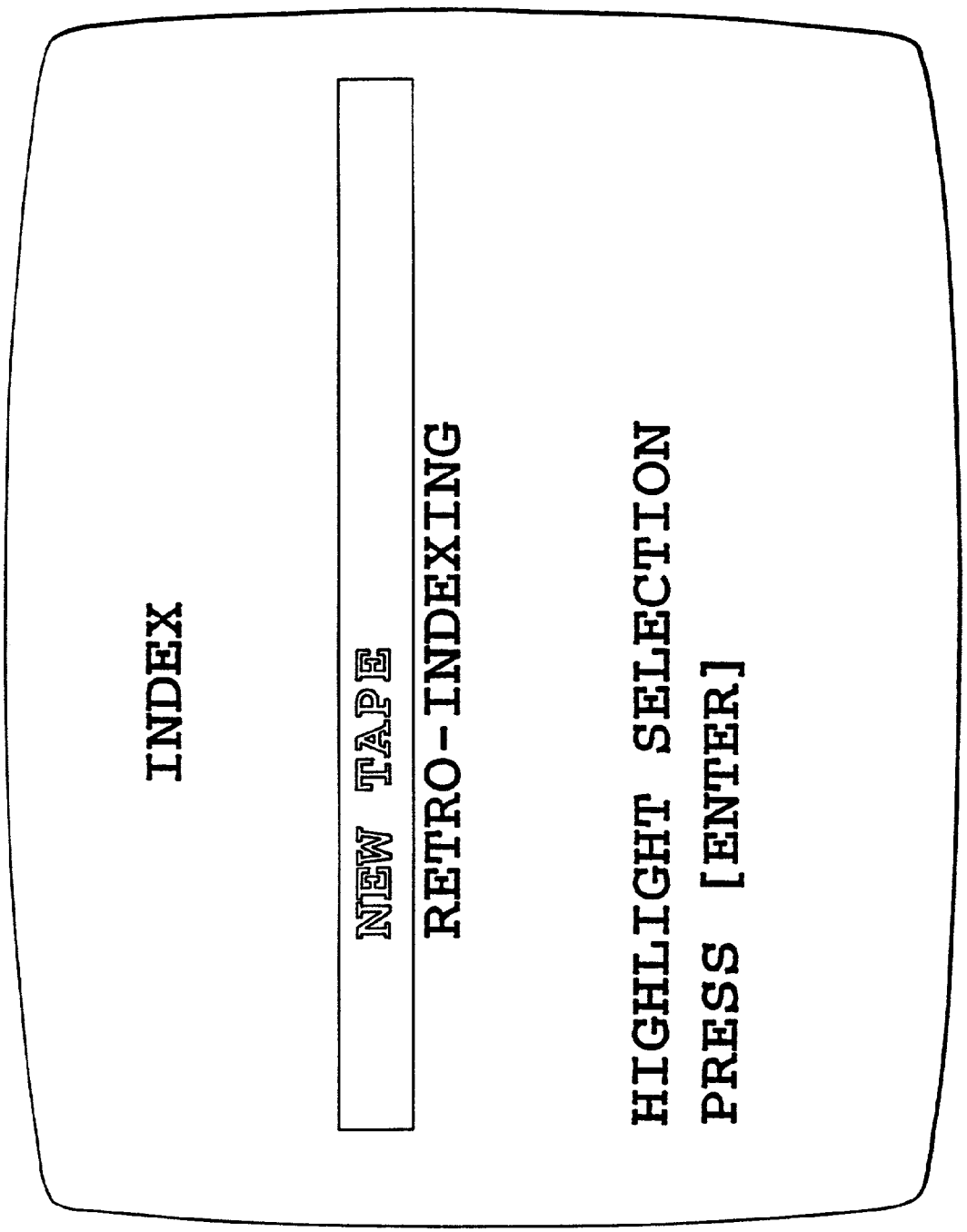
FIGS. 97a-97c, and 97e-97f are schematic views of displays for an indexing system according to a specific implementation of the invention.

A new blank tape is prepared for indexing by inserting the blank tape into the VCR and pressing the index button 1315 on the remote controller 9700. By using the cursor buttons 1305, the user highlights "Blank Tape" on the screen shown in FIG. 97k' and presses the enter button 1303 and selects new tape from the menu (FIG. 97a). The microprocessor controller 31 displays the display shown in FIG. 97b and prompts the user to enter the length of the tape. Using the keypad 1302 the user enters the length of the tape, e.g. 120 is entered for a 2 hour tape. The user presses the enter button 1303 if he has entered the correct time in minutes or the cancel button 9706 if he has made an error and then reenters the correct number. When the tape is ejected, the microprocessor controller 31 displays the tape number and requests the user mark the housing as shown in FIGS. 97c-97d.

When recording either in conjunction with VCR Plus+™, on-screen time programming or instant programming using the indexing VCR, the VCR reads the program identification from the VBI. If no program title is being broadcasted, the microprocessor uses the date, time, and channel of the program as the title. When recording a program, the indexing VCR informs the user whether sufficient space is available on time for the recording. The user first inserts the tape into the VCR and programs the VCR to record a program. The user then presses the review button 9714 and reads the display shown in FIG. 97e as to whether the tape has sufficient capacity. If the user is recording using instant recording (i.e. recording at that moment by pressing the record button 1312), he first presses the index button 1315 to get a program directory as shown in FIG. 97g. The current location on the tape is marked by an arrow. If the user wants to move to a different location on the tape, he uses the cursor keys 1305 and the record button 1319 to change the location. The user is prompted to enter the length of the program to be recorded (FIG. 97f). If sufficient blank space is available at the location on the tape, the VCR begins to record for the specified time. Otherwise, a warning is displayed (FIG. 97i). Pressing the enter button 1303 overrides the warning. Pressing the cancel button 9706 cancels the recording request.

An indexed tape is viewed by inserting the tape into the VCR and pressing the index button 1315. A directory is displayed (FIG. 97j) and the user makes a selection by highlighting the desired program using the cursor keys 1305 and pressing the play button 1317. The VCR then fast forwards or rewinds to the highlighted program. Alternatively, an arrow in reverse video pointing to the destination program may be displayed on the directory during the search. The arrow on the directory moves according to the location on the tape and the selected program is played automatically. During play, the directory can be viewed by pressing the index button 1315.

A program may be erased from tape by pressing the index button 1315 and using the cursor to highlight the program to be erased (FIG. 97j). The erase button 9715 is pressed, and, as shown in FIG. 97i, the user presses the enter button 1303 to confirm the erasure or the cancel button 9706 to cancel the request. Once enter is pressed, the title in the directory is replaced with "BLANK." If two consecutive blank periods occur after the erasure, the microprocessor controller 31 combines them into one entry in the directory. The program is not actually erased from the tape, but only removed from the directory.

Figure 97K:
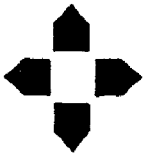
FIG. 97d is a perspective view of a video tape cassette.

A program title is edited by pressing the index button 1315 and highlighting the title of the program to be changed (FIG. 97k). The edit button 9713 is pressed and using the cursor keys 1305 the title is changed (FIG. 97l) and the new title entered by pressing the enter button 1303. Pressing the cancel button 9706 cancels the new title.

A program is searched in the library with or without a tape in the VCR by pressing the library button 9710 and selecting search using the cursor keys 1305 and the enter button 1303 (FIG. 97m). Highlighting program list and pressing the enter button 1303 allows a search by program title (FIG. 97n). Using the cursor keys 1305 and the enter button 1303 to select the first letter of the program title, a list of program titles starting with the letter selected is displayed. (FIG. 97o) The page up button 9704 and the page down button 9705 are used to review the list of program titles (FIG. 97p). Highlighting tape list and pressing the enter button 1303 allows the user to search by tape number (FIG. 97q). The keypad 1302 and the enter button 1303 are used to select the tape number to be searched (FIG. 97r) and displayed (FIG. 97s). Highlighting category and pressing the enter key 1303 allows searches by category (FIG. 97t). The cursor keys 1305 are used to select the category (FIGS. 97u-97v) and the page up button 9704 and the page down button 9705 are used to review the list of program titles in the selected category (FIG. 97w).

A tape may be deleted from the library or the RAM 33 by pressing the library button 9710 and selecting using the cursor keys 1305 and the enter button 1303 registration from the menu of FIG. 97x and delete from the subsequent menu of FIG. 97y. The user then enters the tape number assigned to the tape to be deleted (FIG. 97z). The user may review the program before erasing it from the directory. By pressing the enter button 1303, the microprocessor controller 31 erases the tape number from the RAM 33 (FIG. 97a'). In the preferred embodiment, the program is not erased from the tape, but only the index of it is erased from the RAM 33.

Figure 97B:
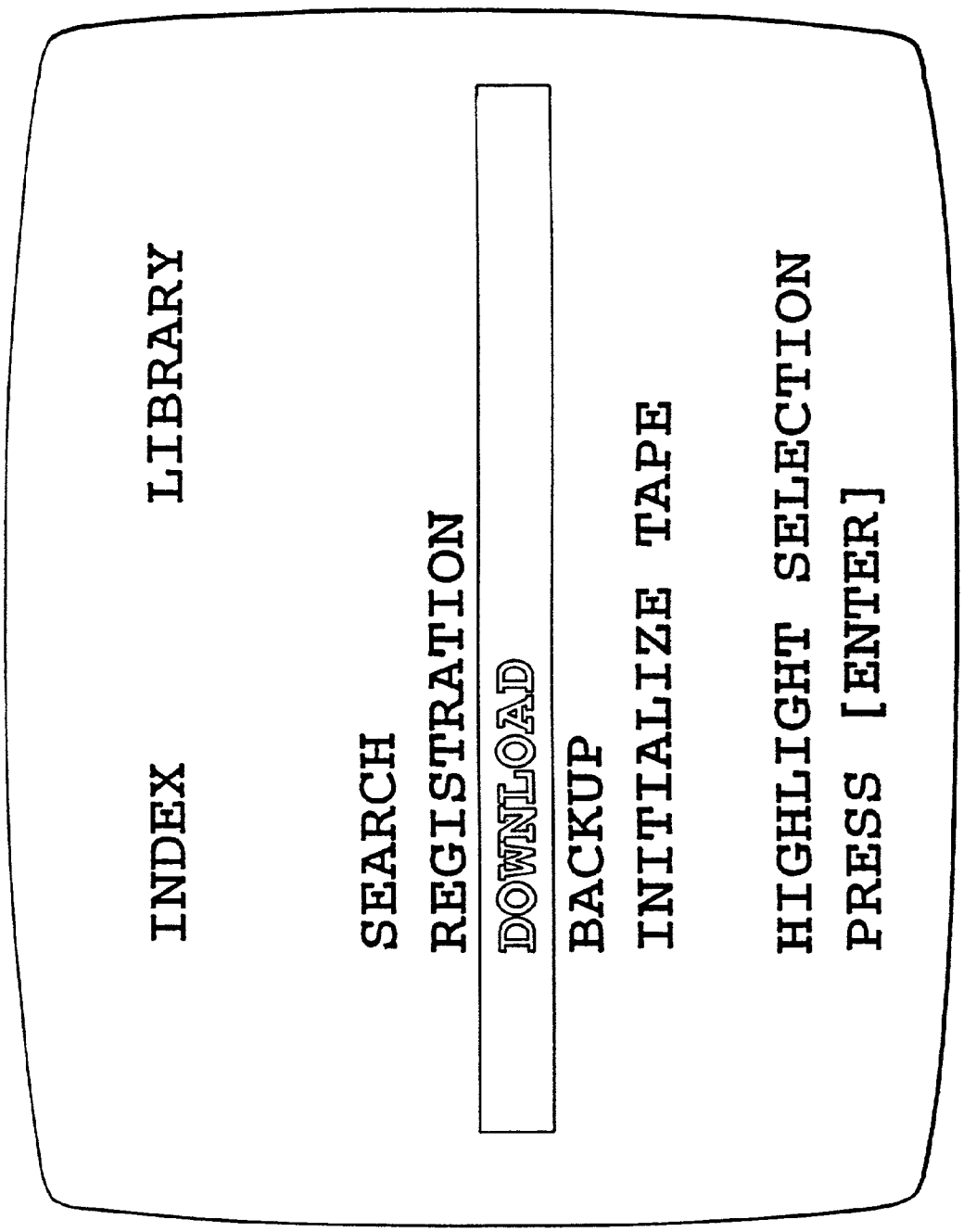
Figure 97F:
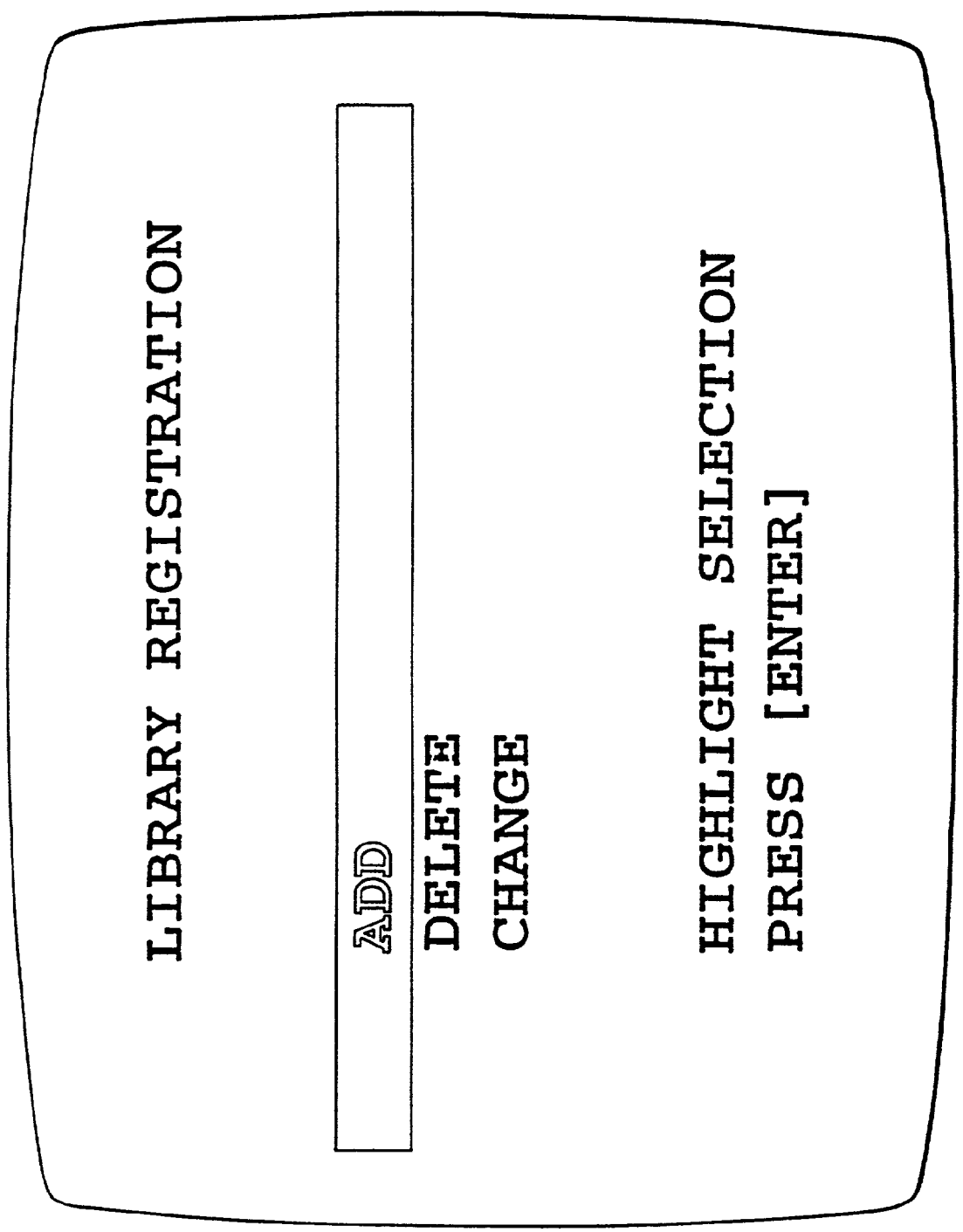

When a tape is loaned to a friend, the directory is downloaded from the VBI at the end of the tape into the RAM 33 by pressing the library button 9710 and selecting, using the cursor keys 1305 and the enter button 1303, download from the menu on the screen shown in FIGS. 97b', c', d'.

A person may adopt a tape indexed in another's VCR by adding the contents of the new tape to the RAM 33 of their VCR. The tape is inserted into the VCR and the library button 9710 is pressed. Using the cursor keys 9725 and the enter button 1303, the user selects registration from the screen shown in FIG. 97e' and selects add from the subsequent screen shown in FIG. 97f. The VCR reads the directory from the VBI at the end of the tape. The microprocessor controller 31 assigns a new tape number which is displayed on the screen. This adopt feature may also be used to add the directory from a PR tape to the RAM 33.

Tape identification numbers may be changed by pressing the library button 9710 and using the cursor keys 1305 to highlight registration as shown in FIG. 97g'. The cursor keys are then used to select Change from the display shown in FIG. 97h'. Using the keypad 9708 the user can change the tape number (FIG. 97i'). Overwriting of numbers previously used is avoided (FIG. 97j'). This number is preferably changed before recording the program. This feature is useful when multiple tapes are required for a single show, such as a 3 part mini-series that is recorded on different tapes.

Tapes may be retroactively indexed by selecting retroindex in FIG. 97l' and following the steps of FIG. 89. By pressing the "i" button 9721 in response to a flashing icon on the TV screen such as a flashing "i," the user is able to obtain additional information on products or services offered in TV commercials or on regular programs. This additional information may be detailed weather, traffic, sport scores, or financial information. Pressing the "i" button 9721 automatically programs the VCR using the "PLUSCODE™" numbers by transferring the numbers from temporary RAM to non-volatile RAM. By pressing the "R" button, the user can later review and manipulate a directory of the text information stored. The cursor buttons 1305 and the enter button 9709 are used to select information.

The user may identify the program while he is viewing a current broadcast or a recorded program by pressing the PGM ID button 9724 which then displays the program title, its length, the day and date of the broadcast (or recording) and the station name or call letters as shown in FIG. 97h. If a program is being recorded that overruns its scheduled time (e.g. a sporting event), the VCR automatically extends the recording time of the preprogrammed recordings for programs broadcasted by a TV station that participates in broadcasting program identification. The TV station broadcasts changes in programming which are detected by the VCR.

When a printer is connected to the VCR, the user can press the review button 9714 to recall the particular information text, such as a coupon, onto the TV screen. The user then presses the print button 9702 to print the information on the printer.

Various methods of combining steps of key strokes may be used. For example, pressing the "i" button twice in rapid succession may be used to review information stored. Pressing the "i" button three times in rapid succession may be used to cancel a selection.

Copying of Prerecorded Tapes

In a first method, a master tape is made of the prerecorded tape. The destination, target, or slave tape is a blank tape on which the information on the master tape is to be copied. In a manner well known in the art, the master tape is placed in physical contact with the slave tape, along its entire length, and a copy is made by applying the suitable magnetic fields. This allows all information from the master tape to be copied on the slave tape.

In a second method, a copying system comprises a master VCR and a plurality of slave VCRs for copying information from a master tape to a plurality of slave tapes. The master VCR is an indexing VCR identical to that described above. The master VCR provides video signals representative of the video signals detected from the master tape. Because the indexing VCR does not normally provide control track signals, other than sync pulses, from its video output, the master VCR is an indexing VCR 10 that is modified to include an internal VISS sensor circuit for providing an indexing signal to the slave VCR in response to a detected VISS mark on the control track of the master tape. The plurality of slave VCRs record the video signals provided from the master VCR. In addition, the index signal is provided to each slave VCR, which, in response thereto, writes a VISS mark on a control track of the slave tape.

Update Machine

Figure 98:
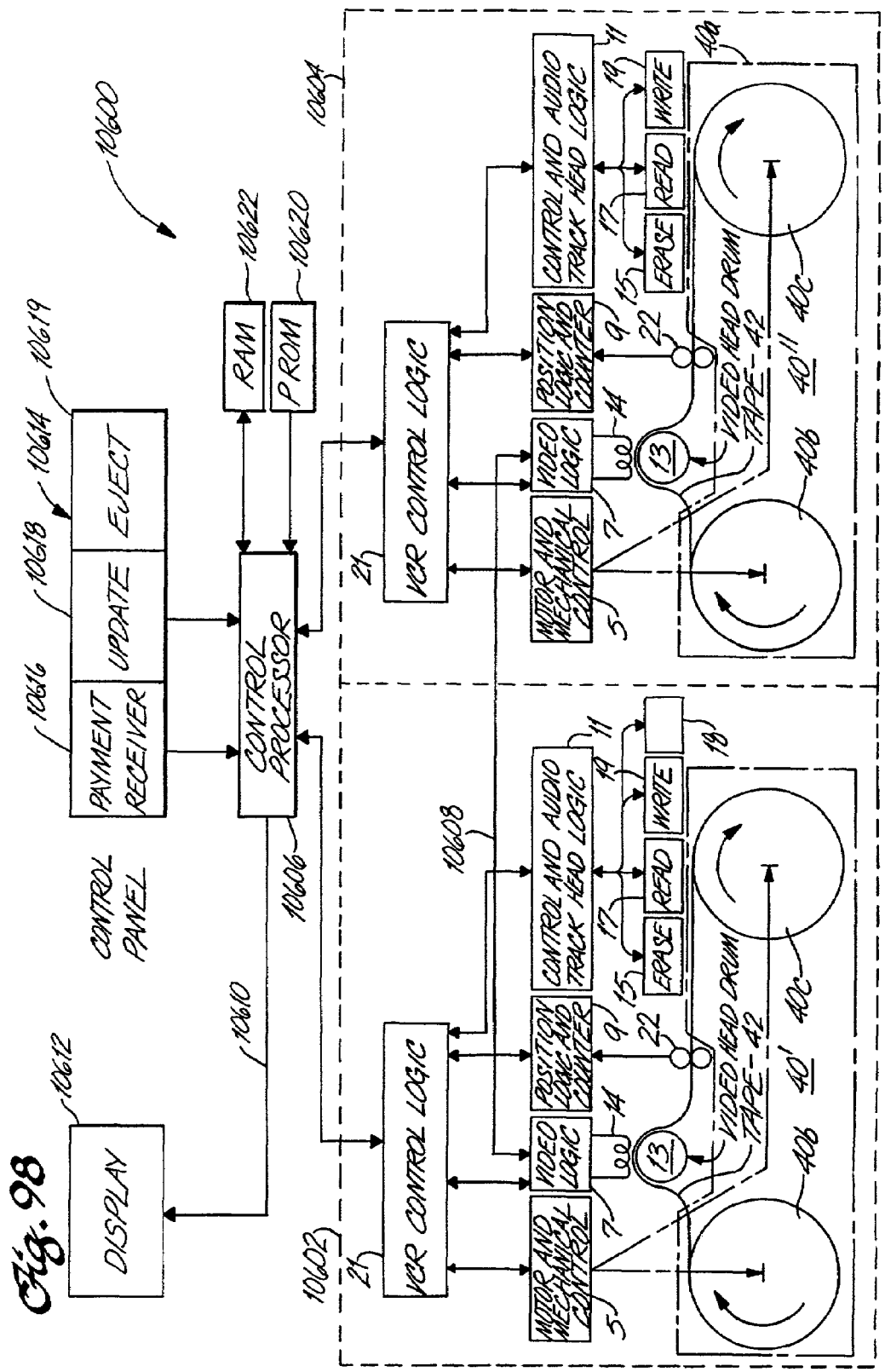
FIG. 98 is a block diagram illustrating a guide updating machine for transferring an electronic program guide from one tape to another.

FIG. 98 is a block diagram illustrating a guide updating machine for transferring an electronic program guide from one tape to another.

A guide updating machine 10600 has a master tape player 10602 and a slave tape recorder 10604, which operate in a manner similar to that of the indexing VCR. In addition, the master tape player 10602 and the slave tape recorder 10604 each have components similar to the indexing VCR. The master tape player 10602 has a motor and mechanical control logic circuits for controlling the loading and ejecting of a master tape cassette 40' and also controlling the movement of a video tape 42 within the master tape cassette during the updating of the user's guide tape. A video logic circuit 7 controls the operation of the video read/write head drum 13 in reading video signals from the master tape 42. As with the indexing VCR, the video signals are magnetically coupled between the video logic circuit 7 and a video head drum 13 using a winding 14. A control and audio track head logic circuit 11 controls the reading of signals on the control and audio tracks of the master tape through a read head. A control track signal detector 18 reads indexing marks, such as VISS marks, recorded on the control, track and informs a control processor 10606 of the occurrence of the indexing mark. In response thereto, the control processor 10606 provides an indexing command to the slave tape recorder 10604 to command the recorder to write an indexing mark on the slave tape. Video signals read from the video logic circuit 7 of the master tape player 10602 are provided on a line 10608 directly to the video logic circuit of the slave tape recorder 10604.

The slave tape recorder 10604 is similar to the indexing VCR except that the slave tape recorder is adapted to receive an indexing command from the control processor 10606 for writing an indexing mark (e.g., a VISS mark) on the control track of the slave tape in response thereto.

Although the master tape player 10602 and the slave tape recorder 10604 are shown as each containing an erase head 15, a read head 17, and a write head 19, the invention is not so limited. The master tape play 10602 does not need a write head 19 or an erase head 15. Similarly, the slave tape recorder 10604 does not need a read head 17. The master tape player 10602 and the slave tape recorder 10604 are preferably selected to be close in structure to the indexing VCR so that a manufacturer of the guide updating machine can slightly modify an indexing VCR to make the master tape player and the slave tape recorder.

A control processor 10606 coupled to the VCR control logic circuit 21 of both the master tape player 10602 and the slave tape recorder 10604 controls the operation of the master tape player and the slave tape recorder. In particular, the control processor 10606 provides tape movement commands, such as rewind, fast forward, read, and record commands, to the VCR control logic circuit 21 of the master tape player and the slave tape recorder. In response thereto, the corresponding VCR control logic circuit operates the respective VCR mechanism in a manner similar to that described above for the indexing VCR. The control processor 10606 provides on a line 10610 display signals for displaying on a display 10612 instructions or status to the user of the guide updating machine 10600. The display 10610 may be a liquid crystal display or a video display and the like.

A control panel 10614 has control buttons for providing commands to the control processor 10606. A payment receiver 10616 is preferably on the face of the update machine and receives either cash, a credit card, or a debit card from a user. When the user inserts either cash or a credit card, the payment receiver 10616 sends either a money received command or credit card information of the control processor. In response to user actuation an update button 10618 sends a signal to the control processor indicating that the user has inserted the slave tape into the update machine and informs the control processor 10606 that it may assume control of the updating of the slave tape. An eject button 10619 allows the user to eject the tape.

A PROM 10620 stores the operational program for the control processor. A RAM 10622 stores the operational program while it is being executed, functions as the operating memory, and stores the credit card information and operational information of the updating machine.

Operation

Having described the structure of the updating machine, the operation of the machine is now described.

At power up, the guide updating machine 10603 performs a diagnostic self-test to assess whether it is operational. After passing this self-test, the update machine waits for a user to update a tape.

The user initiates the updating of a tape by inserting money (or other form of payment) into the payment receiver 10616. Alternately, the payment receiver may include the credit card reader for reading the encoded data on the magnetic strip on the credit card for subsequent billing to the user's credit card account. The payment receiver provides an initiating signal to the control processor 10606 which runs a status routine on the updating machine to verify that the machine is operational. The control processor then sends display information to the display for displaying a ready status and instructions to the user to insert a tape into the slave tape recorder 10604 of the updating machine. In response thereto, the user inserts the old guide tape, which becomes the slave tape, into the slave tape recorder. (Alternatively, the user may insert the tape into a receiver that feeds the tape into the master tape player.) After the updating machine 10605 accepts the cassette tape, the user presses the update button 10618 on the control panel 10614 which provides a update signal to the control processor 10606. The control processor 10606 commands the master tape player 10602 to begin playing the master tape. The video signals are read from the master tape by the video logic circuit, and provided to the slave tape recorder for recording on the slave tape. When a VISS mark is detected in the control track, the control track signal detector 18 generates an indexing signal which is provided to the control processor 10606. In response thereto, the control processor 10602 sends an indexing command to the VCR control logic circuit 21 of the slave tape recorder 10604. The VCR control logic circuit 21 commands a control track index writer to write a VISS mark on the control track of the slave tape. After the entire master tape has been played the master tape player sends a play-completed signal to the control processor which stops the recording of the slave tape recorder and commands the VCR control logic circuit 21 to command the motor and mechanical control logic circuit 5 to rewind the slave tape to the beginning of the tape. After rewinding the tape, the control processor instructs the user to press the eject button 10619 to eject the updated slave tape.

Alternatively, the user may exchange an old tape for another tape that has been updated. The newly inserted tape is then updated without the user having to wait for the tape to be updated.

Camcorder Applications

In an alternate embodiment, a camcorder which is a portable video tape recorder for recording video images received through a lens has a microphone for recording voice and audio track. A clock in the camcorder records a date/time stamp on the tape along with the recorded voice information. The voice information is preferably an announcement by the user of the title of the particular scene he is about to shoot. When the tape is played in the indexing VCR, the voice announcements are read and digitized and stored in the RAM together with the date/time stamp. Later, the user can cursor down on the directory screen to the desired date/time entry and the digitized voice announcement is then recalled from the SRAM memory. The user can create a directory by title by changing the title from the date/time stamp entry with the corresponding digitized voice announcement to an alpha numeric title in a manner similar to that described in connection with FIG. 91.

Alternatively, the camcorder could incorporate the features of recording directory information by using a directory input/output keyboard and display device 32 that is either attachable to or entered along with the camcorder. However, because the user is usually occupied when using the camcorder, he does not have time to enter the title by this method at the time of filming.

Automatic Time Setting

Because broadcast stations broadcast the date and time and whether the time is standard or daylight savings time as part of the Extended Data Services on Line 21 field 2 of the VBI, this information can be captured by the indexing VCR 10 to set the clock automatically and periodically. Even standard time-daylight savings time changes can be set automatically. The indexing VCR 10 constantly monitors line 21 field 2 of the VBI (the designated line by the EIA-608 standard) for the date and time broadcasted therein.

Alternatively, the monitoring does not have to be constant, but can be done periodically, such as once a day, once a week, or once a month. The indexing VCR 10 then resets its date and time clock to correspond to the broadcasted time. The indexing VCR 10 also detects power interruptions. After the occurrence of a power interruption, the indexing VCR 10 also resets the clock.

Alternatively, the clock may be reset by a telephone call that provides the correct time.

Automatic Mute When Index Key is Pressed

When the Index key is pressed, the microprocessor controller transmits a mute command to the television to shut off the volume. This prevents the user from hearing the hissing when the tape is being fast-forwarded or rewound which the user otherwise find annoying. When the user transmits a play command or when the indexing VCR 10 stops its search, the indexing VCR 10 transmits an override to the mute command to turn the volume of the television back on.

Chain Commands

When selecting programs for viewing from a directory, the user may chain commands by concatenating the selections and entering the command. For example, if the tape is a Karaoke tape, he may want to play song number 2, 7, and 4 in sequence. The user enters the command by pressing the 0, 2, 0, 7, 0, 4 buttons and then the Play button. In response thereto, the indexing VCR 10 plays program 2, program 7 and the program 4.

Controller

As described above in conjunction with FIG. 11, the interface between the controller 702 and the VCR control logic circuit 21 is a clocked serial bus having two input/output lines which are hardware selectable to be either in a Slave Bus mode or a Interrupt Bus mode. The controller 702 has a selectable interrupt mode in which an interrupt pin of the controller when enabled allows the VCR control logic circuit 21 to monitor the status of the controller 702 by an interrupt function.

The serial bus is selectively switched between operating in either the Slave Bus mode or the Interrupt Bus mode by setting the level in a bus selection pin of the controller 702. In one implementation, the selection pin is read by the controller 702 only during reset. Accordingly, the bus type cannot be set during operation.

An optional checksum byte may be added to each communication cycle to allow checking of error bytes that may result from noise during the communication. The checksum byte is enabled by polling a checksum pin on the controller 702. After the checksum is enabled, a checksum byte is added at the end of every communication cycle between the VCR control logic circuit 21 and the controller 702 after the stop code 0F hex. The value of the checksum byte makes the modulo 256 sum of the whole message from the function code to the stop code equal to zero.

For commands from the VCR control logic circuit 21 to the controller 702, the controller verifies the checksum after a command is received and sends back a 0E hex signal for the ready byte if the checksum is correct. Otherwise, the controller 702 sends a 09 hex signal to indicate that the checksum has failed. The VCR control logic circuit 21 then resends the whole packet. For data returned from the controller 702 to the VCR control logic circuit 21, the logic circuit 21 provides a function code 04 (described below) to again request the data if the checksum fails.

Slave Bus

The operation of the Slave Bus is now described. In this bus configuration, the controller 702 is a slave to the bus. An address of 68 hex is used for writing data from the VCR control logic circuit 21 to the controller 702. An address of 69 hex is used for reading data from the controller 702. The controller 702 sends an acknowledge (ACK) signal for every byte received and pulls low the serial clock (SCL) pin when the controller is busy. The pull waiting pulse is always present at the ninth serial clock (SCL) pulse. The maximum time of pull low is approximately one TV field time (approximately 17 ms). The controller 702 has a watchdog timer to ensure that the controller does not pull low the SCL pin longer than 17 milliseconds.

The command sequence of the Slave Bus is as follows. The VCR control logic circuit 21 sends a start mark to reset the bus. For writing, the VCR control logic circuit 21 sends a 68 hex address, a function code, parameters, and a checksum (if the checksum pin is pulled low). Optionally, the VCR control logic circuit 21 may send a stop mark. For reading, the VCR control logic circuit 21 sends a start mark to reset the bus and an address 69 hex to indicate a read. The VCR control logic circuit 21 reads a 0E hex ready code. If the checksum is incorrect, the controller 702 returns a 09 hex signal to the VCR control logic circuit 21 which then resends the command. The VCR control logic circuit 21 reads the return data until a 0F hex stop code is received. The VCR control logic circuit 21 reads a checksum, if the checksum is activated, and, optionally, sends a stop code. If the checksum is incorrect, the VCR control logic circuit 21 issues a function code 04 (described below) to read the return again, optionally only if the checksum is activated.

Interrupt Bus

In the Interrupt Bus operation route, the interface bus uses a /Enable pin and a Busy pin. When the /Enable pin is high, the controller 702 ignores all data in several data address (SDA) and SCL so that other devices are allowed to use the bus. When the VCR control logic circuit 21 wants to communicate with the controller 702, it first pulls low the /Enable pin to start a read/write cycle. The Busy pin allows the controller 702 to signal a busy status to the VCR control logic circuit 21. To eliminate an interrupt pin request, the Busy pin provides a level operation mode. The controller 702 inverts the busy after it becomes ready for data input/output. In other words, before each input/output action, the VCR control logic circuit 21 first stores the current level of the Busy pin. After the input/output is completed, the VCR control logic circuit 21 tests the Busy pin to check that it has been inverted before trying the send the next byte. As with the Slave Bus, the Interrupt Bus has a write address of 68 hex and a read address of 69 hex.

The command sequence of the Interrupt Bus is as follows. The VCR control logic circuit 21 pulls the /Enable pin of the controller 702 low. The VCR control logic circuit 21 monitors the Busy pin and waits for it to change status. This waiting is applied after a change in any I/O byte or /Enable pin and is included in each of the subsequent steps described below but is not explicitly mentioned for simplicity and clarity. The VCR control logic circuit 21 sends the write byte 68 hex. The VCR control logic circuit 21 then sends a function code, parameters, checksum, if the checksum pin is pulled low. The VCR control logic circuit 21 then pulls high the /Enable pin.

For a read, the VCR control logic circuit 21 pulls the /Enable pin low and sends a 69 hex address for reading. The VCR control logic circuit 21 reads a ready code of 0E hex. If the checksum is incorrect, a 09 hex code is returned and the VCR control logic circuit 21 resends the command. The VCR control logic circuit 21 reads the return data until a stop code of 0F hex is received. The VCR control logic circuit 21 reads the checksum if the checksum is activated. The VCR control logic circuit 21 then pulls the /Enable pin high. If the checksum is incorrect, the VCR control logic circuit 21 issues a function code 04 (described below) to read the data returned again (optional, only if checksum is activated).

Function Codes

Table XXIII shows the function code, the function name, the parameter and the return. Each parameter ends with a 0F hex signal and is not shown in Table XXIII. Similarly, each parameter and return ends with a 0F hex end code and is not shown in the table for clarity.

Status Checking Function

A function code 00 enables the VCR control logic circuit 21 to read the status register (SR) of the controller 702. The one byte SR return contains the bits as follows: Bit 0 means a new CSPG has been read in. Bit 1 means a new PRI has been read in. Bit 2 means a new program name or tape title (TT) has been read in. Bit 3 means there is a change in the VM packet (described above in conjunction with FIG. 87). Bit 4 means a PR tape directory read is complete. Bit 5 means a TID and PN read is complete. Bit 6 means an external bus cycle is complete. Bit 7 is set to 1 to avoid the status register from overlapping with an end code of 0F hex.

A function code 01 enables the interrupt of the VCR control logic circuit 21 by the interrupt pin on the controller 702. This function allows the VCR control logic circuit 21 to monitor the changes in status of the controller 702 by interrupt from the interrupt pin output. The interrupt mask (IE) is a 1 byte register whose bits are defined in the same way as the bits in the SR register described above for function code 00. For those bits in the interrupt mask which are set, the interrupt pin is changed to 1 whenever there is a change in the status of the corresponding SR bit. Interrupt pin is reset to 0 after the status register is read using function code 00.

A function code 02 sets the current date which the controller 702 uses for creating and decrypting the packet. The VCR control logic circuit 21 updates the controller 702 using this function code at the beginning of each day. As necessary, the VCR control logic circuit 21 uses function codes 50 and 51 (described below) to get the current date and time from the VBI. The year (YR) parameter and return is the current year using two bytes in ASCII BCD number format. If the year parameter is set to 3F3F hex, the setting is not stored in memory and the current value of current month (MN), and current day (DAY) is returned. The current month (MN) parameter and return is one byte from 31 hex to 3C hex corresponding from January to December. The current day (DAY) parameter and return is two bytes in ASCII BCD number format.

A function code 03 is a clear channel related information function issued by the VCR control logic circuit 21 to clear all channel related information inside the controller 702 after the user switches to a different channel.

A function code 04 enables the controller 702 to resend the data from the last function in case the bus connection is broken when the VCR control logic circuit 21 is receiving data or when the checksum is incorrect.

Encoding Functions

A function code 05 commands the controller 702 to encode a TPA packet containing the TID and PN parameters onto the video tape, typically on VBI line 19, until a stop encode function code 06 (described below) is received. The program number is automatically generated by the controller 702. The VCR control logic circuit 21 sends this command to the controller 702 in order to write the TPA packet to line 19 after the recording has started. A flag to increase the program number (PNI) is set to 30 hex if the program number is not to be increased such as for pause and updating the absolute address (AA). The PNI is set to 31 hex if the PN is to be increased, e.g. starting a new recording. The absolute address (typically in one quarter minute units) is measured from the beginning of the tape at SLP speed and is in 4 hex coded binary bytes. In one embodiment, the absolute address is optional for HR tapes and in such embodiments a value of 3F3F3F3F hex is assigned to this field to indicate that the absolute address is not valid. The program number (PN) used for encoding of the TP packet is 3 hex coded binary bytes. A return code (RC) of 30 hex is sent if encoding has started. A return code of 31 hex is sent if the TID is not defined for the current tape. A function code 23 (described below) is sent for setting the TID by the VCR control logic circuit 21. A return code of 3F hex is sent if there is no video signal.

A function code of 06 is sent to stop encoding the TPA packet when recording is stopped or paused. The return code (RC) is equal to number the times of complete automatic backup while 30 hex equals 0 times of backup through 3F hex equals 15 times of complete backup. A return code of 3F hex is sent if the number of times of complete backup is greater than 15. The PNI in function code 05 is set to 30 hex when resuming from a pause.

Decoding Functions

A function code 07 is sent to read the TID of the current tape. After the VCR starts to play the tape, the VCR control logic circuit 21 sends the function code to read the TID. Bit 5 of the status register is cleared after this function and set after the TID is completely read. A return code of 30 hex is sent if the reading has started. A return code of 31 hex is sent if the current TID has been read.

A function code 08 is sent to clear the current TID. Whenever the tape is ejected, the VCR control logic circuit 21 sends a function code 08 to the controller 702 to clear the current TID. Bit 5 of the status register is cleared and all functions referring to the current tape become invalid. If an external I/O port is connected, the updated directory content of the current tape may automatically be sent to the external RAM 73. A return code of 30 hex is sent if the TID is cleared. A return code of 3F hex is sent if there is no current TID and controller 702.

The function code 09 is sent to retrieve the TID of the current tape. A function code 07 must be completed (bit 5 of the status register equals 1) before a function code 09 is sent. Otherwise, a TID of 3F3F3F3F3F3F3F3F3F3F hex is returned. The TID is 5 bytes for the TID of the current tape in 10 bytes of hex coded binary format. The tape number (TN) that is related to the TID is a 3 hex coded binary number (12 bits). This TN is a serial number assigned to the tape by the VCR control logic circuit 21 for the user to mark on the cassette housing. For prerecorded tapes, the tape number is set to zero. The program number (PN) for the current program number is a 3 byte hex coded binary number. The absolute address is defined above for function code 05. The year (YR) is the year when the program was recorded in 2 byte hex coded binary format ranging from 00 to 99. The month (MN) is the month when the program was recorded in 1 byte hex coded binary format ranging from 31 hex to 3C hex corresponding to January through December.

A function code 10 is sent by the VCR control logic circuit 21 to start reading the program number of the current tape before sending function code 11 (described below) for retrieving the PN at the current location of tape. The function code 10 clears the current PN inside the controller 702 and reads in a new PN from the tape. A return code of 30 hex is sent if the reading has started. A return code of 3F hex is sent if there is no valid TID.

A function code 11 is sent for retrieving the program number of the current location of the tape. The VCR control logic circuit 21 preferably sends a function code 10 to start reading the PN before issuing a function code 11. If the return PN is invalid, the VCR control logic circuit 21 reads it again until a valid PN is obtained, or for a predetermined number of reads The PN is as defined above but it is the PN at the current location of the tape. The PN is not valid if a 3F3F3F hex value is returned. The absolute address is as defined above. The year and month is as defined above for function code 09.

A function code 12 is sent for reading the directory of a prerecorded tape. The controller 702 continues to read the directory until either all programs have been read in, the buffer for the prerecorded tape is full, or a subfunction code (SFC) of 32 hex is received. A subfunction code of 30 hex is sent to start reading the PR tape directory beginning with PNS (described below). A Subfunction code of 31 hex is sent to request the number of programs read in. A subfunction code of 32 hex is sent to stop recording. The first PN read (PNS) is in 3 hex coded binary bytes when the subfunction code equals 30 hex. The last PN read (PNE) is in 3 hex coded binary bytes when both the SFC equals 31 hex and RC equals 30 hex. The TPN parameter is the total number of programs in the current tape. A return code of 30 hex is sent if a request is accepted by the controller 702. A return code of 31 hex is sent if reading is in progress. A return code of 32 hex is sent if the current tape is not a PR tape. A return code of 33 hex is sent if the PNS is greater than TPN.

A function code 14 is sent to read the tape title (TT). The BN parameter is the buffer number of the TT and is 30 hex for the current TT and 31 hex for the previous TT. The program category (PC) is 1 byte per the EIA-608 standard. The TT return is a program name string up to the end code 0F hex. A code of 0F hex is returned if the TT has not yet been read in, e.g. in between channel changes.

A function code 17 is sent to clear the tape title. The buffer number (BN) parameter is defined above for function code 14.

A function code 18 is sent to read the current VM packet in the VBI lines. The VMC parameter allows a check in the change in the VM content. Bit 3 of the status register is set, if the VMC parameter is not equal to 30 hex. When there is no VM packet in the VBI, the return is 0F hex. On the other hand, the return normally includes the section number (SCN) of the current program, the total number of sections (TSC) of the current program, a control flag (CF), a time extension (TM), reserved bytes (RSB), a VMC flag and the tape title (TT). Bit 1 of the control flag clears the VM buffer. The VMC indicates the change of the tape title or a section number since the last call of this function. After being read, the VMC is reset to 30 hex. VMC equals 30 hex, if there is no change since the last call. A VMC of 31 hex is returned, if the SCN has changed since the last call. A VMC of 31 hex is returned, if the SCN has changed since the last call. A VMC of 32 hex is returned if the TT has changed since the last call. A VMC of 33 hex is returned if both the SCN and TT have changed since the last call.

Directory Functions

A function code 20 retrieves the directory from the RAM 33. The TN parameter is the tape number in the RAM 33 in a 3 byte hex coded binary format. The tape number is 0 for PR tapes. The PDN parameter is the program entry in the directory. The Nth directory corresponds to the Nth program in the directory. It should be noted that the program number PN of the Nth program of Nth directory may not be N. If PDN=0, the tape title information is returned. The IC parameter is the item code in a 2 byte format with each bit corresponding to the following items. For byte 0, bit 7 is always set to 1 to avoid overlap with the end code. Bit 6 is set to 0 as a reserve bit. Bit 5 is the read program number (PN) of the entry. Bit 4 is the read start address (ST). Bit 3 is the read record speed (RS). Bit 2 is the read length of program (LN). Bit 1 is the read stop address (EN). Bit 0 is the read program category (PC). For Byte 1, bit 7 is set to 1 to avoid overlap with the end code. Bit 6 is the read version number and language code (VL). Bit 5 is the read title text (TT). Bits 4 and 3 are set to 0 as reserve bits. Bit 2 is the read total tape length (TLN). Bit 1 is the read differential period (DP). Bit 0 is the initial period (IP). When PDN=0, only bits in byte 1 are valid and bit 0 is set to 80 hex.

The DNI return contains various items in the DN. Each item is identified by the item code. The items include the PN, ST, RS, LN, EN, PC, VL, TT, TLN, DP, and IP. The PN item is the program number in 3 bytes hex coded binary format. The ST item is the start position in minutes from the beginning of the tape at SLP speed in 3 bytes hex coded binary format. The RS item is the record speed of the program in 1 byte. The RS of 20 hex is the SP speed. An RS of 2 hex is the LP speed. An RS of 22 hex is the SLP speed. An RS of 24 hex is an undefined speed. The LN item is the length of program measured in minutes in 3 bytes hex coded binary format. The EN item is the end position measured in minutes from the beginning of the tape at SLP speed in 3 bytes hex coded binary format. The EN item has a higher priority than the LN item. Once the EN is used it overwrites the LN setting but not vice versa even if the LN is specified later than the EN. The PC item is 2 bytes for the program, category. The first byte is the basic category. per the EIA-608 standard. The second byte is the extended category as described above for the DN packet. The VL item is 2 data bytes with the first byte denoting the version and the second byte denoting the language code. The TT item is the program name with the length less than or equal to 40 characters terminated by the character 1E hex. Attribute characters may be included in the text as described above. The TLN item is 3 bytes of hex coded binary numbers for the total length of the tape. The DP item is 4 bytes of hex coded binary number for the differential period between adjacent terms of the source reel measured in microseconds. This number is used for absolute address calculation. The IP item is 2 bytes of hex coded binary number for the rotation period of the supply hub in units of 0.1 seconds. When PDN equals 0, the VL and TT items refer to the version number and language and title text of the tape title, respectively. The DNI item is output in the order listed in the item code, i.e., from byte 7 of byte 0 to byte 0 of byte 1. If the byte of the corresponding DNI is not set, the item is not present and the return DNI list. The TLN, DP and IP parameters are for the whole tape and can be set or changed in any program. The function code 20 is sent to retrieve any directory in the RAM 33. If the TN or PDN parameters are invalid a code of 3F . . . 3F hex is returned for DNI.

A function code 21 is sent to find a blank section for recording. A subfunction code (SFC) of 30 hex is sent for searching for the current tape. A SFC of 31 hex is sent to search for all tapes in the library. The LN parameter is the blank section with the length and minutes in 3 hex coded binary bytes. The TN parameter is the tape number where the blank space is located. The BS parameter is the starting location of the blank section in 3 hex coded binary bytes. If DN=00 hex, the starting location of the last blank section is returned. If the blank section cannot be found, the return is 3F3F3F hex.

A function code 22 is sent to create a new program for the current tape in the RAM 33. The contents of the RAM 33 are updated according to the content of the tape directory. The controller 702 adjusts the length due to overlap of programs. All items are changeable during recording and the packet is closed only after receiving the end of setting code (bit 3) of byte 1 in the item code (IC). The item code (IC) is a 2 byte parameter. For byte 0, bit 7 is set to 1 to avoid overlap with the encode. Bit 6 is used to create a new program entry. Note there is no corresponding DNI. Bit 5 is used to set or change the PN of the entry. Bit 4 is used to set or change the start address (ST). Bit 3 is used to set or change the record speed (RS). Bit 2 is used to set or change the length of the program (LN). Bit 1 is used to set or change the stop address (EN). Bit 0 is used to set or change the program category (PC). For byte 1, bit 7 is set to 1 to avoid overlap of the end code. Bit 6 is used to set or change the version number and language code (VL). Bit 5 is used to set or change the title text (TT). Bit 4 is set to 0 as a reserve bit. Bit 3 is used to indicate the end of setting. Bit 2 is used to set or change the total tape length (TLN). Bit 1 is used to set or change the differential period (DP). Bit 0 is used to set or change the initial period (IP). The DNI parameter contains the various items in the DN as identified by the item code. The format of the DNI is described above for function code 20. A return code of 30 hex indicates that the operation is completed. A return code of 31 hex indicates the RAM 33 is full. A return code of 32 hex indicates there is an error in the DN content. A code of 3F hex indicates that there are other errors e.g., the current tape is a prerecorded tape.

A function code 22 is sent to allow the VCR control logic circuit 21 to set the TN or TID of the current tape when the information cannot be read from the TPA packet. A subfunction code of 30 hex is sent to set the TN and return a corresponding TID in memory. A subfunction code 31 hex is sent to set the TID and return a corresponding TN in memory. A return code of 30 hex is sent if the operation is completed. The return code of 31 hex is sent if there is no corresponding TID or TN in memory. In such a case, no TID or TN is returned.

A function code 26 is sent to erase the Nth entry in the TNth tape in the RAM. The PDN parameter is the program entry to be erased in a 3 hex coded binary byte format. A return code of 30 hex is sent if the operation is completed. A return code of 3F hex is sent if no such entry exists on the tape.

A function code of 27 is sent to change the program parameters for the Nth entry in the TNth tape in the RAM 33. The content of the RAM 33 is updated according to the content of the tape directory. The controller 702 adjusts the length due to overlap of programs. The item code is identical to the item code of function code 22 except that here bit 3 of byte 1 is set to 0 as a reserve bit. The DNI and RC parameters have the same definition as those for function code 20.

A function code 29 is sent to save the current PR tape directory to the RAM 33. The TN parameter is the tape number assigned to the PR tape in 3 hex coded binary byte format. A return of FFF hex is made if there is an error in the saving operation.

A function code 30 is sent to delete the directory of a tape from RAM 33. The TN parameter is the tape number of the directory to be deleted in a 3 hex coded binary byte format. A return code of 30 hex is sent if the directory is deleted. A return code of 31 hex is sent if no such tape exists in the RAM 33. A return code of 3F hex is sent if there is another type of error in the operation.

A function code 31 is sent to create a TID for a new tape. The newly created TID become the current TID. The TID is not stored in the RAM 33 until at least one program entry is created. The TID parameter is the TID for the new tape in 10 hex coded binary bytes. The TN parameter is the tape number of the new tape in the 3 hex coded binary bytes.

A function code 32 is sent to retrieve a tape number from the TID. A return of 3F3F3F hex is sent if there is no match to such a TID in the RAM 33.

A function code 33 is sent to change the tape number. The parameter TNO is the old tape number in 3 hex coded binary bytes. The parameter TNN is the new tape number in 3 hex coded binary bytes. A return code of 30 hex is sent if the TNN is not used by another tape. A return code of 31 hex is sent if a TNN is already used by some other tape. A return code of 31 hex is sent if the TNO is invalid. For a return code of 31 hex, the VCR control logic circuit 21 first changes the TNN tape to some other number using the function code 33 before setting TNO to TNN.

Library Function

A function code 34 is sent to set the program category filter for sorting of programs by category. The category filter is reset by function code 35 as described below. The PC parameter is the program category to be sorted. A return code of 30 hex is sent if the program filter is set. A return code of 3F hex is sent if the program category is invalid.

A function code 35 is sent to reset the program category filter as set by function code 34. A return code of 30 hex is sent if the filter is reset. A return code of 3F hex is sent if no filter is currently set in the controller 702.

A function code 36 is sent to read the first program title in alphabetical list. This function is used with function codes 37 and 38 described below for listing programs in the library in alphabetical order. If there is no program in the RAM 33, a return of FFF hex is sent for TN and DN. The case of letters is ignored during the sorting. The TN return is the tape number which contains the program in question in 3 hex coded binary bytes. The PDN return is the entry number of the title of the tape in 3 hex coded binary bytes. As necessary, the VCR control logic circuit 21 uses TN and PDN to retrieve more information on the directory using function code 20 (described above). The LN return is the length of the program in 3 hex coded binary bytes.

A function code 37 is sent to read in the next program title in the alphabetical list. When the end of the list has been read, a return of FFF hex is made for TN and DN. The return parameters are as defined for function code 36.

Function code 38 is sent to read in the previous program title in the alphabetical list. If the first program in the list has been read, a return of FFF hex is made for TN and DN. The return parameters are as defined above for function code 36.

A function code 39 is sent to start the search for a title in the RAM 33. If the search fails, the return becomes 3F3F3F0F hex. The search is stopped and the result is sent when (1) the title text of the program (TT2) matches the title to be searched (TT1), (2) the title TT2 with an order, according to the alphabetical list, just greater than TT1 is found, i.e. a TT1 is not found, or (3) the end of the program list is reached. During the search process, the "next" and "previous" program title as read by function codes 37 and 38 (described above) are defined with respect to the current title at where the search stops. The TN return is the tape number which contains the program TT2 in question in 3 hex coded binary bytes. The PDN return is the entry number of the title TT2 in 3 hex coded binary byes. The VCR control logic circuit 21 uses the PDN to get more information on the directory. The LN parameter is the length of the program of TT2 in 3 hex coded binary bytes.

Miscellaneous Functions

A function code 40 is sent to read the machine ID which is supplied either by the VCR or generated by the controller 702 using a function code 42 (described below). The controller 702 does not check if the MID has changed since registered. The VCR control logic circuit 21 ensures that the MID remains unchanged after initial set up. The MID return is a 15 bit machine ID used for TID creation in 4 hex coded binary bytes.

A function code 41 is sent to register the machine ID. As with the function code 40, the VCR or the controller 702 may generate the machine ID. The MID parameter is the same as described for function code 40. A return code of 30 hex is sent if the MID is sent. A return code of 3F hex is sent if the MID is out of the range.

A function code of 42 is sent to generate a machine ID using a random numbered generator in the controller 702 as described above. If the VCR control logic circuit 21 uses this number to generate the MID, the VCR control logic circuit 21 uses function code 41 (described above) to register it. The MID generated by this function is not stored in the RAM.

A function code 43 is sent to write the directory of the tape to the external RAM 73 via the external I/O interface. The VCR reads the "external bus cycle complete" flag (bit 6 of the status register) to check if the communication is completed. The status can be read after the flag is sent using a function code 45 (described below). The TN parameter is the tape number which contains the directory to be sent in 3 hex coded binary bytes. A return code of 30 hex is sent if the sending has started. A return code of 31 hex is sent if the TN is not available. A return code of 0F hex is sent if the external I/O interface is busy.

A function code 44 is sent to read the directory of a tape from the external RAM 73. The VCR reads the "external bus cycle complete" flag to check if the communication is completed. Such status is read using a function code 45 described below, after the flag is sent. The directory content may be read using a function code 20 (described above) after it has been read in. The TID parameter for the tape to be read is in 10 hex coded binary bytes. A return code of 30 hex is sent if communication has started. A return code of 31 hex is sent if there is no external bus. A return code of 3F hex is sent if the external bus is busy.

A function code 45 is sent to read the external read/write status of the external I/O interface. A return code of 30 hex is sent if the directory write/read to the external RAM is completed without error. A return code of 31 hex is sent if there is an error in the external bus. A return code of 32 hex is sent if the external RAM 73 is full. A return code of 33 hex is sent if there is no such TID in the external RAM 73. A return code of 3F hex is sent if there is no external RAM 73.

A function code 46 is sent to check the backup battery voltage using an A/D converter in the controller 702. The VCR control logic circuit 21 determines the warning level base on a voltage level of .the external battery. The frequency of the measurement is limited, e.g., once per hour, to avoid leaking too much current by such measurement. The BL return is the battery voltage level in 2 hex coded bytes ranging from 00 to 255. A BL of 255 means the battery voltage is equal to a reference voltage connected to the controller 702.

A function code 49 is sent to find the program entry number PDN at the current location, e.g., the third program in the directory that the tape is currently at. The controller 702 returns to the same program entry number for the program at the current location (PDN) as the program for blanks section that follows the program. The VCR control logic circuit 21 checks if the PDN refers to a program of the following blank section by the return code. For the blank section before the first program (PDN=1), PDN=20 and RC=31 hex are returned. The CL parameter is a 3 hex coded binary byte number equal to the number of minutes from the beginning of tape to the current location in SLP speed. A return code of 30 hex is sent if the current location is within the program pointed by the PDN. A return code of 31 hex is sent if the current location at the blank section is just after the program pointed by the PDN.

A function code 50 is sent to start reading by the controller 702, line 21 of the Extended Data Services packets, requested by the VCR control logic circuit 21. The VCR control logic circuit 21 then issues a function code 51 (described below) to read the data from line 21. The parameter CC is the Extended Date of Services class code for the EIA-608 standard in 2 byte hex coded binary format. The TC parameter is the Extended Data Service type code for the EIA-608 standard in 2 byte hex coded binary bytes. A return code of 30 hex is sent if the reading has started. A return of 3F hex is sent if it is an invalid code per the EIA-608 standard.

A function code 51 is sent to retrieve line 21 of the Extended Data Service. The function code 50 is issued first to clear the old buffer and start grabbing the data from the VBI. The VCR control logic circuit 21 waits for a period of time before the service data is available. The VCR control logic circuit 21 determines the number of retrials in between waiting. The EDS return is the extended data service packet requested by function code 20 (described above). The format of such packet is defined in the EIA-608 Standard. If the date has not yet been read in, only a return of 0F hex is made.

A function code 52 is sent to retrieve line 21 field 1 closed caption data. The SFC parameters is the subfunction code. A SFC of 30 hex is used for field 2. A subfunction code of 31 hex is used for field 1. The CCD return is 2 bytes of closed caption data from line 21, field 1, with the first byte corresponding to the first byte in the line. The data is returned in 4 hex coded binary format to avoid overlap with control codes used in the controller 702 interface. The data is stored in a buffer in the controller 702 on a FIFO basis.

CSPG and PRI Services

A function code 53 is sent to enter the CSPG and PRI modes described above. The controller 702 responds to the key code input and generates text for the VCR control logic circuit 21 after entering into such modes. These modes are terminated by either function code 55 described below or by internal action of the controller 702. As described, the time out for these two modes is set to a predetermined time after the last key is pressed by the user. Upon such time out, the VCR control logic circuit 21 checks the controller 702 using function code 54 (described below) with the key code (KC) set to time out state as described below for any further action to be performed. The SC parameter is the service code and is 30 hex for the CSPG mode and 31 hex for the PRI mode. A RT return is the return to the VCR control logic circuit 21 of any text to be displayed to a maximum of a predetermined value, any CDTL code to be used, or any action to be performed by the VCR control logic circuit 21. Such return may also include attribute characters related to the RT.

A function code 54 is sent to key action in the CSPG and PRI modes. Using this function, the controller 702 processes all the CSPG and PRI user interfaces from the VCR control logic circuit 21. The VCR control logic circuit 21 passes the user inputted commands from the remote controller (key action) to the controller 702. The controller 702 determines the action to be taken and the display to be made. If the CDTL code for timer programming conflicts with programs inside the VCR control logic circuit 21 program stack, the program buffer stack is full, or it is an invalid CDTL code, the VCR control logic circuit 21 sends a function code 54 to the controller 702 with the key code (KC) indicating the various condition to reissue to thereby allow the controller 702 to generate suitable warning messages for the user. The KC parameter is the key pressed by the user and includes cursor movement, page movement, enter, clear, cancel, print, function buttons and non-key actions including time out, program clash and no key return. The RT return is the same as function 53.

A function code 55 is sent to exit the CSPG or PRI modes. This function stops the controller 702 from performing any further PRI or CSPG processing and returns to a normal mode. The VCR control logic circuit 21 clears the on screen display and returns to normal video after a function code 55.

A function code 56 stores the program into the controller 702 to thereby allow the VCR control logic circuit 21 to extend its own recording program stack by the external RAM 73. The PP parameter is a program location pointer range from 30 hex to 47 hex with 30 hex corresponding to the first program location, 31 hex corresponding to the second location, and 47 hex corresponding to the 24th location. The PGM parameter is 12 bytes of hex coded binary data to be stored in a location pointed by PP. A return code of 30 hex is sent if the data is correct. A return code of 3F hex is sent if the PP parameter is out of the range or the PGM parameter is greater than 12 bytes.

A function code 57 is sent to read programs in the controller 702. The VCR control logic circuit 21 reads back programs stored in the external RAM 73. The PP and PGM parameters are as described above for function code 56. If the PR is out of range, only a return of 0F hex is made. If the location has not been stored by a function code 56, the controller 702 returns the contents in the buffer.

Upload and Download Functions

A function code 60 is sent to estimate the download tape length. The TN parameter is the tape number containing the directory to be downloaded. A TN equalling 0 is invalid for this entry. The LN parameter is the length of tape needed for a complete download. If the TN is invalid, the LN is set to zero. The LN return is defined as the minutes of tape in the SLP mode.

A function code 61 is sent to download the directory to tape. The controller 702 starts encoding the directory onto tape after this function code. The VCR control logic circuit 21 checks for the status of the download using a function code 62 (described below). The VCR control logic circuit 21 terminates the download process before completion by sending a function code 61 with TN set to zero. The TN parameter is as described for function code 60 except that a TN=0 stops the download process. The ND parameter is the number of times the directory is to be downloaded. A return code of 30 hex is sent if the download has started or stopped if TN=0. A return code of 31 hex is sent if the TN number is invalid.

A function code 62 is sent to determine the status of the directory download. A return code of 30 hex is sent if the download has been completed. A return code of 31 hex is sent if the download is in progress.

A function code 63 is sent to upload the directory from the tape. The SFC parameter is the subfunction code. A SFC of 30 hex is sent to start uploading the directory from tape. An SFC of 31 hex is sent to stop uploading.

A function code 64 is sent to determine the status of the directory upload. A return code of 30 hex is sent if the upload has been completed. A return code of 31 hex is sent if the upload is in progress. A return code of 32 hex is sent if the memory is full before the restore is complete.

A function code 65 is sent to backup the library to the tape. The controller 702 starts en-coding the entire library on to tape after a function code 65 is called with the subfunction code (SFC) equal to 30 hex. The VCR control logic circuit 21 checks for the completion of backup by a function code 66 (described below). The VCR control logic circuit 21 terminates the backup process by calling a function code 65 with SFC equalling 31 hex before completion. The parameter ND is the number of times the library is to be backed up.

A function code 66 is to retrieve the status of the library backup. A return code of 30 hex is sent if the backup has been completed. A return code of 31 hex is sent if the backup is in progress.

A function code 67 is sent for restoring the manual backup library from tape. The restoring of the manual backup library from tape does not overwrites the current library in the memory. The new directory is appended to the current library. On the other hand, restoring from automatic backup overwrites the whole library and any program in memory before the restore is lost. The VCR control logic circuit 21 checks for the condition of the library, i.e. if the library has been lost, before performing the restore from automatic backup. The SFC parameter is set to 30 hex for starting to restore the manual backup library from tape, to 31 hex to start restoring automatic backup library from tape, and to 32 hex to stop restoring.

A function code 68 is sent for the status of the library restore. A return code of 30 hex is used if the restore has been completed. A return code of 31 hex is used if the restore is in progress. A return code of 32 hex is used if the memory is full before the restore is complete.

Operation of Controller 702

Figure 99:
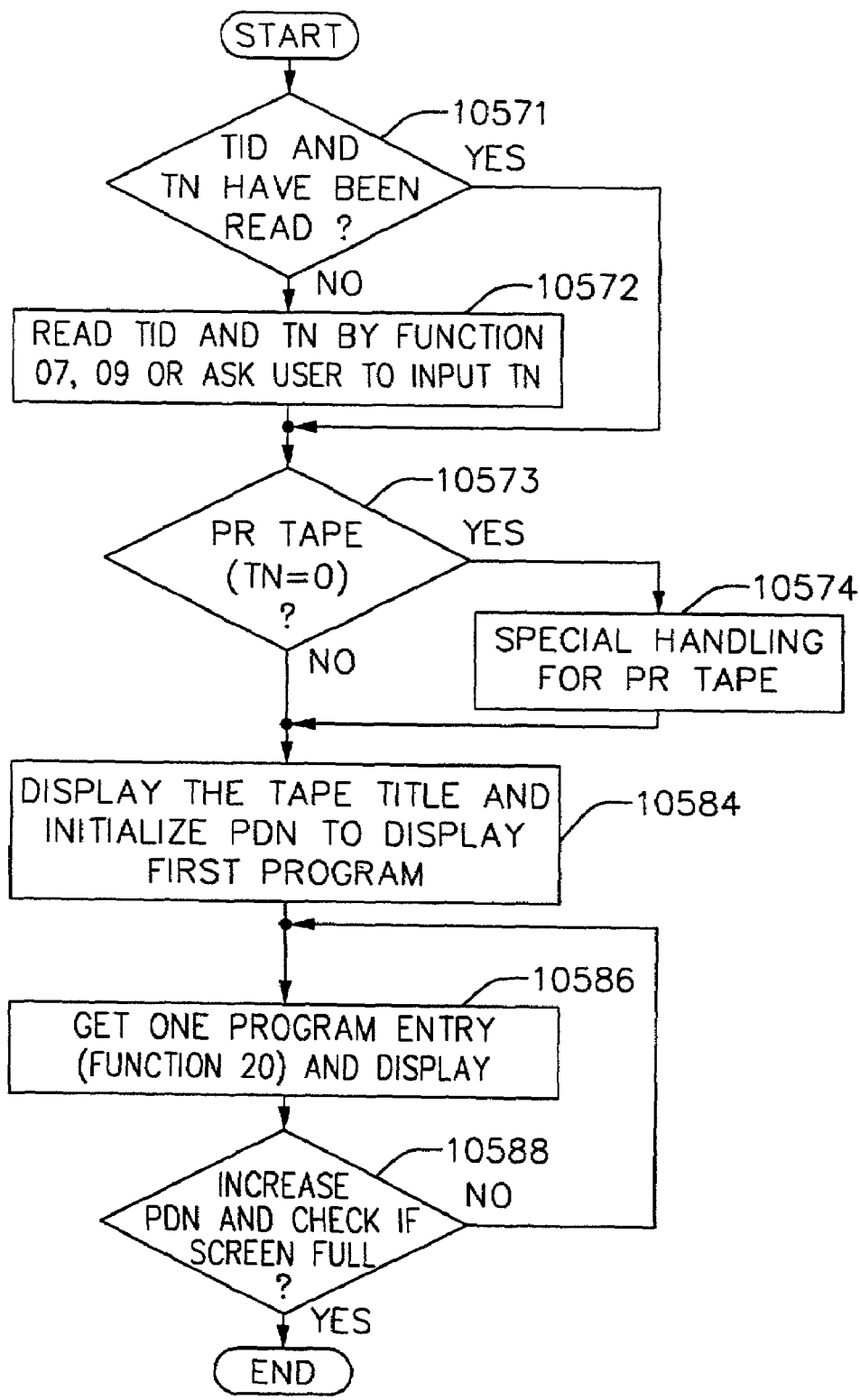
FIG. 99 is a flowchart showing the steps employed in displaying directory content.

FIG. 99 is a flowchart showing the steps employed in displaying directory content.

If the TID and tape number have not been read (step 10571), the VCR control logic circuit 21 reads the TID and tape number by sending a function codes 07 and 09 or requesting the user to input the tape number as described above (step 10572). Either way, the VCR control logic circuit 21 then determines whether the tape is a pre-recorded tape, i.e., the tape number equals 0 (step 10573). If it is a PR tape, the directory must be recorded from the tape as described in FIG. 100 (step 10574).

Figure 100:
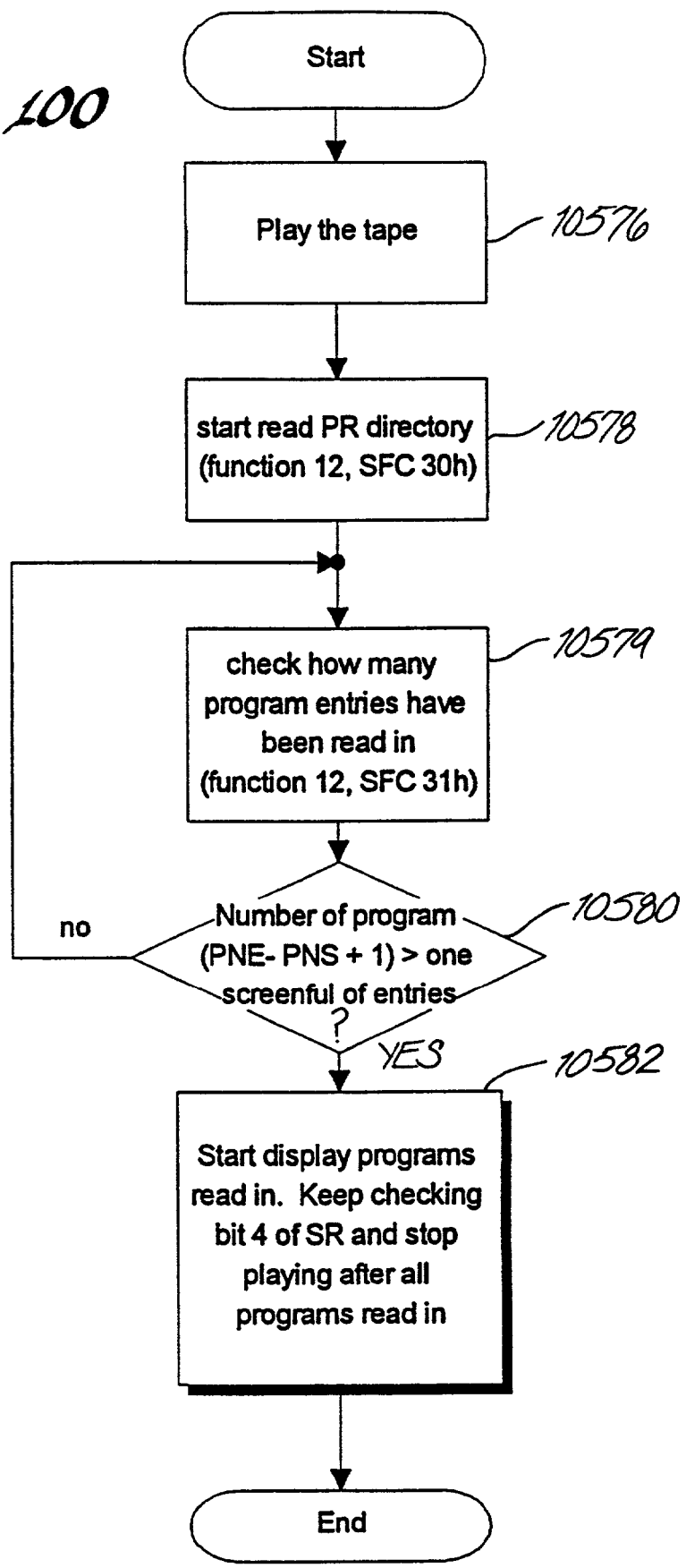
FIG. 100 is a flowchart showing the steps for the special handling of a PR tape.

FIG. 100 is a flowchart showing the steps for the special handling of a PR tape.

The VCR plays the tape (step 10576) and starts to read the directory by the VCR control logic circuit 21 sending a function 12 with SFC=30 hex (step 10578). The VCR control logic circuit 21 checks how many program entries have been read in by sending a function code 12 with SFC=31 hex (step 10579). If the number of programs (PNE−PNS+1) is greater than one screen full of entries (step 10580), the VCR control logic circuit 21 continues to read more entries (step 10579). Otherwise if it is greater, the VCR control logic circuit 21 starts to display the programs read in, and, during such display, continues to check bit 4 of the status register (SR) and stops playing after all programs are written (step 10582).

Returning now to FIG. 99, the VCR control logic circuit 21 displays the tape title and initializes the PDN to display the first program (step 10584). The VCR control logic circuit 21 then gets one program entry using function code 20 and displays its directory (step 10586). The VCR control logic circuit 21 increases the PDN and until the screen is full (step 10588) it continues to get a program entry (step 10586). When the screen is full, the VCR control logic circuit 21 stops display (step 10590).

Figure 101:
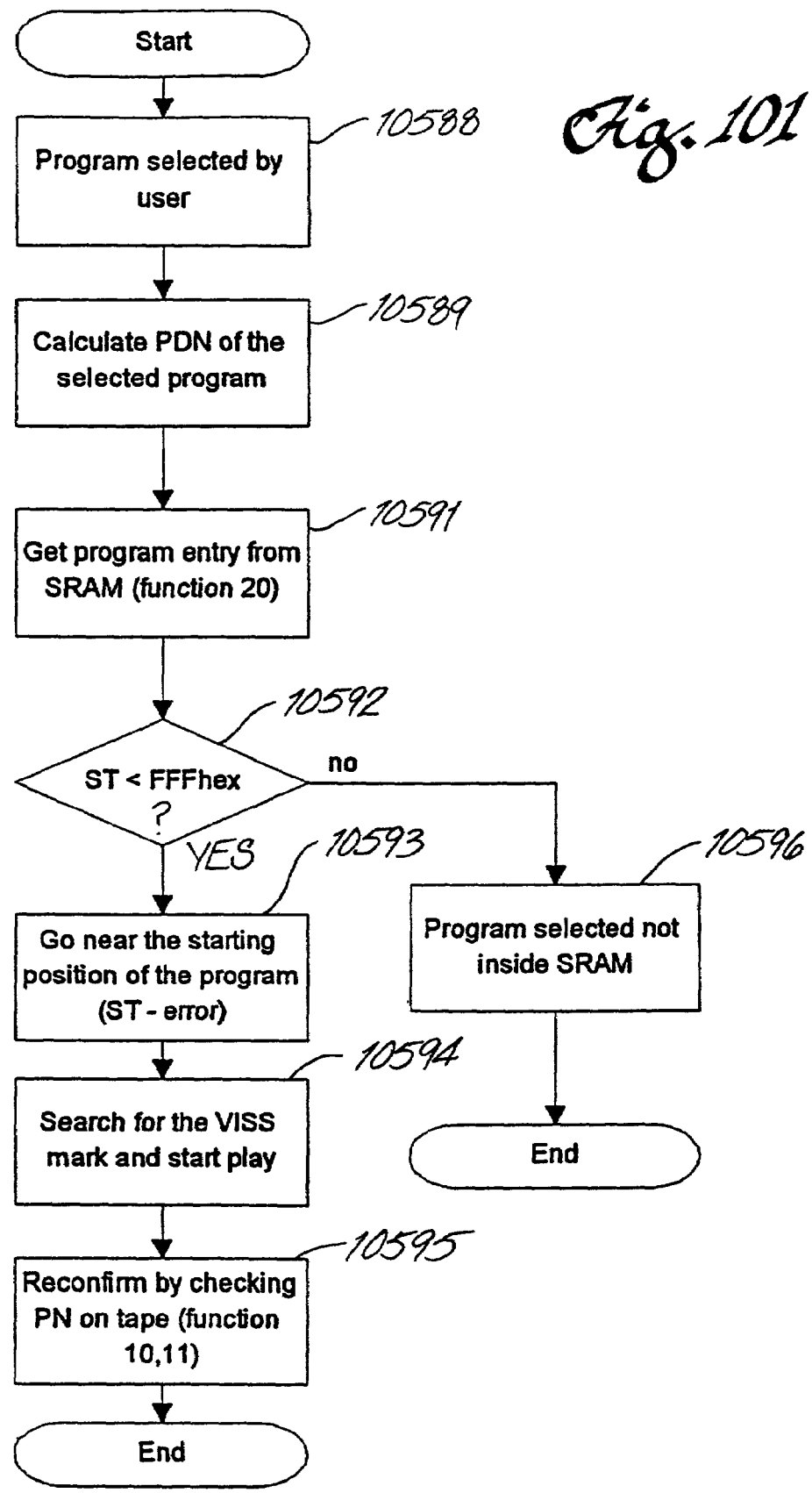
FIG. 101 is a flowchart showing the steps employed in playing a program.

FIG. 101 is a flowchart showing the steps employed in playing a program.

In response to a user selecting a program (step 10588), the VCR control logic circuit 21 calculates the PDN of the selected program (step 1089) and retrieves the program entry from the RAM 33 using a function code 20 (step 10591). If ST is less than FFF hex (step 10592), the VCR control logic circuit 21 performs a search routine. One example of such search routine in addition to those described above is to go near the starting position of the program (ST minus error) (step 10593). The VCR control logic circuit 21 then searches for a VISS mark and upon reaching such mark starts to play (step 10594). The VCR control logic circuit 21 reconfirms that its the correct location by checking a program number (PN) on the tape using a function codes 10 and 11 (step 10595).

If ST is not less than FFF hex (step 10592), the program selected is not inside the RAM 33 and the VCR control logic circuit 21 displays a screen informing the user of such and no further operation is performed until the user makes another selection (step 10596).

Figure 102A:
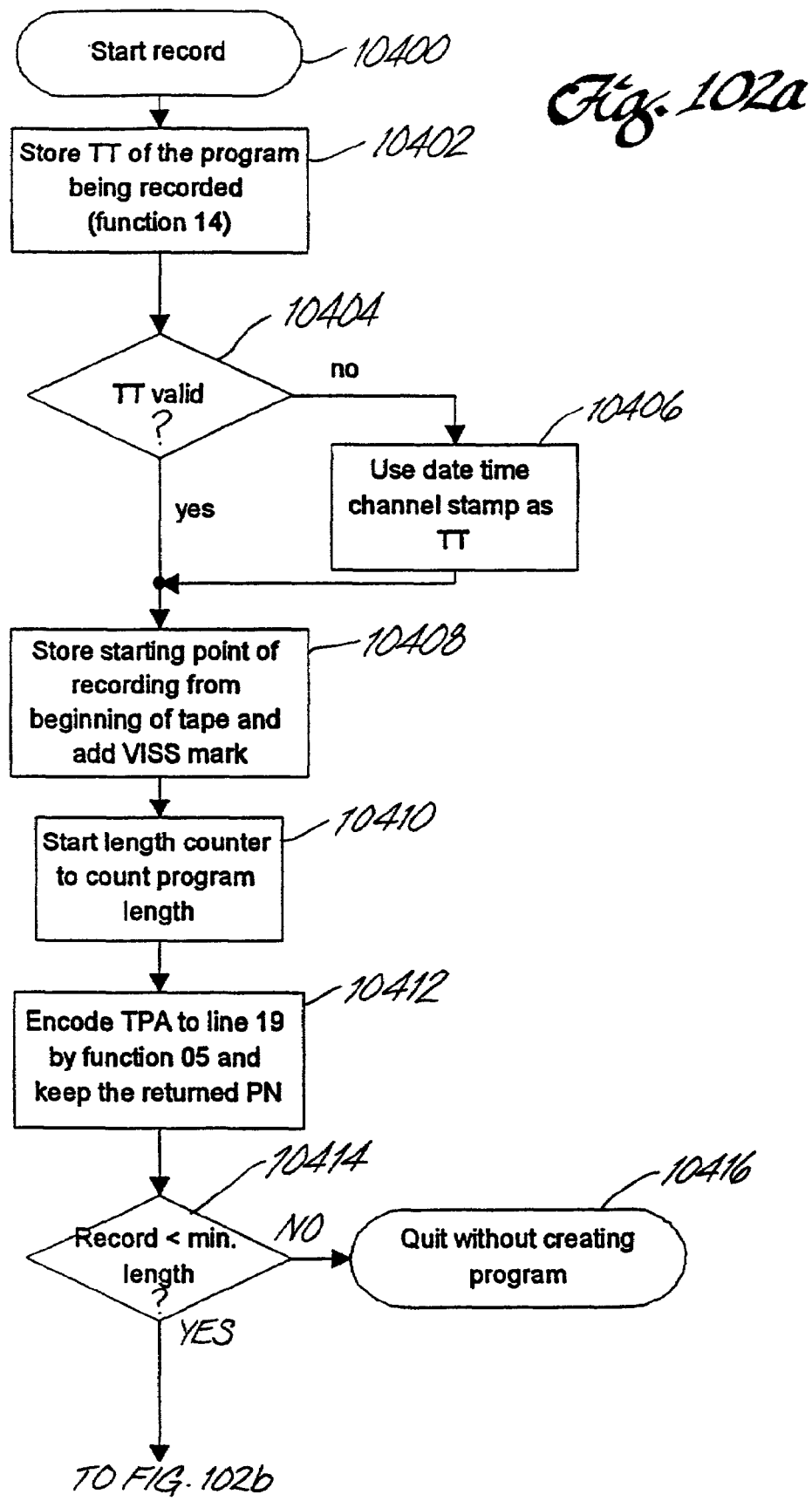
FIGS. 102a-102b are flowcharts showing the steps employed in recording a program.
Figure 102B:
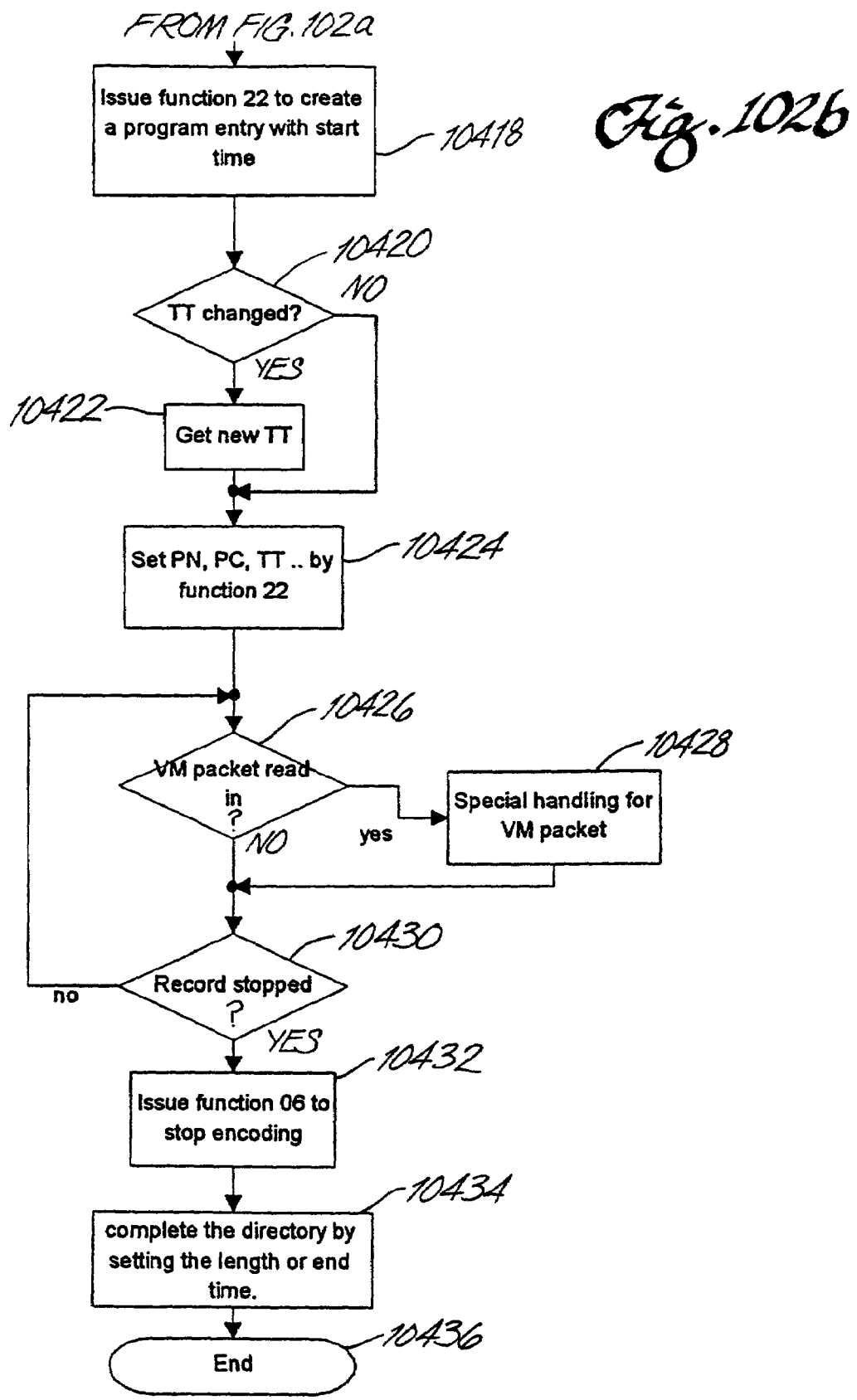

FIGS. 102a-102b are flowcharts showing the steps employed in recording a program.

As the VCR 1 enters a record mode (step 10400), the VCR control logic circuit 21 stores the tape title or program name (TT) using function code 14 (step 10402). If the tape title is not valid (step 10404), the VCR control logic circuit 21 uses the date/time/channel stamp as the tape title (step 10406). Either way, the VCR control logic circuit 21 stores the starting point of recording from the beginning of the tape and adds a VISS mark (step 10408). A start length counter starts to count the program length (step 10410). The VCR control logic circuit 21 encodes a TPA packet (described above) onto VBI line 19 by function code 05 and retains the return program number (step 10412). If the recording is greater than the minimum length of available space (step 10414), the indexing VCR quits without creating new programming (step 10416). Otherwise, the VCR control logic circuit 21 issues a function code 22 to create a program entry with the start time (step 10418). If the tape title has changed (step 10420), the VCR control logic circuit 21 gets a new tape title in a manner described above and sets the program number, PC, TT by using function code 22 (step 10424). If a VM packet is read in (step 10426), special handling is done for the VM packet as described above (step 10428). Otherwise, if no VM packet has been read in (step 10426), this process of monitoring for VM packets is continued until the recording has stopped (step 10430). After stopping, the VCR control logic circuit 21 issues a function code 06 to stop encoding (step 10432). The VCR control logic circuit 21 completes the directory by setting the length or end time of the tape title (step 10434) and stops (step 10436).

Summary of Function Codes

TABLE XXIII

| Func. # | Function Name | Parameter | Return |
|---|---|---|---|
| | Status checking functions | | |
| 00 | Read status register of controller 702 | — | SR |
| 01 | Enable interrupt of VCR main chip by INT pin | IE | — |
| 02 | Set current date | YR, MN, DAY | — |
| 03 | Clear Channel related information | — | — |
| 04 | Resend data from previous function | — | return as previous function |
| | Encoding functions | | |
| 05 | Encode TPA packet of current tape | PNI, AA | PN, RC |
| 06 | Stop Encoding the TPA packet | — | RC |
| | Decoding functions | | |
| 07 | Start reading TID for current Tape | — | RC |
| 08 | Clear current TID | — | RC |
| 09 | Get TID of current tape | — | TID, TN, PNAA, YR, MN |
| 10 | Start reading PN of current tape | — | RC |
| 11 | Get PN at current location of tape | — | PN, AA, YR, MN |
| 12 | Reading pre-recorded tape directory | SFC, PNS | RC, PNE, TPN |
| 13 | Reserved | — | — |
| 14 | Read TT | BN | PC, TT |
| 15 | Reserved | — | — |
| 16 | Reserved | — | — |
| 17 | Clear TT | BN | — |
| 18 | Read VM buffer | — | SCN, TSC, CF, ETM, RSB, VMC, TT |
| 19 | Reserved | — | — |
| | Directory functions | | |
| 20 | Get directory from RAM | TN, PDN, IC | DNI |
| 21 | Find Blank section for recording | SFC, LN | TN, BS |
| 22 | Create new program for current tape in RAM | IC, DNI | RC |
| 23 | Set TN or TID for current tape by main chip | SFC, TN/TID | RC, TID/TN |
| 24 | Reserved | — | — |
| 25 | Reserved | — | — |
| 26 | Erase Nth entry in the TNth tape in RAM | TN, PDN | RC |
| 27 | Change program parameters for the Nth entry in the TNth tape in RAM | TN, PDN, IC, DNI | RC |
| 28 | Reserved | — | — |
| 29 | Save current PR tape directory to RAM | — | TN |
| 30 | Delete directory of a tape from RAM | TN | RC |
| 31 | Create TID for new tape | — | TID, TN |
| 32 | Get TN from TID | TID | TN |
| 33 | Change TN | TNO, TNN | RC |
| | Library functions | | |
| 34 | Set program category filter | PC | RC |
| 35 | Reset program category filter | — | RC |
| 36 | Read in first program title in alphabetical list | — | TN, PDN, TT, LN |
| 37 | Read in next program title in alphabetical list | — | TN, PDN TT, LN |
| 38 | Read in previous program title in alphabetical list | — | TN, PDN TT, LN |

TABLE XXIII-continued

| Func. # | Function Name | Parameter | Return |
|---|---|---|---|
| 39 | Start search for a title in RAM | TTI | TN, PDN, TT2, LN |
| 40 | Reserved | — | — |
| | Miscellaneous functions | | |
| 41 | Register machine ID | MID | RC |
| 42 | Generate Machine ID | — | MID |
| 43 | Write directory of a tape to external RAM module by External I/O port | TN | RC |
| 44 | Read directory of a tape from external RAM module by External I/O port | TID | RC |
| 45 | Read external write/read (External I/O port) status | — | RC |
| 46 | Check backup battery voltage | — | BL |
| 47 | Reserved | — | — |
| 48 | Reserved | — | — |
| 49 | Find program entry number PDN at current location | CL | PDN |
| 50 | Start reading line 21 extended data service | CC, TC | RC |
| 51 | Get line 21 extended data service | — | EDS |
| 52 | Get line 21 field one closed caption data | — | CCD |
| | CSPG and PRI services | | |
| 53 | Enter CSPG and PRI mode | SC | RT |
| 54 | Key action in CSPG/PRI mode | KC | RT |
| 55 | End CSPG or PRI mode | — | 1C hex, 26 hex |
| 56 | Store program into controller 702 | PP, PGM | RC |
| 57 | Read program in controller 702 | PP | PGM |
| 58 | Reserved | — | — |
| 59 | Reserved | — | — |
| | Upload and download functions | | |
| 60 | Estimate download tape length | TN | LN |
| 61 | Download directory to tape | TN, ND | RC |
| 62 | Status of directory download | — | RC |
| 63 | Upload directory from tape | SFC | — |
| 64 | Status of directory upload | — | RC |
| 65 | Download library to tape | SFC, ND | — |
| 66 | Status of library download | — | RC |
| 67 | Restore library from tape | SFC | — |
| 68 | Status of library restore | — | RC |

VBI Signal Processor

FIG. 103 is a block diagram of the VBI signal processor.

As described above, the VBI signal processor 701 performs the vertical and horizontal synchronization separation of the VBI lines. In addition, the VBI signal processor 701 slices and decodes and encodes the VBI lines at either the 1× or 2× formats.

Referring now to FIG. 103, a sync video input (SYNC_VID_IN) signal is provided on a line 10710 by either the controller 702 to a sync separator 10701. A decoder video input (DEC_VID_IN) signal is provided on a line 10711 to a video interface circuit 10702. The sync separator 10701 provides the separated synchronization signals to both a low speed data receiver 10703 and a low speed data inserter 10708. In addition, the low speed data receiver 10703 receives decoded video signals from the video interface circuit 10702. The low speed data receiver 10703 extracts data from selected VBI lines of the incoming video signals. The extracted date is provided at a bit rate of 1,006,993 bits/sec (64 times the horizontal sync frequency $f_H$) with 4 information bytes per line (2× format) or a data rate of 32 times $f_H$ (1× format) to receive data registers 10704 which provide the received data to both a parallel interface 10706 and transmit data registers 10707. The receive data registers 10704 may be read by the controller 702 over the parallel interface 10706 which provides on a line 10712 data to and receives data from the controller 702. The parallel interface 10716 is preferably the Interrupt bus described above. The low speed data receiver 10708 also provides status to a receive line status register 10705. As does the receive data registers 10704, the receive line status registers 10705 provide status data to both the parallel interface 10706 and the transmit data registers 10707. The low speed data inserter sync separation signals from the sync separator data to be transmitted from the transmit data registers and a video signal (ENC_VIDEO_IN) and provides on a line 10713 encoded video output signal (ENC_VID_OUT) to the indexing VCR.

As an overview, the VBI signal processor 701 monitors lines 10-25 of the VBI in either the 1× or 2× formats. For a signal to noise ratio of 20 dB or better, the VBI signal processor 701 has a bit error rate of less than 1 part in 10000.

By way of background, a horizontal sync signal is a highly redundant signal at a constant and precise frequency of 15.74 kHz. The horizontal sync signal is separated from the composite sync signal by using a phased locked loop with a large inertia or locking time constant, for example, 1-2 TV field locking time. However, for video sources from a VCR during tape playback, the time base of the video is distorted. Typically, there is a discontinuity in the horizontal sync pulse near the vicinity of the vertical sync pulse. The discontinuity is increased when a tape that is recorded on one VCR is played back on another VCR. This enhancement in the discontinuity is typically caused by the switching of signals from the two alternating video-heads on the VCR during the beginning part of the VBI. Because the VBI data can be inserted into the video signal as early as line 10 (which occurs two lines after the vertical sync) the horizontal sync regenerator is phase locked into the video within this two line time interval. The VBI signal processor 701 contains a horizontal sync regenerator. The horizontal sync regenerator operates as follows: a counter counts at the 15.74 kHz frequency, to thereby operate as a flywheel for generating a horizontal sync which can regenerate the horizontal sync signal when the free-running signal is phase locked into the video. A window for phase locking is set up on both sides of the horizontal sync pulse in order to detect the leading edge of the incoming composite sync pulse. Upon detection, the counter is reset and the regenerated horizontal sync signal is aligned with the incoming composite sync signal. This abrupt recent action causes the regenerated horizontal sync signal to be more adaptive to video time based distortion and jittering and thereby producing a bent-bend adjustment instead of a smooth adjustment. However, if within the time window, no composite sync signal is detected, the flywheel rolls over and provides a horizontal sync signal in the expected position and at the same time, the error counter is incremented by one. During the next period, the time window becomes wider in proportion to the value of the error counter. When the error counter reaches four, i.e., four consecutive composite sync signals have not been detected and correspondingly the phase locking is likely to have been lost, the time window is opened wider until any composite sync signal pulse is detected. Upon such detection, the error counter is in reset and the horizontal sync regenerator becomes phase locked.

A binary up/down counter has its up/down response controlled by the composite synchronization level. When the composite synchronization level is high, the counter counts upward. Alternatively, when the composite synchronization signal is low, the counter counts downward. Functionally, such a counter works as an analog integrator of a first order analog integrator for integrating the composite sync signal. When the counter value is greater than a threshold value A, the vertical synchronization signal is set. When the counter value is below a threshold value B, the vertical synchronization signal is reset. The value of A is larger than the value of B so that the circuit has hysteresis to prevent the vertical synchronization signal from oscillating. The threshold values A and B are chosen so that the transitions of the vertical synchronization signal are made in the middle between two adjacent equalizing pulses. This ensures maximum margin in discriminating the field signal. After the vertical synchronization signal is separated, it is then synchronized with the first subsequent incoming horizontal synchronization pulse to generate a SB synchronization signal which functions as a reference for the VBI line identification.

The TV field is discriminated by measuring the half line difference between the vertical synchronization and horizontal synchronization signals in field 1 and field 2.

The first TV line after the leading edge of the SB sync signal is TV line 8 in either field. All other VBI lines can be identified by using such line as a reference. The trailing edge of the SB synchronization signal is taken as the reference rather than the leading edge so as to bypass the region of instability and distortion caused by the VCR playback mechanism. Such a instability in the distortion region is typically located before the trailing edge of the SB synchronization signal.

The close caption data acquisition is now described. An external discrete component slices the data embedded in the video into a binary TTL signal (SLIN). The SLIN signal is fed into the VBI signal processor 701 for data acquisition. The slicer operates by windowing out the clock run-in portion (described above) of the closed caption waveform and performs an analog averaging to establish its DC level. This DC level is then held in the later portion of the waveform to act as a slicing threshold.

A 1.007 MHz sampling clock (SCLK) is regenerated from the seven clock run-in pulses by phase locking onto them. The SCLK signal is then used to sample data out in the middle of the "eye" pattern to ensure maximum noise margin.

The digital phase lock loop operates by keeping the SCLK signal whose free running frequency is 0.007 MHz which is derived from the eight cycles of the crystal clock of 8.05594 MHz. Upon detecting each SLIN signal transition, a phase comparator compares the current phase of the SCLK in the current phase of the SLIN signal. If the phase is not matched, the SCLK signal is shifted a predetermined time, e.g., 124 ns, either to the left or to the right in time depending on the phase difference. Normally for the SLIN signal, transitions are necessary to convert the SCLK signal from the 180° out of phase condition which is the worst case to a phase locking condition.

The locking process employs a technique, called "the center of mass locking" to ensure that correct and consistent locking is still possible even when the slicing threshold is correct. Accordingly, the SLIN impulse does not exhibit a 50% duty factor. Duty factor distortion can also be observed in ghostly video signal. The principle is that even if the duty factor is distorted so that the intertransition time of the SLIN signal is uneven, the time between the bit server, which determines the data of frequency is controlled by a crystal stable device at the broadcast site, is exceptionally stable. Therefore, instead of locking the SCLK signal into the transition of the SLIN signal, the SCLK signal is made to look into the bit centers of the clock run-in period. This is made possible by recalling that upon detecting each transition, instead of using the current phase of the of the SCLK and SLIN signals for comparison, the bit width between the current transition and the last transition is calculated. This width is divided by two to locate the position of the bit center, then compared to the phases of the SCLK and SLIN signals in the past position.

For framing code detection and arbitration, the SLIN signal is sampled by the SCLK signal in the data bit is shifted into a shift register which functions as a moving window. The register content is then compared to the 1× format framing codes (01000011) and the 2× format framing code (10011101101) to check for matching. Once matched, the data format, i.e., 1× or 2×, is automatically identified and then subsequent data bits are wired and stored into the RAM 33, the comparison of the 1× format framing code allows one bit compare error, while that of the 2× format framing code allows 2 bits. Since the framing code of the 2× format is specially designed, it has the longest "distance" from 1× format framing code. These two different framing codes thus are difficult to confuse with each other even under the stated compare tolerance.

Data is transferred between the controller 702 and the VBI signal processor 701 through a parallel interface which is preferably an eight bit multiplexed address/data bus.

The controller 702 initiates all data transfers between the VBI signal processor 701 and the controller 702. The controller 702 first places the address, e.g., register number, on the seven least significant bits of the address (AD) bus (e.g., AD [6:0]) and the direction of the data transfer (e.g., read=1; write=0) on the most significant bit, the AD[7]. The controller 702 then pulses an Address Strobe signal high and then low.

For a read operation, the controller 702 tri-states the address bus and raises the Data Strobe signal high. In response thereto, the VBI signal processor 701 places the data for the selected address (or register) on the address bus. After the controller 702 reads the data, it lowers the Data Strobe signal low (e.g., 0) to indicate the ends of the read cycle.

For a write operation, while removing the address from the address bus, the controller 702 replaces it by the data to be written to the selected register of the VBI signal processor 701. The controller 702 then pulses the Data Strobe signal high to write the data and then low to signal the end of the write cycle.

The VBI signal processor 701 increments the contents of its address register on the falling edge of the Data Strobe signal to allow the controller 702 to write or read several successive locations without supplying a new address for each location. However, when non-consecutive registers are accessed or the direction of the data transfer changes (switching from read to write or vise versa), the controller 702 supplies a new address as described above.

The VBI signal processor 701 provides a VBI interrupt request (VBIIRQ) signal which is programmed to occur at the end of each vertical blanking interval to inform the controller 702 that data has been received and/or transmitted during the VBI. The VBI interrupt request signal is preferably an active low signal. The VBI request output of the VBI signal processor 701 is an open drain type interface and has a pullup resistor. The VBI signal processor 701 also provides two clock signals ("8 MHz" and "−8 MHz") to the controller 702. Both signals have a 50% duty cycle. The −8 MHz signal is an inverted 8 MHz signal. The 8 MHz and −8 MHz signals are disabled by pulling low an external pin and a clock enable (CLKENA) signal.

The VBI signal processor 701 has an address latching feature that allows the controller 702 to latch the lower 8 address signals (AD [7:0]) from its address data multiplexed output AD [7:0] to allow the controller to access external memory.

Having described the operation of data transfers between the VBI signal processor 701 and the controller 702, the registers in the VBI signal processor 701 are now described.

A status register (RO) is a read only register that indicates the status of various functions of the VBI signal processor 701. The status register has 8 bits. Bit 0 is a field bit. During TV field 2, the field bit is 0. During TV field 1, the field bit is 1. The field bit is valid after the trailing edge of the vertical sync signal. Bit 1 is a VBI bit. The VBI bit is 1 during the lines which can be selected for data reception and insertion, e.g., during line 10-25. Otherwise, the bit is 0. Bit 2 is a RDRA bit. The RDRA bit is 1 if there are any data packets which have been received and are waiting to be read from the controller 702. The RDRA bit is the logical OR of all bits in the reception status registers (R2-R3) described below. Bit 3 is the transmit data written (TDW) bit. The TDW bit is 1 if there is a data packet which can be written to the VBI signal processor 701 by the controller 702 and which is still waiting for insertion. This bit is set by writing to the last transmit data register (R5) (described below) and is cleared immediately after the data packet is inserted. Bit 4 is the VBI interrupt request (VBIIRQ). The VBIIRQ bit is an active high bit which is set when the VBI interrupt is activated. This bit corresponds to the output pin VBIIRQ except that the bit is active high and the pin is active low. This bit is cleared when the VBI signal processor 701 reads the status register RO. Bits 5-7 are STS, TX, and reserved, respectively, and are reserved status bits.

A control register (R1) is a register for storing control signals. Bit 0 is the interrupt enable (IEN) bit. When this bit is 1, the VBI signal processor 701 asserts the VBIIRQ interrupt output pin low immediately after the VBI goes low. The interrupt is cleared when the controller 702 reads the status register. Bit 1 is the access bit. When this bit is 1, the controller 702 writes to offset control registers (R8) and auxiliary control register (R9) which are described below. When the bit is 0, the controller 702 is disabled from changing the contents of these three registers. Bit 2 is a reserved bit. Bits 3-6 are transmit line (TL) [3:0] which specify the VBI line that is enabled for insertion of data, if TEN bit (described below)=1. These four bits specify the line number as follows: a bit value of 0 hex selects line 10; a bit value of 1 hex selects line 11 and so forth through a value of 0F hex selects line 25. Bit 7 is the TEN bit. When this bit is 1, the insertion is enabled on the TV line specified by TL [3:0]. Whenever TEN=1 and TDW=1 (bit 3 is the status register), the data packet containing the clock run-in, the frame sync, and the sixteen data bits as stored in transmit data registers (R4-R5) (described below) is inserted in the specified line. When TEN=1 and there is no data to insert (TDW=0), the line specified by TL [3:0] is deleted. In other words, zeros are inserted in place of the start bit and data bytes, and the clock run-in is still present. When TEN=0, no lines are inserted or deleted. The contents of all lines, including the line specified by TL [3:0], are bypassed in the encoder output without modification.

Reception status registers (R2-R3) are read only registers that identify the lines from which the VBI signal processor 701 has extracted data bytes in the most recent field. Each of the selectable lines has a corresponding bit in one of the reception status registers. A "1" for the corresponding bit means that a data packet has been written to the receive data registers (R40-R7F) (defined below) for that line. A "0" means that there is no data packet waiting to be read in the receive data register for this line. Immediately after register R2 is read, the VBI signal processor 701 automatically clears all bits to −0. Similarly, immediately after register R3 is read, the VBI signal processor 701 automatically clears all bits to 0. The reception status register R2 has bit 0-7 corresponding to VBI line 18 (RS18) through VBI line 25 (RS25), respectively. The reception status register R3 has bits 0-7 corresponding to VBI line 10 (RS10) through VBI line (RS17), respectively.

Transmit data registers (R4-R5) are write only register for storing data bytes received from the controller 702 for insertion in the selected line during the next field. The data bytes are stored in the order in which they are to be transmitted: register R4 is the first byte; and register R5 is the second byte. The least significant bit is transmitted first.

An offset control register (R8) is a write only register that compensates for the timing offset delay between the trailing edge of the detected composite sync signal and the actual trailing edge of the horizontal synchronization signal of the incoming video. Such offset is typically caused by the low pass filter proceeding the composite synchronization signal stripper. Bits 0-4 of the offset control register are for setting bits OFS0-OFS4, respectively. A value of 10 hex is a nominal value for compensating for a 1 μs offset delay. Incrementing or decrementing bits of the offset control register by 1 bit adjusts the offset time by 124 ns. The value of the offset control register R8 affects the insertion timing of the VBI inserter, the running key, and the clamping pulse timing. This resister is initialized before starting the, operation of the VBI signal processor 701. Bits 5-7 are not used.

An auxiliary control register R9 is a write only register for controlling the bit sampling strobing instance. Bits 0-2 are strobing bits STB [2:0]. The values are as follows:

| STB2 | STB1 | STB0 | Strobing Instance |
|---|---|---|---|
| 0 | 0 | 0 | Bit center |
| 1 | 0 | 0 | 2 cells to the left of bit center |
| 1 | 0 | 1 | 1 cell to the left of bit center |
| 1 | 1 | 0 | 2 cells to the right of bit center |
| 1 | 1 | 1 | 1 cell to the right of bit center |

One cell equals 124 ns. Bit 3 is a reserved bit. Bits 4-6 are auxiliary control bits AUX [2:0] for controlling the value of 3 external pins where one bit corresponds to one pin. If these bits are not used, the value is set to 4 hex. Bit 7 is a VCR bit. When this bit is set, the horizontal sync regenerator internal to the VBI signal processor 701 operates in a free running mode during VBI lines 10-25. During this free running mode, the regenerator disregards the detected composite synchronization pulses as stripped from the incoming video. During the copy protection feature, for example, as provided by Macrovision as noted above, this feature is activated. For a video from broadcast signals, this feature is unnecessary.

Decode mode registers (R0A and R0B) are read only registers that have the same format as the reception status registers R2, R3, and specify the type of data packet, if any, that is detected in each VBI line. If a bit is 0, the corresponding VBI line carries data and the accelerated 2× data format data packet as described above and the four data bytes are then stored in the receive data registers (R40-R7F), described below for that line. For a bit 1, the VBI line carries the caption rate data packet and the 16 data bits are then stored in the first two entries of the receive data buffer for that line.

The receive data registers (R40-R7F) are read or write data registers. For each line which is usable for reception, a four byte register holds ordinary data bytes received in that line during the most recent field. The four data bytes in each TV line are stored in which they are received in the following table.

| VBI Line Number | RX Data Register Numbers |
|---|---|
| 10 | R40-R43 |
| 11 | R44-R47 |
| 12 | R48-R4B |
| 13 | R4C-R4F |
| 14 | R50-R53 |
| 15 | R54-R57 |
| 16 | R58-R5B |
| 17 | R5C-R5F |
| 18 | R60-R63 |
| 19 | R64-R67 |
| 20 | R68-R6B |
| 21 | R6C-R6F |
| 22 | R70-R73 |
| 23 | R74-R77 |
| 24 | R78-R7B |
| 25 | R7C-R7F |

Having described the registers, a typical operation of the VBI signal processor 701 is described.

The controller 702 typically synchronizes its transactions with the VBI signal processor 701 so that the data transfers occur shortly after the end of the VBI to allow the maximum amount of time for reading any data that the VBI signal processor 701 has received in the most recent VBI lines and for writing data to the VBI signal processor 701 for insertion into the next field. This synchronization is achieved by polling the status register RO or preferably by enabling interrupts and subsequently responding to them.

For one example, if the interrupt is enabled, it produces an interrupt in each field immediately after the last line that is available for insertion (line 25).

In another example, it is assumed that interrupts are used for synchronization. If such assumption is not used, a similar result can be achieved by polling as discussed.

First, the controller 702 disables interrupts to clear any pending ones which have been produced during power up. The controller 702 then enables interrupts. Upon the occurrence of an interrupt, the controller 702 reads the status register. If RDRA=1, the controller 702 reads the reception status registers to determine on which lines data has been received and then reads the data from the corresponding data resisters. As noted above, reading the reception status registers clears them and then the controller 702 sets the VBI signal processor 701 sets the RDRA bit to 0. If the TDW bit=0, if there is data ready for insertion, the VBI signal processor 701 writes such data to the transmit data registers. In response thereto, the bit TDW is set to 1.

When the controller 702 is unable to keep up with instantaneous process loading, the interrupt service routine disables interrupts and then reenables such interrupts when all data has been processed.

Alternate Embodiments

In an alternate embodiment to all systems using pointers, the indexing VCR 10 has a VBI decoder capable of decoding all lines of the VBI or at least those lines containing relevant information. In this embodiment, pointers are not used, because the VCR processes all lines of the VBI. After reading all lines, the microprocessor controller 31 identifies the data by the type symbol. Subsequent processing of the data then continues as it does in a pointer system.

In one embodiment, the indexing VCR 10 pauses during playback whenever the user calls up an information screen, e.g., directory, timer programming, or PRI.

Although the embodiment of the indexing VCR 10 is described in terms of the components thereof as being included in the indexing VCR, the invention is not so limited. Various components of the indexing VCR may be integral to the VCR, a television, a cable box, separate therefrom or any combination.

Selections, such as programs to be watched, made from the screen may be done in several ways. A user may move using cursor keys a cursor to point to or highlight a selection and then press the enter or select button to select the highlighted items. Alternatively, the user may enter a number next to the desired selection and then press the enter key.

In one embodiment, to reduce directory listings for programs of short length, a length threshold is set so that programs shorter than the threshold are not listed in the directory. Similarly, blank spaces less than a threshold are not displayed. In one implementation, programs shorter than 3 minutes in SLP or 1 minute in SP for HR tapes and programs shorter than 2 minutes in SLP mode or ½ minute in SP mode for PR tapes are not kept in the directory.

In the foregoing, certain values and representations are used to facilitate description and understanding of the invention. For example, operations of the microprocessor controller 31 is described as being responsive to activation of certain keys ("RECORD", "PLAY", "I", "VCR PLUS+™", etc.). It will be understood, however, that such keys may be implemented by any predefined sequence of keys. Moreover, values of electrical components are shown for circuits illustrated in some of the figures, it will be understood such values are shown to facilitate implementation of the invention and the functions of the circuits can be accomplished by other values or even other components. Therefore, the foregoing description should not be read as pertaining only to the precise structures and techniques described, but rather should be read consistent with, and as support for, the following claims, which are to have their fullest and fair scope.

What is claimed is:

1. A method for managing recording of video programs, the method comprising the steps of:
   recording video programs on a video recording medium;
   storing in a memory index data identifying the location of all the video programs on the recording medium; and
   backing up the stored index data onto the recording medium as each video program is being recorded thereon.

2. The method of claim 1, in which the video programs are recorded on a plurality of cassette tapes.

3. The method of claim 2, in which the video programs recorded on the plurality of cassette tapes have a VBI and the backing up step records the index data in the VBI of the video program being recorded.

4. The method of claim 3 additionally comprising after a failure of the memory the step of retrieving the last cassette tape on which the index data in the memory was backed up based on the stored identification and downloading the index data from the last cassette tape to the memory.

5. The method of claim 2 additionally comprising the step of storing identification of the last cassette tape on which the index data in the memory was backed up.

6. The method of claim 2, in which the storing step stores the index data identifying the cassette tape and the tape location of each video program while it is being recorded.

7. The method of claim 2 additionally comprising the steps of inputting data identifying a particular cassette tape and displaying the portion of the index data stored in the memory that identifies the locations of the video programs recorded on the particular cassette tape.

8. The method of claim 7 additionally comprising the steps of inputting data to select one of the displayed video programs and transporting the cassette tape to the location of the selected video program.

9. The method of claim 8, additionally comprising the step of playing the selected video program after the transporting step.

10. The method of claim 1, in which the backing up step backs up the entire file of the memory data.

11. The method of claim 1, in which the backing up step backs up the index data in the memory each time the recording medium is turned on to record a video program.

12. The method of claim 1, in which the backing up step backs up the index data in the memory for a predetermined number of times and then stops backing up.

13. The method of claim 1, in which the backing up step stops backing up the index data in the memory each time the recording medium is turned off.

14. The method of claim 1 additionally comprising the step of using the index data in the memory to position a recording medium at the start of a selected video program.

15. The method of claim 14, additionally comprising the step of playing the selected video program.

16. The method of claim 1, in which the index data also includes the name of each video program.

17. The method of claim 1 additionally comprising the step of displaying a portion of the index data stored in memory.

18. A video recording and management system comprising:
- a video recording medium for recording video programs thereon; and
- a memory for storing index data identifying the location of all the video programs on the recording medium, wherein the stored index data is backed up onto the recording medium as each video program is being recorded thereon.

19. The system of claim 18, in which the video programs are recorded on a plurality of tapes.

20. The system of claim 19 additionally comprising the step of storing identification of the last tape on which the index data in the memory was backed up.

21. The method of claim 19 additionally comprising after a failure of the memory the step of retrieving the last tape on which the index data in the memory was backed up based on stored identification and downloading the index data from the last tape to the memory.

22. The system of claim 18 additionally comprising means for using the index data in the memory to position a recording medium at the start of a selected video program.

23. The system of claim 22, additionally comprising means for playing the selected video program.

* * * * *

UNITED STATES PATENT AND TRADEMARK OFFICE
CERTIFICATE OF CORRECTION

PATENT NO. : 7,499,628 B2
APPLICATION NO. : 10/173816
DATED : March 3, 2009
INVENTOR(S) : Yuen et al.

It is certified that error appears in the above-identified patent and that said Letters Patent is hereby corrected as shown below:

On page 1, (73) Assignee, change "inc." to -- Inc. --

On page 2, (56) References cited, reference "4,792,864" add classification -- 386/96 --

On sheet 10, Figure 11, change "INTERUPT" to -- INTERRUPT --

On sheet 40, Figure 40, in second processing box, change "BUTTOM" to -- BUTTON --

On sheet 57, Figure 55, in second processing box, change "APEARS" to -- APPEARS --

On sheet 79, Figure 82, in box labeled 10212, change "SUBSCIPTION" to -- SUBSCRIPTION --

Figure 89A:
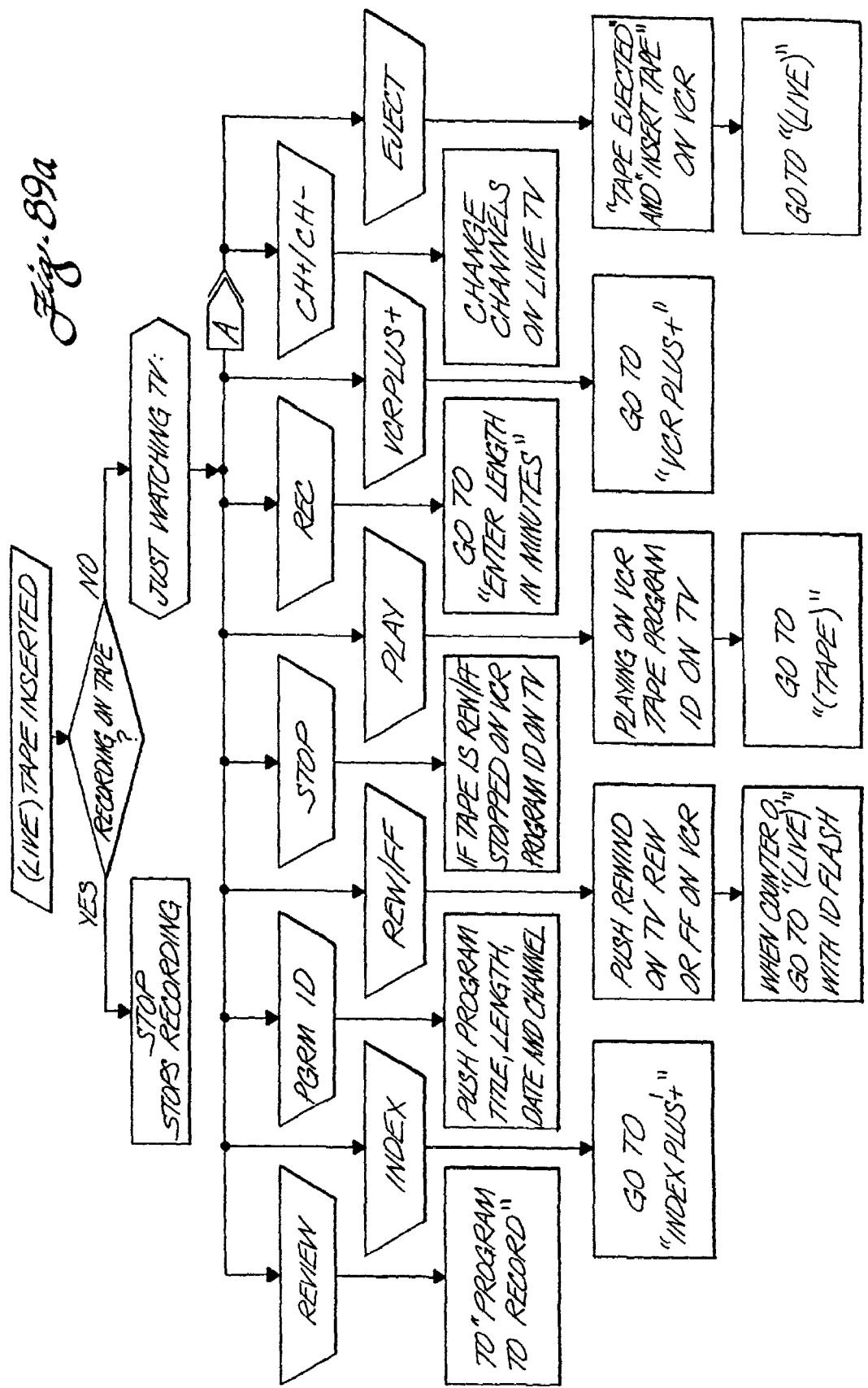
Figure 89B:
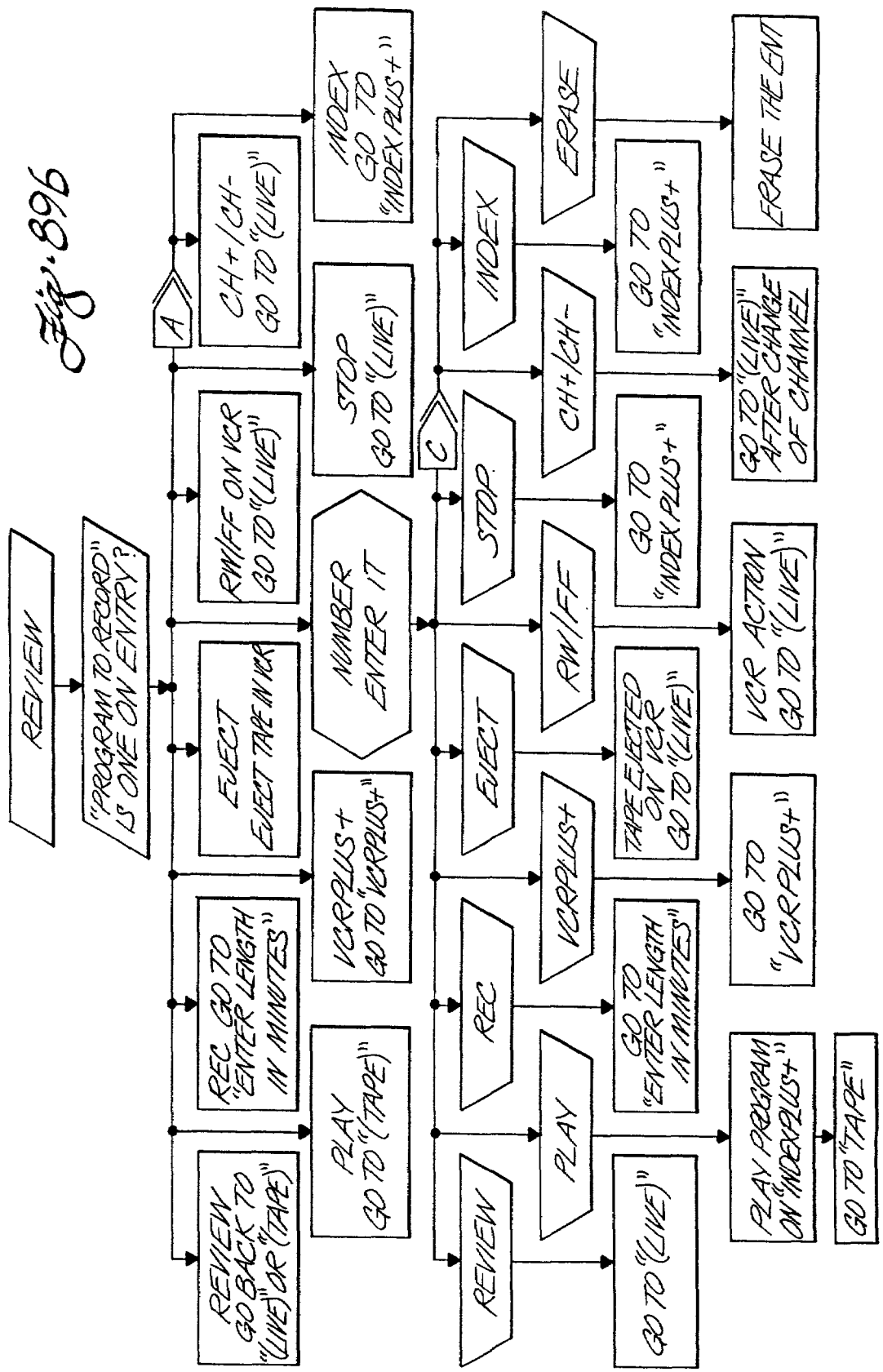
Figure 89C:
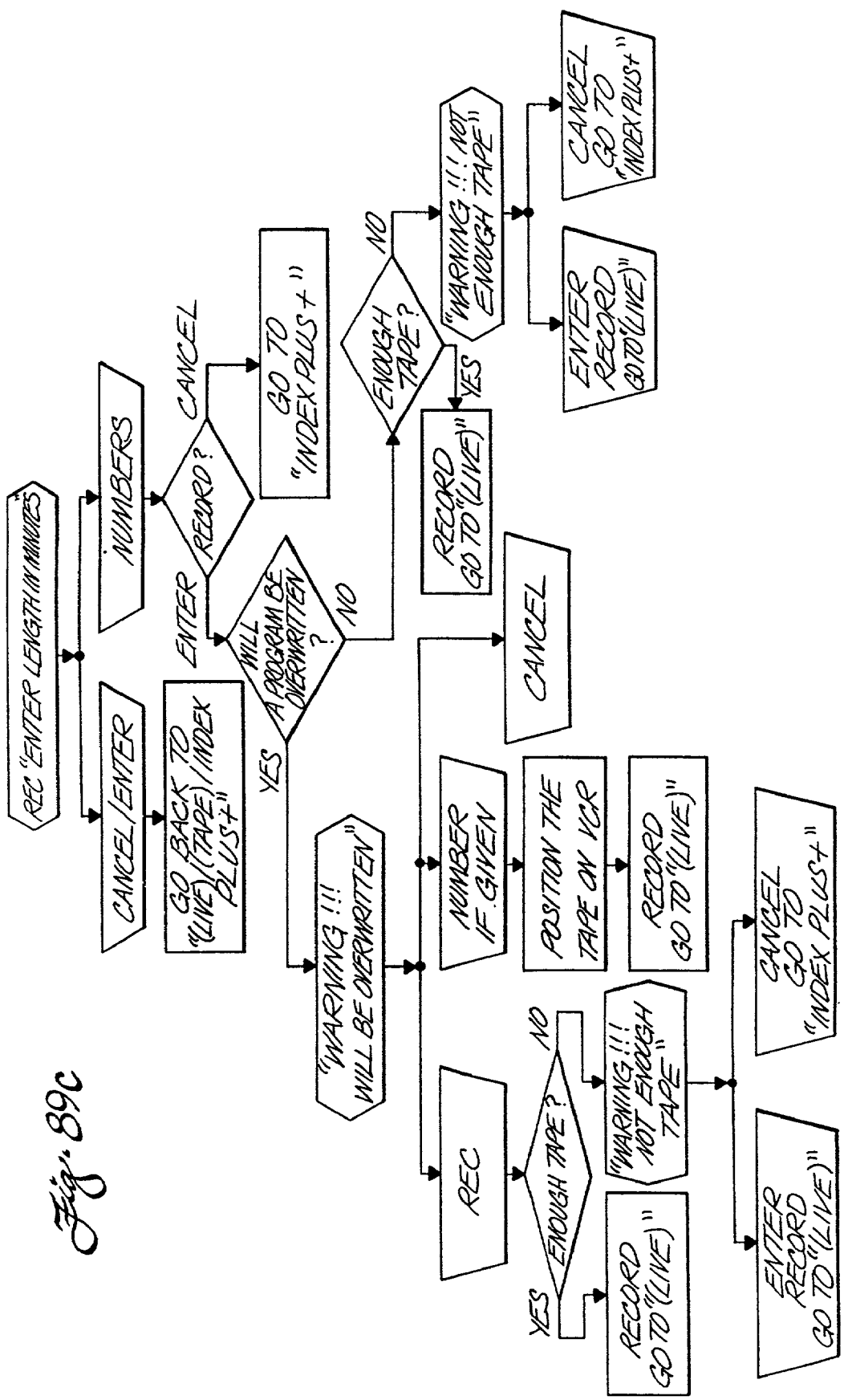
Figure 89D:
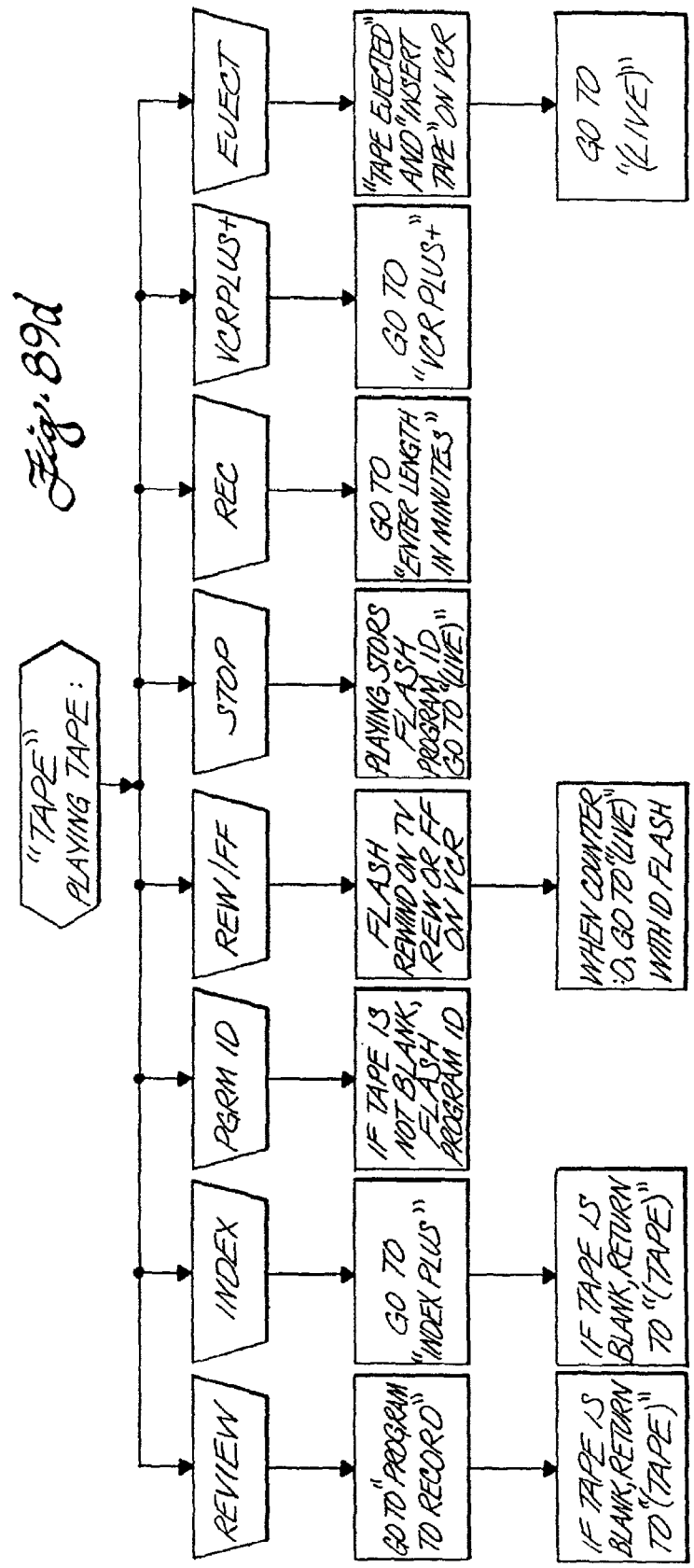
Figure 89F:
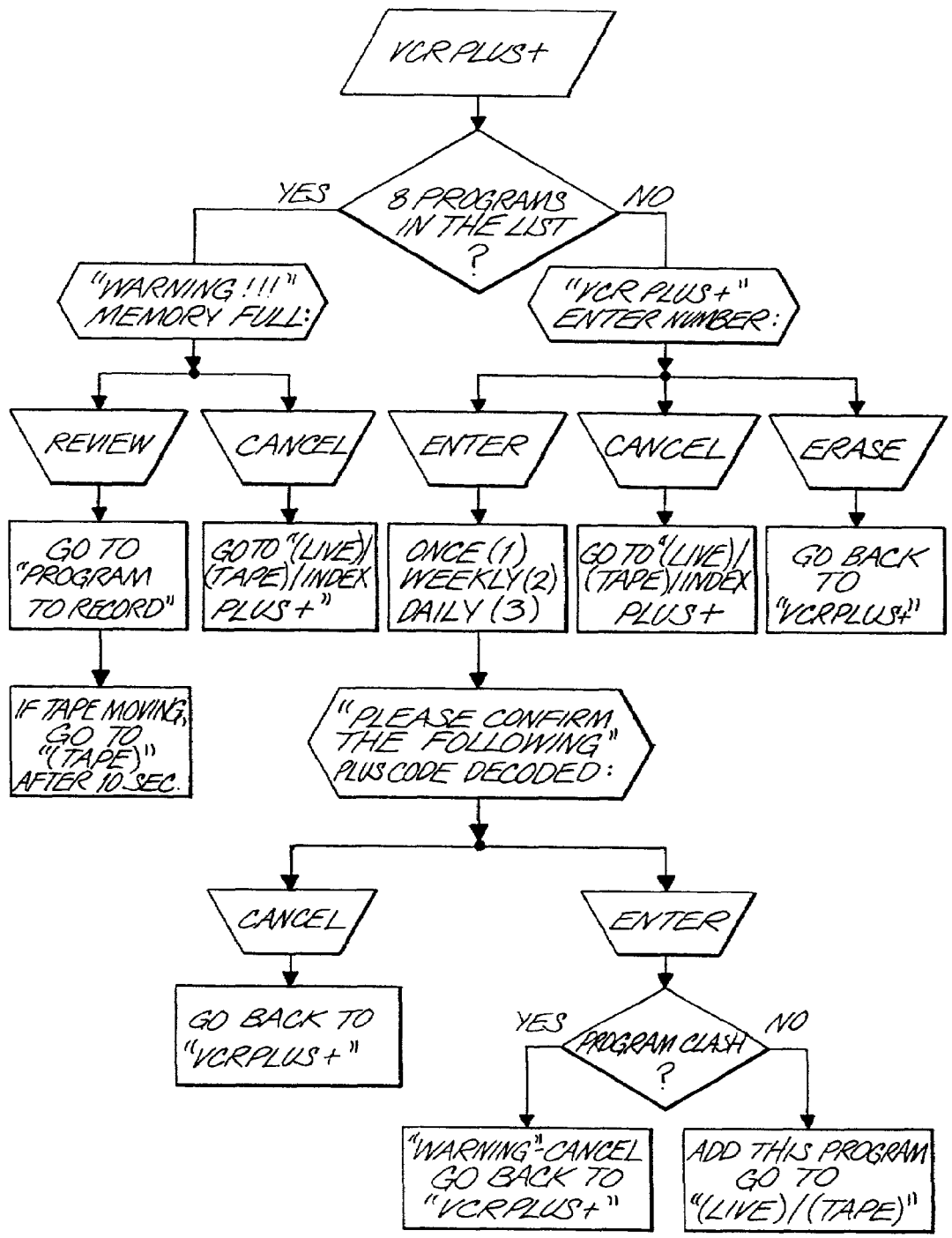

On sheet 90, Figure 89f, in upper "NO" path, in box under "CANCEL", add end quote mark after "PLUS+"

On sheet 116, Figure 92a, in box labeled 3006, insert end quote mark after "TYPE" in phrase "PROGRAM TYPE"

Column 1, line 47, change "In all;" to -- In all, --

Column 3, line 53, add -- to -- after "increase"

Column 3, line 66, add -- to -- after "increase"

Column 5, line 61, change "means-responsive" to -- means responsive --

Column 7, line 38, delete "either"

Column 9, line 52, change "or" to -- of --

Column 9, line 63, delete "a" after "create"

Column 10, line 26, delete "an" after "of"

Column 11, line 63, change ";" to -- . --

Column 11, line 65, change ";" to -- . --

UNITED STATES PATENT AND TRADEMARK OFFICE
CERTIFICATE OF CORRECTION

PATENT NO. : 7,499,628 B2
APPLICATION NO. : 10/173816
DATED : March 3, 2009
INVENTOR(S) : Yuen et al.

It is certified that error appears in the above-identified patent and that said Letters Patent is hereby corrected as shown below:

Column 11, line 67, change ";" to -- . --

Column 12, line 2, change ";" to -- . --

Column 12, line 5, change ";" to -- . --

Column 12, line 7, change ";" to -- . --

Column 12, line 12, delete """ after "97*l*"

Column 13, line 64, insert -- . -- after "versa)"

Column 14, line 49, insert -- screen -- after "and greater"

Column 15, line 4, delete quote mark after "608"

Column 16, Table I, third column, insert line space after line ending with "03 hex"; insert line space after line ending with "04 hex"

Column 17, line 10, change "in-each" to -- in each --

Column 21, line 58, insert -- be -- after "will"

Column 23, line 4, change "a-pointer" to -- a pointer --

Column 27, line 52, change "NEC 18238" to -- NEC 78238 --

Column 33, line 10, change "(150+" to -- (150 ÷ --

Column 33, line 12, change "1)÷" to -- 1)+ --

Column 33, line 45, change "Th" to -- The --

Column 34, line 64, change "if" to -- If --

Column 37, line 62, change "there" to -- There --

Column 38, line 30, change "8-022" to -- 8022 --

Column 39, line 1, change "8040 30+end" to -- 8040+end --

Column 46, line 42, change "these" to -- there --

Column 52, line 12, change "measure" to -- measured --

Column 52, line 15, change "34.0.mm" to -- 34 mm --

UNITED STATES PATENT AND TRADEMARK OFFICE
CERTIFICATE OF CORRECTION

PATENT NO. : 7,499,628 B2
APPLICATION NO. : 10/173816
DATED : March 3, 2009
INVENTOR(S) : Yuen et al.

It is certified that error appears in the above-identified patent and that said Letters Patent is hereby corrected as shown below:

Column 59, line 36, insert the word -- Tape -- after "Previously Recorded"

Column 63, line 1, change "as" to -- a --

Column 63, line 53, change "an" to -- and --

Column 65, line 59, insert -- been -- after "not"

Column 68, line 64, change "tapes" to -- takes --

Column 70, line 34, change "1" to -- $l$ --

Column 70, line 34, change "taps" to -- tape --

Column 70, line 38, change "2l + 1" to -- $2l+ 1$ --

Column 70, line 41, change "2l + 1" to -- $2l+ 1$ --

Column 70, line 44, change "2l + 1" to -- $2l+ 1$ --

Column 71, line 1, change "taps" to -- tape --

Column 74, line 16, change "PLUSCODET™" to -- PLUSCODE™ --

Column 75, line 45, change "enter" to -- enters --

Column 76, line 4, change "PRIS" to -- PRIs --

Column 76, line 16, change "110320" to -- 10320 --

Column 76, line 59, insert -- . -- before "If"

Column 79, line 59, change "The" to -- the --

Column 80, line 44, change "as" to -- has --

Column 82, line 10, change "S" to -- 5 --

Column 85, line 48, change "(steps 3753)" to -- (step 3753) --

Column 87, line 52, change "reads" to -- read --

Column 90, line 34, change "numbering" to -- numbers --

Column 91, line 49, change "three number" to -- three numbers --

UNITED STATES PATENT AND TRADEMARK OFFICE
CERTIFICATE OF CORRECTION

| | | |
|---|---|---|
| PATENT NO. | : 7,499,628 B2 | |
| APPLICATION NO. | : 10/173816 | |
| DATED | : March 3, 2009 | |
| INVENTOR(S) | : Yuen et al. | |

It is certified that error appears in the above-identified patent and that said Letters Patent is hereby corrected as shown below:

Column 94, Table XVIII, second column, insert line space after line ending with "1D 5E"; insert line space after line ending with "1D 42"; insert line space after line ending with "1D 45"; insert line space after line ending with "1D 4B"; insert line space after line ending with "1D 51"

Column 94, Table XVIII, first column, remove line space after line ending with "Text page size"; remove line space after line ending with "Text display mode"; remove line space after line ending with "Character set:"; remove line space after line ending with "Print Destination"; remove line space after line ending with "Miscellaneous"

Column 95, Table XVIII, second column, insert line space after line ending with "1C 4C"; insert line space after line ending with "1C 4E"; insert line space after line ending with "1C 50"; insert line space after line ending with "1C 52"; insert line space after line ending with "1C 54"; insert line space after line ending with "1C 56"; insert line space after line ending with "1C 58"; insert line space after line ending with "1C 5A"

Column 95, Table XVIII, first column, delete line space after line ending with "Color"; delete line space after line ending with "Character set"; delete line space after line ending with "Printable"; delete line space after line ending with "PLUSCODE™" Number"; delete line space after line ending with "Telephone Number"; delete line space after line ending with "Product description"; delete line space after line ending with "Question number"; delete line space after line ending with "Electronic coupon"; delete line space after line ending with "Keyword"; delete line space after line ending with "Others"

Column 97, Table XXI, second column, insert line space after line ending with "1D 42"; insert line space after line ending with "1D 44"; insert line space after line ending with "1D 46"; insert line space after line ending with "10 52"

UNITED STATES PATENT AND TRADEMARK OFFICE
CERTIFICATE OF CORRECTION

PATENT NO. : 7,499,628 B2
APPLICATION NO. : 10/173816
DATED : March 3, 2009
INVENTOR(S) : Yuen et al.

It is certified that error appears in the above-identified patent and that said Letters Patent is hereby corrected as shown below:

Column 97, Table XXI, first column, delete line space after line ending with "Page size"; delete line space after line ending with "Text display mode"; delete line space after line ending with "Character size"; delete line space after line ending with "Page format"; delete line space after line ending with "Miscellaneous"

Column 101, line 38, change "manufactures" to -- manufacturers --

Column 101, line 57, insert -- . -- after "point")"

Column 108, line 36, change "chance" to -- change -- and delete "is" after "tape"

Column 109, line 19, change "library, it" to -- library. It --

Column 111, line 19, change "address" to -- addresses --

Column 111, line 20, change "press" to -- presses --

Column 111, line 21, delete "of" after "search"

Column 112, line 63, change "is" to -- are --

Column 114, line 50, change "provides" to -- provide --

Column 115, line 27, delete "is"

Column 123, line 10, insert -- may -- after "otherwise"

Column 124, line 37, change "busy" to -- Busy pin --

Column 126, line 17, change "number the times" to -- the number of times --

Column 129, line 65, change "become" to -- becomes --

Column 134, line 26, change "overwrites" to -- overwrite --

Column 140, line 3, delete second occurrence of "of the"

Column 141, line 7, change "(RO)" to -- (R0) --

Column 141, line 29, change "RO." to -- R0 --

Column 142, line 1, delete "-" before "0"

Column 142, line 7, change "register" to -- registers --

UNITED STATES PATENT AND TRADEMARK OFFICE
CERTIFICATE OF CORRECTION

PATENT NO. : 7,499,628 B2
APPLICATION NO. : 10/173816
DATED : March 3, 2009
INVENTOR(S) : Yuen et al.

It is certified that error appears in the above-identified patent and that said Letters Patent is hereby corrected as shown below:

Column 142, line 62, inert -- = -- between "bit" and "1"

Column 143, line 47, insert -- and -- after "processor"

Signed and Sealed this

Twenty-fifth Day of August, 2009

David J. Kappos
*Director of the United States Patent and Trademark Office*